(12) United States Patent
Aureglia et al.

(10) Patent No.: US 8,001,461 B2
(45) Date of Patent: *Aug. 16, 2011

(54) SYSTEM FOR EXPORTING-IMPORTING THE CONTENT OF INPUT CELLS FROM A SCALABLE TEMPLATE INSTANCE TO ANOTHER

(75) Inventors: Jean-Jacques Aureglia, Saint Martin du Var (FR); Frederic Bauchot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 611 days.

This patent is subject to a terminal disclaimer.

(21) Appl. No.: 12/217,860

(22) Filed: Jul. 9, 2008

(65) Prior Publication Data

US 2009/0031205 A1 Jan. 29, 2009

Related U.S. Application Data

(63) Continuation of application No. 10/486,016, filed on Feb. 5, 2004, now Pat. No. 7,415,664.

(51) Int. Cl.
*G06F 17/00* (2006.01)
(52) U.S. Cl. ......... 715/212; 715/217; 715/219; 715/220
(58) Field of Classification Search .................. 715/212, 715/214, 217, 219, 220
See application file for complete search history.

(56) References Cited

U.S. PATENT DOCUMENTS

| 5,033,009 | A | 7/1991 | Dubnoff |
| 5,371,675 | A | 12/1994 | Greif et al. |
| 5,742,835 | A | 4/1998 | Kaethler |
| 6,292,810 | B1 | 9/2001 | Richards |
| 6,592,626 | B1 | 7/2003 | Bauchot et al. |
| 7,016,900 | B2 | 3/2006 | Gelfand |
| 2002/0133808 | A1 | 9/2002 | Bosworth et al. |
| 2005/0039113 | A1 | 2/2005 | Balducci et al. |

OTHER PUBLICATIONS

Notice of Allowance mailed on Apr. 9, 2008 for U.S. Appl. No. 10/486,016, filed Feb. 5, 2004 (issued Pat No. 7415664).
Office Action mailed on Jun. 6, 2008 for U.S. Appl. No. 10/486,016, filed Feb. 5, 2004 (issued Pat No. 7415664).
Djang et al., Similarity Inheritance: A New Model of Inheritance for Spreadsheet VPLs, Proceedings of the 1998 IEEE Symposium on Visual Languages, Sep. 1998, pp. 134-141.
International Search Report for PCT/EP02/09483.
Office Action dated Jun. 27, 2006 for U.S. Appl. No. 10/486,016, USPTO.
Chester et al., Mastering Excel 97, Fourth Edition, 1997, Sybex, pp. 41-42, 56-57, 68-73, 728-729.
Office Action dated Dec. 22, 2006 for U.S. Appl. No. 10/486,016, USPTO.
Microsoft, Screen captures depicting a pre-defined template provided as part of Microsoft Excell 2000, Copyright circa 1999,2 pages.
Office Action dated Oct. 3, 2007 for U.S. Appl. No. 10/486,016, USPTO.
Piersol, K.W., Objected-Oriented Spreadsheets: The Analytic Spreadsheet Package. In Conference Proceedings on Object-Oriented Programming Systems, Languages and Applications, ACM, pp. 385-390, 1986.

*Primary Examiner* — Doug Hutton
*Assistant Examiner* — James H Blackwell
(74) *Attorney, Agent, or Firm* — Dillon & Yudell LLP

(57) ABSTRACT

A method for exporting-importing the content of input cells from a source scalable template instance in a source multi-dimensional spreadsheet to a destination scalable template instance in a destination multi-dimensional spreadsheet comprises the steps of: detecting a command for exporting-importing input cells from a source scalable template instance in a source spreadsheet to a destination scalable template instance in a destination spreadsheet; identifying the source scalable template associated with the source scalable template instance; identifying cells, if there are any, defined as input cells in the element profile of the source scalable template; identifying the destination scalable template associated with the destination scalable template instance; identifying cells, if there are any, defined as input cells in the element profile of the destination scalable template; copying cell per cell, the content of each input cell of the source scalable template instance in each input cell of the destination scalable template instance.

1 Claim, 44 Drawing Sheets

SFTI_A:

At creation time:

| | | | |
|---|---|---|---|
| | | | ← ME_Header [401] [402] |
| | | | |
| | | | |
| | | | ← ME_Yellow [403] |

After element adding & filling:

| | | | |
|---|---|---|---|
| | | | ← ME_Header [404] [413] |
| Aureglia | Jean-Jacques | 42 | |
| Bauchot | Frédéric | 41 | |
| Bauchot | Marie-Noëlle | 41 | |
| Bauchot | Jérôme | 17 | |
| Bauchot | Lucie | 13 | |
| | | | ← ME_Yellow [414] |

SPTI_A:

At creation time:

| Family Name | First Name | Age | |
|---|---|---|---|
| | | | ← ME_Header [405] [406] |
| New Name | New First Name | | |
| New Name | New First Name | | |
| New Name | New First Name | | |
| Average | | 0.0 | ← ME_Yellow [407] |

After element adding & filling:

| Family Name | First Name | Age | |
|---|---|---|---|
| | | | ← ME_Header [408] |
| Aureglia | Jean-Jacques | 42 | |
| Bauchot | Frédéric | 41 | |
| Bauchot | Marie-Noëlle | 41 | |
| Bauchot | Jérôme | 17 | |
| Bauchot | Lucie | 13 | |
| Average | | 30.8 | ← ME_Yellow |

SPFTI_A:

At creation time:

| Family Name | First Name | Age | |
|---|---|---|---|
| | | | ← ME_Header [409] [410] |
| New Name | New First Name | | |
| New Name | New First Name | | |
| New Name | New First Name | | |
| Average | | 0.0 | ← ME_Yellow |

After element adding & filling:

| Family Name | First Name | Age | |
|---|---|---|---|
| | | | ← ME_Header [412] [411] |
| Aureglia | Jean-Jacques | 42 | |
| Bauchot | Frédéric | 41 | |
| Bauchot | Marie-Noëlle | 41 | |
| Bauchot | Jérôme | 17 | |
| Bauchot | Lucie | 13 | |
| Average | | 30.8 | ← ME_Yellow |

Fig. 4

| Name | Last change Date | Description Ptr | Min Element # | Max Element # | Type | |
|---|---|---|---|---|---|---|
| | | | | | meta | referenced |
| 722 | 723 | 724 | 725 | 726 | 728 | 727 |

Scalable Template Table — 720, 721, 729

FIG. 7C

| Name | Last change Date | Description Ptr | Info Field 1 | Info Field 2 | Type | | | Index |
|---|---|---|---|---|---|---|---|---|
| | | | | | meta | referenced | nature | selected |
| 732 | 733 | 734 | 735 | 736 | 739 | 740 | 741 | 742 |

Scalable Template Manager Table — 730, 731, 737, 738

FIG. 7D

Scalable Template Description Table

| | | |
|---|---|---|
| 767 { | MEF | MEP — 760 |
| | MEF | MEP — 761 |
| | MEF | MEP |
| | EF | EP — 762 |
| 766 { | MEF | MEP |
| | MEF | MEP — 763 |

| Address | ST | Element # | Critical | Header Size | Footer Size |
|---|---|---|---|---|---|
| Scalable Template Instance Table ─ 750 | | | | | |
| | | | | | — 751 |
| 752 | 753 | 754 | 755 | 756 | 757 |

Scalable Template Export-Import Table

| Name | Last change Date | Description Ptr | Info Field 1 | Info Field 2 | Type | | | |
|---|---|---|---|---|---|---|---|---|
| | | | | | meta | referenced | nature | selected |
| | | | | | 789 | 780 | 781 | 782 |

Scalable Template Instance Export-Import Table

| Name | Source File Name | Export Date | Row # | Exported STI Ptr |
|---|---|---|---|---|

790, 791, 792, 793, 794, 795, 796

FIG 11A — Cash Accounting Journal

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | 04/01/2001 | | Initial Balance | | | $100.00 | $0.00 | $0.00 | $0.00 |
| 4 | 04/03/2001 | Sale | Book | $25.00 | | $125.00 | $25.00 | $0.00 | $0.00 |
| 5 | 04/03/2001 | Purchase | Book | | $10.00 | $115.00 | $25.00 | $0.00 | $10.00 |
| 6 | 04/04/2001 | Sale | Book | $20.00 | | $135.00 | $45.00 | $0.00 | $10.00 |
| 7 | 04/05/2001 | Expense | Telephone | | $30.00 | $105.00 | $45.00 | $30.00 | $10.00 |
| 8 | 04/30/2001 | | Final Results | $45.00 | $40.00 | $105.00 | $45.00 | $30.00 | $10.00 |

FIG 11B — Cash Accounting Journal

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | | | Initial Balance | | | | | | |
| 4 | | | | | | $0.00 | $0.00 | $0.00 | $0.00 |
| 5 | | | | | | $0.00 | $0.00 | $0.00 | $0.00 |
| 6 | | | | | | $0.00 | $0.00 | $0.00 | $0.00 |
| 7 | | | | | | $0.00 | $0.00 | $0.00 | $0.00 |
| 8 | | | Final Results | $0.00 | $0.00 | $0.00 | $0.00 | $0.00 | $0.00 |

FIG 11C — Cash Accounting Journal

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | | | Initial Balance | | | | | | |
| 4 | | | | | | ERR | ERR | ERR | ERR |
| 5 | | | | | | ERR | ERR | ERR | ERR |
| 6 | | | | | | ERR | ERR | ERR | ERR |
| 7 | | | Final Results | $0.00 | $0.00 | ERR | ERR | ERR | ERR |

FIG 11D — Cash Accounting Journal

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | | | Initial Balance | | | | | | |
| 4 | | Sale | Book | | | $0.00 | $0.00 | $0.00 | $0.00 |
| 5 | | Sale | Book | | | $0.00 | $0.00 | $0.00 | $0.00 |
| 6 | | Sale | Book | | | $0.00 | $0.00 | $0.00 | $0.00 |
| 7 | | | Final Results | $0.00 | $0.00 | $0.00 | $0.00 | $0.00 | $0.00 |

FIG 11E — Cash Accounting Journal

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | 05/01/2001 | | Initial Balance | | | $50.00 | $0.00 | $0.00 | $0.00 |
| 4 | 05/02/2001 | Sale | Book | $20.00 | | $70.00 | $20.00 | $0.00 | $0.00 |
| 5 | 05/03/2001 | Expense | Telephone | | $15.00 | $55.00 | $20.00 | $15.00 | $0.00 |
| 6 | 05/10/2001 | Sale | Book | $18.00 | | $73.00 | $38.00 | $15.00 | $0.00 |
| 7 | 05/31/2001 | | Final Results | $38.00 | $15.00 | $73.00 | $38.00 | $15.00 | $0.00 |

FIG 11F

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | 05/01/2001 | Initial | Balance | | | $50.00 | $0.00 | $0.00 | $0.00 |
| 4 | 05/02/2001 | Sale | Book | $20.00 | | $70.00 | $20.00 | $0.00 | $0.00 |
| 5 | 05/03/2001 | Expense | Telephone | | $15.00 | $55.00 | $20.00 | $15.00 | $0.00 |
| 6 | | | | | | | | | |
| 7 | 05/10/2001 | Sale | Book | $18.00 | | $73.00 | $38.00 | $15.00 | $0.00 |
| 8 | 05/31/2001 | Final | Results | $38.00 | $15.00 | $73.00 | $38.00 | $15.00 | $0.00 |

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | 05/01/2001 | Initial | Balance | | | $50.00 | $0.00 | $0.00 | $0.00 |
| 4 | 05/02/2001 | Sale | Book | $20.00 | | $70.00 | $20.00 | $0.00 | $0.00 |
| 5 | 05/03/2001 | Expense | Telephone | | $15.00 | $55.00 | $20.00 | $15.00 | $0.00 |
| 6 | | Sale | Book | | | $55.00 | $20.00 | $15.00 | $0.00 |
| 7 | 05/10/2001 | Sale | Book | $18.00 | | $73.00 | $38.00 | $15.00 | $0.00 |
| 8 | 05/31/2001 | Final | Results | $38.00 | $15.00 | $73.00 | $38.00 | $15.00 | $0.00 |

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | 05/01/2001 | Initial | Balance | | | $50.00 | $0.00 | $0.00 | $0.00 |
| 4 | 05/02/2001 | Sale | Book | $20.00 | | $70.00 | $20.00 | $0.00 | $0.00 |
| 5 | 05/03/2001 | Expense | Telephone | | $15.00 | $55.00 | $20.00 | $15.00 | $0.00 |
| 6 | 05/10/2001 | Sale | Book | $18.00 | | ERR | ERR | ERR | ERR | 1168 |
| 7 | 05/31/2001 | Final | Results | $38.00 | $15.00 | ERR | ERR | ERR | ERR | 1169 |

FIG 11I

| Some formulas contained in the Cash Accounting Journal Illustrated in FIG 11A | |
|---|---|
| Cell | Contents of cell |
| F4 | +F3+D4-E4 |
| G4 | +G3+@IF(B4="Sale";D4;0) |
| H4 | +H3+@IF(B4="Expense";E4;0) |
| I4 | +I3+@IF(B4="Purchase";E4;0) |
| F5 | +F4+D5-E5 |
| G5 | +G4+@IF(B5="Sale";D5;0) |
| H5 | +H4+@IF(B5="Expense";E5;0) |
| I5 | +I4+@IF(B5="Purchase";E5;0) |

FIG 11J

| | A | B | C | D | E | F | G | H | I |
|---|---|---|---|---|---|---|---|---|---|
| 1 | | | | Cash Accounting Journal | | | | | |
| 2 | Date | Type of Transaction | Object of Transaction | $ In | $ Out | $ Balance | Cumulative Sales | Cumulative Expenses | Cumulative Purchases |
| 3 | 05/01/2001 | Initial | Balance | | | $50.00 | $0.00 | $0.00 | $0.00 |
| 4 | 05/02/2001 | Sale | Book | $20.00 | | $70.00 | $20.00 | $0.00 | $0.00 |
| 5 | 05/03/2001 | Expense | Telephone | | $15.00 | $55.00 | $20.00 | $15.00 | $0.00 |
| 6 | 05/10/2001 | Sale | Book | $18.00 | | $73.00 | $38.00 | $15.00 | $0.00 |
| 7 | 05/11/2001 | Sale | Book | | $10.00 | $63.00 | $38.00 | $15.00 | $0.00 |
| 8 | 05/31/2001 | Final | Results | $38.00 | $25.00 | $63.00 | $38.00 | $15.00 | $0.00 |

1173, 1171, 1172, 1170

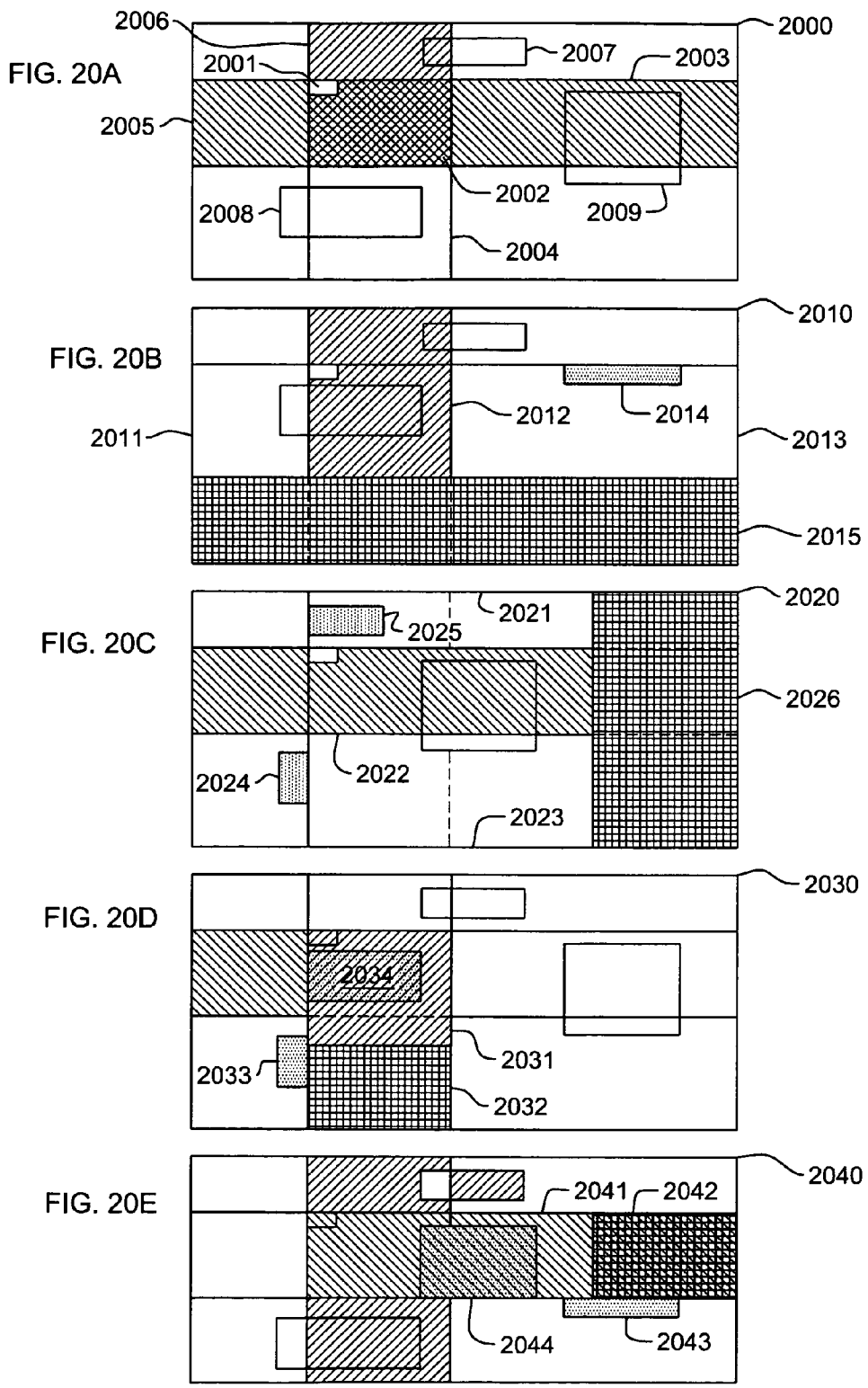

FIG. 27A
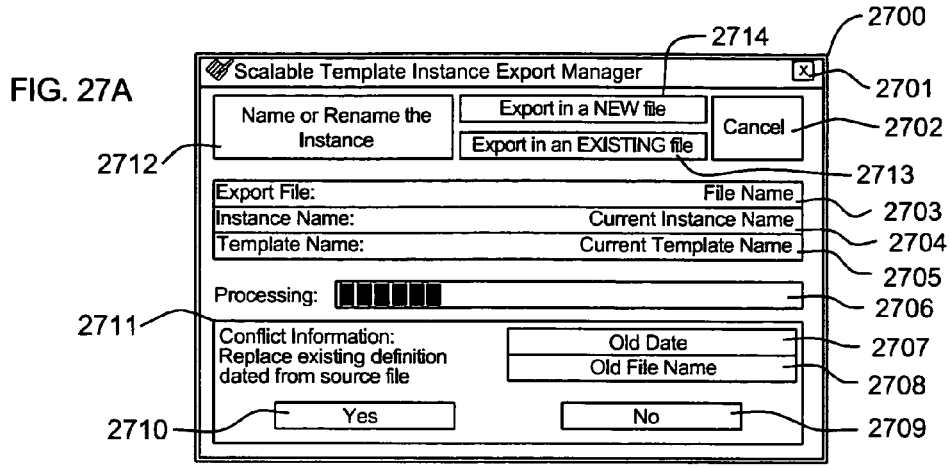
FIG. 27B
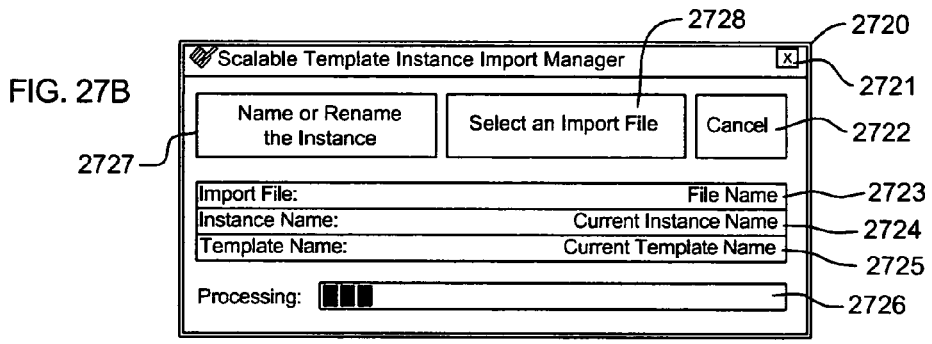
FIG. 27C
| Field # | Field Content |
|---|---|
| Exported Scalable Template Instance Table | |
| 2742 | 2743 |
FIG. 27D
| Spreadsheet Instance Export-Import File Header |
| --- |
| STEIT-like Table |
| Descriptor Area (containing ESTIT tables) |

SYSTEM FOR EXPORTING-IMPORTING THE CONTENT OF INPUT CELLS FROM A SCALABLE TEMPLATE INSTANCE TO ANOTHER

PRIORITY CLAIM

The present application is a continuation of U.S. patent application Ser. No. 10/486,016, filed on Feb. 5, 2004, now U.S. Pat. No. 7,415,664, and entitled, "System and Method in a Spreadsheet for Exporting-Importing the Content of Input Cells from a Scalable Template Instance to Another," which is incorporated herein by reference.

CROSS-REFERENCE TO RELATED APPLICATIONS

The present application is related to co-pending U.S. patent application Ser. No. 12/217,864, filed on Jul. 9, 2008, and also is related to the National Phase application of PCT/EP02/09483 filed on Jul. 26, 2002 and published in English, which claims priority from European Application 01480065.0 filed on Aug. 9, 2001, all of which are incorporated herein by reference.

FIELD OF THE INVENTION

The present invention relates to the field of information processing by digital computers, more particularly to a method and system for exporting-importing the content of input cells from a source scalable template instance in a source multi-dimensional spreadsheet to a destination scalable template instance in a destination multi-dimensional spreadsheet; a multi-dimensional spreadsheet comprising a plurality of cells identified by a cell address along each dimension, a scalable template instance comprising a variable number of contiguous elements of same size ordered and aligned along a given spreadsheet dimension and structured according to information defined in an associated scalable template.

BACKGROUND OF THE INVENTION

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsborneIMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas and/or built-in functions for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

As exposed above, one essential value of an electronic spreadsheet is to organize data into columns and rows, while automating tedious calculations. A typical, common, and valuable example of such a set of data organized into columns and rows is a range of cells. Even if a range of cells receives a formal and strict definition within electronic spreadsheet environments, it is flexible enough so that information can be included in either a single range of cells or in a set of several ranges of cells. Ranges of cells therefore are quite useful objects. A range of cell can be defined and processed as a whole entity. For example it can be copied from one place to another place within the spreadsheet or from one spreadsheet file to another spreadsheet file.

Ranges of cells are widely used in applications developed in the field of electronic spreadsheets. Most often, the ranges of cells are arranged according to some kind of structure, thus becoming structured ranges of cells. The contents of each cell is defined within an element, where an element is defined as a row of a structured range of cells, and then the same kind of element is repeated a certain number of times, to store/process a variable number of information pieces. Most of the time, several instances of similar structured ranges of cells are used. In the current context where no other tool is really available, instances of such similar structured ranges of cells are frequently created through cut/copy and paste operations.

Creating a new instance of a structured range of cells is complex and lengthy, particularly because a conventional range of cells shows strong limitations:
  (i) structure information (such as number of columns, number of rows), format information (such as font style, color or border), and contents information (such as formulas or raw—or informative—data) are mixed,
  (ii) the size of the range of cell is fixed at a given instant.

Therefore, when a spreadsheet user wants to create another range of cells with an identical structure, he/she needs to perform successively several operations. He/she needs to:
  1. copy-paste an existing structured range of cells,
  2. distinguish between areas containing raw—or informative—data and areas containing generic content such as formulas,
  3. empty the copied structured range of cells of the copied raw data while trying to keep the structure, format and generic contents,
  4. adjust the size of the structured copied range of cells to his new needs.
  5. eventually, fill the raw data area with default values, in order to ease subsequent data entry.

Furthermore, before copying and pasting a structured range of cells, the user must prepare the place for the copied structured range of cells, with the risk of overwriting, and therefore loosing the preexisting information at the destination location. This chain of operations rapidly becomes tedious, lengthy and prone to error, especially when manipulated structured ranges of cells increase in size and complexity.

Updating a structured range of cells is also very often complex, lengthy and prone to error. Such updates include additions of new elements and modifications of existing elements. Several types of modifications can be performed without any specific problem in an electronic spreadsheet environment. However, this is not the case for some modifications, for instance for insertions.

For example, if a row is added by means of a conventional function such as the spreadsheet row insertion method, the created row will be empty. This means that the value for every cell of every element needs to be entered. Entering data or executing copy/paste operations represents an important workload for the user, while the content of each element is known to a certain extent, and should follow the general structure of the structured range of cells. Moreover, normal spreadsheet functions such as the row insertion function may jeopardize the contents of some neighbour elements. A good example of an insertion jeopardising neighbour elements is the insertion of a row in a range of cells in which, on every row, a cell such as C17 or more generally (Cn), is pointing to a cell in the previous row, through a formula such as C16+B17, or more generally (Cn−1)+(Bn). After row insertion between rows 16 and 17, the formula in cell C18 becomes C16+B18 instead of the generic formula C17+B18, or more generally after row insertion between rows (n−1) and (n), the formula in cell (Cn+1) becomes (Cn−1)+(Bn+1) instead of the generic formula (Cn)+(Bn+1).

As a second example, there are cases where modifications must be done consistently throughout the structured range of cells. Today, this can only be done using specific copy-paste operations applied to the exact area to be modified. This may prove to be very difficult, especially when manipulated structured ranges of cells increase in size and complexity.

Deleting an element of a structured range of cells is an operation prone to error. As a matter of fact, normal spreadsheet functions such as the row deletion function may jeopardize the contents of some neighbour elements, leading to unresolved references (#REF results) or, even worse to wrong formulas that may be difficult to identify. Solving this problem requires additional "context intelligence", taking into account the structure of the structured range of cells in which the element deletion occurs. Another need appears at the time the user invokes the conventional Delete function after selection in the spreadsheet of one or a plurality of cells. If the selection belongs to a structured range of cells, calling the Delete function by means of a menu or by pressing the "Delete" key, leaves room to ambiguity as to what the user wants to perform. Removing this ambiguity can only be done today by selecting the exact area to be deleted, which may prove to be very difficult, especially as manipulated structured ranges of cells increase in size and complexity. Solving this problem requires additional "context intelligence" to detect this situation, take advantage of the structure of the structured range of cells and offer the relevant choice to the user.

The amount of storage that is necessary to save a structured range of cells may become prohibitive when such a structured range of cells grows in size. On another hand, an important portion of each element of such a structured range of cells may be constituted of OUT fields containing formulas, without any user provided data. Those fields are similar from element to element, and comprise redundant information. This information is not redundant from an end user standpoint, since it is certainly useful, but is redundant because it can be recreated from the base structure of the structured range of cells. Storing and/or conveying this redundant information is a waste that could be avoided if a mechanism would allow to only store/convey the informative data and the information related to the base structure of the structured range of cells.

Sorting data within a selected range of cells introduces the risk of jeopardising any neighbouring structured range of cells. This risk exists because the selected range of cells is sorted, regardless of the existence of any neighbouring structured range of cells and regardless of the respective positions of the selected range of cells versus any neighbouring structured range of cells. The risk can be avoided only by a careful and precise selection of the range to sort. This selection is prone to error, especially when structured ranges of cells grow in size and complexity. Improved control over sort operations are possible by taking into account the structure and the position of the structured ranges of cells.

The U.S. Pat. No. 5,033,009 is an interesting piece of prior art, that develops the concepts of pattern data and variable data that may be integrated to generate a worksheet file through a worksheet file generator. This invention however shows many limitations preventing it from solving the set of issues presented here above and, in particular:
  It aims at producing a new output spreadsheet from a set of two input files, while there is a need, within a user application environment, to create and manipulate new entities within an existing electronic spreadsheet file, that the user is familiar with.
  It contains no mechanism allowing the direct update of the output spreadsheet, other than the regular spreadsheet tool.
  It contains no capability to manipulate within the same spreadsheet file, a variable number of different structures and a variable number of instances of each of those structure. The granularity is limited to the spreadsheet file, while the required granularity is that of a structured range of cells.

The so called "file format specification" really mixes structure information (such as number and relative position of columns and rows), presentation information (such as font, color, background, etc.), contents information (such as formulas, etc.).

SUMMARY OF THE INVENTION

As defined in independent claims, the present invention is directed to a method, system and program for exporting-importing the content of input cells from a source scalable template instance in a source multi-dimensional spreadsheet to a destination scalable template instance in a destination multi-dimensional spreadsheet; a multi-dimensional spreadsheet comprising a plurality of cells identified by a cell address along each dimension; a scalable template instance comprising a variable number of contiguous elements of same size ordered and aligned along a given spreadsheet dimension and structured according to information defined in an associated scalable template; an element being defined as a range of cells; a range of cells comprising one or a plurality of cells; said scalable template comprising an element profile; an element profile defining a cell content and a cell destination for each cell within each element; said cell destination specifying whether the cell is an input cell for receiving an entry or an output cell for producing a result.

The method comprises the steps of:
Detecting a command for exporting-importing input cells from a source scalable template instance in a source spreadsheet to a destination scalable template instance in a destination spreadsheet;
Identifying the source scalable template associated with the source scalable template instance;
Identifying cells, if there are any, defined as input cells in the element profile of the source scalable template;
Identifying the destination scalable template associated with the destination scalable template instance;
Identifying cells, if there are any, defined as input cells in the element profile of the destination scalable template;
Copying cell per cell, the content of each input cell of the source scalable template instance in each input cell of the destination scalable template instance.

Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 4 illustrates the concepts of scalable template instances, according to the preferred embodiment of the present invention.

FIGS. 7A, 7B, 7C, 7D, 7E, 7F, 7G and 7H respectively illustrate the structure of the Element Format Table (EFT), of the Element Profile Table (EPT), of the Scalable Template Table (STT), of the Scalable Template Manager Table (STMT), of a Scalable Template Descriptor Table (STDT), of the Scalable Template Instance Table (STIT), of a Scalable Template Export-Import Table (STEIT), and of the Scalable Template Instance Export-Import Table (STIEIT) according to the preferred embodiment of the present invention.

FIGS. 11A, 11B, 11C, 11D, 11E, 11F, 11G, 11H, 11I and 11J illustrate the limitations of conventional means available in conventional electronic spreadsheet environments for managing structured ranges of cells.

FIGS. 20A, 20B, 20C, 20D, and 20E illustrate the different modes of scalable template instance deletion, according to a preferred embodiment of the present invention.

FIG. 27A shows a preferred spreadsheet user interface, according to the preferred embodiment of the present invention, for exporting scalable template instances.

FIG. 27B shows a preferred spreadsheet user interface, according to the preferred embodiment of the present invention, for importing scalable template instances.

FIG. 27C illustrates the structure of the Exported Scalable Template Instance Table (ESTIT) according to a preferred embodiment of the present invention.

FIG. 27D illustrates the logical file structure of a spreadsheet instance export-import file header.

DETAILED DESCRIPTION OF EMBODIMENTS OF THE INVENTION

System Hardware

Figure 1A:
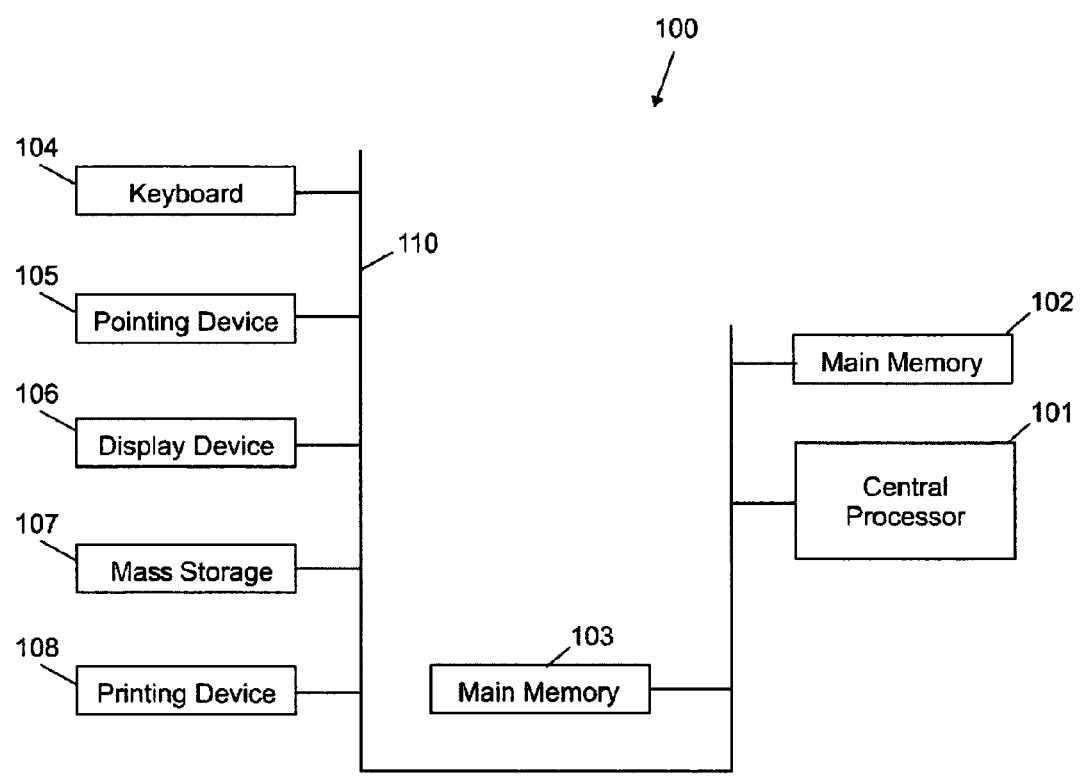
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
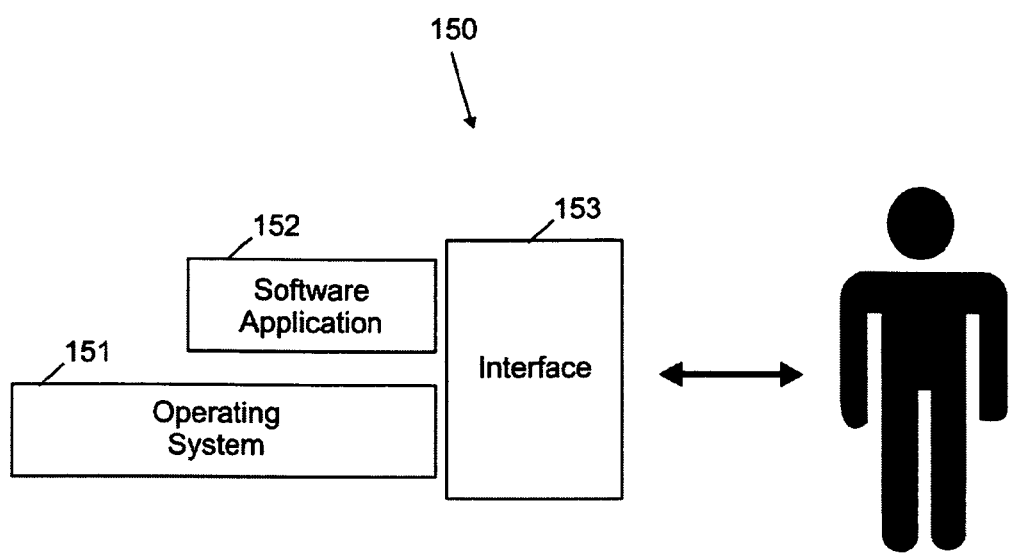
FIG. 1B is a schematic view of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
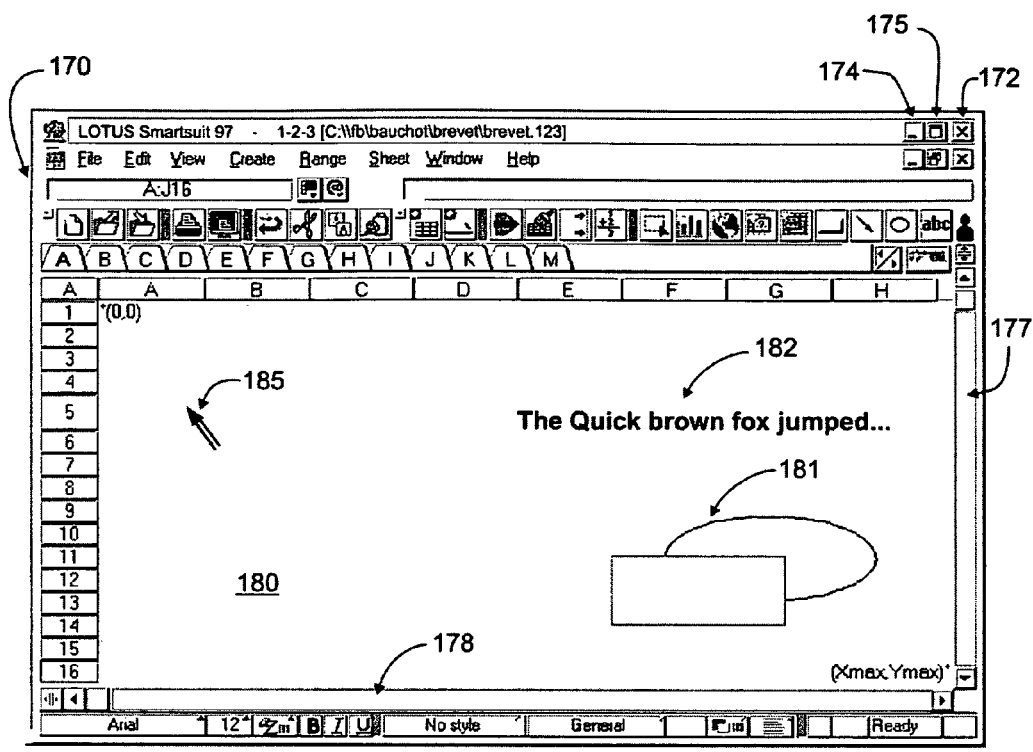
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
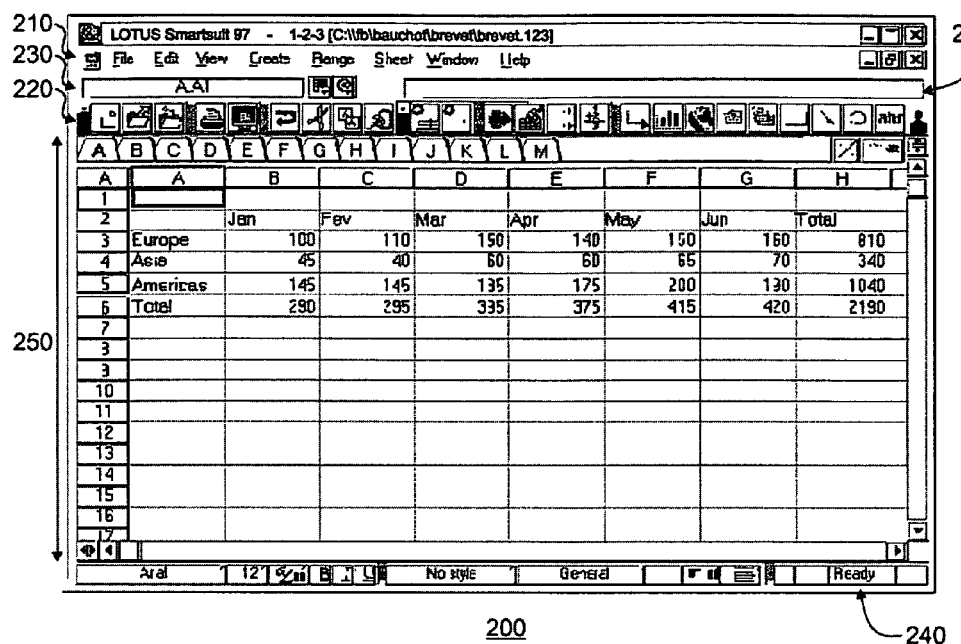
FIG. 2A shows a spreadsheet notebook interface according to the preferred embodiment of the present invention.

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
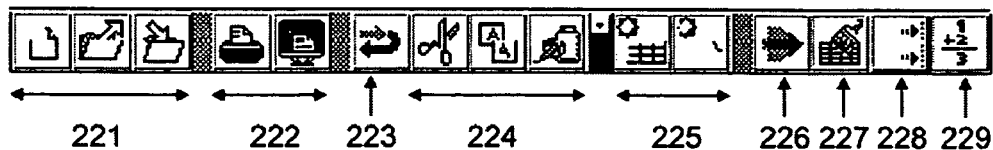
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
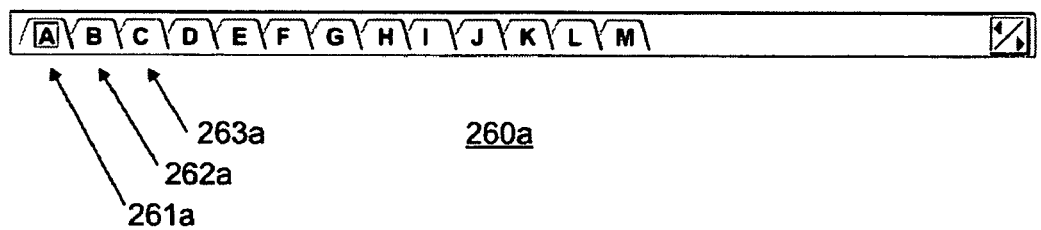
FIGS. 2C and 2D show page identifiers for rapidly accessing and manipulating individual pages of the notebook interface shown in FIG. 2A.
Figure 2D:
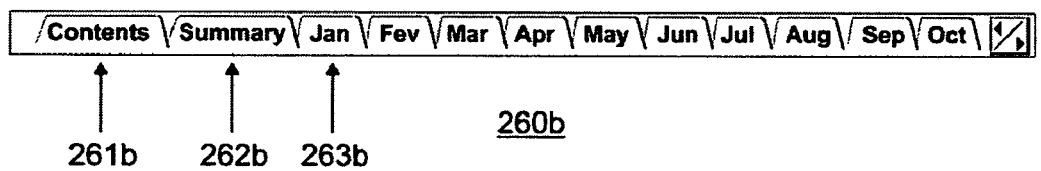

As shown in FIGS. 2C-D, individual notebook pages are identified by page identifiers 260, preferably located along one edge of a notebook. In a preferred embodiment, each page identifier is in the form of a tab member (e.g., members 261*a*, 262*a*, 263*a*) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261*a*, 262*a*, 263*a*) are respectively set to A, B, and C. Tab members are typically given descriptive names provided by the user, however. As shown in FIG. 2D, for example, the first three tab members have now been set to "Contents" (tab member 261*b*), "Summary" (tab member 262*b*), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Scalable Template Management

A. Introduction

The Concept of Scalable Templates

Conventional electronic spreadsheets include built-in means allowing the spreadsheet users to easily organize data into columns and rows, while automating tedious calculations. This set of organized data can be included in either a single range of cells or in a set of several ranges of cells. The range of cells is a quite useful, and widely used object in an electronic spreadsheet environment. It can be defined and processed as a whole entity. For example it can be copied from one place to another place within the spreadsheet or from one spreadsheet file to another spreadsheet file.

Most often, those ranges of cells abides by some kind of structure defining the contents of each cell within an element, defined as a row of the range of cells, and then repeating the same kind of elements a number of times, to store/process a variable number of information pieces. This constitutes a structured range of cells. Referring now to FIG. 11A, a simple example of such a structure, called "Cash Accounting Journal" will be used to illustrate the present application. Let us suppose the user is defining a cash accounting journal 1100 for the month of April 2001, in which is recorded, for each cash transaction, the date of transaction 1101, the type of transaction 1102 (say, Sale, Expense, Purchase), the object of the transaction 1103, the amount of money "in" 1104, the amount of money "out" 1105, the resulting balance 1106, and, say, a cumulative sum par type of transaction, i.e., from left to right Cumulative Sales 1107, Cumulative Expenses 1108, and Cumulative Purchases 1109. A first data row 1110 contains initial values for the computed fields. A last data row 1111 contains final values, with the sum of columns "$ In" 1112 and "$ Out" 1113. Two title rows 1114 and 1115, in Bold, are added for presentation and readability purposes. FIG. 11A, illustrates the structure described above, with 4 (four) transactions already recorded, 1116, 1117, 1118 and 1119. In this example, for each of the 4 (four) transactions, the first 5 (five) columns 1101, 1102, 1103, 1104 and 1105 contain raw information to be entered by the user, while the last 4 (four) columns 1106, 1107, 1108 and 1109 contain formulas that will provide the user with additional information that result from processing the raw data. For example, the cell F4 1120 contains the following formula: F3+D4−E4, and provides the new cash balance, after the transaction. Some of the formulas contained in the structured range of cells illustrated in FIG. 11A, are shown in the table of FIG. 11I. Now referring again to FIG. 11A, it should be noted, however, that the last 4 (four) columns 1106, 1107, 1108 and 1109, in the first data row 1110, contain initial values, i.e. raw data, rather than formulas. For example, the cell F3 1121 contains the initial value of the balance at the beginning of the month, i.e. $100,00.

Most often also, several instances of similar structured ranges of cells are used. Within the logic of our example, as described above and illustrated in FIG. 11A, a similar structured range of cells is created for each month, for example, in a new sheet containing an accounting journal for a given month.

In the current context of electronic spreadsheet environment, where no other tool is really available, instances of such similar structured ranges of cells are frequently be created through cut/copy and paste operations. However, a range of cells shows strong limitations:

It mixes structure information (such as number of columns, number of rows), format information (such as font style, color or border), contents information (such as formulas or raw data).

It has a given fixed size at a given instant.

Therefore, creating a new instance of such a structured range of cells, through copy/paste operations, may become complex, lengthy and prone to errors. When the spreadsheet user wants to create another structured range of cells with the same structure, he/she will need to successively perform several operations:

1. Copying-pasting an existing structured range of cells, thus obtaining another structured range of cells similar to the one illustrated in FIG. 11A.
2. Distinguishing between areas containing raw—or informative—data and areas containing structure specific information such as formulas, or titles. In our example, that means making a distinction between the columns "Date" 1101, "Type of Transaction" 1102, "Object of Transaction" 1103, "$ In" 1104, and "$ Out" 1105, which contain raw data, on one hand, and the columns "$ Balance" 1106, "Cumulative Sales" 1107, "Cumulative Expenses" 1108, and "Cumulative Purchases" 1109, which contain formulas, on the other hand. But, there are some exceptions to the above distinction:
   (i) the title rows 1114 and 1115 do not contain raw data or formulas, they contain specific titles information, that should be kept unchanged.
   (ii) the first data row (Initial Balance) 1110 contains title information in cells B3/C3 1122. This title information should be kept unchanged. It also contains initial values rather than formulas in the cells 1121, 1123, 1124, 1125 of the last 4 (four) columns "$ Balance" 1106, "Cumulative Sales" 1107, "Cumulative Expenses" 1108, and "Cumulative Purchases" 1109. These initial values must be considered as raw data.
   (iii) the last data row (Final Results) 1111 contains title information in cells B8/C8 1126, and specific formulas in cells D8 1112 and E8 1113, which should be kept unchanged.
3. Emptying the copied structured range of cells of the copied raw data while trying to keep the structure, format and generic contents. In our example, and now referring to FIG. 11B, the following cells should be cleared: A3...A8 1127; B4...E7 1128; F3...I3 1129. Through our example, and, given the distinction described above between contents that should be kept unchanged and raw data, we can easily understand the complexity of such an action and the number of opportunities for errors, especially as the spreadsheet grows beyond limits that can be easily viewed and controlled. Once this operation is performed, the resulting range of cells, appears as illustrated in FIG. 11B.
4. Adjusting the size of the copied structured range of cells to his new needs. This size adjustment most often relates to the number of elements of the copied structured range of cells, and not to the structure of the copied structured range of cells. In our example, and referring to FIG. 11B, the copied structured range of cells only contains 4 (four) elements ready to accept data entry, 1130, 1131, 1132 and 1133. But it is easily conceivable that the copied structured range of cells contains several hundred rows, thus making the size adjustment a real "must". Back to our example, and referring to FIG. 11B, we can suppose the user only needs 3 (three) elements for data entry. He will then decide to suppress 1 (one) element, for example, the first element 1130 of the new structured range of cells. In the current context of electronic spreadsheet environment, where no other tool is really available, the user may perform this deletion by using the standard row delete function, or by using the standard row delete in selected range only function. With both options, and depending on the contents of each cell, this may result into errors introduced by the row deletion, as illustrated on FIG. 11C, where cells F4 1134, G4 1135, H4 1136 and I4 1137 are in error because the formulas they each contain was referring to a cell that disappeared during the deletion. The following cells are also shown in error since they reference a cell in error. With the first option, another problem may occur if the row also contains other information outside the range on which the user is performing the delete operation.

5. Correcting any error introduced by the above steps, such as the one described above and illustrated in FIG. 11C. In our example, and referring to FIG. 11C, cell F4 1134, G4 1135, H4 1136 and I4 1137 have to be corrected by entering the correct formulas. For example, in cell F4 1134 the following formula should be entered +F3+D4−E4. The result of this correction can be seen on FIG. 11D.

6. Eventually, filling the raw data area with default values, in order to make easier subsequent data entry. In our example, and referring to FIG. 11D, we can imagine that the most frequent entry is the sale of a book. Therefore the cells of the column "Type of Transaction" 1138 may be initialised with the default value "Sale" and the cells of the column "Object of Transaction" 1139 may be initialised with the default value "Book", as illustrated on FIG. 11D.

Furthermore, before the copy-paste operation, on the structured range of cells, takes place, the user must prepare the place for the copied structured range of cells, at the destination location, with the risk, if this is not done, of overwriting, and therefore loosing the preexisting information at this location.

Once the chain of operations described above has been performed, the user is ready to use the structured range of cells by adding data into empty cells and, as needed, modifying the existing data (such as the default values predefined in the columns "Type of Transaction" 1138 and "Object of Transaction" 1139).

The chain of operations described above rapidly becomes tedious, lengthy and prone to error, especially when manipulated structured ranges of cells increase in size and complexity. In a preferred embodiment of the present invention, a user-friendly solution to these problems is proposed by allowing the electronic spreadsheet user to:

Define a structure, for a range of cells, including:
(i) an optional header part made of one or more meta-elements;
(ii) a mandatory body part made of one or more elements;
(iii) an optional footer part made of one or more meta-elements.

The structure of each meta-element of the header part may be defined in terms of attributes by a meta-element format, and in terms of contents by a meta-element profile.

The structure of all elements of the body part, may be defined in terms of attributes by an element format, and in terms of contents by an element profile.

The structure of each meta-element of the footer part may be defined in terms of attributes by a meta-element format, and in terms of contents by a meta-element profile.

This structure is called a Scalable Template. In summary, the scalable template defines a structure by specifying the number of fields, by referring to a couple of element format and element profile that defines all body elements, and, optionally, by referring to one or several couples of meta-element format and meta-element profile that define each meta-element of the header part or the footer part.

Manage scalable templates and underneath defined objects, known as element formats, element profiles, meta-element formats and meta-element profiles.

Create, or update element formats, meta-element formats.

Create, or update element profiles, meta-element profiles.

Create, or update a scalable template.

Create a scalable template instance abiding by a defined scalable template.

The above set of functions is supported by a set of tools:
the "Scalable Template Manager" method, or STM method for short;
the "Element Format Editor" method, or EFE method for short;
the "Element Profile Editor" method, or EPE method for short; the "Scalable Template Editor" method, or STE method for short;
the "Scalable Template Instanciator" method, or STI method for short.

This set of functions is defined in much further details, in the following sections.

In our example, a scalable template is developed to define the generic structure of the "Cash Accounting Journal" and thus to facilitate the creation of several instances of said "Cash Accounting Journal". Now referring to FIG. 11D, the scalable template defining the structure of "Cash Accounting Journal":

(i) Specifies the number of columns or fields, 9 (nine) in our example.

(ii) Defines the header part of "Cash Accounting Journal", through the following steps:

Defining the format of the first Title row 1140, through a meta-element format. This includes, for example, the Bold type for the font.

Defining the contents of the first Title row 1140, through a meta-element profile. This includes, for example, the text of the Title.

Defining the format of the second Title row 1141, through a meta-element format. This includes, for example, the Bold type for the font.

Defining the contents of the second Title row 1141, through a meta-element profile. This includes, for example, the text of each column title.

Defining the format of the first data row 1142, which contains initial values for the computed fields, through a meta-element format. This includes, for example, the merge of fields B and C.

Defining the contents of the first data row 1142, which contains initial values for the computed fields, through a meta-element profile. This includes, for example, the text of "Initial Balance".

(iii) Defines the body part of "Cash Accounting Journal", through the following steps:

Defining the format of all standard data rows or elements 1143 to 1145, through an element format.

Defining the contents of all standard data rows or elements 1143 to 1145, through an element profile. This includes, for example, the default value "Sale" in field 1138, the default value "Book" in field 1139, and the formulas in the four rightmost fields 1147, 1148, 1149 and 1150.

(iv) Defines the footer part of "Cash Accounting Journal", through the following steps:

Defining the format of the last data row 1146, which contains final values, through a meta-element format. This includes, for example, the merge of fields B and C.

Defining the contents of the last data row 1146, which contains final values, through a meta-element profile. This includes, for example, the text of "Final Results".

From the above scalable template, one or several scalable template instances, such as the one illustrated in FIG. 11D, can be created, at very limited cost to the user and thus avoiding the many risks for error.

Inserting an Element in a Scalable Template Instance

Given the solution briefly described above, and precisely defined in the following sections, the spreadsheet user is now able to define a range of cells structure in a scalable template, and create a scalable template instance abiding by the structure defined in the scalable template, and comprising a given number of elements, initialised thanks to the element format and element profile. In our example of "Cash Accounting Journal", the newly created scalable template instance would typically appear as illustrated in FIG. 11D. Once this creation is completed, the user may now fill in the scalable template instance with data, immediately take advantage of the predefined, structured instance that provide the necessary results, and save this instance, as part of a spreadsheet file, for further use, as required. In our example, and now referring to FIG. 11E, the user would enter:

(i) the initial values for the field "$ Balance" in cell F3 1151, for the field "Cumulative Sales" in cell G3 1152, for the field "Cumulative Expenses" in cell H3 1153, for the field "Cumulative Purchases" in cell I3 1154, (ii) the dates for the Initial Balance in cell A3 1155, and for the Final Results in cell A7 1156

(iii) the data for the 3 (three) cash transactions to be recorded in the cash accounting journal in cells A4 . . . E6 1157, while taking advantage of the default values (Sale and Book) if applicable.

Once filled with data, the instance comprises data and results, as illustrated on FIG. 11E.

However, the user will rapidly need to update the scalable template instance. Updating such a scalable template instance is also very often complex, lengthy and prone to error. Such updates include additions of new elements. Several types of modifications can be performed without any specific problem in an electronic spreadsheet environment. However, this is not the case for an insertion.

For example, if a row is added through normal electronic spreadsheet functions such as the spreadsheet row insertion method, the row created would be empty. This means that the value for every field of every element needs to be entered, thus leaving the user with heavy data entry or copy/paste workload, while the contents of each element is known to a certain extent, and should follow the general structure of the scalable template instance. This can be illustrated in our example: let us suppose the user wants to record another transaction, in the Cash Accounting Journal, for the date Jul. 5, 2001, and now referring to FIG. 11E, between rows 1158 and 1159. Inserting a row, through the normal spreadsheet row insertion method, and now referring to FIG. 11F, will result in a new row 1160, created empty, meaning that the value for every field of the element needs to be entered, thus leaving the user with heavy data entry or copy/paste workload, while the contents of each element is known to a certain extent, and should follow the general structure defined by the scalable template, including, in our example, default values of Sale and Book in cells B6 . . . C6 1161, and formulas in cells F6 . . . I6 1162. Moreover, normal spreadsheet functions such as the row insertion function may well jeopardize the contents of some neighbour elements. This problem is illustrated with our example, in FIG. 11F. The formula contained in cell F7 1163 has been changed, by the row insertion operation, to F5+D7−E7, meaning the new balance is not computed from the balance of the previous row but from the balance of the row before the previous row, and will therefore be wrong, as soon as data is entered in the newly created element. In this example, not only the user has to re-enter the formulas in the newly created row, but he also has to check the formulas in neighbour elements and to re-enter the corrupted formulas.

In a preferred embodiment of the present invention, a user-friendly solution to these problems is proposed by allowing the electronic spreadsheet user to:

change an existing scalable template instance by introducing new elements, with all predefined formats and contents of each field of the element, while insuring the integrity of all elements of the scalable template instance.

The above function is called the "Scalable Template Instance Insertion Manager" method, or STIIM method for short, and is defined in much further details, in the following sections.

In our example, and now referring to FIG. 11G, a new element 1164, with all predefined formats and contents, is inserted in the existing scalable template instance, with appropriate default values Sale and Book in cells B6 . . . C6 1165, appropriate formulas in cells F6 . . . I6 1166, while insuring the integrity of all elements of the scalable template instance. This integrity can be illustrated, in our example, for which, referring to FIG. 11G, the formula of cell F7 1167 has been changed, by the insertion of the new instance element, to F6+D7−E7, meaning the new balance is appropriately computed from the balance of the previous row. In this example, the user not only avoids re-entering the formulas in the newly created element, but also avoids checking and correcting the formulas in neighbour elements.

Deleting an Element from a Scalable Template Instance, Deleting a Scalable Template Instance Deleting an element of a scalable template instance also is an operation prone to error. As a matter of fact, normal spreadsheet functions such as the row deletion function may well jeopardize the contents of some neighbour elements, leading to unresolved references producing an error or, even worse, to wrong formulas that may be difficult to identify. This can easily be illustrated by our example. Referring to FIG. 11G, let us suppose that the user wants to delete the element on row 6 1164. Now referring to FIG. 11H, this will result in errors on row 6 1168 (which previously was row 7) and row 7 1169 due to unresolved formulas on row 6 1168 because cells previously referenced were deleted. Although this unresolved reference problem is quite natural in a normal electronic spreadsheet environment, it is not justified in a structured environment such as the scalable template instance, in which the knowledge of the structure, where the element deletion happens, allows to properly resolve the updates of the formulas. Solving this problem requires some "context intelligence", taking into account the structure of the scalable template instance in which the element deletion occurs.

Another need appears when the spreadsheet user selects one or a plurality of cells and then invokes the conventional Delete function.

If the selection does not belong to a scalable template instance, then the processing of a conventional Delete function may have some detrimental side-effects on existing scalable template instances. Furthermore such side-effects may not be clearly visible by the spreadsheet user at the time he/she invokes the Delete function. A typical example of this situation occurs for instance when the spreadsheet user initiates the deletion of a column which has a not empty intersection with an existing scalable template instance not visible on the display device 106. In this case, the column deletion operation looks safe to the spreadsheet user although it will break the structure of the scalable template instance which is not visible on the display device 106 and which partially overlaps with the column to be deleted. To guarantee that such a delete operation will not negatively impair any existing scalable template instance, the spreadsheet user has no other choice than carefully scanning the entire spreadsheet (including the part not visible on the display device 106) to determine any risk of scalable template instance corruption. This operation may prove to be very difficult, and prone to errors, especially when existing scalable template instances increase in number.

If the selection belongs to a scalable template instance, calling the Delete function by means of a menu or by pressing the "Delete" key, leaves room to ambiguity as to what the user wants to perform. In the current context of electronic spreadsheet environment, where no other tool is really available, this must be done by selecting the exact area to be deleted, which may prove to be very difficult, especially when manipulated structured ranges of cells increase in size and complexity. Solving this problem requires additional "context intelligence" to detect this situation, to take advantage of the structure of the scalable template instance and to offer the relevant choice to the user. The possible alternatives are the deletion of the whole scalable template instance, or the deletion of the selected scalable template instance elements, or the deletion of the content of the cells within the selected scalable template instance elements, or the deletion of the content of the cells within the selected range of cells. In the two former alternatives, a further distinction must be done to identify within the scalable template instance elements the cells belonging to user entry fields. Indeed the content of such cells can be cleared without breaking the structure of the scalable template instance, while other cells (which typically contain formulas producing results) must be kept unchanged to preserve the integrity of the scalable template instance. To secure this scalable template instance integrity, the spreadsheet user has no other choice that carefully determining, cell by cell, if it carries user-specified information that can be cleared, or if it produces a result through a formula that must be preserved. This operation may prove to be very difficult, and prone to errors, especially when existing scalable template instances increase in size and complexity.

In a preferred embodiment of the present invention, a user-friendly solution to these problems is proposed by allowing the electronic spreadsheet user to:

select what is to be deleted (cells content or scalable template instance element or whole scalable template instance), upon the automatic prompt triggered by calling the conventional Delete function, delete, within a scalable template instance, either the contents of input fields within selected cells, or the contents of input fields within selected elements, or the whole selected elements, while maintaining the overall integrity of the scalable template instance, or delete a whole scalable template instance.

The above function is called the "Scalable Template Instance Deletion Manager" method, or STIDM method for short, and is defined in much further details, in the following sections.

In our example, and referring to FIG. 11G, when one or several cells of row 6 1164 is(are) selected, and when the user calls the deletion function through a menu or by pressing the "Delete" key, then the user is prompted to choose between deleting the contents of the selected cells, deleting the whole element on row 6 1164, or deleting the whole scalable template instance. When the user selects the deletion of the scalable template instance element, the whole element on row 6 1164 is deleted while maintaining the integrity of the remaining scalable template instance. The result of this operation is a scalable template instance with no error, as illustrated on FIG. 11E.

Refreshing a Scalable Template Instance Upon the Modification of One of the Parent Element Format, Element Profile, Meta-Element Format or Meta-Element Profile.

Once created and used, the scalable templates have their own life cycles, meaning that they are created but they also need to be modified by the user. Upon such modifications of a scalable template, the need often appears to retrofit those changes on existing scalable template instances abiding by the structure of the modified scalable template. This is typically the case of a correction in a formula: the user wishes to retrofit the changes onto all existing scalable template instances. To be more specific, when a user changes a formula, in a given field of an element profile of a scalable template, most often, he actually wants to change the formula in a given field of every element of every scalable template instance already created and every scalable template instance to be created. Once the formula in the element profile of a scalable template has been changed, the updated formula will be included in every element of every child scalable template instance to be created. On the other hand, changing the formula in every element of every scalable template instance already created should be done manually. It is a long and complex operation, requiring a lot of data entry and/or copy-paste operations. This operation is not only long and complex, but is also prone to errors, especially when manipulated scalable template instances increase in size, complexity and number.

This can be illustrated in our example. Now referring to FIG. 11J, the user records, in a new element 1170, a new transaction: a customer returns a book. The user wants to record this transaction as a "negative" sale (the money is flowing "out" of the Cash Box), by entering the amount in the "$ Out" field. The user immediately detects that the current structure of his Cash Accounting Journal does not support this type of transaction: If the Balance is shown correct in cell F7 1171, the Cumulative Sales amount, in cell G7 1172, is shown incorrect. Now referring to FIG. 11I, this error can easily be understood by looking at the formulas contained in the field "Cumulative Sales": the "$ Out" value is not taken into account. In order to correct this problem, the user has to update the formula. In this situation, it is obvious that the formula must not be updated only in the cell G7 1172. It must be updated in the scalable template itself and in all scalable templates instances abiding by the modified scalable template.

The previous scenario, illustrated so far in the case of a cell containing a formula, applies if the spreadsheet user wishes to modify the content of a cell corresponding to an entry field within an element profile of a scalable template. Nevertheless some specific attention must be taken to avoid overwriting any specific information previously filled by the spreadsheet user in an element of an existing scalable template instance which abides by the updated profile definition. For this purpose, the spreadsheet user has no other choice than carefully scanning each of these elements that abide by the updated profile definition, to determine if the entry field was already filled by user-specified information (which should be left untouched to avoid loosing it), or was filled by the defaut content specified in the previous profile definition, which can be replaced by the new content specified in the updated profile definition, without loosing any user-specified information.

In a preferred embodiment of the present invention, a user-friendly solution to these problems is proposed by allowing the electronic spreadsheet user to:
  Automatically refresh each existing scalable template instance abiding by the structure defined in a scalable template, when the parent scalable template is updated, through the update of an element format, element profile, meta-element format or meta-element profile.

The above function is called the "Scalable Template Refresh Manager" method, or STRM method for short, and is defined in much further details, in the following sections.

Copying-Cutting/Pasting a Scalable Template Instance

A scalable template instance is an object that the user needs, at given times, to copy-and-paste or cut-and-paste. The copy-cut function for a scalable template instance can be performed using standard spreadsheet function, since the scalable template instance is comprised in a range. However, several limitations appear in the standard range copy/cut function:
  The selection of the range corresponding to the scalable template instance is a mandatory, sometime painful, operation, while it is possible to detect, at the time the copy-cut command is issued, that the current cell/selection belongs to a scalable template instance, and therefore offer the possibility to copy-cut the whole instance.
  The standard copy-cut range function does not copy-cut the scalable template instance related information, such as the reference to the parent scalable template. This means that rather than copying/cutting a scalable template instance, only the range is really copied-cut.
  In the case of the cut function, the related entry in the scalable template instance table is not removed, as necessary.

The paste function can, as well, be performed, using standard spreadsheet function. However, additional limitations appear in the standard range paste function:
  The standard paste function overwrites the previous contents of cells, thus presenting the risk of loosing information. This forces the user to make up available space for the paste, to avoid loosing data. Making up available space requires to determine the exact space necessary. Since the geometry of a scalable template instance is known, the process can therefore be automated, like it can be automated when a scalable template instance is created.
  The standard paste function would not create the related entry in the scalable template instance table necessary to really have a scalable template instance rather than a simple range.

Additionally, the standard range copy/cut and paste function do not allow to paste a scalable template instance in lieu and place of another existing scalable template instance abiding by the same template.

Also, at the time the user has selected one or more cells belonging to a scalable template instance and calls the copy-cut function, there is an ambiguity as to what the user wants to perform. He/she may want to copy/cut the content of selected cells, copy/cut one or several elements of the scalable template instance, or copy/cut the whole scalable template instance.

Finally, as the user copies-cuts/pastes, ranges of the spreadsheet that do not belong to a scalable template instance, there is a value to protect the integrity of existing scalable template instances, from any side effect.

In a preferred embodiment of the present invention, a user-friendly solution to these problems is proposed by:
  allowing the electronic spreadsheet user to:
    copy/cut a scalable template instance,
    paste a scalable template instance in lieu and place of another existing instance,
    paste a scalable template instance in any other area of the spreadsheet, after automatically preparing the necessary space to protect preexisting data,
    copy/cut one or several scalable template instance elements,
    paste one or several scalable template instance elements,
  automatically detecting that the current cell or selection is in a scalable template instance, and offering the user the options to copy-cut a scalable template instance or scalable template instance elements rather than a cell or range.

The above set of functions is supported by a set of tools: the "Scalable Template Instance Copy Manager", the "Scalable Template Instance Cut Manager" and the "Scalable Template Instance Paste Manager" methods, or STICopyM, STICutM, and STIPasteM methods for short. This set of tools is described in much further details in the following sections.

Exporting and Importing Element/Meta-Element Formats/Profiles and Scalable Templates.

As the user defines, in a given spreadsheet file, a set of element formats, meta-element formats, element profiles, meta-element profiles, and scalable templates (further referred to as scalable templates items), he is really developing an intellectual capital that may result from important development efforts, and may therefore carry a high value for the user. It is not unusual that this set of developed scalable template items, or a subset of it, can be useful in another spreadsheet file. In such a case, the user would waste a considerable amount of energy if he had to develop again the same set of template items. Copy/paste operations is, of course, an alternative, but individual copy/paste operations of such template items may indeed be in itself a huge operation.

In a preferred embodiment of the present invention, a user-friendly solution to this problem is proposed by allowing the electronic spreadsheet user to:
  Export scalable template items (i.e. element formats, element profiles, meta-element formats, meta-element profiles and scalable templates) from a spreadsheet file,
  Import scalable template items (i.e. element formats, element profiles, meta-element formats, meta-element profiles and scalable templates) into a spreadsheet file,
and, therefore, be able to reuse, in any spreadsheet file, the set of scalable templates items, that have been defined in any other spreadsheet file.

The above set of functions is supported by a set of tools: the "Scalable Template Export Manager" method, or STEM method for short, and the "Scalable Template Import Manager" method, or STIM method for short, and is described in much further details in the following sections.

Exporting and Importing the IN (or Data) Portion of Scalable Templates Instances.

During their own life cycle, scalable template instances will grow in size and the amount of data stored to save such a scalable template instance may become prohibitive. This is true while, on the other hand, it is obvious that an important portion of each element of scalable template instances may be constituted of OUT fields only comprising formulas, without any source, or essential data. Those fields, being similar from element to element, actually comprise redundant information, not redundant from an end user prospective, since it certainly is useful to display results or intermediate results, but redundant from an essential prospective because it can be recreated from the base structure information of the scalable template instance, i.e. scalable template, element format, element profile, meta-element format, meta-element profile. Storing and/or conveying this redundant information is a waste that could be avoided if a mechanism would allow to only store/convey the informative data and the base structure information.

In order to solve this problem, there is value in making a clear and formal distinction between IN fields aimed at receiving raw or informative data from the user and OUT fields, most often containing fixed values or formulas, aimed at providing results or intermediate results to the user.

In our example, and now referring to FIG. 11B, when considering the scalable template instance illustrated, the cells A3 . . . A8 1127, B4 . . . E7 1128, and F3 . . . I3 1129, are aimed at containing IN data. Other cells of the scalable template instance are aimed at providing results, using fixed content or formulas defined in the scalable template.

In a preferred embodiment of the present invention, a user-friendly solution to this problem is proposed by allowing the electronic spreadsheet user to:
  export the IN (or informative) data of a scalable template instance,
  import the previously exported IN (or informative) data of a scalable template instance, into another scalable template instance. If this previously exported IN data is imported into a scalable template instance abiding by the same structure, i.e. with the same parent scalable template, and with the same number of elements, it will reconstitute an exact copy of the original scalable template instance. The previously exported IN data may also be imported into another scalable template instance, abiding by a slightly different structure. There is value in performing such an operation, as long as the IN data is relevant in the import scalable template instance. There is, therefore, value in allowing such an operation.

The above capability results in significant user time, transmission time and storage space savings, and therefore in important cost savings. This also facilitates remote collaboration through file exchange.

In our example, and referring again to FIG. 11B, the IN data of the scalable template instance illustrated, i.e. the content of the cells A3 . . . A8 1127, B4 . . . E7 1128, and F3 . . . I3 1129, can be exported, stored and conveyed. This limited set of data, together with the parent scalable template of the instance, contains all the information necessary to recreate the original scalable template instance. This limited set of data can then be imported into another scalable template instance (thus reconstituting an exact copy of the original scalable template instance if the import scalable template instance abides by the same parent scalable template and has the same number of elements than the original instance).

The above set of functions is supported by a set of tools: the "Scalable Template Instance Export Manager" method, or STIExportM method for short; the "Scalable Template Instance Import Manager" method, or STIImportM method for short.

This set of tools is described in much further details in the following sections.

Using a Sort Application with Scalable Template Instances

Sorting data in a spreadsheet environment, and more specifically in a structured range of cells is a quite natural, often necessary operation. Considering existing tools and prior art, within an electronic spreadsheet environment, this operation can be performed, by the user, who first selects a range of cells and, then, calls the standard sort application. When performed in a spreadsheet comprising scalable template instances, the sort operation may introduce errors or break the consistency of a scalable template instance. This is the case if the range of cells selected prior to the call to the sort function (for example A1 . . . K92) overlaps the range occupied by a scalable template instance (for example H70 . . . N105). This is also the case if the range of cells selected prior to the call to the sort function overlaps the body and the footer of a scalable template instance. Moreover, at the time the user has selected one or more cells belonging to a scalable template instance and calls the sort application, there is an ambiguity as to what the user wants to perform. He/she may want to sort the contents of selected cells, sort one or several elements of the scalable template instance, or sort the whole scalable template instance.

Sorting a whole scalable template instance is a useful operation. However, to make it a meaningful operation, i.e. respect the structure of the scalable template instance, only element of the body must be sorted.

In our example, one simple sort application that could be used with all Cash Accounting Journals, is a "Date sorting" application. Now referring to FIG. 11J, this date sorting application must sort the elements of the Cash Accounting Journal, in ascend order, on the range A4 . . . A7 1173.

In a preferred embodiment of the present invention, a user-friendly solution to this problem is proposed by allowing the electronic spreadsheet user to:
  sort ranges within the spreadsheet file, while protecting the consistency of existing scalable template instances,
  sort several elements of a scalable template instance,
  sort a whole scalable template instance (i.e. all elements of the body part of a scalable template instance).

The above function is referred to as the "Scalable Template Instance Sort Application Manager" method, or STISAM method for short, and is defined in much further details, in the following sections.

B. Concepts and Vocabulary

The purpose of this section is to formalize both some concepts (with associated objects) and some vocabulary defined within the scope of the present invention. In the following descriptions, it is assumed that spreadsheets are in two dimensions (2D), so that tables and structures can be described in a 2D environment. Moreover it is assumed that tables are organized vertically, so that the table headings are on the top of the table instead of being on its left. This allows to significantly clarify the description of the various original concepts, objects, and methods which are part of the present invention, but this does not limit in any way the scope of the invention. In other words, the underneath description can be generalized to environment with either 2D tables organized horizontally or with 3D tables, without departing from the spirit of the present invention.

B1. Preliminary Definitions

Structured Range of Cells: a structured range of cells is a range of cells that abides by some kind of structure organising the data into rows and columns. Columns define fields aimed at containing the same kind of information on each row. Rows define records (or elements).

Table: the word table can be used to designate a structured range of cells.

Field: a field is a labeled column in a database or table that contains the same kind of information for each record (or element). For example, a customer table may contain fields labeled Name, Address and Tel #.

By extension, in a given record (or element), a given field refers to the cell located at the intersection of the record (or element) and the given field (labeled column).

The above definitions are for a 2D environment where columns define fields and rows define records. They can be transposed in a 2D environment where rows define fields and columns define record. They can also be transposed in a 3D environment, where, for example, sheets define records.

IN/OUT Cell: a cell is specified as "IN" cell when assumed to be used for recording user provided information. A cell is specified as "OUT" cell when assumed to be used for producing information (generally obtained through formulas whose arguments refer directly or indirectly to "IN" cells).

B2. Object Definitions

The following objects are defined to help the understanding of the invention.

Figure 3:
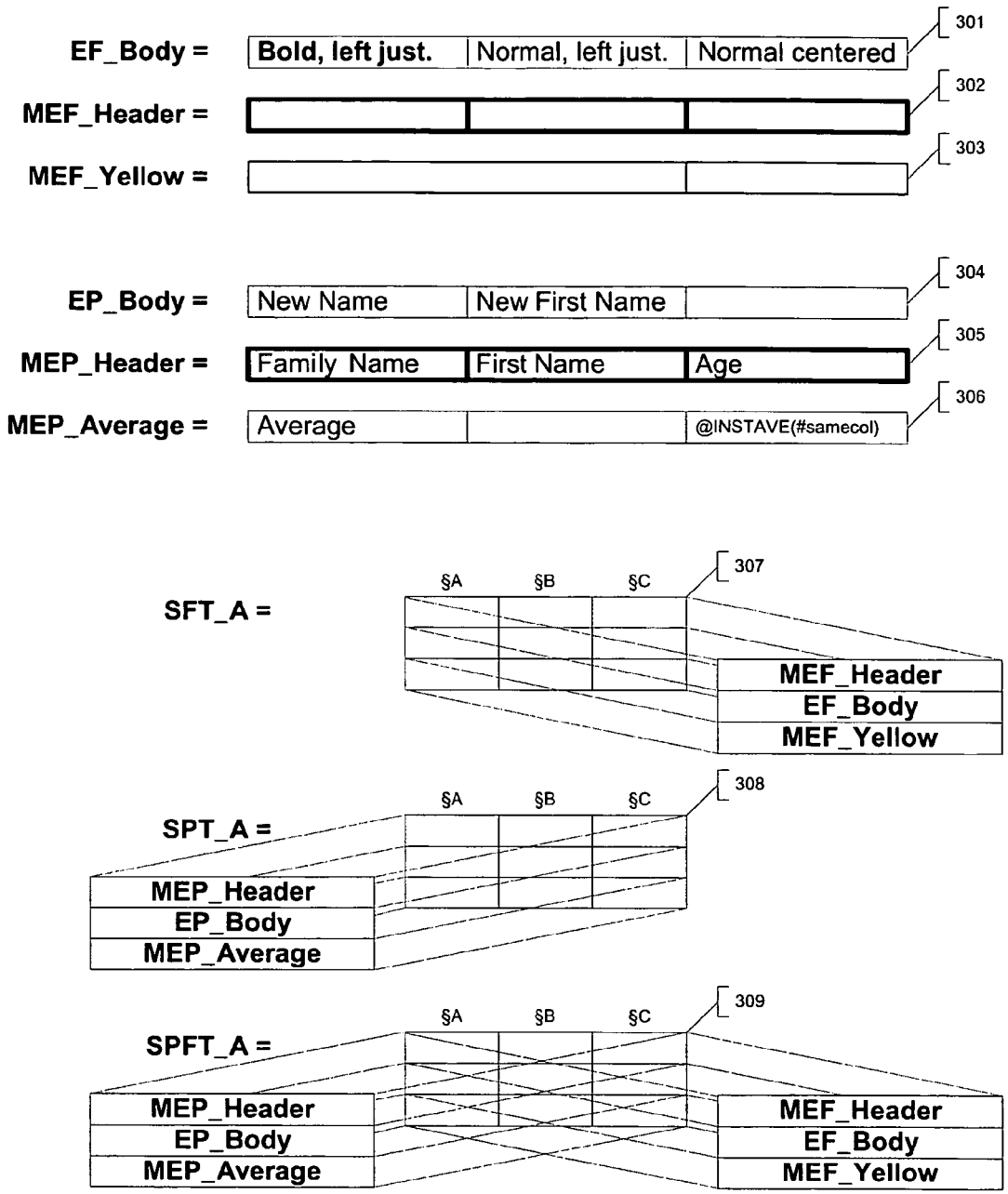
FIG. 3 illustrates the concepts of formats, profiles, and scalable templates, according to the preferred embodiment of the present invention.

Element Format: an element format is a spreadsheet object defining the structure of an element within a 2 dimensions or a 3 dimensions range of cells, in terms of format attribute:
- Background attributes (color, pattern, etc . . . ),
- Alignment attributes (horizontal, vertical, text wrapping, alignment across columns, etc . . . )
- Font attributes (size, color, etc . . . )
- Line attributes (type, color, etc . . . )
- Protection of the field
- and any other conventional format attribute.
- Example: Referring now to FIG. 3, an element format EF_Body 301 could define the structure of a 2 dimension range as a 3 field table, where the first field is with bold font, left justified; where the second field is with normal font, left justified; and where the third field is with normal font, centered.

Meta-Element Format: a meta-element format is a spreadsheet object defining the structure of a meta-element within a 2 dimensions or a 3 dimensions range of cells, in terms of format attribute:
- Background attributes (color, pattern, etc . . . ),
- Alignment attributes (horizontal, vertical, text wrapping, cell merging, etc . . . )
- Font attributes (size, color, etc . . . )
- Line attributes (type, color, etc . . . )
- Protection of the field
- and any other conventional format attribute.
- Example: A meta-element format MEF_Header 302 could define the structure of a 2 dimensions range by defining it as a 3 column, single row structure made of three fields, each field being bordered by a solid line.
- Example: A meta-element format MEF_Yellow 303 could define the structure of a meta-element part of a 2 dimensions range by defining it as a 3 cell structure, all with yellow background color, and where the two left most cells are aligned across columns (a.k.a. "merged cells").

Element Profile: an element profile is a spreadsheet object defining the structure of an element within a 2 dimensions or a 3 dimensions range of cells, in terms of content and destination:
- formulas for fields to be computed from data comprised in other fields of the same element, or in other fields of another element or meta-element of the same instance, or even in other fields outside the instance.
- field default values to be assigned at element creation time.
- destination of the cells (data entry for "IN" cells or data produced for "OUT" cells).
- Example: An element profile EP_Body 304 could define the structure of a 2 dimension range as a 3 fields table, where the first field has a default value "New Name", where the second field has a default value "New First Name" and where the third field has a void default value.

Meta-Element Profile: a meta-element profile is a spreadsheet object defining the structure of a meta-element within a 2 dimensions or a 3 dimensions range, in terms of content and destination:
- formulas for cells to be computed from data comprised in other cells of the same element, or in other cells of another element or meta-element of the same instance, or even in other cells outside the instance.
- cell default values to be assigned at meta-element creation time.
- destination of the cells (data entry for "IN" cells or data produced for "OUT" cells)
- Example: A meta-element profile MEP_Header 305 could define the structure of a 2 dimensions range by defining it as a 3 cell structure, the leftmost cell being filled with the content "Family name", the middle cell being filled with the content "First Name", and the rightmost cell being filled with the content "Age". All these three cells are "OUT" cells.
- Example: A meta-element profile MEP_Average 306 could define the structure of a 2 dimensions range by defining it as a 3 cell structure, the leftmost cell being filled with the content "Average", the middle cell being filled with a void content, and the rightmost cell containing a formula computing the average value of the rightmost field of the elements within the instance. All these three cells are "OUT" cells.

Scalable Template (also referred to as "Template"): A scalable template is a spreadsheet object defining the structure of a 2 dimensions or a 3 dimensions range of cells, in terms of {element+meta-elements} layout. The word "scalable" refers to the capability of the scalable template of defining a given structure for variable size (e.g. ranging from a minimum value to a maximum value) range of cells. The scalable template defines a structure by:
- specifying the number of fields,
- by referring to a couple of element format and/or element profile that defines each body element, and,
- optionally, by referring to one or several couples of meta-element formats and/or meta-element profiles.

In a 2 dimensions environment, such meta-element formats/profiles are either located above the element format/profile, constituting the scalable template "header" part, or located below the element format/profile, constituting the scalable template "footer" part. Either the scalable template "header" part or the scalable template "footer" part, or both of them may be empty.

When the element and meta-element references are only constituted by element profiles and meta-element profiles, then the scalable template only carries contents information and can thus be named Scalable Profiled Template.

When the element and meta-element references are only constituted by element formats and meta-element formats, then the scalable template only carries format information and can thus be named Scalable Formatted Template.

When the element and meta-element references are constituted by any combination of both profiles and formats, then the scalable template carries both profile and format information and can thus be named Scalable Profiled & Formatted Template.

Example: A scalable template SFT_A 307 could define the structure of a 2 dimensions range by defining a three column (referred to as A, B, C) structure made by a top meta-element format MEF_Header 302 (the "header" part), a middle element format EF_Body 301 and a bottom meta-element format MEF_Yellow 303 (the "footer" part).

Example: A scalable template SPT_A 308 could define the structure of a 2 dimensions range by defining a three field (referred to as A, B, C) structure made by a top meta-element profile MEP_Header 305 (the "header" part), a middle element profile EP_Body 304 and a bottom meta-element profile MEP_Average 306 (the "footer" part).

Example: A scalable template SPFT_A 309 could define the structure of a 2 dimensions range by defining a three field (referred to as A, B, C) structure made by a top meta-element format MEF_Header 302 coupled with a top meta-element profile MEP_Header 305 (both constituting the "header" part), a middle element format EF_Body 301 coupled with a middle element profile EP_Body 304 and a bottom meta-element format MEF_Yellow 303 coupled with a bottom meta-element profile MEP_Average 306 (both constituting the "header" part).

Scalable Template Instance (also referred to as "Instance" or "scalable instance"): A scalable instance is a spreadsheet object abiding by the structure of a defined scalable template: a scalable formatted template, or a scalable profiled template, or a scalable profiled & formatted template. An instance may be viewed as a child object of the scalable template. It contains a variable number of elements (at least one) containing information, in each field, corresponding to the parent structure, and constituting the "body" part, plus optionally one or several meta-elements, as defined by the scalable template, and constituting the "header" part and the "footer" part of the scalable template instance.

Example: Referring now to FIG. 4, an instance SFTI_A 401 is created, with a specified number of 3 elements structured according to the scalable formatted template SFT_A 307. The instance SFTI_A 401 is then a 2 dimensions table, with 3 columns, made of three parts. The top "header" part is a meta-element ME_Header. 402, abiding by the meta-element format MEF_Header 302, made of three cells, all bordered with a solid line. The second "body" part is a 3 column wide table made of a variable number of elements (3 in the example), all abiding by the element format EF_Body 301, so that the first field is with bold font, left justified; the second field is normal font, left justified; and the third field is normal font, centered. The bottom "footer" part is a meta-element ME_Yellow 403 abiding by the meta-element format MEF_Yellow 303, made of three cells, all with yellow background color. Each element of the instance (within the middle "body" part) would be 3 column wide. A variable number (between minimum and maximum size) of elements, initially empty, could be added to the instance SFTI_A 404 and filled by the user.

Example: An instance SPTI_A 405 is created, with a specified number of 3 elements structured according to the scalable profiled template SPT_A 308. The instance SPTI_A 405 would then be a 2 dimensions table, with 3 columns, made of three parts. The top "header" part is a meta-element ME_Header 406, abiding by the meta-element profile MEP_Header 305, made of three cells, respectively filled with contents "Family Name", "First Name" and "Age". The second "body" part is a 3 column wide table made of a variable number of elements (3 in the example), all abiding by the element profile EP_Body 304, respectively initialised with default values "New Name", "New First Name" and void. The bottom "footer" part is a meta-element ME_Yellow 407 abiding by the meta-element profile MEP_Average 306, made of three cells, respectively filled with contents "Average", void, "@INSTAVE(#samecol)". Each element of the instance (within the middle "body" part) would be 3 column wide. A variable number (between minimum and maximum size) of elements, initially filled with default values, could be added to the instance SPTI_A 408, and then filled by the user.

Example: An instance SPFTI_A 409 is created, with a specified number of 3 elements structured according to the scalable profiled & formatted template SPFT_A 309. The instance SPFTI_A 409 would then be a 2 dimensions table, with 3 columns, made of three parts. The top "header" part is a meta-element ME_Header 410, abiding by the meta-element format MEF_Header 302 and the meta-element profile MEP_Header 305, made of three cells, all bordered with a solid line, respectively filled with contents "Family Name", "First Name" and "Age". The second "body" part is a 3 column wide table made of a variable number of elements (3 in the example), all abiding by the element format EF_Body 301 and the element profile EP_Body 304, respectively initialised with default values "New Name", "New First Name" and void, and so that the first field is with bold font, left justified; the second field is normal font, left justified; and the third field is normal font, centered. The bottom "footer" part is a meta-element ME_Yellow 411 abiding by the meta-element format MEF_Yellow 303 and a meta-element profile MEP_Average 306, made of three cells, all with yellow background color, respectively filled with contents "Average", void, "@INSTAVE(#samecol)". Each element of the instance (within the middle "body" part) would be 3 column wide. A variable number (between minimum and maximum size) of elements, initially filled with default values, could be added to the instance SPFTI_A 412 and then filled by the user.

Element: An element is a spreadsheet object belonging to a scalable instance, and made of elementary fields abiding either by an element format, or by an element profile, or by a couple (element template, element profile) found in the parent structure (respectively scalable formatted template, or scalable profiled template, or scalable profiled & formatted template). Without loosing any generality, it is assumed that an element always abides by a couple (element template, element profile), where either the element template or the element profile can be reduced to a void object.

Example: An element of instance SFTI_A 404 can contain "Aureglia" in the first element field, "Jean-Jacques" in the second element field and "42" in the third element field. A similar element could be found in other instances like SPTI_A 408 and SPFTI_A 412.

Meta-Element: A meta-element is a spreadsheet object belonging to an instance, and made of elementary cells abiding either by a meta-element format, or by a meta-element profile, or by a couple (meta-element template, meta-element profile). Without loosing any generality, it is assumed that a meta-element always abides by a couple (meta-element template, meta-element profile), where either the meta-element template or the meta-element profile can be reduced to a void object.

Example: In the scalable template instance SFTI_A 404, a meta-element ME_Header 413 is abiding by the MEF_Header 302 meta-element format, and a meta-element ME_Yellow 414 is abiding the MEF_Yellow 303 meta-element format.

Figure 5:
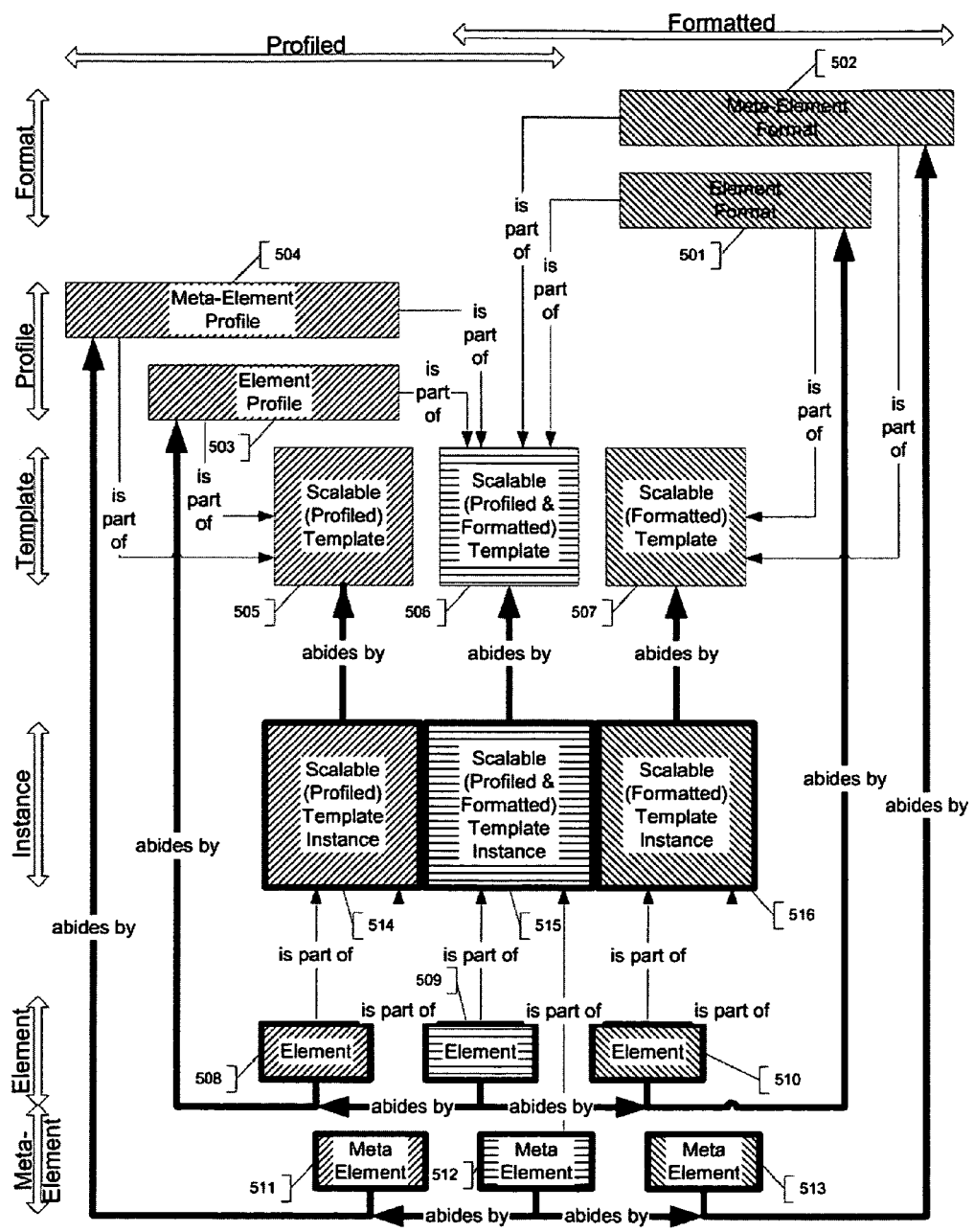
FIG. 5 provides a structured organisational view of the concepts of formats, profiles, scalable templates, and scalable template instances according to the preferred embodiment of the present invention.

All the objects introduced above can be advantageously arranged in a positioning diagram, as shown in FIG. 5. Element formats 501, meta-element formats 502, element profiles 503, meta-element profiles 504 are part of scalable templates 505, or 506 or 507. In turn elements 508 or 509 or 510 and meta-elements 511 or 512 or 513 are respectively part of scalable template instances 514 or 515 or 516 which respectively abide by scalable templates 505 or 506 or 507.

C. Tables Used for Managing Scalable Template Objects

As introduced in the previous section, the preferred embodiment of the present invention relies on different types of objects for managing scalable templates. These objects are recorded in different repositories, so that they can be accessed and updated by the different methods which are part of the preferred embodiment of the present invention.

Such repositories are referred to as tables:
The Element Format Table or EFT for short,
The Element Profile Table or EPT for short,
The Scalable Template Table or STT for short,
The Scalable Template Manager Table or STMT for short.
The Scalable Template Descriptor Table or STDT for short.
The Scalable Template Instanciator Table or STIT for short.
The Scalable Template Export-Import Table or STEIT for short.
The Scalable Template Instance Export-Import Table or STIEIT for short.
The Exported Scalable Template Instance Table or ESTIT for short.

The EFT, EPT, STT, STDT and STIT tables are saved as part of the spreadsheet disk file on the mass storage 107, whereas the STMT table is temporarily saved on the main memory 102 and the STEIT, STIEIT and ESTIT tables are saved on spreadsheet export-import files and spreadsheet instance export-import files.

C1. Element Format Table

Figure 7A:
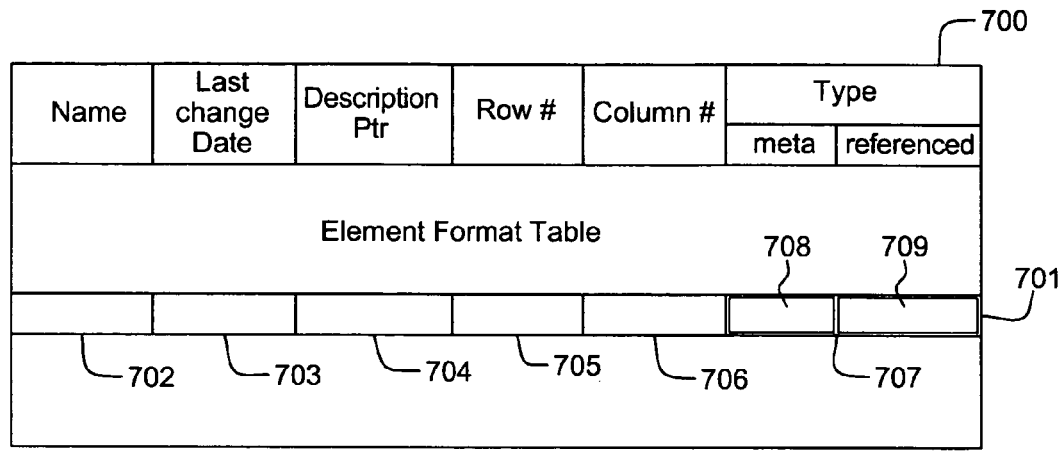

Referring now to FIG. 7A, the EFT Table 700 corresponds to a logical simple structure made of several records 701, each of them corresponding to an element format or to a meta-element format, according to the present invention. Each record includes six fields:

The "Name" 702 field is used for recording a character string which uniquely identifies the element format or the meta-element format described by the current record 701.

The "Last Change Date" 703 field is used for recording the date of the last update of the element format or the meta-element format described by the current record 701.

The "Description Ptr" 704 field is a reference pointing to the memory location where is recorded an illustrative range of cells depicting the element format or meta-element format described by the current record 701. This memory location can either be on the Mass storage 107, or on the main memory 102, or on other conventional memory repository means, without departing from the spirit of the present invention.

The "Row #" 705 field is used for recording the number of rows present in the element format or in the meta-element format described by the current record 701. This field is relevant for 3D scalable templates where element or meta-element formats correspond to 2D structures. In the preferred embodiment of the present invention where 2D scalable templates are assumed, this field is always filled with the value 1.

The "Column #" 706 field is used for recording the number of columns present in the element format or in the meta-element format described by the current record 701.

The "Type" 707 field is used for recording different attributes associated to the element format or to the meta-element format described by the current record 701: this is the "META" attribute 708 specifying if the current record 701 describes an element format or a meta-element format (with respective values "NO" and "YES"), and the "REFERENCED" attribute 709 specifying if there is at least one scalable template or at least one scalable template instance or none of them which refers to this element format or meta-element format (with respective values "TEMPLATE", "INSTANCE" and "NONE"). Conventional techniques can be used for encoding these different attributes in this "Type" field, such as executing bit-wise XOR operations with predefined bit patterns, but any other conventional means could be used instead without departing from the spirit of the invention.

C2. Element Profile Table

Figure 7B:
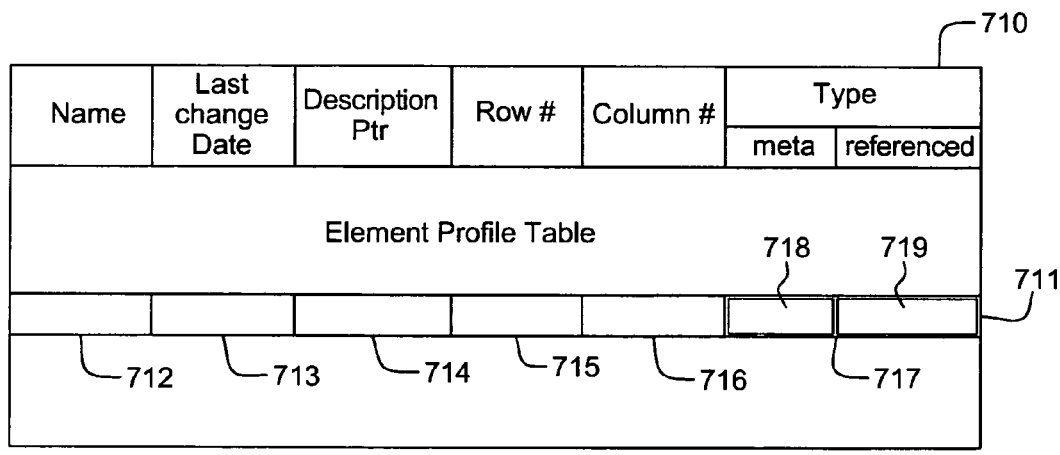

Referring now to FIG. 7B, the EPT Table 710 corresponds to a logical simple structure made of several records 711, each of them corresponding to an element profile or to a meta-element profile, according to the present invention. Each record includes six fields:

The "Name" 712 field is used for recording a character string which uniquely identifies the element profile or the meta-element profile described by the current record 711.

The "Last Change Date" 713 field is used for recording the date of the last update of the element profile or the meta-element profile described by the current record 711.

The "Description Ptr" 714 field is a reference pointing to the memory location where an illustrative range of cells depicting the element profile or meta-element profile described by the current record 711 is recorded. This memory location can either be on the Mass storage 107, or on the main memory 102, or on other conventional memory repository means, without departing from the spirit of the present invention.

The "Row #" 715 field is used for recording the number of rows present in the element profile or in the meta-element profile described by the current record 711. This field is relevant for 3D scalable templates where element or meta-element profiles correspond to 2D structures. In the preferred embodiment of the present invention where 2D scalable templates are assumed, this field is always filled with the value 1.

The "Column #" 716 field is used for recording the number of columns present in the element profile or in the meta-element profile described by the current record 711.

The "Type" 717 field is used for recording different attributes associated to the element profile or to the meta-element profile described by the current record 711: this is the "META" attribute 718 specifying if the current record 701 describes an element profile or a meta-element profile (with respective values "NO" and "YES"), and the "REFERENCED" attribute 719 specifying if there is at least one scalable template or at least one scalable template instance or none of them which refers to this element profile or meta-element profile (with respective values "TEMPLATE", "INSTANCE" and "NONE"). Conventional techniques can be used for encoding these different attributes in this "Type" field, such as executing bit-wise XOR operations with predefined bit patterns, but any other conventional means could be used instead without departing from the spirit of the invention.

C3. Scalable Template Table

Referring now to FIG. 7C, the STT Table 720 corresponds to a logical simple structure made of several records 721, each of them corresponding to a scalable template, according to the present invention. Each record includes six fields:

- The "Name" 722 field is used for recording a character string which uniquely identifies the scalable template described by the current record 721.
- The "Last Change Date" 723 field is used for recording the date of the last update of the scalable template described by the current record 721.
- The "Description Ptr" 724 field is a reference pointing to the memory location where a description of the scalable template described by the current record 721 is recorded. This memory location can either be on the mass storage 107, or on the main memory 102, or on other conventional memory repository means, without departing from the spirit of the present invention. This description is structured according to the STDT table 760 illustrated in FIG. 7E, that is as an ordered list of couples of names, each couple being made by the name of an element or meta-element format and by the name of an element or meta-element profile.
- The "Min Element #" 725 field is used for recording the minimum number of elements found in every scalable template instance abiding by the scalable template described by the current record 721.
- The "Max Element #" 726 field is used for recording the maximum number of elements found in every scalable template instance abiding by the scalable template described by the current record 721.
- The "Type" 727 field is used for recording different attributes associated to the scalable template described by the current record 721: this is the "META" attribute 728 which always take the value "NO", and the "REFERENCED" attribute 729 specifying if there is at least one scalable template instance or none of them which refers to this scalable template (with respective values "INSTANCE" and "NONE"). Conventional techniques can be used for encoding these different attributes in this "Type" field, such as executing bit-wise XOR operations with pre-defined bit patterns, but any other conventional means could be used instead without departing from the spirit of the invention.

C4. Scalable Template Manager Table.

Referring now to FIG. 7D, the STMT Table 730 corresponds to a logical simple structure made of several records 731, each of them corresponding to an object managed by the scalable template manager, according to the preferred embodiment of the present invention. Each record includes seven fields:

- The "Name" 732 field is used for recording a character string which uniquely identifies the object described by the current record 731.
- The "Last Change Date" 733 field is used for recording the date of the last update of the object described by the current record 731.
- The "Description Ptr" 734 field is a reference pointing to the memory location where is recorded a description of the object described by the current record 731. This memory location can either be on the Mass storage 107, or on the main memory 102, or on other conventional memory repository means, without departing from the spirit of the present invention.
- The "Info Field 1" 735 field is used for recording a first piece of information associated to the object described by the current record 731.
- The "Info Field 2" 736 field is used for recording a second piece of information associated to the object described by the current record 731.
- The "Type" 737 field is used for recording different attributes associated to the object described by the current record 731, such as the attributes "META" 739 and "REFERENCED" 740 previously described for the similar "Type" fields 707, 717 and 727, and also two other attributes:
  - the "SELECTED" attribute 742 reflecting whether the associated object has been or not selected by the spreadsheet user within the Scalable Template Manager Dialog Box 600, (with respective values "YES" and "NO"), and also
  - the "NATURE" attribute 741 reflecting whether the object is a "FORMAT", or a "PROFILE", or a "TEMPLATE" (with respective values "FORMAT", "PROFILE", and "TEMPLATE").

Conventional techniques can be used for encoding these different attributes in this "Type" field, such as executing bit-wise XOR operations with predefined bit patterns, but any other conventional means could be used instead without departing from the spirit of the invention.

- The "Index" 738 field is used for sorting the STMT table, as performed by the Scalable Template Manager method.

C5. Scalable Template Descriptor Table.

Referring now to FIG. 7E, the STDT Table 760 corresponds to a logical simple structure made of several couples of element or meta-element format 765 and of element or meta-element profile 764. This structure is organised into three sub-sets:

- The optional scalable template "Header" part 767, made of a variable number (possibly null) of couples like the top couple 761. Each of these couples is constituted by a meta-element format (column 765) and by a meta-element profile (column 764).
- The mandatory "Body" part 762 made of a single couple constituted by an element format (column 765) and by an element profile (column 764).
- The optional scalable template "Footer" part 766, made of a variable number (possibly null) of couples like the bottom couple 763. Each of these couples is constituted by a meta-element format (column 765) and by a meta-element profile (column 764).

C6. Scalable Template Instanciator Table

Referring now to FIG. 7F, the STIT Table 750 corresponds to a logical simple structure made of several records 751, each of them corresponding to a scalable template instance, according to the preferred embodiment of the present invention. Each record includes six fields:

- The "Address" 752 field is used for locating the scalable template instance described by the current record 751: its value corresponds to the conventional character string used to record the address of any range of cells.
- The "ST" 753 field is used for recording the name of the scalable template abided by the scalable template instance described by the current record 751.
- The "Element #" 754 field is used for recording the number of elements within the scalable template instance described by the current record 751.

The "Critical" 755 field is used for recording if the scalable template instance described by the current record 751 is considered as critical. Its content can take the values "YES" or "NO".

The "Header Size" 756 field is used for recording the number of meta-elements constituting the Header part of the scalable template instance described by the current record 751.

The "Footer Size" 757 field is used for recording the number of meta-elements constituting the Footer part of the scalable template instance described by the current record 751.

C7. Scalable Template Export-Import Table

Referring now to FIG. 7G, the STEIT Table 770 corresponds to a logical simple structure made of several records 771, each of them corresponding to an exported scalable template item (element format or meta-element format or element profile or meta-element profile or scalable template) managed by the scalable template export manager or by the scalable template import manager, according to the preferred embodiment of the present invention. Each record includes seven fields:

The "Name" 772 field is used for recording a character string which uniquely identifies the object described by the current record 771.

The "Last Change Date" 773 field is used for recording the date of the last update of the object described by the current record 771.

The "Description Ptr" 774 field is a reference pointing to the memory location where a description of the object described by the current record 771 is recorded. This memory location can either be on the Mass storage 107, or on the main memory 102, or on other conventional memory repository means, without departing from the spirit of the present invention.

The "Info Field 1" 775 field is used for recording a first piece of information associated to the object described by the current record 771.

The "Info Field 2" 776 field is used for recording a second piece of information associated to the object described by the current record 771.

The "Type" 777 field is used for recording different attributes associated to the object described by the current record 771, such as the attributes "META" 779, "REFERENCED" 780, "SELECTED" 782, and "NATURE" 781. Conventional techniques can be used for encoding these different attributes in this "Type" field, such as executing bit-wise XOR operations with predefined bit patterns, but any other conventional means could be used instead without departing from the spirit of the invention.

The "Index" 778 field is used for scanning the STEIT table, as performed by the Scalable Template Export Manager and Scalable Template Import Manager methods.

C8. Scalable Template Instance Export-Import Table

Referring now to FIG. 7H, the STIEIT Table 790 corresponds to a logical simple structure made of several records 791, each of them corresponding to an exported scalable template instance managed by the scalable template instance export manager or by the scalable template instance import manager, according to the preferred embodiment of the present invention. Each record includes five fields:

The "Name" 792 field is used for recording the name of the range of cells corresponding to the exported scalable template instance described by the current record 791.

The "Source File Name" 793 field is used for recording the name of the file from which has been performed the last export operation for the exported scalable template instance described by the current record 791.

The "Export Date" 794 field is used for recording the date of the last export operation for the exported scalable template instance described by the current record 791.

The "Row #" 795 field is a reference pointing to the memory location where is recorded the ESTIT table containing the exported scalable template instance described by the current record 791. This memory location can either be on the Mass storage 107, or on the main memory 102, or on other conventional memory repository means, without departing from the spirit of the present invention.

The "Exported STI Ptr" 796 field is used for recording a first piece of information associated to the object described by the current record 791.

C9. Relationships Between Tables

Figure 7I:
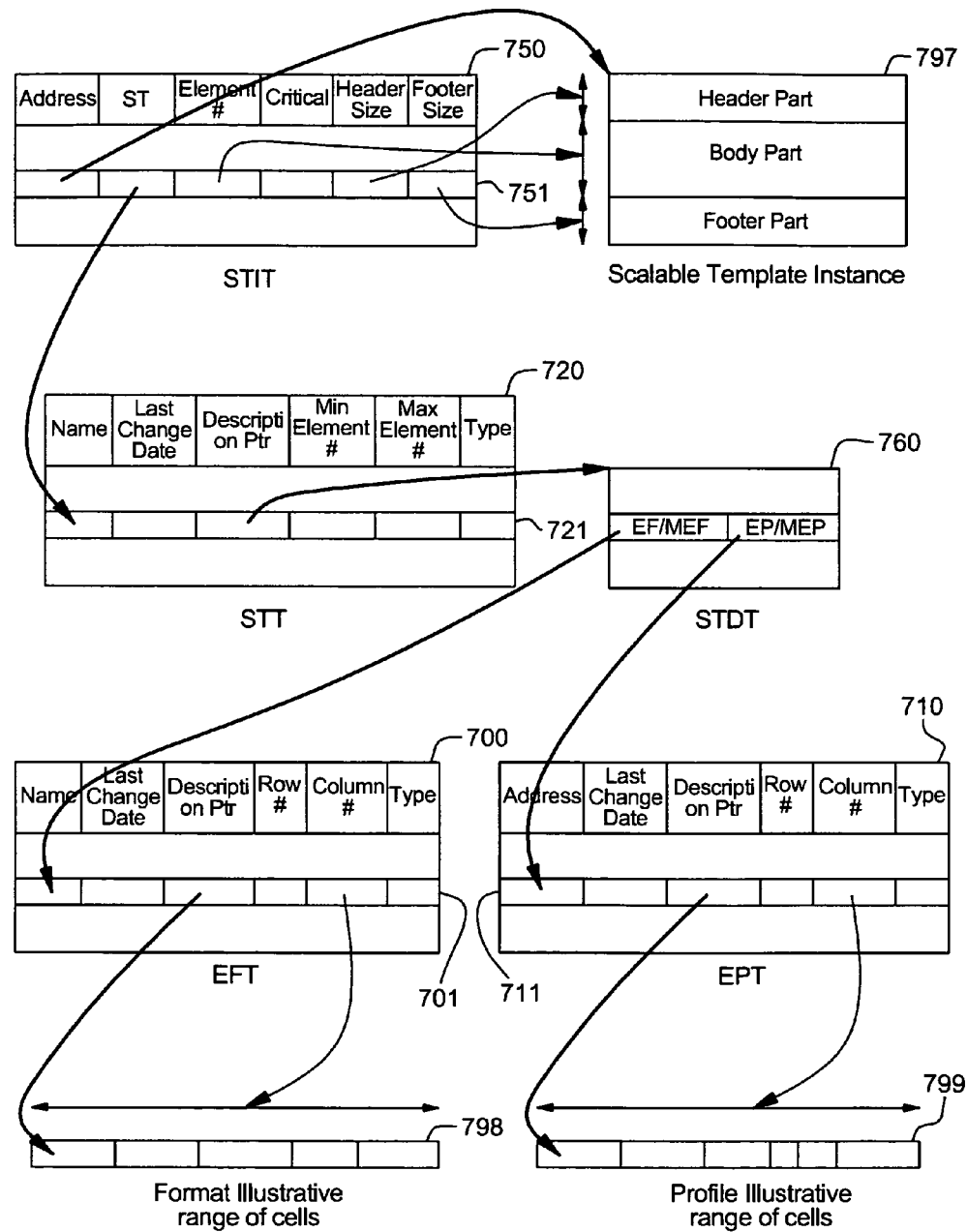
FIG. 7I gives a graphical illustration of the relationships established between the tables EFT, EPT, STT, STDT, and STIT according to the preferred embodiment of the present invention.

Referring now to FIG. 7I, some previously introduced tables STIT 750, STT 720, STDT 760, EFT 700 and EPT 710 are presented altogether to illustrate the relationships established between these tables.

Starting with a scalable template instance 797 made of the three parts Header, Body and Footer, a first relationship is established between this scalable template instance 797 and a record 751 of the STIT table 750.

A second relationship is then established between this record 751 and a record 721 of the STT table 720. This record 721 corresponds to the scalable template abided by the scalable template instance 797.

A third relationship is established between this record 721 and a STDT table 760 which describes the structure of the scalable template. Each record of the STDT table 760 corresponds to a pair of an element or meta-element format name and of an element or meta-element profile name.

A fourth relationship is established between the element or meta-element format name and a record 701 of the EFT table 700.

A fifth relationship is established between the element or meta-element profile name and a record 711 of the EPT table 710.

A sixth relationship is established between the record 701 and an illustrative range of cells 798 specifying the format attributes.

A seventh relationship is established between the record 711 and an illustrative range of cells 799 specifying the profile content.

C10. Exported Scalable Template Instance Table

Referring now to FIG. 27C, the ESTIT Table 2740 corresponds to a logical simple structure made of several records 2741, each of them corresponding to a row of an exported scalable template instance managed by the scalable template instance export manager or by the scalable template instance import manager, according to the preferred embodiment of the present invention. The ESTIT table can thus be seen as the range of cell which results from the disappearance of "OUT" fields from a scalable template instance. Each record includes two fields:

The "Field #" 2742 field is used for recording the number of "IN" fields recorded in the range of cells corresponding to the 2743 field.

The "Field Content" 2743 field is a conventional range of cells corresponding to the concatenation of the "IN" field cells for the row of the exported scalable template instance described by the current record 2741.

D. Scenarios

In contrast to just-described conventional tools, the preferred embodiment of the present invention provides a more powerful, user-friendly and interactive approach for defining and managing scalable templates, in a form of a collection of methods.

In a preferred embodiment, the present invention is used within a scenario which articulates as a sequence of operations:

1. First Operation: Creation of a Scalable Template Instance

The first operation occurs when the spreadsheet user decides, based on some criteria not detailed here, to create a scalable template instance abiding by the structure of a scalable template. In a preferred embodiment of the present invention, this operation comprises the following steps:

a. Scalable Template Manager

The spreadsheet user invokes first an original specific command called "Scalable Template Manager" thanks to conventional means available in spreadsheet environment, such as but not limited to the pointing device 105 or the keyboard 104, in order to visualise through a dedicated user interface any existing element format or meta-element format or element profile or meta-element profile or scalable template. This scalable template manager offers different alternatives for further managing these entities.

Figure 6A:
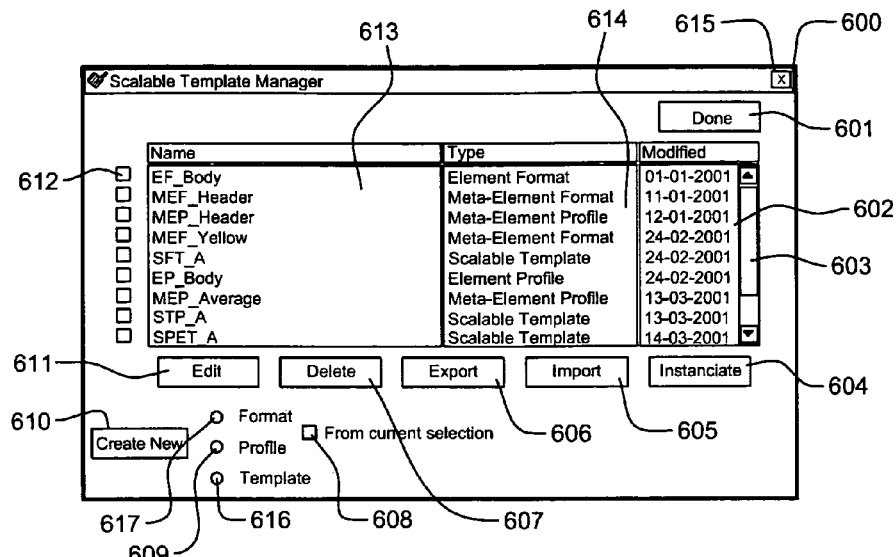
FIGS. 6A, 6B, 6C and 6D show a preferred spreadsheet user interface, according to the preferred embodiment of the present invention, respectively for managing scalable templates, for editing formats, for editing profiles and for editing scalable templates.

This can be illustrated with the user interface described with the FIG. 6A, showing the Scalable Template Manager Dialog Box 600, as displayed on the display device 106. Within this Scalable Template Manager Dialog Box 600, the user can visualise already defined objects (element formats, meta-element formats, element profiles, meta-element profiles and scalable templates) in the "list boxes" 613, 614 and 602 where are respectively specified the names of the objects, the types of the objects and their last date of update. If a large number of objects have been defined, then the user can navigate among them by clicking with the pointing device 105 either upwards on downwards on the scrollbar 603, so that the objects shown within the list boxes 613, 614 and 602 move back and forth between the top object and the bottom object. In a preferred embodiment of the present invention, the objects have been sorted by date of last update, but any other sorting scheme could be also used without departing from the spirit of the invention. Several actions may then be taken by the user.

The user can use the pointing device 105 to click on a check box on the left side of the Scalable Template Manager Dialog Box 600 like the check box 612, in order to either select or deselect the object whose name is displayed within the list box 613 just on the right of the clicked check box. One or multiple objects can be selected or deselected. List scrolling is of course reflected on the check boxes.

Once a selection is performed, the user can use the pointing device 105 to click on the "Delete" push-button 607, if he/she intends to remove all the selected objects from the list boxes 613, 614 and 602. If there is no other object (either scalable template or scalable template instance) referring to at least one of these objects, then they are immediately deleted, so that they do no longer appear on the list boxes 613, 614 and 602. Reversely if there exists at least one other scalable template or scalable template instance referring to at least one of the selected objects, then a conventional dialog box is displayed on the display device 106 to first alert the user about this situation and second to invite him to either cancel the deletion operation or to confirm it. If the user decision is to cancel the operation, then no action is taken, otherwise the selected objects are immediately deleted, so that they do no longer appear on the list boxes 613, 614 and 602.

Alternatively the user can use the pointing device 105 to click on the "Edit" push-button 611 if he/she wants to edit the selected object which is assumed to be unique.

If no object or multiple objects have been previously selected, as shown within the Scalable Template Manager Dialog Box 600 by the presence of no or multiple check marks (visible or not) within the check boxes located on the left side, like the check box 612, then a warning message is displayed on the display device 106 to the user through conventional means such as pop-up windows, status bar messages, or any other similar conventional means which can be used instead without departing from the spirit of the invention.

Reversely if a single object was previously selected, as shown by the presence of a single check mark (visible or not) within a check box located on the left side, like the check box 612, then the Scalable Template Manager Dialog Box 600 is first closed and afterwards the nature of this single selected object is taken into account to determine the new dialog box to be opened.

Figure 6B:
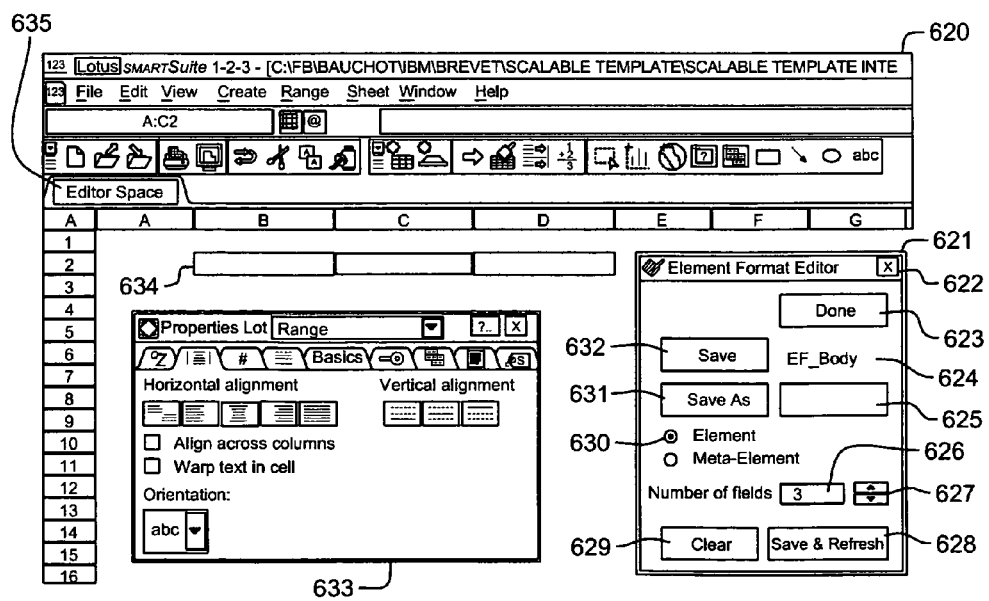

If the selected object was an element format or a meta-element format, then the Element Format Editor command is issued, so that the Element Format Editor method takes control by first displaying on the display device 106 the Element Format Editor Dialog Box 621, as illustrated in FIG. 6B. The following steps of this scenario case are detailed in a subsequent section.

Figure 6C:
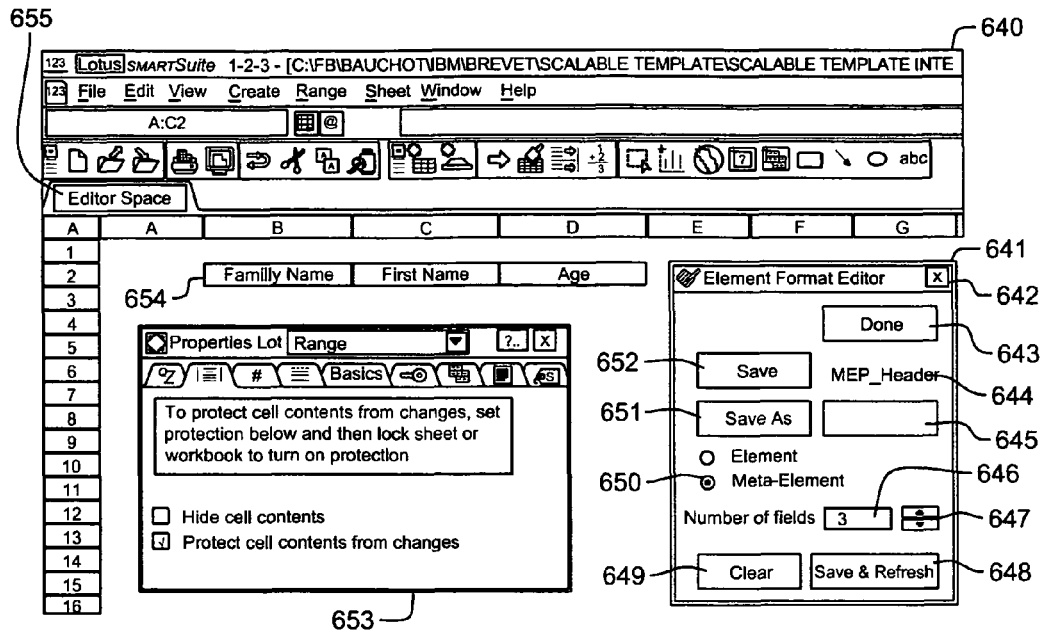

If the selected object was an element profile or a meta-element profile, then the Element Profile Editor command is issued, so that the Element Profile Editor method takes control by first displaying on the display device 106 the Element Profile Editor Dialog Box 641, as illustrated in FIG. 6C. The following steps of this scenario case are detailed in a subsequent section.

Figure 6D:
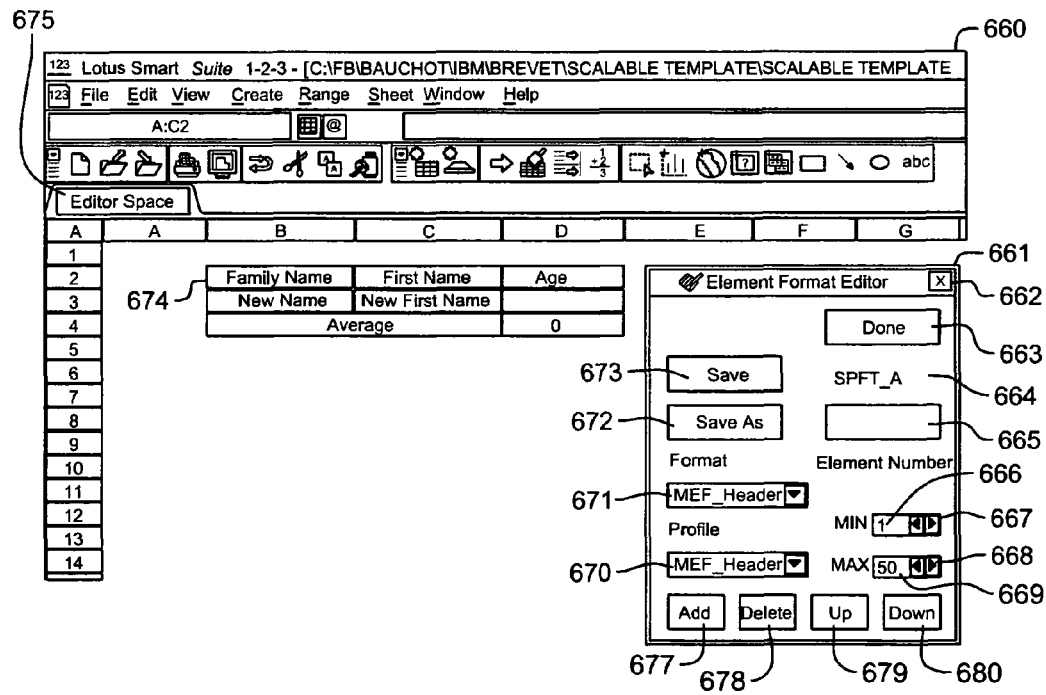

If the selected object was a scalable template, then the Scalable Template Editor command is issued, so that the Scalable Template Editor method takes control by first displaying on the display device 106 the Scalable Template Editor Dialog Box 661, as illustrated in FIG. 6D. The following steps of this scenario case are detailed in a subsequent section.

Alternatively the user can use the pointing device 105 to click on the "Instanciate" push-button 604 if he/she wants to generate a scalable template instance which abides by the selected object which is assumed to be unique and to be a scalable template.

If no object or multiple objects have been previously selected, as shown within the Scalable Template Manager Dialog Box 600 by the presence of no or multiple check marks (visible or not) within the check boxes located on the left side, like the check box 612, then a warning message is displayed on the display device 106 to the user through conventional means such as pop-up windows, status bar messages, or any other similar conventional means which can be used instead without departing from the spirit of the invention.

Reversely if a single object was previously selected, as shown by the presence of a single check mark (visible or not) within a check box located on the left side, like the check box 612, then the method checks if this object is a scalable template.

If it is not the case, then a warning message is displayed on the display device 106 to the user through conventional means such as pop-up windows, status bar messages, or any other similar conventional means which can be used instead without departing from the spirit of the invention.

Figure 13A:
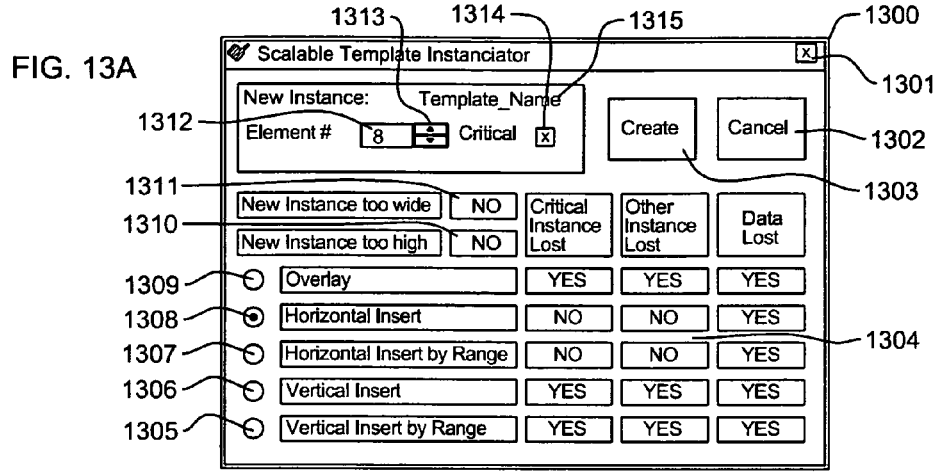
FIG. 13A shows a preferred spreadsheet user interface, according to the preferred embodiment of the present invention, for creating scalable template instances.

Reversely if a single scalable template object was previously selected, then the Scalable Template Manager Dialog Box 600 is first closed and afterwards the Scalable Template Instanciator command is issued, so that the Scalable Template Instanciator method takes control by first displaying on the display device 106 the Scalable Template Instanciator Dialog Box 1300, as illustrated in FIG. 13A. The following steps of this scenario case are detailed in a subsequent section.

Alternatively the user can use the pointing device 105 to click on the "Export" push-button 606 if he/she wants to export a non-empty set of objects from the current spreadsheet file to another spreadsheet file.

If no object has been previously selected, as shown within the Scalable Template Manager Dialog Box 600 by the absence of any check mark (visible or not) within the check boxes located on the left side, like the check box 612, then a warning message is displayed on the display device 106 to the user through conventional means such as pop-up windows, status bar messages, or any other similar conventional means which can be used instead without departing from the spirit of the invention.

Figure 26A:
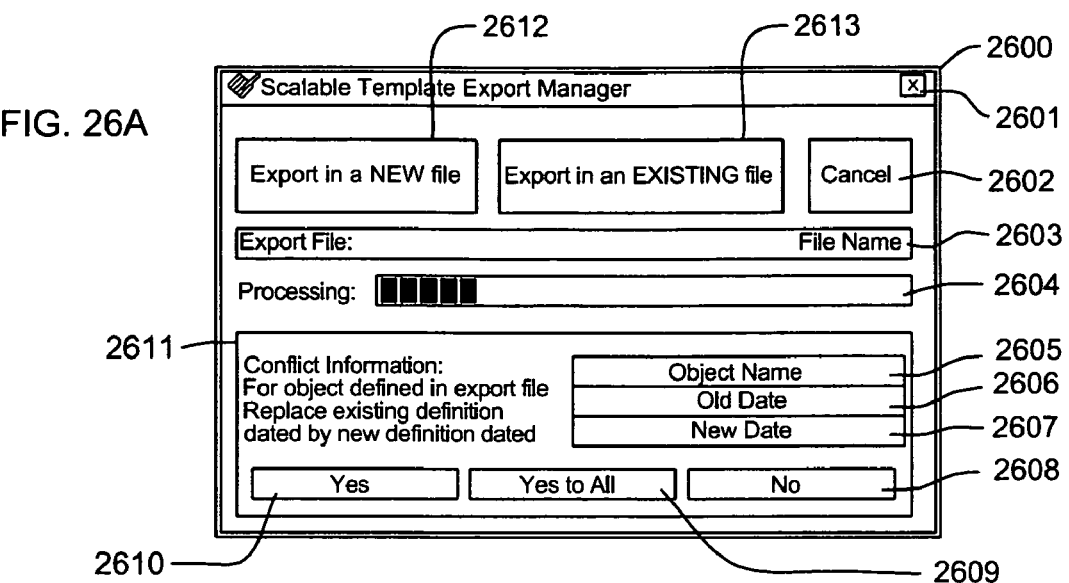
FIG. 26A shows a preferred spreadsheet user interface, according to the preferred embodiment of the present invention, for exporting scalable template items (element formats, or meta-element formats, or element profiles, or meta-element profiles, or scalable templates).

Reversely if one or multiple objects were previously selected, as shown by the presence of at least one check mark (visible or not) within a check box located on the left side, like the check box 612, then the Scalable Template Manager Dialog Box 600 is first closed and afterwards the Scalable Template Export Manager command is issued, so that the Scalable Template Export Manager method takes control by first displaying on the display device 106 the Scalable Template Export Manager Dialog Box 2600, as illustrated in FIG. 26A. The following steps of this scenario case are detailed in a subsequent section.

Figure 26B:
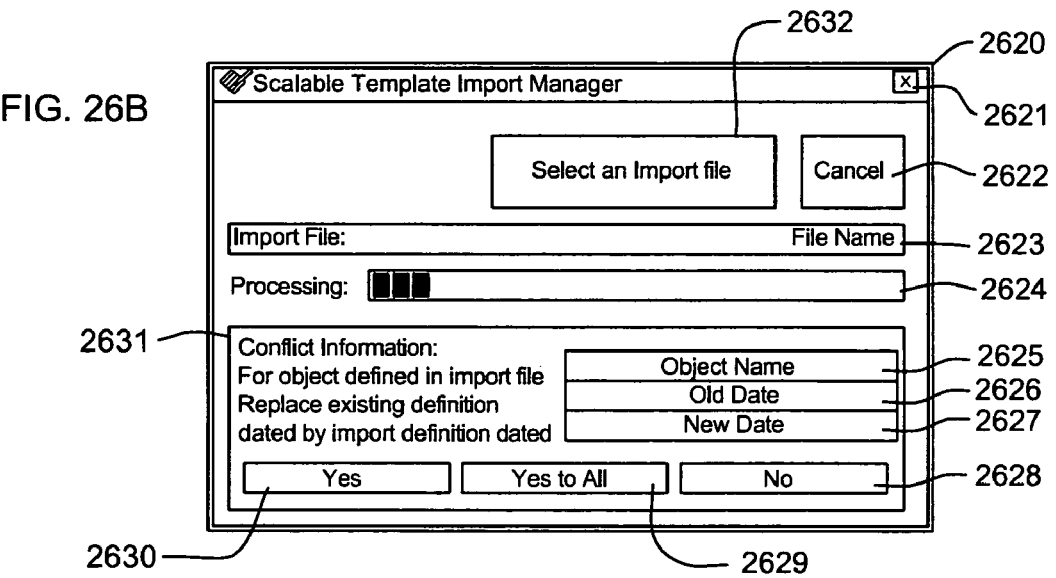
FIG. 26B shows a preferred spreadsheet user interface, according to the preferred embodiment of the present invention, for importing scalable template items (element formats, or meta-element formats, or element profiles, or meta-element profiles, or scalable templates).

Alternatively the user can use the pointing device 105 to click on the "Import" push-button 605 if he/she wants to import one or several objects from another spreadsheet file to the current spreadsheet file. The Scalable Template Manager Dialog Box 600 is first closed and afterwards the Scalable Template Import Manager command is issued, so that the Scalable Template Import Manager method takes control by first displaying on the display device 106 the Scalable Template Import Manager Dialog Box 2620, as illustrated in FIG. 26B. The following steps of this scenario case are detailed in a subsequent section.

Alternatively the user can use the pointing device 105 to click on one of the three option-buttons on the bottom left side of the Scalable Template Manager Dialog Box 600, like the "Profile" option-button 609, if he/she wants to specify which type of new object may be created afterwards. As three option-buttons are available on the Scalable Template Manager Dialog Box 600, the user has the choice to specify either a format, or a profile or a scalable template as the type of the new object to be created afterwards.

Alternatively the user can use the pointing device 105 to click on the check-box 608 entitled "From current selection", if he/she wants to specify if the next object to be created afterwards will be derived or not from the range of cells currently selected in the spreadsheet file.

Alternatively the user can use the pointing device 105 to click on the "Create New" push-button 610 if he/she wants to create a new object whose type has been previously specified thanks to the three option-buttons like the "Profile" option-button 609, or the "Format" option-button 617, or the "Template" option-button 616.

If none of these three option-buttons shows a previous user choice, as shown within the Scalable Template Manager Dialog Box 600 by the absence of a point within one of these three option-buttons 609, 616 and 617, then a warning message is displayed on the display device 106 to the user through conventional means such as pop-up windows, status bar messages, or any other similar conventional means which can be used instead without departing from the spirit of the invention.

Reversely if one of these three option-buttons 609, 616 and 617 shows a previous user choice, then the Scalable Template Manager Dialog Box 600 is first closed and afterwards the single selected option-button is taken into account to determine the new dialog box to be opened.

If the "Format" option-button 617 shows a selection, then the Element Format Editor command is issued, so that the Element Format Editor method takes control by first displaying on the display device 106 the Element Format Editor Dialog Box 621, as illustrated in FIG. 6B. The following steps of this scenario case are detailed in a subsequent section.

If the "Profile" option-button 609 shows a selection, then the Element Profile Editor command is issued, so that the Element Profile Editor method takes control by first displaying on the display device 106 the Element Profile Editor Dialog Box 641, as illustrated in FIG. 6C. The following steps of this scenario case are detailed in a subsequent section.

If the "Template" option-button 616 shows a selection, then the Scalable Template Editor command is issued, so that the Scalable Template Editor method takes control by first displaying on the display device 106 the Scalable Template Editor Dialog Box 661, as illustrated in FIG. 6D. The following steps of this scenario case are detailed in a subsequent section.

Finally the user can use the pointing device 105 to click on the "Done" push-button 601 or on the closing-window push-button 615 if he/she wants to quit the Scalable template Manager method. The resulting effect is to close the Scalable Template Manager Dialog Box 600 on the display device 106.

b. Element Format Editor

According to the previous scenario illustrating the Scalable Template Manager method, the spreadsheet user may then invoke an original specific command called "Element Format Editor" thanks to conventional means available in spreadsheet environment, such as but not limited to the pointing device 105 or the keyboard 104, in order to either create a new element format; or to create a new meta-element format; or to update an existing element format; or to update an existing meta-element format.

This can be illustrated with the user interface described with the FIG. 6B, showing the Element Format Editor Dialog Box 621, as displayed on the display device 106 within the GUI window 620 of the electronic spreadsheet office application. When the Element Format Editor Dialog Box 621 is displayed on the display device 106, the current sheet becomes a dedicated sheet entitled "Editor Space" 635 in a preferred embodiment of the present invention. Within the "Editor Space" 635 sheet, the element or meta-element format to be edited appears as a range of cells 634 in the top left angle of the window 620, with the top left cell at address B2. As the element or meta-element format corresponds to a regular range of cells 634 within a sheet, the conventional tools available in electronic spreadsheet environments can be used to update it. This is illustrated for instance with the Range Properties Dialog Box 633 which is used here to specify that the second cell of the element format has an horizontal alignment set to center, has a vertical alignment set to bottom, without text alignment across columns, without text wrapping in cells and finally with a natural orientation. Any other conventional format attribute could in turn be specified with conventional means.

When the Element Format Editor Dialog Box 621 is displayed on the display device 106, it contains some pieces of information.

First the nature of the edited object is shown by a pair of option-buttons 630 which specifies if it is either an element format or a meta-element format. The spreadsheet user can click with the pointing device 105 on one of these two option-buttons 630 to swap between an element format definition and a meta-element format definition.

Second the number of cells within the edited object is specified in the text-box 626. When a new element format or meta-element format is created from the currently selected range of cells (the spreadsheet user having previously clicked with the pointing device 105 on the check box 608 to put a check mark on it, on the option-button 617 to put a point on it and on the push-button 610, all contained within the Scalable Template Manager Dialog Box 600 as illustrated by FIG. 6A), the value shown by the text box 626 corresponds to the numbers of cells found in the currently selected range of cells. When a new element format or meta-element format is created regardless of the currently selected range of cells (the spreadsheet user having previously clicked with the pointing device 105 on the check box 608 to clear it, on the option-button 617 to put a point on it and on the push-button 610, all contained within the Scalable Template Manager Dialog Box 600), the value shown by the text box 626 corresponds to a defalult value set to 8 in a preferred embodiment of the present invention. When an existing element format or meta-element format is edited, the value shown by the text box 626 corresponds to the number of cells previously defined for this object. In all cases, the spreadsheet user can change the value shown in the text box 626 by clicking with the pointing device 105 on the spin-button 627, either on the ascending or on the descending side, so that the value can get increased or decreased (within predefined boundaries).

Third the name of the edited element format or meta-element format is displayed on the label box 624.

When an existing element format or meta-element format is edited, the name shown by the label box 624 corresponds to the name previously assigned to this object. When a new element format or meta-element format is created, then the name displayed on the label box 624 corresponds to a default value which, in a preferred embodiment of the present invention, takes the form "New XX" where XX is a counter ensuring the uniqueness of the assigned name.

The Element Format Editor Dialog Box 621 contains several graphical objects which allow the spreadsheet user to take some actions.

First the spreadsheet user can assign a new name to the currently edited element format or meta-element format. For this purpose he/she will first use conventional means such as the keyboard 104 to specify within the text box 625 the new name to be given to the edited element or meta-element format. Then he/she will use the pointing device 105 to click on the "Save As" push-button 631. If the specified name entered within the text box 625 was already assigned to an existing object or is not a valid name, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for acknowledgement. Then the text box 625 is cleared without further action. If the specified name entered within the text box 625 was not yet assigned to an existing object and was a valid name, then the text box 625 is cleared and the edited object is saved on the spreadsheet file under the new name which is in turn displayed within the label box 624.

Second the spreadsheet user can clear the current element or meta-element format definition by clicking with the pointing device 105 on the "Clear" push-button 629. The resulting effect is to assign to the edited object shown by the range 634 all the default attributes currently defined within the opened spreadsheet file (these attributes being for instance the ones set by default when a new sheet is created within the electronic spreadsheet file).

Third the spreadsheet user can save on the spreadsheet file the current definition of the edited object by clicking with the pointing device 105 on the "Save" push-button 632. This event results in checking if the updated element of meta-element format is already referenced by an existing scalable template. If it is not the case, then the updated definition of the element or meta-element format, as described by the illustrative range of cells 634, is saved on the spreadsheet file. If it is the case, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for either cancelling the operation or for pursuing it. In the first case the updated element or meta-element format definition, as described by the illustrative range of cells 634, is not saved while it is saved on the spreadsheet file in the second case.

Fourth the spreadsheet user can apply any updated element or meta-element format definition onto any existing scalable template instance abiding by a scalable template which refers to the updated format. For this purpose he/she use the pointing device 105 to click on the "Save & Refresh" push-button 628. The result effect is first that the element or meta-element format definition gets saved on the spreadsheet file and then that every existing scalable template instance which abides by any scalable template which refers to the updated element or meta-element format will be in turn updated to reflect the element or meta-element format definition change.

Finally the user can use the pointing device 105 to click on the "Done" push-button 623 or on the closing-window push-button 622 if he/she wants to quit the Element Format Editor method. The resulting effect is to close the Element Format Editor Dialog Box 621 on the display device 106 and to revert to the sheet which was active when the Element Format Editor command was first invoked.

c. Element Profile Editor

According to the previous scenario illustrating the Scalable Template Manager method, the spreadsheet user may then invoke an original specific command called "Element Profile Editor" thanks to conventional means available in spreadsheet environment, such as but not limited to the pointing device 105 or the keyboard 104, in order to either create a new element profile or to create a new meta-element profile or to update an existing element profile or to update an existing meta-element profile.

This can be illustrated with the user interface described with the FIG. 6C, showing the Element Profile Editor Dialog Box 641, as displayed on the display device 106 within the GUI window 640 of the electronic spreadsheet office application. When the Element Profile Editor Dialog Box 641 is displayed on the display device 106, the current sheet becomes a dedicated sheet entitled "Editor Space" 655 in a preferred embodiment of the present invention. Within the "Editor Space" 655 sheet, the element or meta-element profile to be edited appears as a range of cells 654 in the top left angle, with the top left cell at address B2. As the element or meta-element profile corresponds to a regular range of cells 654 within a sheet, the conventional tools available in electronic spreadsheet environments can be used to update it. This will typically consist in updating the content of any cell belonging to the edited element profile or meta-element profile. As far as the "IN" or "OUT" nature of each cell is concerned, this information is recorded in a preferred embodiment of the present invention by the cell protection mode attribute: a cell specified as not protected from changes corresponds to an "IN" cell whereas a cell specified as protected from changes corresponds to an "OUT" cell. This is illustrated for instance with the Range Properties Dialog Box 653 which is used here to specify that the second cell of the element profile is protected from cell contents, meaning that it is considered as an "OUT" cell. Any other conventional cell attribute could be used instead of the cell protection mode attribute without departing from the spirit of the present invention.

When the Element Profile Editor Dialog Box 641 is displayed on the display device 106, it contains some pieces of information.

First the nature of the edited object is shown by a pair of option-buttons 650 which specifies if it is either an element profile or a meta-element profile. The spreadsheet user can click with the pointing device 105 on one of these two option-buttons 650 to swap between an element profile definition and a meta-element profile definition.

Second the number of cells within the edited object is specified in the text-box 646. When a new element profile or meta-element profile is created from the currently selected range of cells (the spreadsheet user having previously clicked with the pointing device 105 on the check box 608 to put a check mark on it, on the option-button 609 to put a point on it and on the push-button 610, all contained within the Scalable Template Manager Dialog Box 600, as illustrated by FIG. 6A), the value shown by the text box 646 corresponds to the numbers of cells found in the currently selected range of cells. When a new element profile or meta-element profile is created regardless of the currently selected range of cells (the spreadsheet user having previously clicked with the pointing device 105 on the check box 608 to clear it, on the option-button 609 to put a point on it and on the push-button 610, all contained within the Scalable Template Manager Dialog Box 600, as illustrated by FIG. 6A), the value shown by the text box 646 corresponds to a default value set to 8 in a preferred embodiment of the present invention. When an existing element profile or meta-element profile is edited, the value shown by the text box 646 corresponds to the number of cells previously defined for this object. In all cases, the spreadsheet user can change the value shown in the text box 646 by clicking with the pointing device 105 on the spin-button 647, either on the ascending or on the descending side, so that the value can get increased or decreased (within predefined boundaries).

Third the name of the edited element profile or meta-element profile is displayed on the label box 644. When an existing element profile or meta-element profile is edited, the name shown by the label box 644 corresponds to the name previously assigned to this object. When a new element profile or meta-element profile is created, then the name displayed on the label box 644 corresponds to a default value which, in a preferred embodiment of the present invention, takes the form "New XX" where XX is a counter ensuring the uniqueness of the assigned name.

The Element Profile Editor Dialog Box 641 contains several graphical objects which allow the spreadsheet user to take some actions.

First the spreadsheet user can assign a new name to the currently edited element profile or meta-element profile. For this purpose he/she will first use conventional means such as the keyboard 104 to specify within the text box 645 the new name to be given to the edited element or meta-element profile. Then he/she will use the pointing device 105 to click on the "Save As" push-button 651. If the specified name entered within the text box 645 was already assigned to an existing object or was not a valid name, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for acknowledgement. Then the text box 645 is cleared without further action. If the specified name entered within the text box 645 was not yet assigned to an existing object and was a valid name, then the text box 645 is cleared and the edited object is saved on the spreadsheet file under the new name which is in turn displayed within the label box 644.

Second the spreadsheet user can clear the current element or meta-element profile definition by clicking with the pointing device 105 on the "Clear" push-button 649. The resulting effect is to assign to the edited object shown by the range 654 the default content currently defined within the opened spreadsheet file (this content being for instance the one set by default when a new sheet is created within the electronic spreadsheet file, most often a "void" content).

Third the spreadsheet user can save on the spreadsheet file the current definition of the edited object by clicking with the pointing device 105 on the "Save" push-button 652. This event results in checking if the updated element or meta-element profile is already referenced by an existing scalable template. If it is not the case, then the updated definition of the element or meta-element profile is saved on the spreadsheet file. If it is the case, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for either cancelling the operation or for pursuing it. In the first case the updated element or meta-element profile definition is not saved while it is saved on the spreadsheet file in the second case.

Fourth the spreadsheet user can apply any updated element or meta-element profile definition onto any existing scalable template instance abiding by a scalable template which refers to the updated profile. For this purpose he/she use the pointing device 105 to click on the "Save & Refresh" push-button 648. The result effect is first that the element or meta-element profile definition gets saved on the spreadsheet file and then that every existing scalable template instance which abides by any scalable template which refers to the updated element or meta-element profile will be in turn updated to reflect the element or meta-element profile definition change.

Finally the user can use the pointing device 105 to click on the "Done" push-button 643 or on the closing-window push-button 642 if he/she wants to quit the Element Profile Editor method. The resulting effect is to close the Element Profile Editor Dialog Box 641 on the display device 106 and to revert to the sheet which was active when the Element Profile Editor command was first invoked.

d. Scalable Template Editor

According to the previous scenario illustrating the Scalable Template Manager method, the spreadsheet user may then invoke an original specific command called "Scalable Template Editor" thanks to conventional means available in spreadsheet environment, such as but not limited to the pointing device 105 or the keyboard 104, in order to either create a new scalable template or to update an existing scalable template.

This can be illustrated with the user interface described with the FIG. 6D, showing the Scalable Template Editor Dialog Box 661, as displayed on the display device 106 within the GUI window 660 of the electronic spreadsheet office application. When the Scalable Template Editor Dialog Box 661 is displayed on the display device 106, the current sheet becomes a dedicated sheet entitled "Editor Space" 675 in a preferred embodiment of the present invention. Within the "Editor Space" 675 sheet, the scalable template to be edited appears as a range of cells 674 in the top left angle, with the top left cell at address B2. Although the edited scalable template corresponds to a regular range of cells 674 within a sheet, conventional tools available in electronic spreadsheet environments cannot be used to update this range of cells 674. The spreadsheet user will only be able to navigate within the range of cells 674 illustrating the scalable template, and to either insert or delete rows within the range of cells 674 illustrating the scalable template, by using dedicated means which are part of the Scalable Template Editor Dialog Box 661. Row insertion or deletion in the "Editor Space" sheet 675 will be disabled. Moreover the "Editor Space" sheet 675 is write-protected to prevent the user to inadvertently modify the settings of the elements or meta-elements defined as part of the scalable template illustrated by the range of cells 674.

When the Scalable Template Editor Dialog Box 661 is displayed on the display device 106, it contains some pieces of information which either relate to the whole scalable template, as illustrated by the range of cells 674, or which relate to the element or meta-element pointed by the cell currently selected within this same range of cells 674.

First the format of the element or meta-element pointed by the cell currently selected is shown by the "Format" combo box 671. By clicking with the pointing device 105 on the arrow located on the right side of this "Format" combo box 671, the spreadsheet user can display and navigate within the list of defined formats, then select a format of his/her choice and see the resulting visible effect on the row where is located the currently selected cell within the range of cells 674. Similarly the profile of the element or meta-element pointed by the cell currently selected is shown by the "Profile" combo box 670. By clicking with the pointing device 105 on the arrow located on the right side of this "Profile" combo box 670, the spreadsheet user can display and navigate within the list of defined profiles, then select a profile of his/her choice and see the resulting visible effect on the row where is located the currently selected cell within the range of cells 674. Reversely, if the spreadsheet user changes the selected row within the range of cells 674, by clicking with the pointing device 105 on the "Up" push-button 679, or on the "Down" push-button 680, then the names displayed within the combo boxes 671 and 670 are updated to respectively specify the name of the format and of the profile of the element or meta-element corresponding to the new selected row. If the spreadsheet user wishes to insert a new meta-element either in the header or in the footer part of the scalable template, he/she has just to click with the pointing device 105 on the "Add" push-button 677 to insert a new row within the range of cells 674, at the desired place above the last position of the currently selected cell. Then the range of cells 674 is updated with a new row being displayed on the window 660. Then the Scalable Template Editor Dialog Box 661 is updated by showing within the respective combo boxes 671 and 670 the names of the format and profile assigned by default to the introduced meta-element. If the spreadsheet user wishes to remove a meta-element either from the header part or from the footer part of the scalable template, he/she has just to click with the pointing device 105 on the "Delete" push-button 678 to remove the corresponding row within the range of cells 674, at the desired place. Then the currently selected cell within the range of cells 674 becomes the left cell belonging to the row representing the unique element defined within the scalable template, and the Scalable Template Editor Dialog Box 661 is updated by showing within the respective combo boxes 671 and 670 the names of the format and profile of the unique element defined within the scalable template.

Second the minimum number of elements allowed within a scalable template instance abiding by the edited scalable template is specified in the "MIN" text-box 666. Similarly the maximum number of elements allowed within a scalable template instance abiding by the edited scalable template is specified in the "MAX" text-box 669. When a new scalable template is created (the spreadsheet user having previously clicked with the pointing device 105 on the option-button 616 to put a point on it and on the push-button 610, all contained within the Scalable Template Manager Dialog Box 600, as illustrated by FIG. 6A), the value shown by the "MIN" text box 666 corresponds to a default value set to 1 in a preferred embodiment of the present invention, and the value shown by the "MAX" text box 669 corresponds to a default value set to 255 in a preferred embodiment of the present invention. When an existing scalable template is edited, the values shown by the text boxes 666 and 669 correspond respectively to the minimum and maximum number of elements allowed in any scalable template instance abiding by the currently edited scalable template, as previously defined by the spreadsheet user. In all cases, the spreadsheet user can change the values shown in the text box "MIN" 666 or in the text box "MAX" 669 by clicking with the pointing device 105 respectively on the spin-button 667 or on the spin-button 668, either on the ascending or on the descending side, so that the values can get increased or decreased (within predefined boundaries), while ensuring that the value specified in the "MIN" text box 666 remains less than or equal to the value specified in the "MAX" text box 669. Should any existing scalable template instance abiding by the updated scalable template have a number of elements falling outside the new "MIN"–"MAX" interval, then this instance will not be impacted by the scalable template update, but any future addition or removal of elements will be done according to the new definition of the "MIN"–"MAX" interval.

Third the name of the edited scalable template is displayed on the label box 664. When an existing scalable template is edited, the name shown by the label box 664 corresponds to the name previously assigned to this object. When a new scalable template is created, then the name displayed on the label box 664 corresponds to a default value which, in a preferred embodiment of the present invention, takes the form "New XX" where XX is a counter ensuring the uniqueness of the assigned name.

The Scalable Template Editor Dialog Box 661 comprises several graphical objects which allow the spreadsheet user to take some actions.

First the spreadsheet user can assign a new name to the currently edited scalable template, if this scalable template is currently constituted by element formats, element profiles, meta-element formats and meta-element profiles having all the same number of fields. Indeed in this case the "Save As" push-button 672 is enabled, so that any click on it with the pointing device 105 is recognised as a valid event. The spreadsheet user will first use conventional means such as the keyboard 104 to specify within the text box 665 the new name to be given to the edited scalable template. Then he/she will use the pointing device 105 to click on the "Save As" push-button 672. If the specified name entered within the text box 665 was already assigned to an existing object or is not a valid name, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts her/him for acknowledgement. Then the text box 665 is cleared without further action. If the specified name entered within the text box 665 was not yet assigned to an existing object and is a valid name, then the text box 665 is cleared and the edited scalable template is saved on the spreadsheet file under the new name which is in turn displayed within the label box 664.

Second the spreadsheet user can save on the spreadsheet file the current definition of the edited scalable template, if this scalable template is currently constituted by element formats, element profiles, meta-element formats and meta-element profiles having all the same number of fields. Indeed in this case the "Save" push-button 673 is enabled, so that any click on it with the pointing device 105 is recognised as a valid event. This event results in checking if the updated scalable template is already referenced by an existing scalable template instance. If it is not the case, then the updated definition of the scalable template is saved on the spreadsheet file. If it is the case, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for either cancelling the operation or for pursuing it. In the first case the updated scalable template definition is not saved while it is saved on the spreadsheet file in the second case.

Finally the user can use the pointing device 105 to click on the "Done" push-button 663 or on the closing-window push-button 662 if he/she wants to quit the Scalable Template Editor method. The resulting effect is to close the Scalable Template Editor Dialog Box 661 on the display device 106 and to revert to the sheet which was active when the Element Profile Editor command was first invoked.

e. Scalable Template Instanciator

According to the previous scenario illustrating the Scalable Template Manager method, the spreadsheet user may then invoke an original specific command called "Scalable Template Instanciator" thanks to conventional means available in spreadsheet environment, such as but not limited to the pointing device 105 or the keyboard 104, in order to create a scalable template instance abiding by a selected scalable template and located according to the currently selected cell.

This can be illustrated with the user interface described with the FIG. 13A, showing the Scalable Template Instanciator Dialog Box 1300, as displayed on the display device 106. When the Scalable Template Instanciator Dialog Box 1300 is displayed on the display device 106, the current sheet remains still active, so that the spreadsheet user can visualise the data present on it. The Scalable Template Instanciator Dialog Box 1300 contains some pieces of information which relate to the instanciation operation.

First the name of the scalable template that abides by the scalable template instance to be created, is displayed in a label box 1315.

Second the number of elements to be present at instance creation time is shown in a text box 1312. This number takes a default value equal to 8 (eight) in a preferred embodiment of the present invention. If the spreadsheet user wished to create a scalable template instance with another number of elements, then he/she will have to click with the pointing device 105 on the upper or lower side of the spin-button 1313 to either increase or decrease the number of elements. This number of elements will vary within a range delimited by the minimum and maximum number of elements, as specified within the definition of the scalable template (fields "Min Element #" 725 and "Max Element #" 726 within a record 721 of the STT table 720 whose "Name" field 722 matches the name displayed in the label box 1315) and is displayed, after possible update, in the text box 1312.

Third the mode of the instanciation is specified by the presence of a black point within one of the five option buttons "Overlay" 1309, "Horizontal Insert" 1308, "Horizontal Insert by Range" 1307, "Vertical Insert" 1306 and "Vertical Insert by Range" 1305. If the spreadsheet user wishes to change the default mode of instanciation which is "Overlay" or a previously changed mode of instanciation, then he/she uses the pointing device 105 to click on one of the five option buttons "Overlay" 1309, "Horizontal Insert" 1308, "Horizontal Insert by Range" 1307, "Vertical Insert" 1306 and "Vertical Insert by Range" 1305 which will display alone a black point specifying the new selected mode of instanciation.

Fourth the check box 1314 allows the spreadsheet user to specify if the new scalable template instance is considered or not as a "Critical" instance. If and only if the check box 1314 displays a check mark, then the scalable template instance will be created as a critical one. By clicking with the pointing device 105 on this check box 1314, the spreadsheet user can swap between a "Critical" and not "Critical" instance, which is reflected by the presence or absence of a check mark within this same check box 1314.

Fifth the push-button "Cancel" 1302 or the closing-window push-button 1301 allow to close the Scalable Template Instanciation Dialog Box 1300 without further action. By clicking with the pointing device 105 on one of these two push-buttons 1301 and 1302, the Scalable Template Instanciation Dialog Box 1300 is closed and the scalable template instanciation operation is aborted.

Sixth the push-button "Create" 1303, when first enabled and second clicked with the pointing device 105 by the spreadsheet user, is the trigger launching the operation of scalable template instanciation. This push-button "Create" 1303 is enabled (meaning that the method recognises the click event with the pointing device on this push-button "Create" 1303) when the instanciation operation is possible. The fact that this scalable template instanciation is possible or not depends on different factors: the position of the currently selected cell within the current sheet of the electronic spreadsheet, the size of the scalable template to be created, the mode of instanciation, the presence of any existing critical scalable template instance which would be corrupted due to the new instance creation. The possibility to create or not a new scalable template instance with the size specified in the text box 1312, abiding by a scalable template whose name is specified by the label box 1315, with the top left corner located on the currently selected cell, and according to the mode of instanciation specified by one of the five option buttons 1305, 1306, 1307, 1308 and 1309, is reflected by several label boxes, taking the values "YES" or "NO", which are part of the Scalable Template Instanciation Dialog Box 1300: the label box 1310 which reflects if the new scalable template instance is or not too high, the label box 1311 which reflects if the new scalable template instance is or not too wide, and the set of 15 label boxes 1304 which are organised as a matrix of 5 rows by 3 columns and which reflect for each possible mode of instanciation (one per row) if the creation of the new scalable template instance may lead to corrupt any existing critical scalable template instance (first column), or may lead to corrupt any other existing scalable template instance or may lead to loose any existing data present in one or several spreadsheet cells. As soon as the value "YES" is taken by the label box 1310, or by the label box 1311, or by the 1304 label box located at the intersection of the leftmost column and of the row corresponding to the selected mode of instanciation, then the instance creation is considered as impossible, so that the "Create" push-button 1303 get disabled. Reversely, if the value "NO" is displayed in these three label boxes, then the instanciation operation is possible, so that the "Create" push-button 1303 get enabled. When clicked with the pointing device 105 by the spreadsheet user, the instanciation operation is performed, and then the Scalable Template Instanciation Dialog Box 1300 is closed.

The way the creation of a new scalable template instance may corrupt an existing scalable template instance or may lead to loose any data present in a cell is illustrated for each mode of instanciation by the FIGS. 13B, 13C, 13D, 13E, 13F and 13G.

Figure 13B:
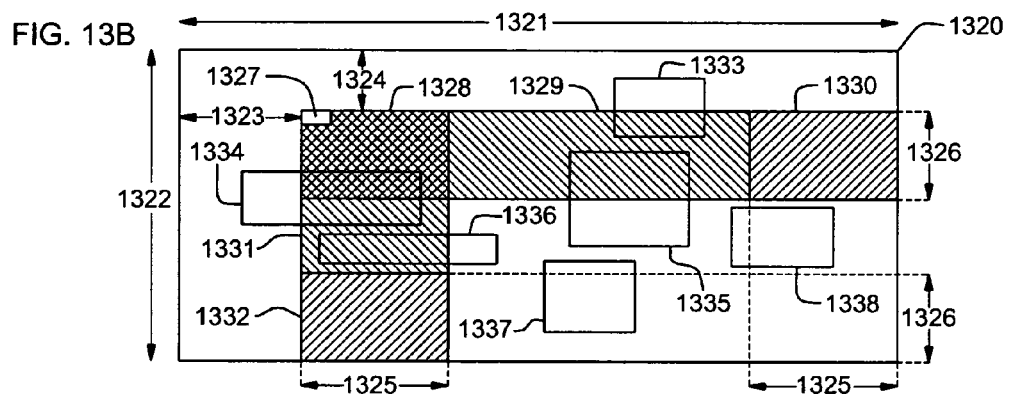
FIGS. 13B, 13C, 13D, 13E, 13F and 13G illustrate the different modes of scalable template instanciation, according to a preferred embodiment of the present invention.

Referring first to the FIG. 13B, one can see an illustration of the current sheet 1320 before the instanciation operation is triggered. This sheet is first characterised by its number of columns STI_sheet_width 1321 and by its number of rows STI_sheet_height 1322. Within this current sheet, the currently selected cell 1327 is also characterised by its row offset number STI_offset_height 1324 and by its column offset number STI_offset_width 1323. The new scalable template instance to be created will correspond to a range of cells STI_range 1328 which is itself characterised by a number of rows STI_height 1326 and by a number of columns STI_width 1325. Four other ranges of cells can now be identified within the current sheet 1320: the range of cells STI_horizontal_flushed_range 1330 which is located on the same rows than the range of cells STI_range 1328, but in the STI_width 1325 rightmost columns; the range of cells STI_vertical_flushed_range 1332 which is located on the same columns than the range of cells STI_range 1328, but in the STI_height 1326 bottom rows; the range of cells STI_horizontal_kept_range 1329 located between the ranges of cells STI_range 1328 and STI_horizontal_flushed_range 1330; and the range of cells STI_vertical_kept_range 1331 located between the ranges of cells STI_range 1328 and STI_vertical_flushed_range 1332. Finally the FIG. 13B also shows 6 existing scalable template instances: the ranges of cells STI_horizontal_cut_instance 1333, STI_vertical_cut_instance 1334, STI_horizontal_sheared_instance 1335, STI_vertical_sheared_instance 1336, STI_vertical_flushed_instance 1337, STI_horizontal_flushed_instance 1338.

Figure 13C:
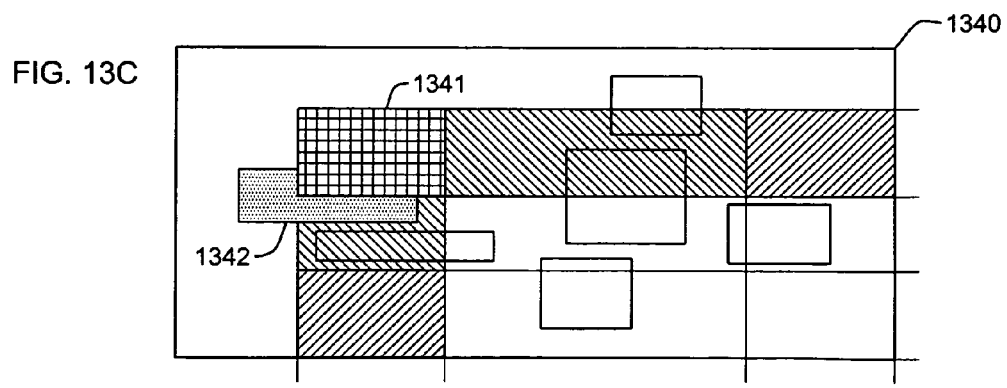

Referring now to FIG. 13C, the "OVERLAY" mode is illustrated as the new instance is created as the range of cells 1341 within the updated current sheet 1340. The instanciation operation consists here in replacing the former range of cells STI_range 1328 by the new instance. The previously existing scalable template instance STI_vertical_cut_instance 1334 is corrupted as its top right corner has been overwritten by the newly created instance: only the shape 1342 has been left untouched by the instanciation operation. If this previously existing scalable template instance STI_vertical_cut_instance 1334 was a critical one, then the instanciation operation would have been considered as impossible (push-button "Create" 1303 being disabled). If this previously existing scalable template instance STI_vertical_cut_instance 1334 was not a critical one, then the instanciation operation would have been considered as possible (push-button "Create" 1303 being enabled), but the range of cells STI_vertical_cut_instance 1334 would no longer be considered as an instance.

Figure 13D:
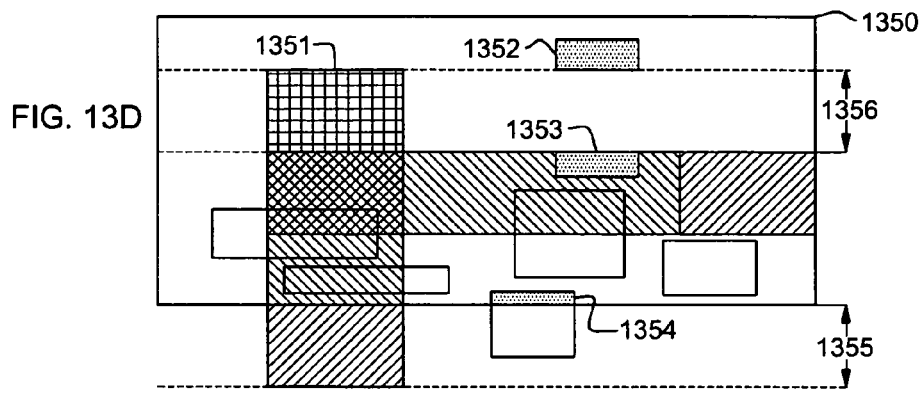

Referring now to FIG. 13D, the "HORIZONTAL INSERT" mode is illustrated as the new instance is created as the range of cells 1351 within the updated current sheet 1350. With this mode, a number of rows 1356 equal to STI_height 1326 is first inserted at the position occupied by the currently selected cell 1327, then the new scalable template instance 1351 is created with the top left cell located on the currently selected cell 1327. The insertion of the new rows may have some impact on existing instances. First any instance like the STI_horizontal_cut_instance 1333 (which crossed the row of the currently selected cell 1327) is cut into two pieces: the top piece 1352 which was located above the row of the currently selected cell 1327 and the bottom piece 1353 which was located below the row of the currently selected cell 1327. Second any instance like the STI_vertical_flushed_instance 1337 (which was overlapping the last STI_height 1326 rows) is partially or totally flushed away from the current sheet, so that only a sub-set of it (possibly void) 1354 remains within the limits of the current sheet 1350. Third any data previously located within the last STI_height 1326 rows is now pushed away from the current sheet 1350 in an area 1355. As previously explained, if one of the corrupted existing instance is a critical instance, then the instanciation operation would be considered as impossible, so that the "Create" push-button 1303 remains disabled. Otherwise the instanciation operation is performed, and any existing impacted scalable template instance will no longer be considered as a scalable template instance.

Figure 13E:
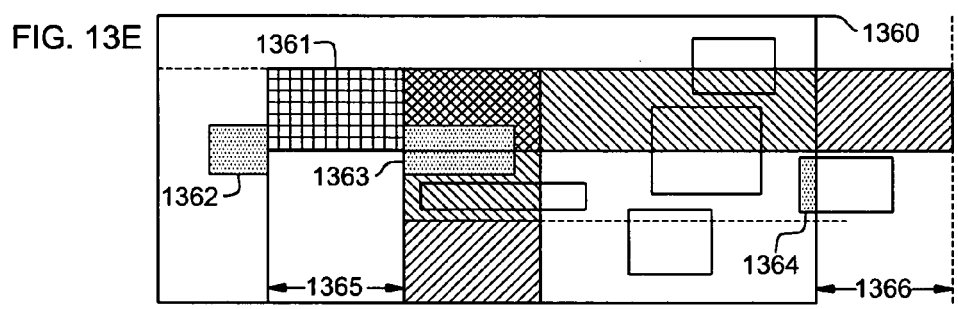

Referring now to FIG. 13E, the "VERTICAL INSERT" mode is illustrated as the new instance is created as the range of cells 1361 within the updated current sheet 1360. With this mode, a number of columns 1365 equal to STI_width 1325 is first inserted at the position occupied by the currently selected cell 1327, then the new scalable template instance 1361 is created with the top left cell located on the currently selected cell 1327. The insertion of the new columns may have some impact on existing instances. First any instance like the STI_vertical_cut_instance 1334 (which crossed the column of the currently selected cell 1327) is cut into two pieces: the left piece 1362 which was located on the left of the column of the currently selected cell 1327 and the right piece 1363 which was located on the right of the column of the currently selected cell 1327. Second any instance like the STI_horizontal_flushed_instance 1338 (which was overlapping the last STI_width 1325 columns) is partially or totally flushed away from the current sheet, so that only a sub-set of it (possibly void) 1364 remains within the limits of the current sheet 1360. Third any data previously located within the rightmost STI_width 1325 columns is now pushed away from the current sheet 1360 in an area 1366. As previously explained, if one of the corrupted existing instance is a critical instance, then the instanciation operation would be considered as impossible, so that the "Create" push-button 1303 remains disabled. Otherwise the instanciation operation is performed, and any existing impacted scalable template instance will no longer be considered as a scalable template instance.

Figure 13F:
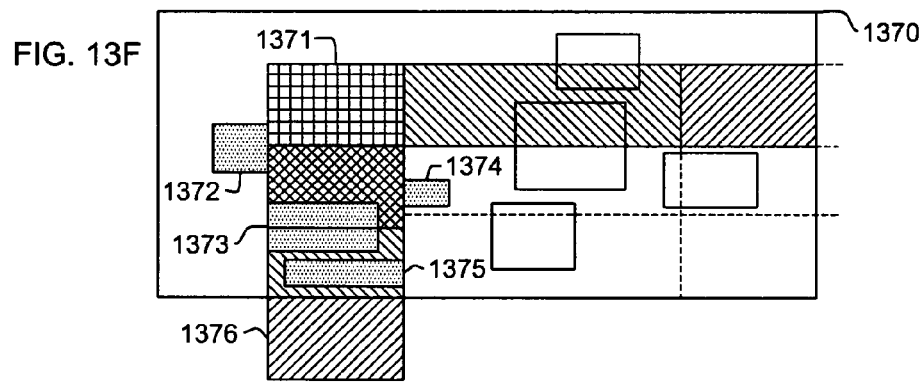

Referring now to FIG. 13F, the "HORIZONTAL INSERT BY RANGE" mode is illustrated as the new instance is created as the range of cells 1371 within the updated current sheet 1370. With this mode, the two ranges of cells STI_range 1328 and STI_vertical kept_range 1331 are moved down by a number of rows equal to STI_height 1326, so that space is left available for the new instance 1371, and so that the bottom range of cells STI_vertical_flushed_range 1332 is moved away from the limits of the current sheet 1370 in an area 1376. The range move may have some impact on existing instances. First any instance like the STI_vertical_cut_instance 1334 and the STI_vertical_sheared_instance 1336 (which partially overlapped the two ranges of cells 1328 and 1331 moved down) are sheared into two pieces: the left pieces 1372 and 1375 and the right pieces 1373 and 1374. Second any instance which was overlapping the range of cells STI_vertical_flushed_range 1332 is partially or totally flushed away from the current sheet, so that only a sub-set of it (possibly void) remains within the limits of the current sheet 1370. Third any data previously located within the range of cells STI_vertical_flushed_range 1332 is now pushed away from the current sheet 1370 in an area 1376. As previously explained, if one of the corrupted existing instance is a critical instance, then the instanciation operation would be considered as impossible, so that the "Create" push-button 1303 remains disabled. Otherwise the instanciation operation is performed, and any existing impacted scalable template instance will no longer be considered as a scalable template instance.

Figure 13G:
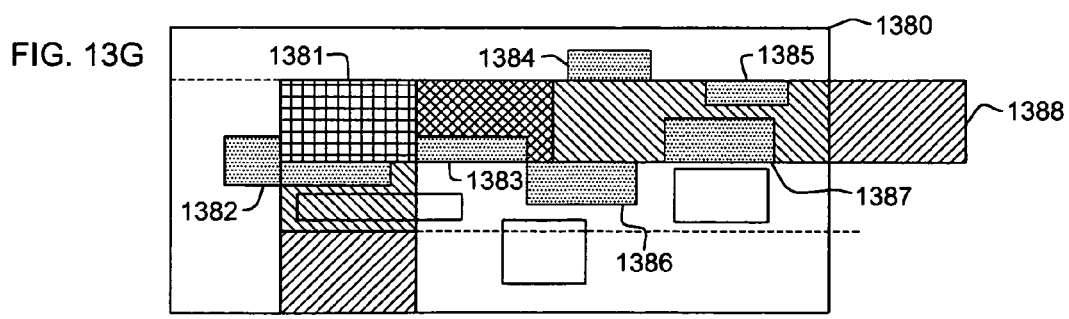

Referring now to FIG. 13G, the "VERTICAL INSERT BY RANGE" mode is illustrated as the new instance is created as the range of cells 1381 within the updated current sheet 1380. With this mode, the two ranges of cells STI_range 1328 and STI_horizontal_kept_range 1329 are moved right by a number of columns equal to STI_width 1325, so that space is left available for the new instance 1381, and so that the rightmost range of cells STI_horizontal_flushed_range 1330 is moved away from the limits of the current sheet 1370 in an area 1388. The range move may have some impact on existing instances. First any instance like the STI_horizontal_cut_instance 1333, the STI_vertical_cut_instance 1334, and the STI_horizontal_sheared_instance 1335 (which partially overlapped the two ranges of cells 1328 and 1329 moved rights) are sheared into two pieces: the top pieces 1383, 1384 and 1387 and the bottom pieces 1382, 1385 and 1386. Second any instance which was overlapping the range of cells STI_horizontal_flushed_range 1330 is partially or totally flushed away from the current sheet, so that only a sub-set of it (possibly void) remains within the limits of the current sheet 1380. Third any data previously located within the range of cells STI_horizontal_flushed_range 1330 is now pushed away from the current sheet 1380 in an area 1388. As previously explained, if one of the corrupted existing instance is a critical instance, then the instanciation operation would be considered as impossible, so that the "Create" push-button 1303 remains disabled. Otherwise the instanciation operation is performed, and any existing impacted scalable template instance will no longer be considered as a scalable template instance.

2. Second Operation: Introduction of New Elements Within a Defined Scalable Template Instance The second operation occurs when the spreadsheet user decides, based on his or her own criteria not detailed here, to introduce new elements within a defined scalable template instance. In a preferred embodiment of the present invention, this operation comprises the following steps:

a. The spreadsheet user first selects a range of cell of his/her choice by using conventional means, such as but not limited to the pointing device 105 or the keyboard 104.

b. Scalable Template Instance Insertion Manager

Then the spreadsheet user invokes thanks to conventional means available in spreadsheet environment, such as (but not limited to) dedicated push-buttons, keyboard entry short cuts, menu or sub-menu entries, an original specific command called "Scalable Template Instance Insertion Manager" which enriches the conventional means for inserting cells or rows within a spreadsheet. In a preferred embodiment of the present invention, the "Scalable Template Instance Insertion Manager" command is invoked by using the same set of means as the ones available in conventional electronic spreadsheets for inserting a range of cells within a sheet, such as but not limited to clicking with the pointing device 105 on a "Insert" sub-menu entry of the "Range" menu entry, or keying the "Ctrl +" key on the keyboard 104.

When the command is invoked, a test is first performed to determine if the currently selected cell belongs or not to an existing scalable template instance.

If it is the case, then a second test is performed to determine the relative position of the currently selected cell within this scalable template instance, which will be referred to as the current scalable template instance.

If the currently selected cell is found within the header part of within the footer part of the current scalable template instance, then the insertion operation will certainly corrupt this instance. To this effect a warning message is issued on the display device 106 through conventional means such as pop-up windows, status bar messages, or any other similar conventional means which can be used instead without departing from the spirit of the invention. This warning message informs the spreadsheet user about this case, and the spreadsheet user is then invited through conventional prompting means such as a dialog box with "Cancel" and "Continue" push-buttons, or through any other similar conventional means which can be used instead without departing from the spirit of the invention, to either cancel the insertion operation, or to continue it, meaning that the current scalable template instance will loose its instance nature.

If the spreadsheet user decision is to cancel the insertion operation, then the warning and prompting means disappear from the display device 106 and the insertion operation is aborted.

If the spreadsheet user decision is to continue the insertion operation, then the current scalable template instance is no longer considered as an instance, so that the remaining command execution becomes the same as the one followed when the result of the initial test indicates that the currently selected cell does not belong to a scalable template instance.

Figure 16A:
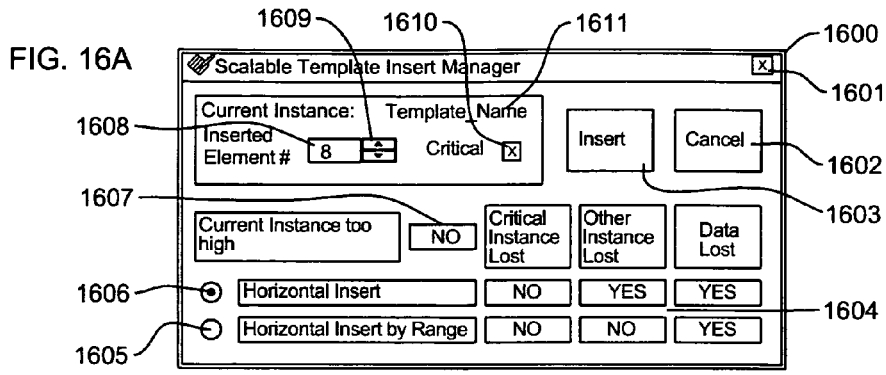
FIGS. 16A, and 16B show each a preferred spreadsheet user interface, according to the preferred embodiment of the present invention, for managing insertion in scalable template instances.

If the currently selected cell is found outside the header part and the footer part of the current scalable template instance, but within the body part of the current scalable template instance, then the insertion operation is followed by displaying on the display device 106 the Scalable Template Insert Manager Dialog Box 1600, as illustrated by FIG. 16A.

Figure 16B:
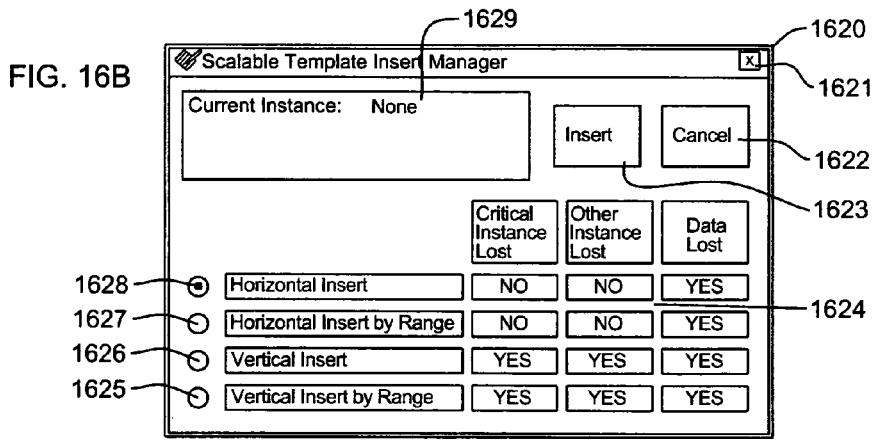

If the currently selected cell is found outside a scalable template instance (or if it was within the header of footer parts of the current scalable template instance that the spreadsheet user has decided to no longer consider as a scalable template instance) and if the insertion operation may lead to corrupt an existing scalable template instance, then the insertion operation is followed by displaying on the display device 106 the Scalable Template Insert Manager Dialog Box 1620, as illustrated by FIG. 16B.

If the currently selected cell is found outside a scalable template instance (or if it was within the header of footer parts of the current scalable template instance that the spreadsheet user has decided to no longer consider as a scalable template instance) and if the insertion operation cannot corrupt any existing scalable template instance, then the conventional means interfacing the spreadsheet user for initiating an insertion operation are used.

The Scalable Template Insert Manager Dialog Box 1600 contains some pieces of information which relate to the insertion operation in the case where the currently selected cell is within an existing scalable template instance.

First the name of the scalable template abiding by the current scalable template instance is displayed in a label box 1611.

Second the number of elements to be inserted is shown in a text box 1608. This number takes as initial value the number of rows contained in the currently selected range of cells. If the spreadsheet user wishes to insert within the current scalable template instance another number of elements, then he/she will have to click with the pointing device 105 on the upper or lower side of the spin-button 1609 to either increase or decrease the number of elements to be inserted. This number of inserted elements will vary within a range whose boundaries are delimited by ensuring that the sum of the number of already existing elements and of the number of inserted elements remains within the minimum and maximum number of elements, as specified within the definition of the scalable template (fields "Min Element #" 725 and "Max Element #" 726 within a record 721 of the STT table 720 whose "Name" field 722 matches the name displayed in the label box 1611) and is displayed, after possible update, in the text box 1608, whereas the currently selected range of cells is updated accordingly by containing as many rows as the number of inserted elements.

Third the mode of the insertion is specified by the presence of a black point within one of the two option buttons "Horizontal Insert" 1606 and "Horizontal Insert by Range" 1605. If the spreadsheet user wishes to change the default mode of insertion which is "HORIZONTAL INSERT" or a previously changed mode of insertion, then he/she uses the pointing device 105 to click on one of the two option buttons "Horizontal Insert" 1606 and "Horizontal Insert by Range" 1605 which will display alone a black point specifying the new selected mode of insertion.

Fourth the check box 1610 allows the spreadsheet user to visualise and possibly to change if the current scalable template instance is considered or not as a "Critical" instance. If and only if the check box 1610 displays a check mark, then the current scalable template instance is a critical one. By clicking with the pointing device 105 on this check box 1610, the spreadsheet user can swap between a "Critical" and not "Critical" instance, which is reflected by the presence or absence of a check mark within this same check box 1610.

Fifth the push-button "Cancer" 1602 or the closing-window push-button 1601 allow to close the Scalable Template Insert Manager Dialog Box 1600 without further action. By clicking with the pointing device 105 on one of these two push-buttons 1601 and 1602, the Scalable Template Insert Manager Dialog Box 1600 is closed and the scalable template insertion operation is aborted.

Sixth the push-button "Insert" 1603, when first enabled and second clicked with the pointing device 105 by the spreadsheet user, is the trigger launching the operation of scalable template insertion. This push-button "Insert" 1603 is enabled (meaning that the method recognises the click event with the pointing device on this push-button "Insert" 1603) when the insertion operation is possible. The fact that this scalable template insertion operation is possible or not depends on different factors: the position of the currently selected cell within the current scalable template instance, the size of the current scalable template instance, the mode of insertion, the presence of any other existing critical scalable template instance which would be corrupted due to the insertion operation. The possibility to insert or not within the current scalable template instance a number of elements specified in the text box 1608, at a row position corresponding to the currently selected cell, and according to the mode of insertion specified by one of the two option buttons 1605, and 1606, is reflected by several label boxes, taking the values "YES" or "NO", which are part of the Scalable Template Insert Manager Dialog Box 1600: the label box 1607 which reflects if the current scalable template instance would or not be too high after the insertion operation, and the set of 6 label boxes 1604 which are organised as a matrix of 2 rows by 3 columns and which reflect for each possible mode of insertion (one per row) if the insertion of the number of elements specified by the text box 1608 within the current scalable template instance may lead to corrupt any other existing critical scalable template instance (first column), or may lead to corrupt any other existing not critical scalable template instance or may lead to loose any existing data present in one or several spreadsheet cells. As soon as the value "YES" is taken by the label box 1607, or by the 1304 label box located at the intersection of the leftmost column and of the row corresponding to the selected mode of insertion, then the insertion operation is considered as impossible, so that the "Insert" push-button 1603 get disabled. Reversely, if the value "NO" is displayed in these label boxes, then the insertion operation is possible, so that the "Insert" push-button 1603 get enabled. When clicked with the pointing device 105 by the spreadsheet user, the insertion operation is performed, and then the Scalable Template Insert Manager Dialog Box 1600 is closed.

Figure 17A:
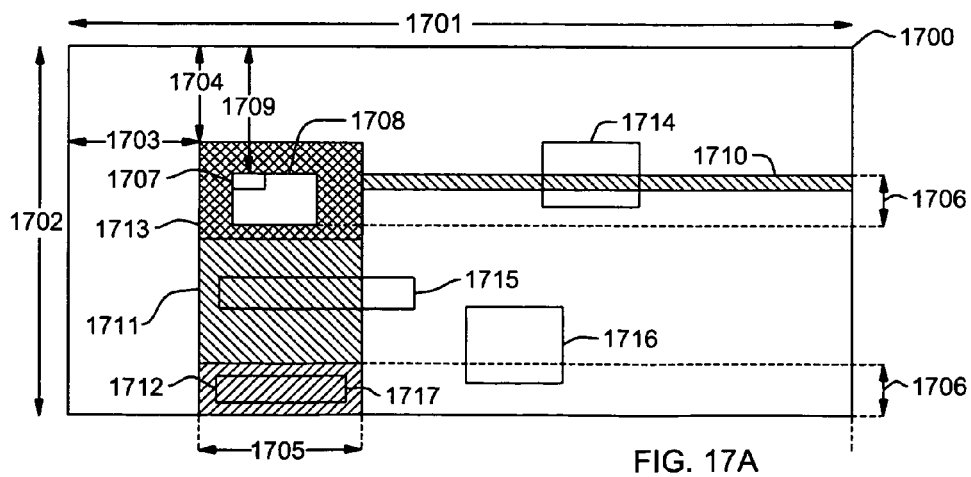
FIGS. 17A, 17B, 17C, 17D, 17E, 17F, 17G and 17H illustrate the different modes of scalable template instance insertion, according to a preferred embodiment of the present invention.
Figure 17B:
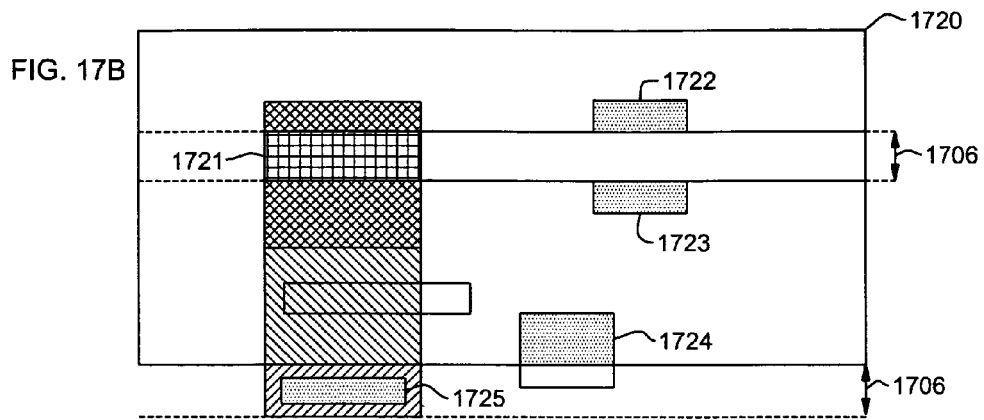
Figure 17C:
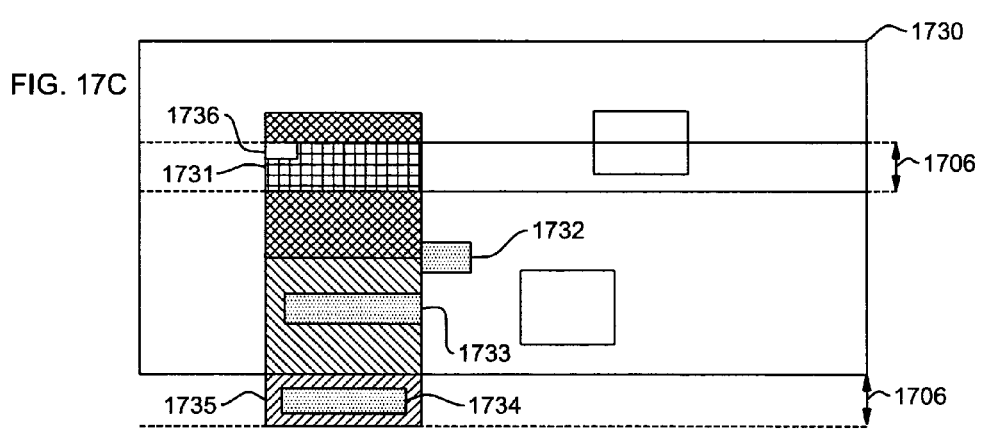

The way the insertion of new elements within the current scalable template instance may corrupt another existing scalable template instance or may lead to loose any data present in a cell is illustrated for each mode of insertion by the FIGS. 17A, 17B, and 17C.

Referring first to the FIG. 17A, one can see an illustration of the current sheet 1700 before the insertion operation is triggered. This sheet is first characterised by its number of columns STIM_sheet_width 1701 and by its number of rows STIM_sheet_height 1702. Within this current sheet, the currently selected cell 1707 is also characterised by its row offset number STIM_range_offset_height 1709 and is part of the currently selected range of cells STIM_range 1708 which is itself characterised by a number of rows STIM_height 1706. The current scalable template instance corresponds to a range of cells STIM_instance_range 1713 which is itself characterised by a number of columns STIM_width 1705. The range of cells STIM_instance_range 1713 is also characterized by its row offset number STIM_offset_height 1704 and by its column offset number STIM_offset width 1703. Three other ranges of cells can now be identified within the current sheet 1700:

the range of cells STIM_row_range 1710 which corresponds to the row where is located the currently selected cell 1707, but in the columns located on the right of the range of cells STIM_instance_range 1713;

the range of cells STIM_vertical_flushed_range 1712 which is located on the same columns than the range of cells STIM_instance_range 1713, but in the STIM_height 1706 bottom rows; and the range of cells STIM_vertical_kept_range 1711 located between the range of cells STIM_instance_range 1713 and STIM_vertical_flushed_range 1712.

Finally FIG. 17A also shows 4 existing scalable template instances: the ranges of cells STIM_horizontal_cut_instance 1714,
STIM_vertical_lost_instance 1717,
STIM_vertical_sheared_instance 1715,
STIM_vertical_flushed_instance 1716.

Referring now to FIG. 17B, the "HORIZONTAL INSERT" mode is illustrated by the new inserted elements corresponding to the range of cells 1721 within the updated current sheet 1720. With this mode, a number of rows equal to STIM_height 1706 is first inserted at the position occupied by the currently selected cell 1707, then the new elements 1721 are created within the current scalable template instance. The insertion of the new rows may have some impact on existing instances.

First any instance like the STIM_horizontal_cut_instance 1714 (which crossed the row STIM_row_range 1710 of the currently selected cell 1707) is cut into two pieces:

the top piece 1722 which was located above the row STIM_row range 1710 of the currently selected cell 1707 and the bottom piece 1723 which was located below the row STIM_row_range 1710 of the currently selected cell 1707.

Second any instance like the STIM_vertical_flushed_instance 1716 (which was overlapping the last STIM_height 1706 rows) or STIM_vertical_lost_instance 1717 (which was included within the last STIM_height 1706 rows) is partially or totally flushed away from the current sheet, so that only a sub-set of it (possibly void) 1724 remains within the limits of the current sheet 1720, or so that it is totally moved away from the current sheet 1720, as an "out-of-sheet" range 1725. Also any data previously located within the last STIM_height 1706 rows is now pushed away from the current sheet 1720.

As previously explained, if one of the corrupted existing instance is a critical instance, then the insertion operation would be considered as impossible, so that the "Insert" push-button 1603 remains disabled. Otherwise the insertion operation is performed, and any existing impacted scalable template instance will no longer be considered as a scalable template instance.

Referring now to FIG. 17C, the "HORIZONTAL INSERT BY RANGE" mode is illustrated by the new inserted elements corresponding to the range of cells 1731 within the updated current sheet 1730. With this mode, the range of cells which occupies the same columns as the range of cells STIM_instance_range 1713, and which occupies the rows below the currently selected cell is moved down by a number of rows equal to STIM_height 1706, so that space is left available for the new inserted elements 1731, and so that the bottom range of cells STIM_vertical_flushed_range 1712 is moved away from the limits of the current sheet 1730 in an area 1735. The range move may have some impact on existing instances.

First any instance like the STIM_vertical_sheared_instance 1715 (which partially overlapped the range of cells which occupies the same columns as the range of cells STIM_instance_range 1713, and which occupies the rows below the currently selected cell) is sheared into two pieces: the left piece 1733 and the right piece 1732.

Second any instance like the STIM_vertical_lost_instance 1717 previously located within the range of cells STIM_vertical_flushed_range 1712 is totally moved away from the current sheet 1730 as an out-of-limit instance 1734. Also any data previously located within the range of cells STIM_vertical_flushed_range 1712 is now pushed away from the current sheet 1730 in an area 1735.

As previously explained, if one of the corrupted existing instance is a critical instance, then the insertion operation would be considered as impossible, so that the "Insert" push-button 1603 remains disabled. Otherwise the insertion operation is performed, and any existing impacted scalable template instance will no longer be considered as a scalable template instance.

The Scalable Template Insert Manager Dialog Box 1620 comprises some pieces of information which relate to the insertion operation in the case where the currently selected cell is outside any existing scalable template instance.

First a label box 1629 filled with the reserved value "None" indicates that the currently selected cell does not belong to any existing scalable template instance.

Second the mode of the insertion is specified by the presence of a black point within one of the four option buttons "Horizontal Insert" 1628, "Horizontal Insert by Range" 1627, "Vertical Insert" 1626 and "Vertical Insert by Range" 1625. If the spreadsheet user wishes to change the default mode of insertion which is "Horizontal insert" or a previously changed mode of insertion, then he/she uses the pointing device 105 to click on one of the four option buttons "Horizontal Insert" 1628, "Horizontal Insert by Range" 1627, "Vertical Insert" 1626 and "Vertical Insert by Range" 1625 which will display alone a black point specifying the new selected mode of insertion.

Third the push-button "Cancel" 1622 or the closing-window push-button 1621 allow to close the Scalable Template Insert Manager Dialog Box 1620 without further action. By clicking with the pointing device 105 on one of these two push-buttons 1621 and 1622, the Scalable Template Insert Manager Dialog Box 1620 is closed and the insertion operation is aborted.

Fourth the push-button "Insert" 1623, when first enabled and second clicked with the pointing device 105 by the spreadsheet user, is the trigger launching the operation of insertion. This push-button "Insert" 1623 is enabled (meaning that the method recognises the click event with the pointing device on this push-button "Insert" 1623) when the insertion operation is possible. The fact that this insertion operation is possible or not depends on different factors: the position of the currently selected cell within the current sheet of the electronic spreadsheet, the size of the currently selected range of cells, the mode of insertion, the presence of any existing critical scalable template instance which would be corrupted due to the insertion operation. The possibility to perform or not the insertion according to the mode of insertion specified by one of the four option buttons 1625, 1626, 1627, and 1628, is reflected by several label boxes, taking the values "YES" or "NO", which are part of the Scalable Template Insert Manager Dialog Box 1620: the set of 12 label boxes 1624 which are organised as a matrix of 4 rows by 3 columns and which reflect for each possible mode of insertion (one per row) if the insertion operation may lead to corrupt any existing critical scalable template instance (first column), or may lead to corrupt any other existing scalable template instance or may lead to loose any existing data present in one or several spreadsheet cells. As soon as the value "YES" is taken by the 1624 label box located at the intersection of the leftmost column and of the row corresponding to the selected mode of insertion, then the insertion operation is considered as impossible, so that the "Insert" push-button 1623 get disabled. Reversely, if the value "NO" is displayed in this label box, then the insertion operation is possible, so that the "Insert" push-button 1623 get enabled. When clicked with the pointing device 105 by the spreadsheet user, the insertion operation is performed, and then the Scalable Template Insert Manager Dialog Box 1620 is closed.

The way the insertion operation may corrupt an existing scalable template instance or may lead to loose any data present in a cell is illustrated for each mode of insertion by the FIGS. 17D, 17E, 17F, 17G and 17H.

Figure 17D:
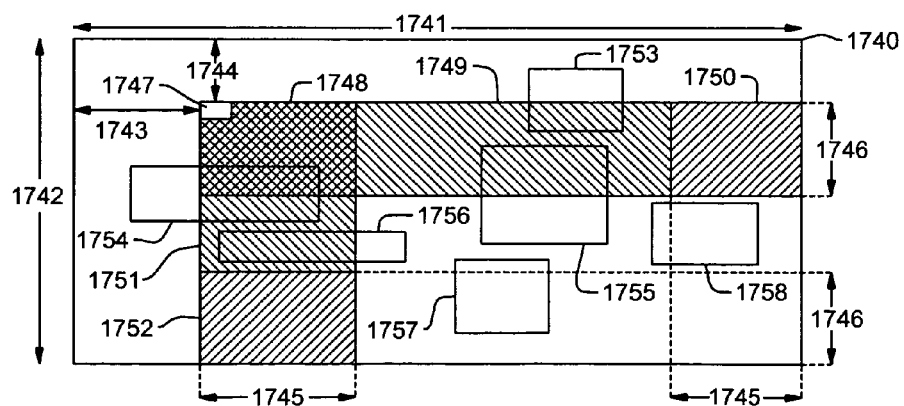

Referring first to the FIG. 17D, one can see an illustration of the current sheet 1740 before the insertion operation is triggered. This sheet is first characterised by its number of columns STIM_sheet_width 1741 and by its number of rows STIM_sheet_height 1742. Within this current sheet, the currently selected cell 1747 is also characterised by its row offset number STIM_offset_height 1744 and by its column offset number STIM_offset_width 1743. The currently selected range of cells STIM_range 1748 is itself characterised by a number of rows STIM_height 1746 and by a number of columns STIM_width 1745. Four other ranges of cells can now be identified within the current sheet 1740: the range of cells STIM_horizontal_flushed_range 1750 which is located on the same rows than the range of cells STIM_range 1748, but in the STIM_width 1745 rightmost columns; the range of cells STIM_vertical_flushed_range 1752 which is located on the same columns than the range of cells STIM_range 1748, but in the STIM_height 1746 bottom rows; the range of cells STIM_horizontal_kept_range 1749 located between the ranges of cells STIM_range 1748 and STIM_horizontal_flushed_range 1750; and the range of cells STIM_vertical_kept_range 1751 located between the ranges of cells STIM_range 1748 and STIM_vertical_flushed_range 1752. Finally the FIG. 17D also shows 6 existing scalable template instances: the ranges of cells STIM_horizontal_cut_instance 1753, STIM_vertical_cut_instance 1754, STIM_horizontal_sheared_instance 1755, STIM_vertical_sheared_instance 1756, STIM_vertical_flushed_instance 1757, STIM_horizontal_flushed_instance 1758.

Figure 17E:
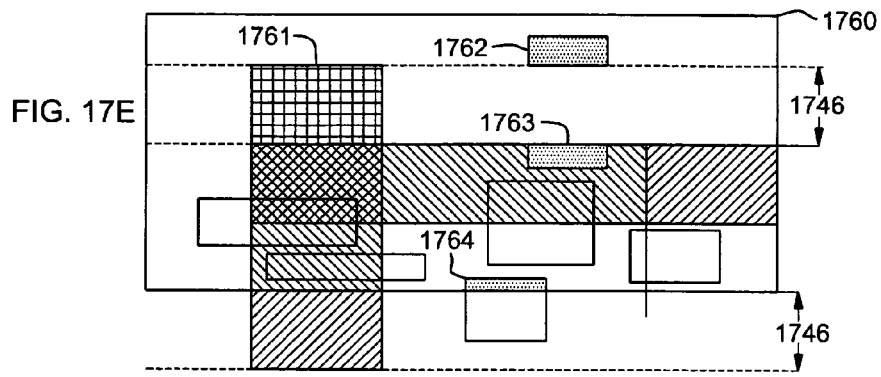

Referring now to FIG. 17E, the "HORIZONTAL INSERT" mode is illustrated by the updated current sheet 1760, resulting from the insertion of a number of rows equal to STIM_height 1746 at the position occupied by the currently selected cell 1747 within the currently selected range of cells which now takes the position 1761. The insertion of the new rows may have some impact on existing instances. First any instance like the STIM_horizontal_cut_instance 1753 (which crossed the row of the currently selected cell 1747) is cut into two pieces: the top piece 1762 which was located above the row of the currently selected cell 1747 and the bottom piece 1763 which was located below the row of the currently selected cell 1747. Second any instance like the STIM_vertical_flushed_instance 1757 (which was overlapping the last STIM_height 1746 rows) is partially or totally flushed away from the current sheet, so that only a sub-set of it (possibly void) 1764 remains within the limits of the current sheet 1760. Third any data previously located within the last STIM_height 1746 rows is now pushed away from the current sheet 1760. As previously explained, if one of the corrupted existing instance is a critical instance, then the insertion operation would be considered as impossible, so that the "Insert" push-button 1623 remains disabled. Otherwise the insertion operation is performed, and any existing impacted scalable template instance will no longer be considered as a scalable template instance.

Figure 17F:
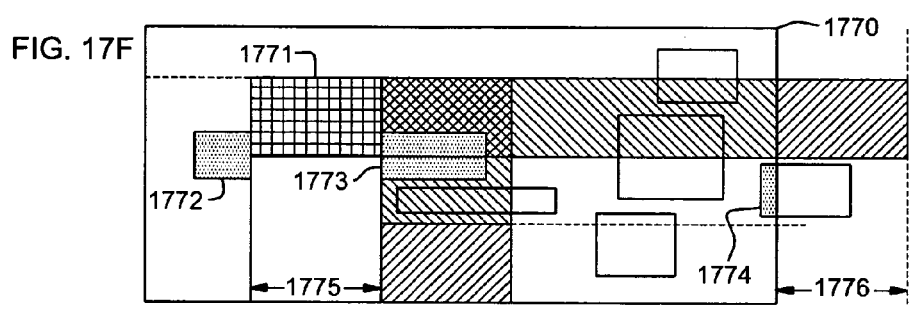

Referring now to FIG. 17F, the "VERTICAL INSERT" mode is illustrated by the updated current sheet 1770, resulting from the insertion of a number of columns equal to STIM_width 1745 at the position occupied by the currently selected cell 1747 within the currently selected range of cells which now takes the position 1771. The insertion of the new columns may have some impact on existing instances. First any instance like the STIM_vertical_cut_instance 1754 (which crossed the column of the currently selected cell 1747) is cut into two pieces: the left piece 1772 which was located on the left of the column of the currently selected cell 1747 and the right piece 1773 which was located on the right of the column of the currently selected cell 1747. Second any instance like the STIM_horizontal_flushed_instance 1758 (which was overlapping the last STIM_width 1745 columns) is partially or totally flushed away from the current sheet, so that only a sub-set of it (possibly void) 1774 remains within the limits of the current sheet 1770. Third any data previously located within the rightmost STIM_width 1745 columns is now pushed away from the current sheet 1770 in an area 1776. As previously explained, if one of the corrupted existing instance is a critical instance, then the insertion operation would be considered as impossible, so that the "Insert" push-button 1623 remains disabled. Otherwise the insertion operation is performed, and any existing impacted scalable template instance will no longer be considered as a scalable template instance.

Figure 17G:
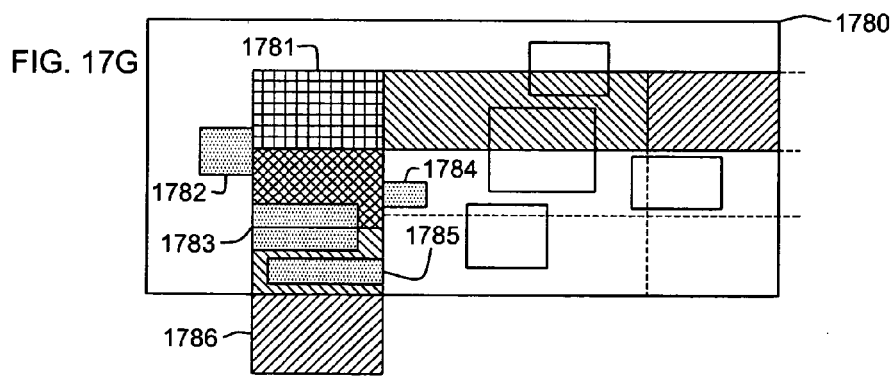

Referring now to FIG. 17G, the "HORIZONTAL INSERT BY RANGE" mode is illustrated by the updated current sheet 1780, resulting from the insertion within range of a number of rows equal to STIM_height 1746 at the position occupied by the currently selected cell 1747 within the currently selected range of cells which now takes the position 1781. With this mode, the two ranges of cells STIM_range 1748 and STIM_vertical kept_range 1751 are moved down by a number of rows equal to STIM_height 1746, so that space is left available for the new insertion 1781, and so that the bottom range of cells STIM_vertical_flushed_range 1752 is moved away from the limits of the current sheet 1780. The range move may have some impact on existing instances. First any instance like the STIM_vertical_cut_instance 1754 and the STIM_vertical_sheared_instance 1756 (which partially overlapped the two ranges of cells 1748 and 1751 moved down) are sheared into two pieces: the left pieces 1782 and 1785 and the right pieces 1783 and 1784. Second any instance which was overlapping the range of cells STIM_vertical_flushed_range 1752 is partially or totally flushed away from the current sheet, so that only a sub-set of it (possibly void) remains within the limits of the current sheet 1780. Third any data previously located within the range of cells STIM_vertical_flushed_range 1752 is now pushed away from the current sheet 1780 in an area 1786. As previously explained, if one of the corrupted existing instance is a critical instance, then the insertion operation would be considered as impossible, so that the "Insert" push-button 1623 remains disabled. Otherwise the insertion operation is performed, and any existing impacted scalable template instance will no longer be considered as a scalable template instance.

Figure 17H:
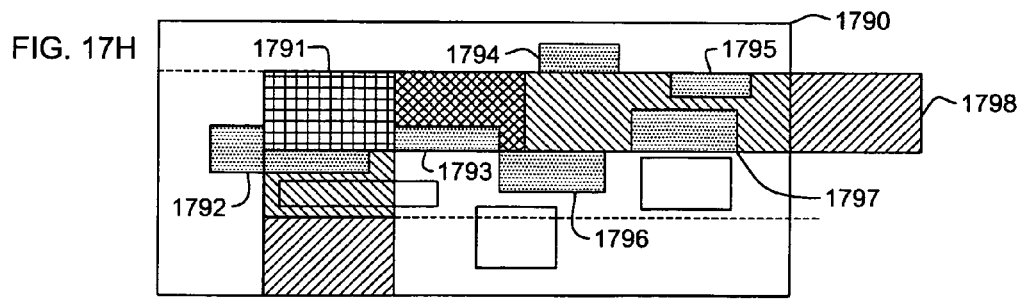

Referring now to FIG. 17H, the "VERTICAL INSERT BY RANGE" mode is illustrated by the updated current sheet 1790, resulting from the insertion within range of a number of columns equal to STIM_width 1745 at the position occupied by the currently selected cell 1747 within the currently selected range of cells which now takes the position 1791. With this mode, the two ranges of cells STIM_range 1748 and STIM_horizontal_kept_range 1749 are moved right by a number of columns equal to STIM_width 1745, so that space is left available for the new insertion 1791, and so that the rightmost range of cells STIM_horizontal_flushed_range 1750 is moved away from the limits of the current sheet 1790 in an area 1798. The range move may have some impact on existing instances. First any instance like the STIM_horizontal_cut_instance 1753, the STIM_vertical_cut_instance 1754, and the STIM_horizontal_sheared_instance 1755 (which partially overlapped the two ranges of cells 1748 and 1749 moved rights) are sheared into two pieces: the top pieces 1793, 1794 and 1797 and the bottom pieces 1792, 1795 and 1796. Second any instance which was overlapping the range of cells STIM_horizontal_flushed_range 1750 is partially or totally flushed away from the current sheet 1790, so that only a sub-set of it (possibly void) remains within the limits of the current sheet 1790. Third any data previously located within the range of cells STIM_horizontal_flushed_range 1750 is now pushed away from the current sheet 1790 in an area 1798. As previously explained, if one of the corrupted existing instance is a critical instance, then the insertion operation would be considered as impossible, so that the "Insert" push-button 1623 remains disabled. Otherwise the insertion operation is performed, and any existing impacted scalable template instance will no longer be considered as a scalable template instance.

3. Third Operation: Removal of Elements from a Defined Scalable Template Instance The third operation occurs when the spreadsheet user decides, based on his or her own criteria not detailed here, either:

to remove some elements from a defined scalable template instance, or to clear the content of some elements within a defined scalable template instance, or to delete a whole defined scalable template instance, or even to delete some spreadsheet cells or columns or rows from the current sheet.

In a preferred embodiment of the present invention, this operation comprises the following steps:

a. The spreadsheet user first selects a range of cells of his/her choice by using conventional means, such as but not limited to the pointing device 105 or the keyboard 104.

b. Scalable Template Instance Deletion Manager

Then the spreadsheet user invokes thanks to conventional means available in spreadsheet environment, such as (but not limited to)

dedicated push-buttons, keyboard entry short cuts, menu or sub-menu entries, an original specific command called "Scalable Template Instance Deletion Manager" which enriches the conventional means for deleting cells or rows or columns within a spreadsheet. In a preferred embodiment of the present invention, the "Scalable Template Instance Deletion Manager" command is invoked by using the same set of means as the one available in conventional electronic spreadsheets for clearing the content of a single cell or of a range of cells or for removing cells or rows or columns within a sheet, such as but not limited to keying the "Delete" key on the keyboard 104, or clicking with the pointing device 105 on a "Delete" sub-menu entry of the "Range" menu entry, or keying the "Ctrl –" key on the keyboard 104.

When the command is invoked, a test is first performed to determine if the currently selected cell belongs or not to an existing scalable template instance.

If it is the case, then a second test is performed to determine the relative position of the currently selected range of cells within this scalable template instance, which will be referred to as the current scalable template instance.

If the currently selected range of cells is overlapping, even partially, the header part or the footer part of the current scalable template instance, then the deletion operation cannot consist in removing selected elements and meta-elements as the resulting scalable template instance would be corrupted. Indeed the current scalable template instance abides by its associated scalable template which defines a structure comprising both elements and meta-elements, as the second test has shown that the current scalable template instance comprises either a footer part, or a header part or both. Should at least a meta-element be removed from one of these parts, then the structure of the current scalable template instance would no longer abide by the structure of the associated scalable template. To globally preserve the structure of the current scalable template instance, the deletion operation must statically keep the existing meta-elements according to the structure defined by the associated scalable template. Within this structure, the scalable template defines cells, within each element or meta-elements, that can be specified either as "IN" cells or as "OUT" cells. As the "IN" cells are those receiving spreadsheet user input, their content can be cleared without jeopardizing the global structure of the current scalable template instance. It is not the case for the "OUT" cells which should therefore be kept untouched. The determination of the "IN" cells to be cleared belongs to the spreadsheet user, under the control of the method which, in this specific case, statically manages the meta-elements. Two different sets of "IN" cells can be cleared: first the set of "IN" cells which belong to the currently selected range of cells, and second the set of "IN" cells which belong to the current scalable template instance elements and/or meta-elements sharing the same rows as the currently selected range of cells. Finally, besides this static management of meta-elements, another possible option consists in deleting the complete current scalable template instance. Thus the only available modes of deletion are:

the mode "DELETE_IN_FIELDS_IN_SELECTED_RANGE" where are cleared the "IN" cells within the currently selected range of cells, the mode "DELETE_IN_FIELDS_IN_SELECTED_ROWS" where are cleared the "IN" cells found within the scalable template instance elements and/or meta-elements located on the same rows as the currently selected range of cells, and The mode "DELETE_SELECTED_INSTANCE" where is deleted the whole scalable template instance containing the currently selected cell, by restoring in place void cells with default display attributes.

If the currently selected range of cells is found outside the header part and the footer part of the current scalable template instance, but within the body part of the current scalable template instance, then a fourth mode of deletion becomes possible:

the "DELETE_SELECTED_ELEMENTS" mode where are removed from the scalable template instance the elements sharing the same rows as the currently selected range of cells, by copy-pasting the underneath elements (and possible meta-elements) onto the ones contained in the currently selected range of cells.

Figure 19A:
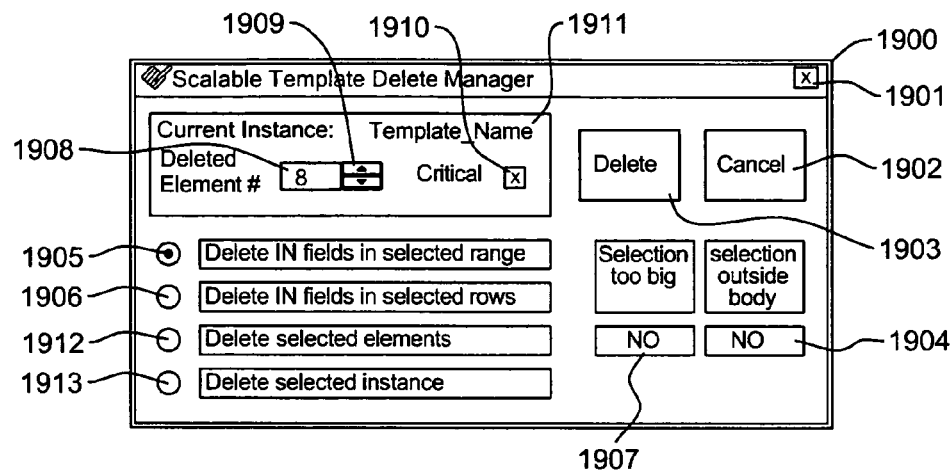
FIGS. 19A, and 19B show each a preferred spreadsheet user interface, according to the preferred embodiment of the present invention, for managing deletion in scalable template instances.

Then the deletion operation continues by displaying on the display device 106 the Scalable Template Delete Manager Dialog Box 1900, as illustrated by FIG. 19A. If the currently selected cell is found outside a scalable template instance, then a conventional deletion operation may have some side effects on existing scalable template instances. It is therefore needed to dynamically determine if such a deletion operation may lead to corrupt any existing scalable template instance. Such a corruption can take different forms, but always correspond to a situation where a scalable template instance does no longer abide by its associated scalable template. A typical scalable template instance corruption case is for instance the deletion of a row comprising a meta-element belonging to an existing scalable template instance. In such a case, either the header or the footer part of this existing scalable template instance is corrupted, so that the scalable template instance, as a whole, is itself corrupted.

Figure 19B:
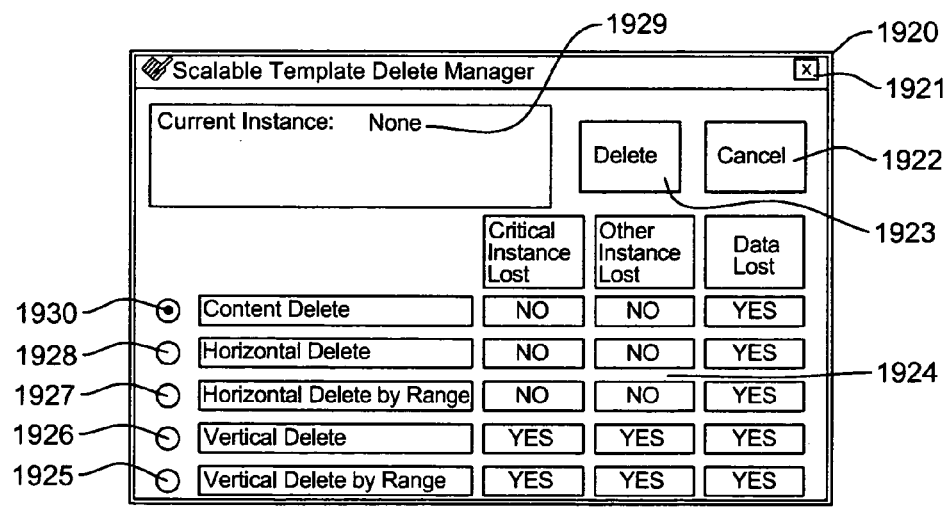

Once the method has dynamically determined that a meta-element, or an element, of any existing scalable template instance gets corrupted as a result of the deletion operation, then the spreadsheet user is informed about this situation, so that he/she can either cancel the deletion operation, or decide to pursue it according to the mode which minimizes the negative side effects of the deletion operation. For this purpose, this dynamic management of meta-element and/or element corruption displays on the display device 106 the Scalable Template Delete Manager Dialog Box 1920, as illustrated by FIG. 19B, which offers five different modes of deletion:

a the mode "CONTENT_DELETE" where is cleared the content of all individual cells within the currently selected range of cells, the mode "HORIZONTAL_DELETE" where are removed the whole rows containing the currently selected range of cells, the mode "horizontal_delete_by_range" where the range of cells located on the right of the currently selected range of cells is shifted left to overwrite the currently selected range of cells, the mode "VERTICAL_DELETE" where are removed the whole columns containing the currently selected range of cells, the mode "VERTICAL_DELETE_BY_RANGE" where the range of cells located on the bottom of the currently selected range of cells is shifted up to overwrite the currently selected range of cells.

If the currently selected cell is found outside a scalable template instance and if the deletion operation cannot corrupt any existing scalable template instance, then the conventional means interfacing the spreadsheet user for initiating a deletion operation are used.

The Scalable Template Delete Manager Dialog Box 1900 contains some pieces of information which relate to the deletion operation in the case where the currently selected cell is within an existing scalable template instance.

First the name of the scalable template that the current scalable template instance abides by, is displayed in a label box 1911.

Second the number of elements to be deleted is shown in a text box 1908. This number takes as initial value the number of element rows contained in the currently selected range of cells. If the spreadsheet user wished to delete within the current scalable template instance another number of elements, then he/she will have to click with the pointing device 105 on the upper or lower side of the spin-button 1909 to either increase or decrease the number of elements to be deleted. This number of deleted elements will vary within a range whose boundaries are delimited by ensuring that the difference of the number of already existing elements with the number of deleted elements remains within the minimum and maximum number of elements, as specified within the definition of the scalable template (fields "Min Element #" 725 and "Max Element #" 726 within a record 721 of the STT table 720 whose "Name" field 722 matches the name displayed in the label box 1911) and is displayed, after possible update, in the text box 1908, whereas the currently selected range of cells is updated accordingly by containing as many element rows as the number of inserted elements.

Third the mode of the deletion is specified by the presence of a black point within one of the four option buttons:
"delete_IN_fields_in_selected_range" 1905;
"delete_IN_fields_in_selected_rows" 1906;
"delete_selected_elements" 1912; and
"delete_selected_instance" 1913.

If the spreadsheet user wishes to change the default mode of deletion which is "delete_IN_fields_in_selected_range" or a previously changed mode of deletion, then he/she uses the pointing device 105 to click on one of the four option buttons:
"delete_IN_fields_in_selected_range" 1905,
"delete_IN_fields_in_selected_rows" 1906,
"delete_selected_elements" 1912, and
"delete_selected_instance" 1913,
which will display alone a black point specifying the new selected mode of deletion.

Fourth the check box 1910 allows the spreadsheet user to visualise and possibly to change if the current scalable template instance is considered or not as a "Critical" instance. If and only if the check box 1910 displays a check mark, then the current scalable template instance is a critical one. By clicking with the pointing device 105 on this check box 1910, the spreadsheet user can swap between a "Critical" and not "Critical" instance, which is reflected by the presence or absence of a check mark within this same check box 1910.

Fifth the push-button "Cancel" 1902 or the closing-window push-button 1901 allow to close the Scalable Template Delete Manager Dialog Box 1900 without further action. By clicking with the pointing device 105 on one of these two push-buttons 1901 and 1902, the Scalable Template Delete Manager Dialog Box 1900 is closed and the scalable template deletion operation is aborted.

Sixth the push-button "Delete" 1903, when first enabled and second clicked with the pointing device 105 by the spreadsheet user, is the trigger launching the operation of scalable template instance deletion. This push-button "Delete" 1903 is enabled (meaning that the method recognises the click event with the pointing device on this push-button "Delete" 1903) when the deletion operation is possible. The fact that this scalable template deletion operation is possible or not depends on different factors:
- the position of the currently selected cell within the current scalable template instance,
- the size of the current scalable template instance and of the currently selected range of cells,
- the mode of deletion.

When the deletion mode is equal to "DELETE_IN_FIELDS_IN_SELECTED RANGE" or "DELETE_IN_FIELDS_IN_SELECTED_ROWS" or "DELETE_SELECTED_INSTANCE", then the deletion operation is always possible, so that the "Delete" push-button 1903 remains enabled.

When the deletion mode is equal to "DELETE_SELECTED_ELEMENTS", then the deletion operation is only possible if two conditions are met:
- first the currently selected range of cells must be entirely located within the body part of the current scalable template, as specified by the "Selection outside body" text box 1904 which can takes the values "YES" and "NO";
- second the number of deleted elements must result in a new number of elements remaining above the minimum number of elements in the current scalable template instance, as specified in the "Selection too big" text box 1907 which can takes the values "YES" and "NO".

Thus when the "DELETE_SELECTED_ELEMENTS" option button 1912 is selected, the "Delete" push-button 1903 is enabled if and only if the two text boxes 1904 and 1907 display the value "NO". When clicked with the pointing device 105 by the spreadsheet user, the deletion operation is performed, and then the Scalable Template Delete Manager Dialog Box 1900 is closed.

The Scalable Template Delete Manager Dialog Box 1920 contains some pieces of information which relate to the deletion operation in the case where the currently selected cell is outside any existing scalable template instance.

First a label box 1929 filled with the reserved value "None" indicates that the currently selected cell does not belong to any existing scalable template instance.

Second the mode of the deletion is specified by the presence of a black point within one of the five option buttons:
- "Content Delete" 1930,
- "Horizontal Delete" 1928,
- "Horizontal Delete by Range" 1927,
- "Vertical Delete" 1926 and
- "Vertical Delete by Range" 1925.

If the spreadsheet user wishes to change the default mode of deletion which is "Content Delete" in a preferred embodiment of the present invention, or a previously changed mode of deletion, then he/she uses the pointing device 105 to click on one of the five option buttons "Content Delete" 1930, "Horizontal Delete" 1928, "Horizontal Delete by Range" 1927, "Vertical Delete" 1926 and "Vertical Delete by Range" 1925 which will display alone a black point specifying the new selected mode of deletion.

Third the push-button "Cancel" 1922 or the closing-window push-button 1921 allow to close the Scalable Template Delete Manager Dialog Box 1920 without further action. By clicking with the pointing device 105 on one of these two push-buttons 1921 and 1922, the Scalable Template Delete Manager Dialog Box 1920 is closed and the deletion operation is aborted.

Fourth the push-button "Delete" 1923, when first enabled and second clicked with the pointing device 105 by the spreadsheet user, is the trigger launching the operation of deletion. This push-button "Delete" 1923 is enabled (meaning that the method recognises the click event with the pointing device on this push-button "Delete" 1923) when the deletion operation is possible. The fact that this deletion operation is possible or not depends on different factors:
- the position of the currently selected cell within the current sheet of the electronic spreadsheet,
- the size of the currently selected range of cells,
- the mode of deletion,
- the presence of any existing critical scalable template instance which would be corrupted due to the deletion operation.

The possibility to perform or not the deletion according to the mode of deletion specified by one of the five option buttons 1925, 1926, 1927, 1928 and 1930, is reflected by several label boxes, taking the values "YES" or "NO", which are part of the Scalable Template Delete Manager Dialog Box 1920: the set of 15 label boxes 1924 which are organised as a matrix of 5 rows by 3 columns and which reflect for each possible mode of deletion (one per row) if the deletion operation may lead to corrupt any existing critical scalable template instance (first column), or may lead to corrupt any other existing scalable template instance or may lead to loose any existing data present in one or several spreadsheet cells.

As soon as the value "YES" is taken by the 1924 label box located at the intersection of the leftmost column and of the row corresponding to the selected mode of deletion, then the deletion operation is considered as impossible, so that the "Delete" push-button 1923 get disabled.

Reversely, if the value "NO" is displayed in this label box, then the deletion operation is possible, so that the "Delete" push-button 1923 get enabled. When clicked with the pointing device 105 by the spreadsheet user, the deletion operation is performed, and then the Scalable Template Delete Manager Dialog Box 1920 is closed.

The way the deletion operation may corrupt an existing scalable template instance or may lead to loose any data present in a cell is illustrated for each mode of deletion by the FIGS. 20A, 20B, 20C, 20D and 20E.

Referring first to the FIG. 20A, one can see an illustration of the current sheet 2000 before the deletion operation is triggered. Within this current sheet, the currently selected cell 2001 is part of the currently selected range of cells STDM_range 2002. Four other ranges of cells can now be identified within the current sheet 2000:
- the range of cells STDM_right_range 2003 which is located on the same rows as the range of cells STDM_range 2002, but in the columns on its right;

the range of cells STDM_bottom_range 2004 which is located on the same columns than the range of cells STDM_range 2002, but in the rows bellow it;

the range of cells STDM_left_range 2005 which is located on the same rows as the range of cells STDM_range 2002, but in the columns on its left; and the range of cells STDM_top_range 2006 which is located on the same columns than the range of cells STDM_range 2002, but in the rows above it.

Finally the FIG. 20A also shows 3 existing scalable template instances:
STDM_vertical_cut_instance 2007,
STDM_vertical_sheared_instance 2008,
STDM_horizontal_sheared_instance 2009.

The "CONTENT DELETE" mode consists in clearing the content of every individual cell belonging to the currently selected range of cells STDM_range 2002. This range of cells STDM_range 2002 may partially or totally overlap one or a plurality of existing scalable template instances, so that the resulting intersection is constituted by element or meta-element cells which can be either defined as "IN" cells or as "OUT" cells.

If this intersection comprises only "IN" cells, then clearing their content does not corrupt at all the scalable template instances they belong to.

Reversely if this intersection comprises "OUT" cells, the clearing their content corrupts the scalable template instances they belong to.

If one of the corrupted existing scalable template instances is a critical instance, then the deletion operation would be considered as impossible, so that the "Delete" push-button 1923 remains disabled.

Otherwise the deletion operation is performed, and any existing impacted scalable template instance will no longer be considered as a scalable template instance.

Referring now to FIG. 20B, the "HORIZONTAL DELETE" mode is illustrated by the updated current sheet 2010, resulting from the deletion of the rows occupied by the currently selected range of cells STDM_range 2002, so that the STDM_bottom_range moves from the former position 2004 to the new position 2012, as well as the two other ranges of cells 2011 and 2013 occupying the same rows, and so that a new range of void cells 2015 is appended at the bottom of the current sheet 2010. The deletion of the rows may have some impact on existing instances.

First any instance like the STDM_horizontal_sheared_instance 2009 (which overlapped partially or totally the rows occupied by the currently selected range of cells 2002) is reduced to a remaining piece (potentially void): the piece 2014 which was located below the deleted rows.

Second any data previously located within the ranges of cells STDM_range 2002, STDM_left_range 2005 and STDM_right_range 2003 is now pushed away from the current sheet 2010.

As previously explained, if one of the corrupted existing instance is a critical instance, then the deletion operation would be considered as impossible, so that the "Delete" push-button 1923 remains disabled.

Otherwise the deletion operation is performed, and any existing impacted scalable template instance will no longer be considered as a scalable template instance.

Referring now to FIG. 20C, the "VERTICAL DELETE" mode is illustrated by the updated current sheet 2020, resulting from the deletion of the columns occupied by the currently selected range of cells STDM_range 2002, so that the STDM_right_range moves from the former position 2003 to the new position 2022, as well as the two other ranges of cells 2021 and 2023 occupying the same columns, and so that a new range of void cells 2026 is appended at the right of the current sheet 2020. The deletion of the columns may have some impact on existing instances.

First any instance like the STDM_vertical_cut_instance 2007 or the STDM_vertical_sheared_instance 2008 (which overlapped partially or totally the columns occupied by the currently selected range of cells 2002) is reduced to a remaining piece (potentially void): the left piece 2024 which was located on the left of the deleted columns and the right piece 2025 which was located on the right of the deleted columns.

Second any data previously located within the ranges of cells STDM_range 2002, STDM_bottom_range 2004 and STDM_top_range 2006 is now pushed away from the current sheet 2020.

As previously explained, if one of the corrupted existing instance is a critical instance, then the deletion operation would be considered as impossible, so that the "Delete" push-button 1923 remains disabled.

Otherwise the deletion operation is performed, and any existing impacted scalable template instance will no longer be considered as a scalable template instance.

Referring now to FIG. 20D, the "HORIZONTAL DELETE BY RANGE" mode is illustrated by the updated current sheet 2030, resulting from the row deletion within range of the previously selected range of cells STDM_range 2002, so that the range of cells STDM_bottom_range moves from the former position 2004 to the new position 2031, and so that a new range of void cells 2032 is introduced below the new position of the range of cells STDM_bottom_range 2031. The range move may have some impact on existing instances.

First any instance like the STDM_vertical_sheared_instance 2008 (which partially or totally overlapped the range of cells made by the concatenation of the ranges of cells STDM_range 2002 and STDM_bottom_range 2004) are sheared into two pieces (possibly void): the left piece 2033 and the right piece 2034.

Second any data previously located within the range of cells STDM_range 2002 is now pushed away from the current sheet 2030.

As previously explained, if one of the corrupted existing instance is a critical instance, then the deletion operation would be considered as impossible, so that the "Delete" push-button 1923 remains disabled.

Otherwise the deletion operation is performed, and any existing impacted scalable template instance will no longer be considered as a scalable template instance.

Referring now to FIG. 20E, the "VERTICAL DELETE BY RANGE" mode is illustrated by the updated current sheet 2040, resulting from the column deletion within range of the previously selected range of cells STDM_range 2002, so that the range of cells STDM_right_range moves from the former position 2003 to the new position 2041, and so that a new range of void cells 2042 is introduced on the right of the new position of the range of cells STDM_right_range 2041. The range move may have some impact on existing instances.

First any instance like the STDM_horizontal_sheared_instance 2009 (which partially or totally overlapped the range of cells made by the concatenation of the two ranges of cells STDM_range 2002 and STDM_right_range 2041) are sheared into two pieces (possibly void): the top piece 2044 and the bottom piece 2043.

Second any data previously located within the range of cells STDM_range 2002 is now pushed away from the current sheet 2040.

As previously explained, if one of the corrupted existing instance is a critical instance, then the deletion operation would be considered as impossible, so that the "Delete" push-button 1923 remains disabled.

Otherwise the deletion operation is performed, and any existing impacted scalable template instance will no longer be considered as a scalable template instance.

4. Fourth Operation: Definition Updates of Element Formats or Profiles

The fourth operation occurs when the spreadsheet user decides, based on his or her own criteria not detailed here, to update the definition of
- existing element formats, or
- meta-element formats, or
- element profiles, or
- meta-element profiles, so that the new definition gets automatically reflected in every scalable template instance abiding by an updated scalable template. In a preferred embodiment of the present invention, this operation comprises the following steps:

a. The spreadsheet user first invokes thanks to conventional means available in spreadsheet environment, such as (but not limited to)
- dedicated push-buttons,
- keyboard entry short cuts,
- menu or sub-menu entries, the original command called "Scalable Template Manager", followed by one of the original commands called "Element Format Editor", or "Element Profile Editor" in order to start updating either an existing element format, or an existing meta-element format, or an existing element profile, or an existing meta-element profile. This initial step corresponds to the first step of the first operation of this scenario, followed by the second, or third step of the first operation of this scenario.

b. Scalable Template Refresh Manager

Then the spreadsheet user invokes thanks to conventional means available in spreadsheet environment, such as (but not limited to)
- dedicated push-buttons,
- keyboard entry short cuts,
- menu or sub-menu entries, an original specific command called "Scalable Template Refresh Manager" which identifies if at least one existing scalable template instance abides by the object updated during the previous step, and then retrofits the update onto the scalable template instances.

Figure 22A:
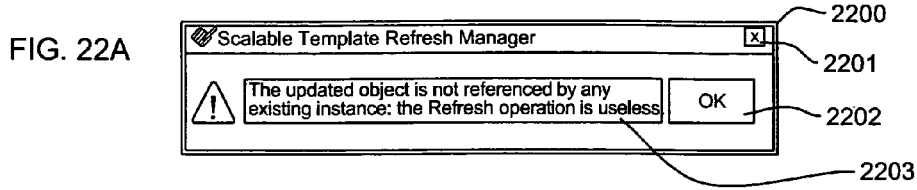
FIGS. 22A, and 22B show each a preferred spreadsheet user interface, according to the preferred embodiment of the present invention, for refreshing scalable template instances.

If the updated object (either an element format, or a meta-element format, or an element profile or a meta-element profile) is not referenced in at least a scalable template that at least one existing scalable template instance abides by, then a warning message is displayed on the display device 106, as illustrated with the dialog box 2200 described within the FIG. 22A. This dialog box 2200 contains a text window 2203 specifying the warning message. The spreadsheet user can close this dialog box 2200 by clicking with the pointing device 105 on the "OK" push button 2202 or on the closing-window push button 2201.

If the updated object) is referenced in at least one scalable template that at least one existing scalable template instance abides by, then the Refresh operation does effectively take place. This operation consists:

first in identifying each existing scalable template instance which abides by a scalable template which references the updated object, then in identifying within each found scalable template instance all elements or meta-elements which depend on the updated object, and finally in refreshing each identified element or meta-element according to the change of the updated object. This element or meta-element Refresh operation depends on the nature of the updated object.

If the updated object is an element format or a meta-element format, then the Refresh operation of a given element or meta-element consists in performing a conventional copy-paste operation by attribute (the content and the destination ("IN" cell vs "OUT" cell) being kept untouched) from the new object illustrative range of cells 634 onto the given element or meta-element.

If the updated object is an element profile or a meta-element profile, then the Refresh operation of a given element or meta-element consists in performing a conventional copy-paste operation by content and by destination ("IN" cell vs "OUT" cell), the attributes being kept untouched, from each cell of the new object illustrative range of cells 654 onto each corresponding cell of the given element or meta-element. This copy-paste operation by content and destination is performed cell after cell, starting with the leftmost cell, and up to the rightmost one. For a given relative cell position within the corresponding ranges of cells (element or meta-element and illustrative rang of cells 654), the copy-paste operation by content is performed unless the two following conditions are fulfilled:

both in its previous and updated profile definition, the current cell is considered as an "IN" cell, and the content of the cell in the element or meta-element is different from the content of the cell in the previous profile definition.

These two tests are necessary to avoid the overwritting of an "IN" cell which content was already filled by the spreadsheet user. Indeed in such a case, the default cell content, as specified in the previous profile definition, has been replaced by a user-specifed content which must not be lost. As a result, the updated profile definition is reflected in cells of elements or meta-elements in the following situations:

the cell is defined in the updated destination as an "OUT" cell, or the destination of the cell is updated and the cell becomes an "IN" cell while the cell was defined in the previous destination as an "OUT" cell, or the destination is unchanged and the cell remains an "IN" cell while the cell content matches the content defined in the previous profile definition.

Figure 22B:
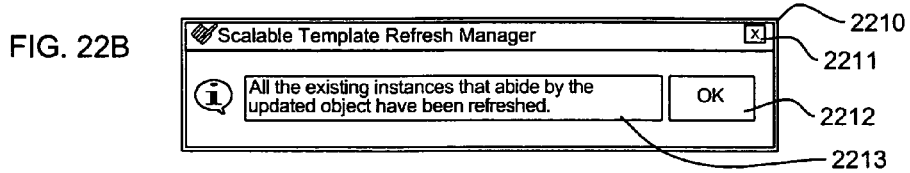

When every cell of every refreshed element or meta-element of every refreshed instance has been refreshed, the refresh operation is completed, and an information message is displayed on the display device 106, as illustrated with the dialog box 2210 described within the FIG. 22B. This dialog box 2210 contains a text window 2213 specifying the information message. The spreadsheet user can close this dialog box 2210 by clicking with the pointing device 105 on the "OK" push button 2212 or on the closing-window push button 2211.

5. Fifth Operation: Copy/Cut and Paste a Scalable Template Instance

The fifth operation occurs when the spreadsheet user decides, based on his or her own criteria not detailed here, to perform a copy-and-paste or a cut-and-paste operation with a given scalable template instance. In a preferred embodiment of the present invention, this operation comprises the following steps:

a. The spreadsheet user first selects a range of cells of his/her choice by using conventional means, such as but not limited to the pointing device 105 or the keyboard 104.

b. Scalable Template Instance Copy

Then the spreadsheet user invokes thanks to conventional means available in spreadsheet environment, such as (but not limited to)
    dedicated push-buttons,
    keyboard entry short cuts,
    menu or sub-menu entries,
one of the two original commands called "Scalable Template Instance Copy", or "Scalable Template Instance Cut" in order to copy or cut onto the clipboard available as part of the memory storage 102 the selected range of cells, or any elements or meta-elements contained in the selected range of cells or even the whole scalable template instance containing the currently selected cell.

When the Scalable Template Instance Copy command is invoked, a test is first performed to determline whether the currently selected cell belongs or not to an existing scalable template instance.

If it is not the case, then a conventional Copy operation is performed from the currently selected range of cells onto the clipboard.

If it is the case, then three different modes of copy become possible.

The first copy mode is the "RANGE" mode which corresponds to the conventional copy operation where the currently selected range of cells is copied onto the clipboard.

The second copy mode is the "ELEMENT" mode where the range of cells to be copied onto the clipboard corresponds to the elements and meta-elements which on one side are part of the scalable template instance to which the currently selected cell belongs, and which on the other side occupy the rows of the currently selected range of cells.

The third copy mode is the "INSTANCE" mode where the range of cells to be copied onto the clipboard corresponds to the whole scalable template instance to which the currently selected cell belongs.

Figure 23A:
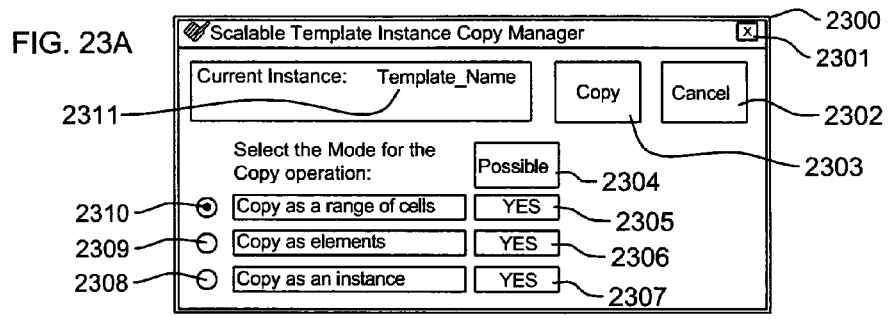
FIG. 23A shows a preferred spreadsheet user interface, according to the preferred embodiment of the present invention, for copying scalable template instances.

To determine which copy mode to use, the Scalable Template Instance Copy Manager Dialog Box 2300 is displayed on the display device 106, as illustrated by FIG. 23A. This Scalable Template Instance Copy Manager Dialog Box 2300 contains some pieces of information which relate to the copy operation.

First the name of the scalable template that the scalable template instance to which the currently selected cell belongs, abides by, is displayed in the label box 2311.

Second the copy mode is specified by the presence of a black point within one of the three option buttons
    "Copy as a range of cells" 2310,
    "Copy as elements" 2309, and
    "Copy as an Instance" 2308,
respectively corresponding to the copy modes "RANGE", "ELEMENT" and "INSTANCE". If the spreadsheet user wishes to change the default copy mode which is "RANGE" in a preferred embodiment of the present invention, or a previously changed copy mode, then he/she uses the pointing device 105 to click on one of the three option buttons "Copy as a range of cells" 2310, "Copy as elements" 2309, and "Copy as an Instance" 2308 which will display alone a black point specifying the new selected copy mode.

Third the push-button "Cancel" 2302 or the closing-window push-button 2301 allow to close the Scalable Template Instance Copy Manager Dialog Box 2300 without further action. By clicking with the pointing device 105 on one of these two push-buttons 2301 and 2302, the Scalable Template Instance Copy Manager Dialog Box 2300 is closed and the copy operation is aborted.

Fourth the push-button "Copy" 2303, when clicked with the pointing device 105 by the spreadsheet user, is the trigger launching the operation of copy. This push-button "Copy" 2303 is always enabled (meaning that the method recognises the click event with the pointing device 105 on this push-button "Copy" 2303) as the copy operation is always possible. This is reflected by the three label boxes 2305, 2306 and 2307 in the "Possible" columns 2304, which always display the value "YES" to reflect that the three different copy modes are always available. When the push-button "Copy" 2303 is clicked with the pointing device 105 by the spreadsheet user, the selected copy mode is used to determine how to reshape the currently selected range of cells.

If the selected copy mode is the "RANGE" mode (option button 2310 displaying a black point), then the currently selected range of cells is kept as is.

If the selected copy mode is the "ELEMENT" mode (option button 2309 displaying a black point), then the currently selected range of cells is reshaped to correspond to the elements and meta-elements which on one side are part of the scalable template instance to which the currently selected cell belongs, and which on the other side occupy the rows of the currently selected range of cells.

If the selected copy mode is the "INSTANCE" mode (option button 2308 displaying a black point), then the currently selected range of cells is reshaped to correspond to the whole scalable template instance to which the currently selected cell belongs.

Once the reshape is done, a conventional copy operation is performed from the reshaped range of cells onto the memory clipboard. Then the Scalable Template Instance Copy Manager Dialog Box 2300 is closed to complete the processing of the Scalable Template Instance Copy command.

c. Scalable Template Instance Cut

When the Scalable Template Instance Cut command is invoked, a test is first performed to determine if the currently selected range of cells overlaps or not (totally or partially) one or several existing scalable template instances.

If it is not the case, then a conventional Cut operation is performed from the currently selected range of cells onto the clipboard.

If it is the case, then a second test is performed to determine if the currently selected cell belongs or not to an existing scalable template instance.

If it is not the case, then a conventional cut operation will be possible, at the cost of corrupting the existing scalable template instances which overlap with the currently selected range of cells.

If it is the case, then three different modes of cut become possible.

The first cut mode is the "RANGE" mode which corresponds to the conventional cut operation where the currently selected range of cells is cut onto the clipboard. With this first mode, any existing scalable template instance overlapping with the cut range of cells will be corrupted.

The second cut mode is the "ELEMENT" mode where the range of cells to be cut onto the clipboard corresponds to the elements and meta-elements which on one side are part of the scalable template instance to which the currently selected cell belongs, and which on the other side occupy the rows of the currently selected range of cells. With this second mode, the aforementioned elements and meta-elements are in fact copied onto the clipboard, and then only their cells specified as "IN" cells are changed with empty content.

The third cut mode is the "INSTANCE" mode where the range of cells to be cut onto the clipboard corresponds to the whole scalable template instance to which the currently selected cell belongs. With this third mode, the scalable template instance to which the currently selected cell belongs is in fact moved to the clipboard, and is thus no longer considered as an existing scalable template instance.

Figure 23B:
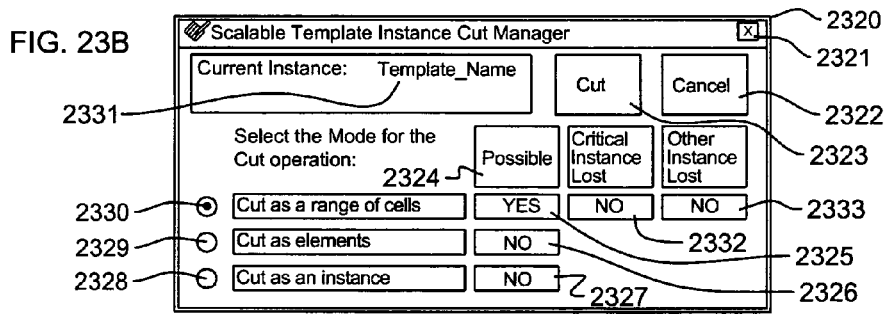
FIG. 23B shows a preferred spreadsheet user interface, according to the preferred embodiment of the present invention, for cutting scalable template instances.

To determine which cut mode to use, the Scalable Template Instance Cut Manager Dialog Box 2320 is displayed on the display device 106, as illustrated by FIG. 23B. This Scalable Template Instance Cut Manager Dialog Box 2320 contains some pieces of information which relate to the cut operation.

First the name of the scalable template that the scalable template instance to which the currently selected cell belongs, abides by, is displayed in the label box 2331 (if such a scalable template instance does not exist, then the label box 2331 displays the reserved name "NONE").

Second the cut mode is specified by the presence of a black point within one of the three option buttons
"Cut as a range of cells" 2330,
"Cut as elements" 2329, and
"Cut as an Instance" 2328,
respectively corresponding to the cut modes "RANGE", "ELEMENT" and "INSTANCE". If the spreadsheet user wishes to change the default cut mode which is "RANGE" in a preferred embodiment of the present invention, or a previously changed cut mode, then he/she uses the pointing device 105 to click on one of the three option buttons "Cut as a range of cells" 2330, "Cut as elements" 2329, and "Cut as an Instance" 2328 which will display alone a black point specifying the new selected cut mode.

Third the push-button "Cancel" 2322 or the closing-window push-button 2321 allow to close the Scalable Template Instance Cut Manager Dialog Box 2320 without further action. By clicking with the pointing device 105 on one of these two push-buttons 2321 and 2322, the Scalable Template Instance Cut Manager Dialog Box 2320 is closed and the cut operation is aborted.

Fourth the push-button "Cut" 2323, when clicked with the pointing device 105 by the spreadsheet user, is the trigger launching the operation of cut. This push-button "Cut" 2323 is enabled (meaning that the method recognises the click event with the pointing device 105 on this push-button "Cut" 2323) when the cut operation is possible. The fact that this cut operation is possible or not depends on different factors:
the position of the currently selected cell within an existing scalable template instance,
the overlap of the currently selected range of cells with existing scalable template instance(s),
the mode of cut, and
the presence of any existing critical scalable template instance which would be corrupted due to the cut operation.

The possibility to perform or not the cut operation according to the cut mode specified by one of the three option buttons 2330, 2329, and 2328, is reflected by several label boxes, taking the values "YES" or "NO", which are part of the Scalable Template Instance Cut Manager Dialog Box 2320.

The two label boxes 2332 and 2333 reflect for the cut mode "RANGE" if the cut operation may lead to corrupt any existing critical scalable template instance (label box 2332), or may lead to corrupt any other existing scalable template instance (label box 2333). As soon as the value "YES" is taken by the 2332 label box, the label box 2325 located in the "Possible" column 2324 takes the value "NO" reflecting that the cut mode "RANGE" is not possible.

The label box 2326 takes the value "YES" as soon as the currently selected cell is located within an existing scalable template instance, so that the "ELEMENT" cut mode is possible.

The label box 2327 takes the value "YES" as soon as the currently selected cell is located within an existing scalable template instance, so that the "INSTANCE" cut mode is possible. As soon as the value "NO" is taken by the 2325 label box when the option button 2330 displays a black point, or by the 2326 label box when the option button 2329 displays a black point, or by the 2327 label box when the option button 2328 displays a black point, then the cut operation is considered as impossible, so that the "Cut" push-button 2323 gets disabled.

Reversely, if the value "YES" is displayed instead of the value "NO", then the cut operation is possible, so that the "Cut" push-button 2323 get enabled. When the "Cut" push-button 2323 is clicked with the pointing device 105 by the spreadsheet user, the selected cut mode is used to determine how to reshape the currently selected range of cells.

If the selected cut mode is the "RANGE" mode (option button 2330 displaying a black point), then the currently selected range of cells is kept as is.

If the selected cut mode is the "ELEMENT" mode (option button 2329 displaying a black point), then the currently selected range of cells is reshaped to correspond to the elements and meta-elements which on one side are part of the scalable template instance to which the currently selected cell belongs, and which on the other side occupy the rows of the currently selected range of cells.

If the selected cut mode is the "INSTANCE" mode (option button 2328 displaying a black point), then the currently selected range of cells is reshaped to correspond to the whole scalable template instance to which the currently selected cell belongs.

Once the reshape is done, a conventional cut operation is performed from the reshaped range of cells onto the memory clipboard, when the cut mode is either "RANGE" or "INSTANCE". In the case the cut mode is equal to "ELEMENT", a conventional copy operation is first performed from the reshaped range of cells onto the memory clipboard, and then all the "IN" cells within this reshaped range of cells are updated with a void content. Then the Scalable Template Instance Cut Manager Dialog Box 2320 is closed to complete the processing of the Scalable Template Instance Cut command.

d. The spreadsheet user then selects another range of cells of his/her choice by using conventional means, such as but not limited to the pointing device 105 or the keyboard 104.

e. Scalable Template Instance Paste

Then the spreadsheet user invokes thanks to conventional means available in spreadsheet environment, such as (but not limited to)

dedicated push-buttons,
keyboard entry short cuts,
menu or sub-menu entries, an original specific command called "Scalable Template Instance Paste" which pastes the content of the clipboard onto the currently selected cell.

When the Scalable Template Instance Paste command is invoked, the first step consists in determining according to conventional means the range of cells which will receive the information previously copied or cut onto the clipboard. This range of cells will be referred to as the dest_range.

If the previously copied or cut range of cells is made of a single column and of multiple rows, then dest_range corresponds to a range of cells occupying the same columns as the currently selected range of cells, and occupying as many rows as the range of cells previously copied or cut.

If the previously copied or cut range of cells is made of a single row and of multiple columns, then dest_range corresponds to a range of cells occupying the same rows as the currently selected range of cells, and occupying as many columns as the range of cells previously copied or cut.

If the previously copied or cut range of cells is made of a single cell, then dest_range corresponds to the currently selected range of cells.

In all the other cases, dest_range occupies as many rows and columns as the previously copied or cut range of cells, with the top left cell located on the position of the currently selected cell.

Then an initial test is performed to determine if the range of cells dest_range overlaps or not (totally or partially) one or several existing scalable template instances.

If it is not the case, then a conventional Paste operation is performed from the clipboard onto the range of cells dest_range. This conventional paste mode of operation is referred to as the "RANGE" paste mode. Then a second test is performed to determine if the previous copy or cut operation was done with the mode "INSTANCE".

If it is the case, then it means that a whole instance was present in the clipboard, so that the conventional Paste operation has created a new instance, and so that this new instance must be recorded within the spreadsheet environment.

If it is not the case, then the conventional Paste operation completes without further action.

If the range of cells dest_range does overlap one or several existing scalable template instances, then several different situations are considered.

First
if the previous copy or cut operation was done with the mode "RANGE" and
if the range of cells dest_range only overlaps "IN" cells in the scalable template instances,
then a conventional paste operation is performed from the clipboard onto the range of cells dest_range.

Second
if the previous copy or cut operation was done with the mode "RANGE" and
if the range of cells dest_range overlaps at least one "OUT" cell in the scalable template instances,
then the overlapped scalable templates instances will be corrupted by the paste operation. The spreadsheet user must thus be prompted to either continue or cancel the paste operation.

Third
if the previous copy or cut operation was not done with the mode "RANGE" and
if the currently selected cell does not belong to a scalable template instance and
if the range of cells dest_range only overlaps "IN" cells in the scalable template instances,
then a conventional paste operation is performed from the clipboard onto the range of cells dest_range.

Fourth
if the previous copy or cut operation was not done with the mode "RANGE" and
if the currently selected cell does not belong to a scalable template instance and
if the range of cells dest_range overlaps at least one "OUT" cell in the scalable template instances,
then the overlapped scalable templates instances will be corrupted by the paste operation. The spreadsheet user must thus be prompted to either continue or cancel the paste operation.

Fifth
if the previous copy or cut operation was done with the mode "ELEMENT" and
if the currently selected cell belongs to a scalable template instance and
if the structure of the elements or meta-elements copied or cut onto the clipboard is the same as the structure of the elements or meta-elements of the scalable template instance to which the currently selected cell belongs, and which are located on the same rows as the range of cells dest_range, then it is possible to safely paste (meta-)element by (meta-)element the clipboard onto the elements or meta-elements of the scalable template instance to which the currently selected cell belongs, and which are located on the same rows as the range of cells dest_range. This paste mode is referred to as the "ELEMENT" mode and the spreadsheet user must be prompted to select:
this "ELEMENT" mode, or
the "RANGE" mode, or
simply to cancel the paste operation.

Sixth
if the previous copy or cut operation was done with the mode "ELEMENT" and
if the currently selected cell belongs to a scalable template instance and
if the structure of the elements or meta-elements copied or cut onto the clipboard is not the same as the structure of the elements or meta-elements of the scalable template instance to which the currently selected cell belongs, and which are located on the same rows as the range of cells dest_range,
then it is not possible to safely paste (meta-)element by (meta-)element the clipboard onto the elements or meta-elements of the scalable template instance to which the currently selected cell belongs, and which are located on the same rows as the range of cells dest_range. Therefore only the "RANGE" paste mode is possible, at the cost of corrupting the overlapped scalable template instances. The spreadsheet user must thus be prompted to either continue or cancel the paste operation.

Seventh
- if the previous copy or cut operation was done with the mode "INSTANCE" and
- if the currently selected cell belongs to a scalable template instance and
- if the size of the scalable template instance copied or cut onto the clipboard is the same as the size of the scalable template instance to which the currently selected cell belongs, then it is possible to safely paste the whole scalable template instance from the clipboard onto the one to which the currently selected cell belongs. This paste mode is referred to as the "INSTANCE" mode and the spreadsheet user must be prompted to select
- this "INSTANCE" mode, or
- the "RANGE" mode, or
- simply to cancel the paste operation.

Eighth
- if the previous copy or cut operation was done with the mode "INSTANCE" and
- if the currently selected cell belongs to a scalable template instance and
- if the size of the scalable template instance copied or cut onto the clipboard is not the same as the size of the scalable template instance to which the currently selected cell belongs, then it is not possible to safely paste the whole scalable template instance from the clipboard onto the one to which the currently selected cell belongs. Therefore only the "RANGE" paste mode is possible, at the cost of corrupting the overlapped scalable template instances. The spreadsheet user must thus be prompted to either continue or cancel the paste operation.

Figure 23C:
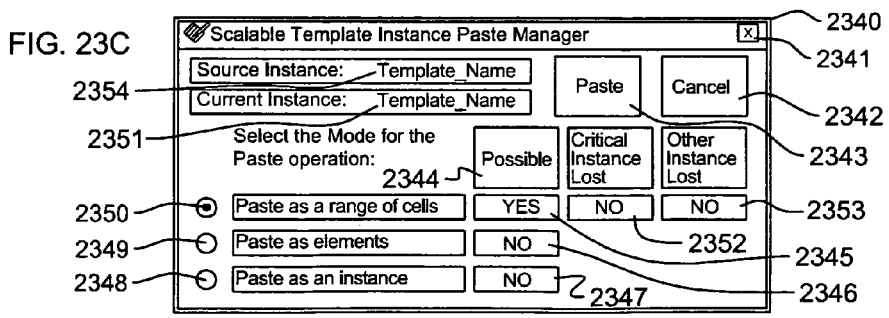
FIG. 23C shows a preferred spreadsheet user interface, according to the preferred embodiment of the present invention, for pasting scalable template instances.

To determine if the paste operation must be performed and which paste mode to use, the Scalable Template Instance Paste Manager Dialog Box 2340 is displayed on the display device 106, as illustrated by FIG. 23C. This Scalable Template Instance Paste Manager Dialog Box 2340 contains some pieces of information which relate to the paste operation.

First the name of the scalable template that the scalable template instance to which the currently selected cell belongs, abides by, is displayed in the label box 2351 (if such a scalable template instance does not exist, then the label box 2351 displays the reserved name "NONE").

Second the name of the scalable template that the scalable template instance which has been previously copied or cut onto the clipboard, abides by, is displayed in the label box 2354 (if such a scalable template instance was not previously copied or cut onto the clipboard, then the label box 2354 displays the reserved name "NONE").

Third the paste mode is specified by the presence of a black point within one of the three option buttons "Paste as a range of cells" 2350, "Paste as elements" 2349, and "Paste as an Instance" 2348, respectively corresponding to the paste modes "RANGE", "ELEMENT" and "INSTANCE". If the spreadsheet user wishes to change the default paste mode which is "RANGE" in a preferred embodiment of the present invention, or a previously changed paste mode, then he/she uses the pointing device 105 to click on one of the three option buttons "Paste as a range of cells" 2350, "Paste as elements" 2349, and "Paste as an Instance" 2348 which will display alone a black point specifying the new selected paste mode.

Fourth the push-button "Cancer" 2342 or the closing-window push-button 2341 allow to close the Scalable Template Instance Paste Manager Dialog Box 2340 without further action. By clicking with the pointing device 105 on one of these two push-buttons 2341 and 2342, the Scalable Template Instance Paste Manager Dialog Box 2340 is closed and the paste operation is aborted.

Fifth the push-button "Paste" 2343, when clicked with the pointing device 105 by the spreadsheet user, is the trigger launching the operation of paste. This push-button "Paste" 2343 is enabled (meaning that the method recognises the click event with the pointing device 105 on this push-button "Paste" 2343) when the paste operation is possible. The fact that this paste operation is possible or not depends on different factors:
- the position of the currently selected cell within an existing scalable template instance,
- the overlap of the range of cells dest_range with existing scalable template instance(s), the mode of paste,
- the last mode of copy or cut, and
- the presence of any existing critical scalable template instance which would be corrupted due to the paste operation.

The possibility to perform or not the paste operation according to the paste mode specified by one of the three option buttons 2350, 2349, and 2348, is reflected by several label boxes, taking the values "YES" or "NO", which are part of the Scalable Template Instance Paste Manager Dialog Box 2340.

The two label boxes 2352 and 2353 reflect for the paste mode "RANGE" if the paste operation may lead to corrupt any existing critical scalable template instance (label box 2352), or may lead to corrupt any other existing scalable template instance (label box 2353).

As soon as the value "YES" is taken by the 2352 label box, the label box 2345 located in the "Possible" column 2344 takes the value "NO" reflecting that the cut mode "RANGE" is not possible.

The label box 2346 takes the value "YES" as soon as the "ELEMENT" paste mode is possible (fifth case in the aforementioned situations).

The label box 2347 takes the value "YES" as soon as the "INSTANCE" paste mode is possible (seventh case in the aforementioned situations). As soon as the value "NO" is taken
- by the 2345 label box when the option button 2350 displays a black point, or
- by the 2346 label box when the option button 2349 displays a black point, or
- by the 2347 label box when the option button 2348 displays a black point, then the paste operation is considered as impossible, so that the "Paste" push-button 2343 get disabled.

Reversely, if the value "YES" is displayed instead of the value "NO", then the paste operation is possible, so that the "Paste" push-button 2343 get enabled. When the "Paste" push-button 2343 is clicked with the pointing device 105 by the spreadsheet user, the selected paste mode is used to determine how to reshape the range of cells dest_range.

If the selected paste mode is the "RANGE" mode (option button 2350 displaying a black point), then the range of cells dest_range is kept as is.

If the selected paste mode is the "ELEMENT" mode (option button 2349 displaying a black point), then the range of cells dest_range is reshaped to correspond to the elements and meta-elements which on one side are part of the scalable template instance to which the currently selected cell belongs, and which on the other side occupy the rows of the current position of the range of cells dest_range.

If the selected paste mode is the "INSTANCE" mode (option button 2348 displaying a black point), then the range of cells dest_range is reshaped to correspond to the whole scalable template instance to which the currently selected cell belongs. Once the reshape is done, a conventional paste operation is performed from the memory clipboard onto the reshaped range of cells. When the paste mode is equal to "INSTANCE", the newly created range of cells is recorded as a valid scalable template instance in the spreadsheet environment and replaces the scalable template instance which the currently selected cells was belonging to.

Finally the Scalable Template Instance Paste Manager Dialog Box 2340 is closed to complete the processing of the Scalable Template Instance Paste command.

6. Sixth Operation: Import/Export of Element Format, Element Profile, Scalable Template The sixth operation occurs when the spreadsheet user decides, based on his or her own criteria not detailed here, to share, through an import/export mechanism, a set of one or several element formats, and/or
meta-element formats, and/or
element profiles, and/or
meta-element profiles, and/or
scalable templates, between a source spreadsheet file and a destination spreadsheet file. In a preferred embodiment of the present invention, this operation comprises the following steps:

a. The spreadsheet user invokes first an original specific command called "Scalable Template Manager" thanks to conventional means available in spreadsheet environment, such as but not limited to the pointing device 105 or the keyboard 104, in order to visualise any existing:

element format, or
meta-element format, or
element profile, or
meta-element profile, or
scalable template.

This initial step corresponds to the first step of the first operation of this scenario, where the spreadsheet user can select one or multiple element formats, or meta-element formats, or element profiles, or meta-element profiles, or scalable templates.

b. Scalable Template Export Manager

Then the spreadsheet user invokes an original specific command called "Scalable Template Export Manager" thanks to conventional means available in spreadsheet environment, such as but not limited to the pointing device 105 or the keyboard 104, in order to store in an Export/Import file the set of selected element formats or meta-element formats or element profiles or meta-element profiles or scalable templates.

This can be illustrated with the user interface described with the FIG. 26A, showing the Scalable Template Export Dialog Box 2600, as displayed on the display device 106. When first displayed, the Scalable Template Export Dialog Box 2600 contains three push-buttons, leaving to the spreadsheet user the choice to either cancel the Export operation (by clicking with the pointing device 105 on the "Cancel" push-button 2602), or to start an Export operation in a new export-import file to be created (by clicking with the pointing device 105 on the "Export in a NEW file" push-button 2612), or to start an Export operation in an already existing export-import file to be selected (by clicking with the pointing device 105 on the "Export in an EXISTING file" push-button 2613).

If the "Cancel" push-button 2602 is clicked, then the Scalable Template Export Dialog Box 2600 is closed and the Export operation completes without any further action.

If the "Export in a NEW file" push-button 2612 is clicked, then a conventional file creation dialog box is displayed on the display device 106 to let the spreadsheet user navigate within the existing file directory structure, name and create a new file within a selected file directory. Any similar conventional means could also be used instead of the file creation dialog box without departing from the spirit of the present invention.

If the "Export in an EXISTING file" push-button 2613 is clicked, then a conventional file selection dialog box is displayed on the display device 106 to let the spreadsheet user navigate within the existing file directory structure, and then select an existing file within a file directory. Any similar conventional means could also be used instead of the file selection dialog box without departing from the spirit of the present invention.

Once the existing file has been specified by the spreadsheet user, a test is performed to check if this file is a valid export-import file, and follows as such a pre-defined logical file structure.

If it is not the case, then the spreadsheet user is warned about this situation. To this effect a warning message is issued on the display device 106 through conventional means such as pop-up windows, status bar messages, or any other similar conventional means which can be used instead without departing from the spirit of the invention. This warning message informs the spreadsheet user about this file case, and the spreadsheet user is then invited through conventional prompting means such as an "OK" push-button, to acknowledge the warning. The warning message is then closed, so that the spreadsheet user can click again with the pointing device 105 on one of the three push-buttons 2602, 2612 and 2613 available within the Scalable Template Export Manager Dialog Box 2600.

If the user-specified existing file is a correct export-import file, or if the user choice was to create a new export-import file, then the Scalable Template Export Manager Dialog Box 2600 is completed with the text box 2603 displaying the name of the export-import file.

Then the Export operation is launched by moving (from the spreadsheet file towards the export-import file) one by one every member of the set of selected element formats or meta-element formats or element profiles or meta-element profiles or scalable templates. The progress of the Export operation is reflected by the progress bar 2604 which graphically translates the portion of processing already completed of the whole Export operation.

During this Export operation, in the case where the export-import file was an already existing one, a potential conflict may be identified between a version of an object (either an element format or a meta-element format or an element profile or a meta-element profile or a scalable template) previously exported within this export-import file and a new version of the same object candidate to be exported. If this situation arises, then the Scalable Template Export Manager Dialog Box 2600 is completed with a set of information, all contained within the frame 2611.

First the name of the conflicting object is displayed in the text box 2605.

Second the date associated to the object version found in the specified export-import file is displayed in the text box 2606.

Third the date associated to the object candidate for export is displayed in the text box 2607.

By receiving all this information, the spreadsheet user can decide how to handle this conflict.

The first choice is to click with the pointing device 105 on the "No" push-button 2608 to prevent the Export operation for this specific object, so that the former version recorded within the specified export-import file is kept unchanged.

The second choice is to click with the pointing device 105 on the "Yes" push-button 2610 to proceed with the Export operation for this specific object, that is to replace the current object version definition recorded in the export-import file by the one defined as part of the current spreadsheet file.

The third choice is to click with the pointing device 105 on the "Yes to All" push-button 2609 to proceed with the Export operation for this specific object, but also for any other object which would also fall in the same type of conflict case.

Once the spreadsheet user has clicked with the pointing device 105 on one of the three push-buttons 2608, 2609, or 2610, the frame 2611 disappears from the Scalable Template Export Manager Dialog Box 2600 with all the graphical objects it contains (labels, text boxes and push-buttons). When all the objects part of the set of selected objects (element formats or meta-element formats or element profiles or meta-element profiles or scalable templates) have been processed by the Export operation, the Scalable Template Export Manager Dialog Box 2600 is closed on the display device 106, and the export-import file (either new or updated) is ready to be imported to another spreadsheet file.

c. Scalable Template Import Manager

Then the spreadsheet user moves to another electronic spreadsheet file and then invokes an original specific command called "Scalable Template Import Manager" thanks to conventional means available in spreadsheet environment, such as but not limited to the pointing device 105 or the keyboard 104, in order to retrieve from an export-import file a set of one or several element formats and/or meta-element formats and/or element profiles and/or meta-element profiles and/or scalable templates.

This can be illustrated with the user interface described with the FIG. 26B, showing the Scalable Template Import Dialog Box 2620, as displayed on the display device 106. When first displayed, the Scalable Template Import Dialog Box 2620 contains two push-buttons, leaving to the spreadsheet user the choice to either cancel the Import operation (by clicking with the pointing device 105 on the "Cancel" push-button 2622), or to start an Import operation from an already existing export-import file to be selected (by clicking with the pointing device 105 on the "Select an Import File" push-button 2632).

If the "Cancel" push-button 2622 is clicked, then the Scalable Template Import Dialog Box 2620 is closed and the Import operation completes without any further action.

If the "Select an Import File" push-button 2632 is clicked, then a conventional file selection dialog box is displayed on the display device 106 to let the spreadsheet user navigate within the existing file directory structure, and then select an existing file within a file directory. Any similar conventional means could also be used instead of the file selection dialog box without departing from the spirit of the present invention.

Once the existing file has been specified by the spreadsheet user, a test is performed to check if this file is a valid export-import file, and follows as such a pre-defined logical file structure.

If it is not the case, then the spreadsheet user is warned about this situation. To this effect a warning message is issued on the display device 106 through conventional means such as pop-up windows, status bar messages, or any other similar conventional means which can be used instead without departing from the spirit of the invention. This warning message informs the spreadsheet user about this file case, and the spreadsheet user is then invited through conventional prompting means such as an "OK" push-button, to acknowledge the warning. The warning message is then closed, so that the spreadsheet user can click again with the pointing device 105 on one of the two push-buttons 2622, and 2632 available within the Scalable Template Import Manager Dialog Box 2620.

If the user-specified file is a correct export-import file, then the Scalable Template Import Manager Dialog Box 2620 is completed with the text box 2623 displaying the name of the export-import file. Then the Import operation is launched by moving (from the export-import file towards the spreadsheet file) one by one every element format or meta-element format or element profile or meta-element profile or scalable template recorded in the export-import file. The progress of the Import operation is reflected by the progress bar 2624 which graphically translates the portion of processing already completed of the whole Import operation.

During this Import operation, a potential conflict may be identified between a version of an object (either an element format or a meta-element format or an element profile or a meta-element profile or a scalable template) already defined within the spreadsheet file and a version recorded within this export-import file. If this situation arises, then the Scalable Template Import Manager Dialog Box 2620 is completed with a set of information, all contained within the frame 2631.

First the name of the conflicting object is displayed in the text box 2625.

Second the date associated to the object version found in the spreadsheet file is displayed in the text box 2626.

Third the date associated to the object version recorded in the export-import file is displayed in the text box 2627.

By receiving all this information, the spreadsheet user can decide how to handle this conflict.

The first choice is to click with the pointing device 105 on the "NO" push-button 2628 to prevent the Import operation for this specific object, so that the former version recorded within the spreadsheet file is kept unchanged.

The second choice is to click with the pointing device 105 on the "Yes" push-button 2630 to proceed with the Import operation for this specific object, that is to replace the current object version definition recorded in the spreadsheet file by the one defined as part of the export-import file.

The third choice is to click with the pointing device 105 on the "Yes to All" push-button 2629 to proceed with the Import operation for this specific object, but also for any other object which would also fall in the same type of conflict case.

Once the spreadsheet user has clicked with the pointing device 105 on one of the three push-buttons 2628, 2629, or 2630, the frame 2631 disappears from the Scalable Template Import Manager Dialog Box 2620 with all the graphical objects it contains (labels, text boxes and push-buttons). When all the objects part of the set of selected objects (element formats or meta-element formats or element profiles or meta-element profiles or scalable templates) have been processed by the Import operation, the Scalable Template Import Manager Dialog Box 2620 is closed on the display device 106, and the current spreadsheet file has been updated by the definitions imported from the export-import file.

7. Seventh Operation: Import/Export of Scalable Template Instance

The seventh operation occurs when the spreadsheet user decides, based on his or her own criteria not detailed here, to share, through an import/export mechanism, a scalable template instance between a source spreadsheet file and a destination spreadsheet file. In a preferred embodiment of the present invention, this operation comprises the following steps:

a. The spreadsheet user first selects a range of cells of his/her choice by using conventional means, such as but not limited to the pointing device 105 or the keyboard 104. This range of cells comprises the currently selected cell.

b. Scalable Template Instance Export Manager

Then the spreadsheet user invokes an original specific command called "Scalable Template Instance Export Manager" thanks to conventional means available in spreadsheet environment, such as but not limited to the pointing device 105 or the keyboard 104, in order to store in an Export/Import file the scalable template instance identified through the currently selected range of cells.

When the Scalable Template Instance Export Manager command is invoked, a test is first performed to determine if the currently selected cell belongs or not to an existing scalable template instance.

If it is not the case, then a conventional pop-up window is displayed on the display device 106 to inform the spreadsheet user that the currently selected cell must be located within an existing scalable template instance to enable the Instance Export operation.

If it is the case, then the Scalable Template Instance Export Dialog Box 2700 is displayed on the display device 106, as illustrated by the FIG. 27A. When first displayed, the Scalable Template Instance Export Dialog Box 2700 contains three informative dialog boxes and four push-buttons, leaving to the spreadsheet user the choice between different actions. The text boxes are the "Export File" text box 2703 which displays the name of the spreadsheet instance export file, once specified (if not specified, the name of the spreadsheet instance export file defaults to an empty character string), the text box "Instance Name" 2704 which displays the name of the range of cells corresponding to the scalable template instance to which the currently selected cell belongs, and the "Template Name" 2705 text box which displays the name of the scalable template that the scalable template instance to which the currently selected cell belongs, abides by.

If the "Instance Name" text box 2704 does not display a valid range of cells name (meaning that the range of cells corresponding to the scalable template instance containing the currently selected cell has not yet been named), then the two push-buttons:
"Export in a NEW file" 2714, and
"Export in an EXISTING file" 2713,
are disabled, so that any click with the pointing device 105 on them will not be recognised as a valid event.

Reversely if the "Instance Name" text box 2704 displays a valid range of cells name, then the two push-buttons
"Export in a NEW file" 2714, and
"Export in an EXISTING file" 2713, are enabled, so that any click with the pointing device 105 on them will be recognised as a valid event.

The spreadsheet user can
either cancel the Instance Export operation (by clicking with the pointing device 105 on the "Cancel" push-button 2702), or start an Export operation in a new spreadsheet instance export-import file to be created (by clicking with the pointing device 105 on the "Export in a NEW file" push-button 2714 when enabled), or start an Export operation in an already existing spreadsheet instance export-import file to be selected (by clicking with the pointing device 105 on the "Export in an EXISTING file" push-button 2713 when enabled), or name or rename the range of cells corresponding to the scalable template instance to which the currently selected cell belongs (by clicking with the pointing device 105 on the "Name or Rename the Instance," push-button 2712).

If the "Cancel" push-button 2702 is clicked, then the Scalable Template Instance Export Dialog Box 2700 is closed and the Instance Export operation completes without any further action.

If the "Name or Rename the Instance" push-button 2712 is clicked, then a conventional range of cells naming dialog box is displayed on the display device 106 to let the spreadsheet user assign a name to the range of cells corresponding to the scalable template instance containing the currently selected cell. Any similar conventional means could also be used instead of the range of cells naming dialog box without departing from the spirit of the present invention.

If the "Export in a NEW file" push-button 2714 is enabled and clicked, then a conventional file creation dialog box is displayed on the display device 106 to let the spreadsheet user navigate within the existing file directory structure, name and create a new file within a selected file directory. Any similar conventional means could also be used instead of the file creation dialog box without departing from the spirit of the present invention.

If the "Export in an EXISTING file" push-button 2713 is enabled and clicked, then a conventional file selection dialog box is displayed on the display device 106 to let the spreadsheet user navigate within the existing file directory structure, and then select an existing file within a file directory. Any similar conventional means could also be used instead of the file selection dialog box without departing from the spirit of the present invention.

Once the existing file has been specified by the spreadsheet user, a test is performed to check if this file is a valid spreadsheet instance export-import file, and follows as such a pre-defined logical file structure.

If it is not the case, then the spreadsheet user is warned about this situation. To this effect a warning message is issued on the display device 106 through conventional means such as pop-up windows, status bar messages, or any other similar conventional means which can be used instead without departing from the spirit of the invention. This warning message informs the spreadsheet user about this situation, and the spreadsheet user is then invited through conventional prompting means such as an "OK" push-button, to acknowledge the warning. The warning message is then closed, so that the spreadsheet user can click again with the pointing device 105 on one of the four push-buttons 2702, 2712, 2713 and 2714 available within the Scalable Template Export Instance Manager Dialog Box 2700.

If the user-specified existing file is a correct spreadsheet instance export-import file, or if the user choice was to create a new spreadsheet instance export-import file, then the Scalable Template Instance Export Manager Dialog Box 2700 is updated as the text box 2703 displays the name of the spreadsheet instance export-import file.

Then the Instance Export operation is launched by copying-pasting by value, from the spreadsheet file towards the spreadsheet instance export-import file, every "IN" cell belonging to the scalable template instance containing the currently selected cell. If the spreadsheet instance export-import file was already containing the result of a previous instance export operation from a scalable template instance sharing the same name, then a conflict is possible.

If this situation arises, then the Scalable Template Instance Export Manager Dialog Box 2700 is completed with a set of information, all contained within the frame 2711.

First the date associated to the previous Instance Export operation found in the specified spreadsheet instance export-import file is displayed in the text box 2707.

Second the name of the file from which the previous instance has been exported in the specified spreadsheet instance export-import file is displayed in the text box 2708.

By receiving all this information, the spreadsheet user can decide how to handle this conflict.

The first choice is to click with the pointing device 105 on the "NO" push-button 2709 to prevent the Instance Export operation, so that the former exported instance recorded within the specified spreadsheet instance export-import file is kept unchanged.

The second choice is to click with the pointing device 105 on the "Yes" push-button 2710 to proceed with the Instance Export operation, that is to replace the current exported instance recorded in the spreadsheet instance export-import file by the one which will be derived from the current spreadsheet file.

Once the spreadsheet user has clicked with the pointing device 105 on one of the two push-buttons 2709, or 2710, the frame 2711 disappears from the Scalable Template Instance Export Manager Dialog Box 2700 with all the graphical objects it contains (labels, text boxes and push-buttons).

If not stopped by the spreadsheet user by a click on the "NO" push-button 2709 as aforementioned, the progress of the Instance Export operation is reflected by the progress bar 2706 which graphically translates the portion of completed processing of the Instance Export operation. When the Instance Export operation is over, the Scalable Template Instance Export Manager Dialog Box 2700 is closed on the display device 106, and the spreadsheet instance export-import file (either new or updated) is ready to be imported to another spreadsheet file.

c. Scalable Template Instance Import Manager

Then the spreadsheet user moves to another electronic spreadsheet file and then invokes an original specific command called "Scalable Template Instance Import Manager" thanks to conventional means available in spreadsheet environment, such as but not limited to the pointing device 105 or the keyboard 104, in order to retrieve from a spreadsheet instance export-import file a scalable template instance.

When the Scalable Template Instance Import Manager command is invoked, a test is first performed to determine if the currently selected cell belongs or not to an existing scalable template instance.

If it is not the case, then a conventional pop-up window is displayed on the display device 106 to inform the spreadsheet user that the currently selected cell must be located within an existing scalable template instance to enable the Instance Import operation.

If it is the case, then the Scalable Template Instance Import Dialog Box 2720 is displayed on the display device 106, as illustrated by the FIG. 27B. When first displayed, the Scalable Template Instance Import Dialog Box 2720 contains three informative dialog boxes and three push-buttons, leaving to the spreadsheet user the choice between different actions. The text boxes are the "Import File" text box 2723 which displays the name of the spreadsheet instance Import file, once specified (if not specified, the name of the spreadsheet instance Import file defaults to an empty character string), the text box "Instance Name" 2724 which displays the name of the range of cells corresponding to the scalable template instance to which the currently selected cell belongs, and the "Template Name" 2725 text box which displays the name of the scalable template that the scalable template instance to which the currently selected cell belongs, abides by.

If the "Instance Name" text box 2724 does not display a valid range of cells name (meaning that the range of cells corresponding to the scalable template instance containing the currently selected cell has not yet been named), then the push-button "Select an Import File" 2728 is disabled, so that any click with the pointing device 105 on it will not be recognised as a valid event.

Reversely if the "Instance Name" text box 272 displays a valid range of cells name, then the push-button "Select an Import File" 2728 is enabled, so that any click with the pointing device 105 on it will be recognised as a valid event.

The spreadsheet user can either cancel the Instance Import operation (by clicking with the pointing device 105 on the "Cancel" push-button 2722), or start an Import operation from an already existing spreadsheet instance export-import file to be selected (by clicking with the pointing device 105 on the "Select an Import File" push-button 2728 when enabled), or name or rename the range of cells corresponding to the scalable template instance to which the currently selected cell belongs (by clicking with the pointing device 105 on the "Name or Rename the Instance," push-button 2727).

If the "Cancer" push-button 2722 is clicked, then the Scalable Template Instance Import Dialog Box 2720 is closed and the Instance Import operation completes without any further action.

If the "Name or Rename the Instance" push-button 2727 is clicked, then a conventional range of cells naming dialog box is displayed on the display device 106 to let the spreadsheet user assign a name to the range of cells corresponding to the scalable template instance containing the currently selected cell. Any similar conventional means could also be used instead of the range of cells naming dialog box without departing from the spirit of the present invention.

If the "Select an Import File" push-button 2728 is enabled and clicked, then a conventional file selection dialog box is displayed on the display device 106 to let the spreadsheet user navigate within the existing file directory structure, and then select an existing file within a file directory. Any similar conventional means could also be used instead of the file selection dialog box without departing from the spirit of the present invention.

Once the existing file has been specified by the spreadsheet user, a test is performed to check if this file is a valid spreadsheet instance export-import file, and follows as such a pre-defined logical file structure.

If it is not the case, then the spreadsheet user is warned about this situation. To this effect a warning message is issued on the display device 106 through conventional means such as pop-up windows, status bar messages, or any other similar conventional means which can be used instead without departing from the spirit of the invention. This warning message informs the spreadsheet user about this situation, and the spreadsheet user is then invited through conventional prompting means such as an "OK" push-button, to acknowledge the warning. The warning message is then closed, so that the spreadsheet user can click again with the pointing device 105 on one of the three push-buttons 2722, 2727 and 2728 available within the Scalable Template Import Instance Manager Dialog Box 2720.

If the user-specified existing file is a correct spreadsheet instance export-import file, then the Scalable Template Instance Import Manager Dialog Box 2720 is updated as the text box 2723 displays the name of the spreadsheet instance export-import file. Then the Instance Import operation is launched by copying-pasting by value, from the spreadsheet instance export-import file towards the current spreadsheet file, every "IN" cell belonging to the scalable template instance containing the currently selected cell. The progress of the Instance Import operation is reflected by the progress bar 2726 which graphically translates the portion of completed processing of the Instance Import operation. When the Instance Import operation is over, the Scalable Template Instance Import Manager Dialog Box 2720 is closed on the display device 106, and the spreadsheet instance export-import file (either new or updated) is ready to be imported to another spreadsheet file.

In the specific case where the source spreadsheet file and the destination spreadsheet file are in fact the same spreadsheet file, the previous method and commands can be used identically. In this case, the proposed import-export method can be seen as an intelligent, scalable template minded way to perform a copy-and-paste operation from a source scalable template instance onto a destination scalable template instance belonging to the same spreadsheet file.

8. Eighth Operation: Reorganisation of Scalable Template Instance

The eighth operation occurs when the spreadsheet user decides, based on his or her own criteria not detailed here, to use a sorting application available in electronic spreadsheet environments to reorganise a scalable template instance. In a preferred embodiment of the present invention, this operation comprises the following steps:

a. The spreadsheet user first selects a range of cells of his/her choice by using conventional means, such as but not limited to the pointing device 105 or the keyboard 104.

b. Scalable Template Instance Sort Application Manager

Then the spreadsheet user invokes an original specific command called "Scalable Template Instance Sort Application Manager" thanks to conventional means available in spreadsheet environment, such as but not limited to the pointing device 105 or the keyboard 104, in order to sort part or totality of a scalable template instance identified by the currently selected range of cells.

When the Scalable Template Instance Sort Application Manager command is invoked, a test is first performed to determine if the currently selected range of cells overlaps or not (totally or partially) one or several existing scalable template instances.

If it is not the case, then the conventional sorting application available in electronic spreadsheet environments is invoked to sort the currently selected range of cells.

If it is the case, then a second test is performed to determine if the currently selected cell belongs or not to an existing scalable template instance.

If it is not the case, then a conventional sorting application will be possible, at the cost of corrupting the existing scalable template instances which overlap with the currently selected range of cells.

If it is the case, then three different modes of sorting become possible.

The first sorting mode is the "RANGE" mode which corresponds to the conventional sorting application where the currently selected range of cells is sorted according to user-specified parameters. With this first mode, any existing scalable template instance overlapping with the sorted range of cells will be corrupted.

The second sorting mode is the "ELEMENT" mode where the range of cells to be sorted corresponds to the elements which on one side are part of the scalable template instance to which the currently selected cell belongs, and which on the other side occupy the rows of the currently selected range of cells.

The third sorting mode is the "instance" mode where the range of cells to be sorted corresponds to the whole body part of the scalable template instance to which the currently selected cell belongs (in other words it corresponds to all the elements defined within this scalable template instance).

Figure 29A:
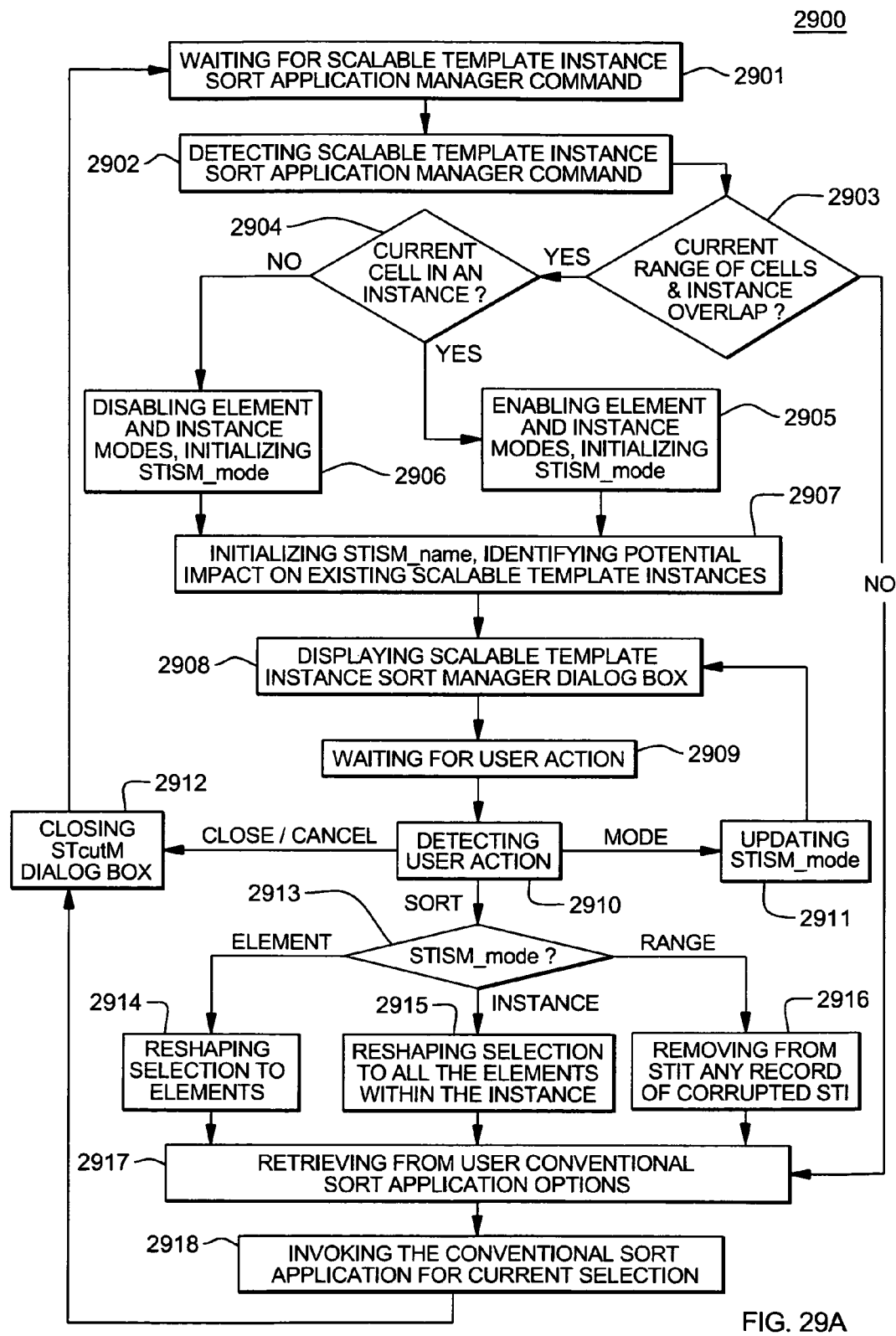
FIG. 29A is a flow chart illustrating a preferred method for sorting scalable template instances according to a preferred embodiment of the present invention.
Figure 29B:
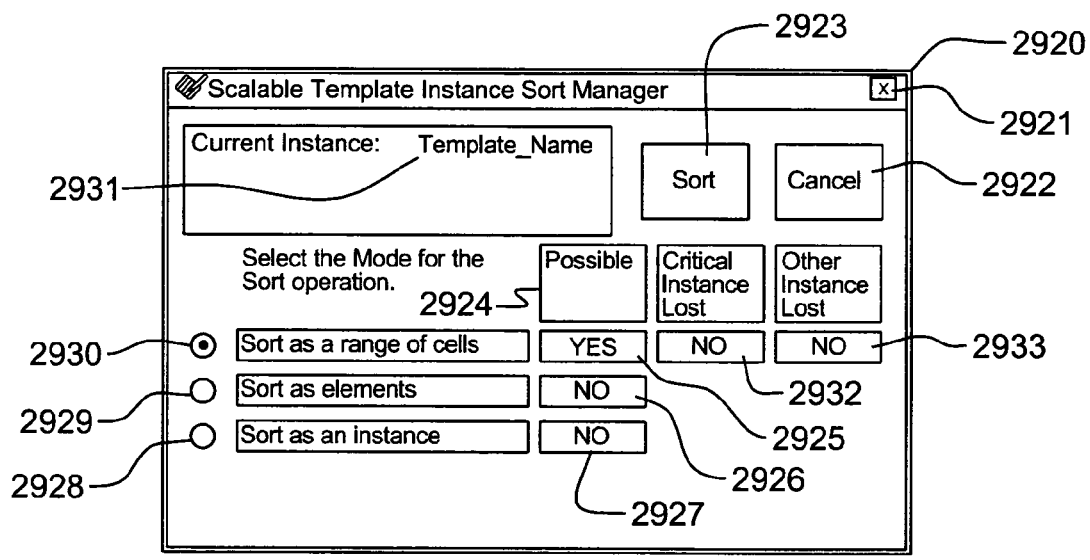
FIG. 29B shows a preferred spreadsheet user interface, according to the preferred embodiment of the present invention, for sorting scalable template instances.

To determine which sorting mode to use, the Scalable Template Instance Sort Manager Dialog Box 2920 is displayed on the display device 106, as illustrated by FIG. 29B. This Scalable Template Instance Sort Manager Dialog Box 2920 contains some pieces of information which relate to the sorting application.

First the name of the scalable template that the scalable template instance to which the currently selected cell belongs, abides by, is displayed in the label box 2931 (if such a scalable template instance does not exist, then the label box 2931 displays the reserved name "NONE").

Second the sorting mode is specified by the presence of a black point within one of the three option buttons "Sort as a range of cells" 2930, "Sort as elements" 2929, and "Sort as an Instance" 2928, respectively corresponding to the sorting modes "RANGE", "ELEMENT" and "INSTANCE". If the spreadsheet user wishes to change the default sorting mode which is "RANGE" in a preferred embodiment of the present invention, or a previously changed sorting mode, then he/she uses the pointing device 105 to click on one of the three option buttons "Sort as a range of cells" 2930, "Sort as elements" 2929, and "Sort as an Instance" 2928, which will display alone a black point specifying the new selected sorting mode.

Third the push-button "Cancel" 2922 or the closing-window push-button 2921 allow to close the Scalable Template Instance Sort Manager Dialog Box 2920 without further action. By clicking with the pointing device 105 on one of these two push-buttons 2921 and 2922, the Scalable Template Instance Sort Manager Dialog Box 2920 is closed and the sorting application is aborted.

Fourth the push-button "Sort" 2923, when clicked with the pointing device 105 by the spreadsheet user, is the trigger launching the sorting application. This push-button "Sort" 2923 is enabled (meaning that the method recognises the click event with the pointing device 105 on this push-button "Sort" 2923) when the sorting application is possible. The fact that this sorting application is possible or not depends on different factors:

the position of the currently selected cell within an existing scalable template instance, the overlap of the currently selected range of cells with existing scalable template instance(s), the sorting mode, and the presence of any existing critical scalable template instance which would be corrupted due to the sorting application.

The possibility to perform or not the sorting application according to the sorting mode specified by one of the three option buttons 2930, 2929, and 2928, is reflected by several label boxes, taking the values "YES" or "NO", which are part of the Scalable Template Instance Sort Manager Dialog Box 2920.

The two label boxes 2932 and 2933 reflect for the sorting mode "RANGE" if the sorting application may lead to corrupt any existing critical scalable template instance (label box 2932), or may lead to corrupt any other existing scalable template instance (label box 2933).

As soon as the value "YES" (respectively "NO") is taken by the 2932 label box, the label box 2925 located in the "Possible" column 2924 takes the value "NO" (respectively "YES") reflecting that the sorting mode "RANGE" is not possible.

The label box 2926 takes the value "YES" as soon as the currently selected cell is located within an existing scalable template instance, so that the "ELEMENT" sorting mode is possible.

The label box 2927 takes the value "YES" as soon as the currently selected cell is located within an existing scalable template instance, so that the "INSTANCE" sorting mode is possible. As soon as the value "NO" is taken by 2925 label box when the option button 2930 displays a black point, or by the 2926 label box when the option button 2929 displays a black point, or by the 2927 label box when the option button 2928 displays a black point, then the sorting application is considered as impossible, so that the "Sort" push-button 2923 gets disabled.

Reversely, if the value "YES" is displayed instead of the value "NO", then the sorting application is possible, so that the "Sort" push-button 2923 gets enabled. When the "Sort" push-button 2923 is enabled and clicked with the pointing device 105 by the spreadsheet user, the selected sorting mode is used to determine how to reshape the currently selected range of cells.

If the selected sorting mode is the "RANGE" mode (option button 2930 displaying a black point), then the currently selected range of cells is kept as is.

If the selected sorting mode is the "ELEMENT" mode (option button 2929 displaying a black point), then the currently selected range of cells is reshaped to correspond to the elements which on one side are part of the scalable template instance to which the currently selected cell belongs, and which on the other side occupy the rows of the currently selected range of cells.

If the selected sorting mode is the "INSTANCE" mode (option button 2928 displaying a black point), then the currently selected range of cells is reshaped to correspond to the whole body part of the scalable template instance to which the currently selected cell belongs.

Once the reshape is done, a conventional sorting application is invoked for the reshaped range of cells, so that the spreadsheet user can first specify through conventional means (such as clicking with the pointing device 105 on push-buttons, options buttons, check boxes, or any other equivalent dialog box components) the conventional options available in electronic spreadsheet environments for sorting ranges of cells. Such options are for instance the possibility to exclude or include the first row of the selected range of cells, or the possibility to perform an ascending or descending sorting operation, or the possibility to update the sorting criteria in terms of prioritised column sequence.

Once the spreadsheet user has specified the sorting application options, then this sorting application is performed on the reshaped range of cells, according to the specified options. Upon completion of this conventional sorting application, the Scalable Template Instance Sort Manager Dialog Box 2920 is closed to complete the processing of the Scalable Template Instance Sort Application Manager command.

E. Methods

E1. Scalable Template Manager method

Figure 8:
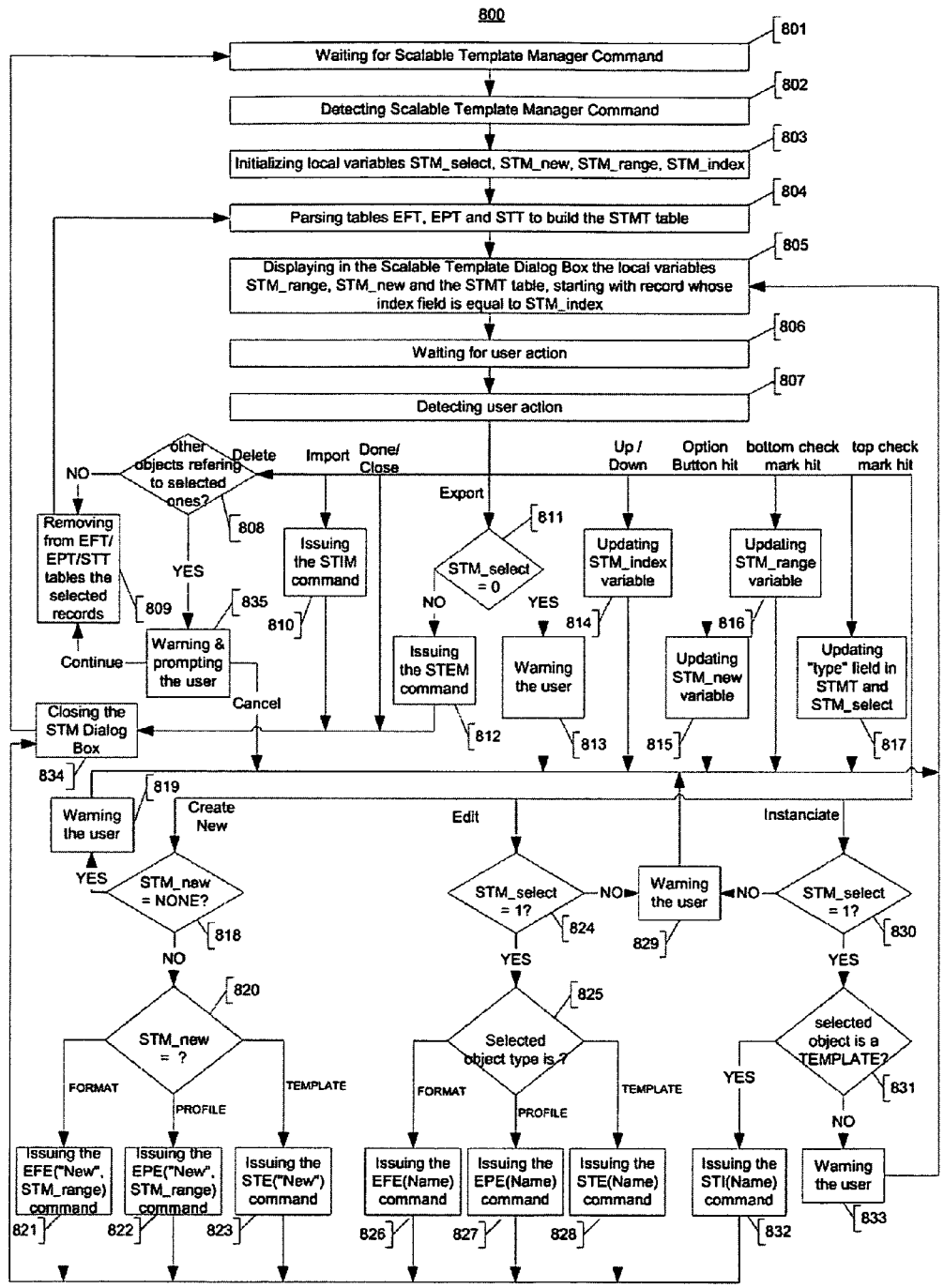
FIG. 8 is a flow chart illustrating a preferred method for managing scalable template objects according to a preferred embodiment of the present invention.

The method for managing element formats, meta-elements formats, element profiles, meta-element profiles and scalable templates used in the preferred embodiment of the present invention is summarised in flowchart 800 of FIG. 8. This method can be seen as the processing of the Scalable Template Manager command.

At step 801, the method is in its default state, waiting for an event to initiate the process.

At step 802, the Scalable Template Manager command is detected, as a result of a user action. This action can be for instance:
  a specific combination of key on the keyboard 104, or
  the click of the pointing device 105 on a specific button, or
  any other similar means not further specified here.

At step 803, some local variables are initialised:
  the local variable STM_select is set to the value 0 (zero),
  the local variable STM_new is set to the value "NONE",
  the local variable STM_range is set to the value "NO", and
  the local variable STM_index is set to the value 1 (one).

At step 804, the three tables EFT 700, EPT 710, and STT 720 are parsed to derive the table STMT 730. For each respective record 701, or 711, or 721 found in one of these three tables, is created a new record 731 within the STMT table 730. Referring now to FIGS. 7A, 7B, 7C, and 7D, this construction is done by copying in sequence all the fields defined in the record 701 ("Name" field 702, "Last Change Date" field 703, "Description Ptr" field 704, "Row #" field 705, "Column #" field 706 and "Type" field 707) or in the record 711 ("Name" field 712, "Last Change Date" field 713, "Description Ptr" field 714, "Row #" field 715, "Column #" field 716 and "Type" field 717), or in the record 721 ("Name" field 722, "Last Change Date" field 723, "Description Ptr" field 724, "Min Element #" field 725, "Max Element #" field 726 and "Type" field 727) onto the corresponding fields of the record 731 ("Name" field 732, "Last Change Date" field 733, "Description Ptr" field 734, "Info Field 1" field 735, "Info Field 2" field 736 and "Type" field 737), then by initialising in the "Type" field 737 the "SELECTED" attribute 742 to "NO" and the "NATURE" attribute 741 to the values "FORMAT", or "PROFILE" or "TEMPLATE" if the record 731 has been respectively copied from a record 701, or 711, or 721, and then by initialising the last field "Index" 738 with the value of a counter which increments for each new record and which starts with the value 1 (one).

At step 805, the Scalable Template Manager Dialog Box 600 is displayed on the display device 106.

The "Name" information appearing on the top of the list box 613 corresponds to the "Name" field 732 of the record 731 in the STMT table 730 whose "Index" field 738 is equal to the local variable STM_index. Underneath "Name" information's within this list box 613 correspond to the "Name" field 732 of the following records 731 of the STMT table 730.

The "Type" information appearing on the top of the list box 614 is derived from the "Type" field 737 (attributes "NATURE" 741 and "META" 739) of the record 731 in the STMT table 730 whose "Index" field 738 is equal to the local variable STM_index. Underneath "Type" information's within this list box 613 are derived from the "Type" field 737 (attributes "NATURE" 741 and "META" 739) of the following records 731 of the STMT table 730.

The "Modified" information appearing on the top of the list box 602 corresponds to the "Last Change Date" field 733 of the record 731 in the STMT table 730 whose "Index" field 738 is equal to the local variable STM_index. Underneath "Modified" information's within this list box 613 correspond to the "Last Change Date" field 733 of the following records 731 of the STMT table 730.

The check box 612 is filled with a check mark if the "Type" field 737 of the record 731 in the STMT table 730 whose "Index" field 738 is equal to the local variable STM_index has the "SELECTED" attribute 742 equal to "YES". Underneath check boxes on the left of the list box 613 are also derived from the "Type" field 737 ("SELECTED" attribute 742) of the following records 731 of the STMT table 730.

The option button "Format" 617 displays a black point if and only if the local variable STM_new is equal to "FORMAT". The option button "Profile" 609 displays a black point if and only if the local variable STM_new is equal to "PROFILE". The option button "Template" 616 displays a black point if and only if the local variable STM_new is equal to "TEMPLATE".

The check box "From current selection" 608 displays a check mark if and only if the local variable STM_range is equal to "YES".

At step 806, the method is waiting for any user action on the Scalable Template Manager Dialog Box 600. Such user action is typically resulting from a click with the pointing device 105, but take other similar forms such as, but not limited to a specific combination of key on the keyboard 104, or any other similar means not further specified here.

At step 807, a user action on the Scalable Template Manager Dialog Box 600 is detected.
  If the user action is a click on the push-button "Delete" 607, then control is given to step 808;
  if the user action is a click on the push-button "Import" 605, then control is given to step 810;
  if the user action is a click on the push-button "Done" 601 or on the closing-window push-button 615, then control is given to step 834;
  if the user action is a click on the push-button "Export" 606, then control is given to step 811;
  if the user action is a click on the scrolling bar 603, either on the up direction or on the down direction, then control is given to step 814;
  if the user action is a click on the option buttons "Format" 617, or "Profile" 609, or "Template" 616, then control is given to step 815;
  if the user action is a click on the check box "From current selection" 608, then control is given to step 816;
  if the user action is a click on a top check box like the check box 612, then control is given to step 817;
  if the user action is a click on the push-button "Instanciate" 604, then control is given to step 830;
  if the user action is a click on the push-button "Edit" 611, then control is given to step 824 and;
  if the user action is a click on the push-button "Create New" 610, then control is given to step 818.

At step 808, a test is performed on each of the records 731 of the STMT table 730 whose "Type" field 737 has the "SELECTED" attribute 742 equal to "YES", to determine if this same "Type" field 737 has the "REFERENCED" attribute 740 equal to "TEMPLATE" or "INSTANCE".
If it is the case, then control is given to step 835 (meaning that at least one record 731 of the STMT table 730 previously selected was referenced by a scalable template or by a scalable template instance);
otherwise control is given to step 809.

At step 809, each respective record 701, 711, and 721 is removed from the EFT table 700, EPT table 710, and STT table 720 if the corresponding respective "Name" field 702, 712, and 722 matches the "Name" field 732 of a record 731 of the STMT table 730 whose "Type" field 737 has the "SELECTED" attribute 742 equal to "YES", as resulting from the step 817. Then the local variable STM_select is reset to the value 0 (zero). Then control is given to the step 804 for rebuilding the STMT table.

At step 810, the Scalable Template Import Manager command is issued and then control is given to step 834.

At step 811, a test is performed to determine if the local variable STM_select is equal to 0 (zero).
If it is the case, then control is given to step 813; otherwise control is given to step 812.

At step 812, the Scalable Template Export Manager command is issued and then control is given to step 834.

At step 813, a warning message notification is issued for informing the user that at least one object must be selected prior clicking on the "Export" push-button 606. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 814, the local variable STM_index is either incremented or decremented by 1 (one) according to the direction (up or down) specified by the pointing device 105 on the scrolling bar 603, and as long as it value remains positive and less than or equal to the number of records 731 defined within the STMT table 730. Then control is given to step 805.

At step 815, the local variable STM_new is updated to reflect the option button hit by the user with the pointing device 105.
If the user has clicked on the "Format" option button 617, then the local variable STM_new takes the value "FORMAT".
If the user has clicked on the "Profile" option button 609, then the local variable STM_new take the value "PROFILE".
If the user has clicked on the "Template" option button 616, then the local variable take the value "TEMPLATE".
Then control is given to step 805.

At step 816, the local variable STM_range is updated, so that its value swaps between "YES" and "NO". In addition, a check mark is respectively added within or removed from the check box 606 if it was previously absent or present in this same check box 606. Then control is given to step 805.

At step 817, the method updates the value of the "Type" field 737 of the record 731 within the STMT table 730, whose "Name" field 732 is found equal to the character string located within the list box 613 immediately on the right of the check box on which the user has just clicked.
If the previous value of this "Type" field 737 had the "SELECTED" attribute 742 equal to "YES", then the value update consists in turning this "SELECTED" attribute 742 to "NO"; reversibly if the previous value of the "SELECTED" attribute 742 was equal to "NO", then the value update consists in turning this "SELECTED" attribute 742 to "YES".
In the first case the local variable STM_select is decremented by 1, and in the second case the local variable STM_select is incremented by 1.
Furthermore in the first case the check mark previously present in the check box on which the user has just clicked is removed from this check box and in the second case a check mark is displayed in the check box on which the user has just clicked. Then control is given to step 805.

At step 818, a test is performed to determine if the local variable STM_new is equal to "NONE". If it is the case, then control is given to step 819; otherwise control is given to step 820.

At step 819, a warning message notification is issued for informing the user that at least one option ("Format" option button 617, or "Profile" option button 609, or "Template" option button 616) must be selected prior clicking on the "Create New" push-button 610. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 820, a test is performed to determine the value taken by the local variable STM_new.
If found equal to "FORMAT", then control is given to step 821;
If found equal to "PROFILE", then control is given to step 822;
If found equal to "TEMPLATE", then control is given to step 823.

At step 821, the Element Format Editor command is issued with passing two parameters ("NEW"; STM_range) and then control is given to step 834.

At step 822, the Element Profile Editor command is issued with passing two parameters ("NEW"; STM_range) and then control is given to step 834.

At step 823, the Scalable Template Editor command is issued with passing one parameter ("NEW") and then control is given to step 834.

At step 824, a test is performed to determine if the local variable STM_select is equal to 1 (one). If it is the case, then control is given to step 825; otherwise control is given to step 829.

At step 825, a test is performed to determine the nature of the selected object, as specified by the "Type" field 737 "NATURE" attribute 741 of the corresponding record 731 of the STMT table 730.
If found equal to "FORMAT", then control is given to step 826;
if found equal to "PROFILE", then control is given to step 827;

if found equal to "TEMPLATE", then control is given to step 828.

At step 826, the Element Profile Editor command is issued with passing one parameter equal to the "Name" field 732 of the unique record 731 of the STMT table 730 whose "Type" field 737 has the "SELECTED" attribute 742 equal to "YES", and then control is given to step 834.

At step 827, the Element Format Editor command is issued with passing one parameter equal to the "Name" field 732 of the unique record 731 of the STMT table 730 whose "Type" field 737 has the "SELECTED" attribute 742 equal to "YES", and then control is given to step 834.

At step 828, the Scalable Template Editor command is issued with passing one parameter equal to the "Name" field 732 of the unique record 731 of the STMT table 730 whose "Type" field 737 has the "SELECTED" attribute 742 equal to "YES", and then control is given to step 834.

At step 829, a warning message notification is issued for informing the user that a single object must be selected within the Scalable Template Manager Dialog Box (thanks to check boxes like 612) prior clicking on the "Edit" push-button 611 or on the "Instanciate" push-button 604. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 830, a test is performed to determine if the local variable STM_select is equal to 1 (one). If it is the case, then control is given to step 831; otherwise control is given to step 829.

At step 831, a test is performed to determine the nature of the selected object, as specified by the "Type" field 737 "NATURE" attribute 741 of the corresponding record 731 of the STMT table 730. If found equal to "TEMPLATE", then control is given to step 832; otherwise control is given to step 833.

At step 832, the Scalable Template Instanciator command is issued with passing one parameter equal to the "Name" field 732 of the unique record 731 of the STMT table 730 whose "Type" field 737 has the "SELECTED" attribute 742 equal to "YES", and then control is given to step 834.

At step 833, a warning message notification is issued for informing the user that a single scalable template object must be selected within the Scalable Template Manager Dialog Box (thanks to check boxes like 612) prior clicking on the "Instanciate" push-button 604. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 834, the Scalable Template Manager Dialog Box 600 is closed so that it disappears from the display device 106 and then control is given back to the initial step 801 for processing any future Scalable Template Manager command.

At step 835, a warning message notification is issued for informing the user that at least one selected object to be deleted is referenced by another object. This can typically be done by displaying on the display device 106 a warning message in a pop-up window, or in a status bar area, but any other similar means could be used instead, without departing from the spirit of the invention. Then the user is prompted to either cancel the current "Delete" operation, or to pursue it. This can typically be done by displaying on the display device 106 a prompting message in a pop-up window, but any other similar means could be used instead, without departing from the spirit of the invention. Once the user has made his choice through conventional means such as clicking with the pointing device 105 on an "Cancel" or "Continue" push-button present within a prompting message pop-up window, or any other similar means without departing from the spirit of the invention, control is given to step 805 if the spreadsheet user decision is to cancel the "Delete" operation, or to step 809 if the spreadsheet user decision is to continue the "Delete" operation.

E2. Element Format Editor method

Figure 9:
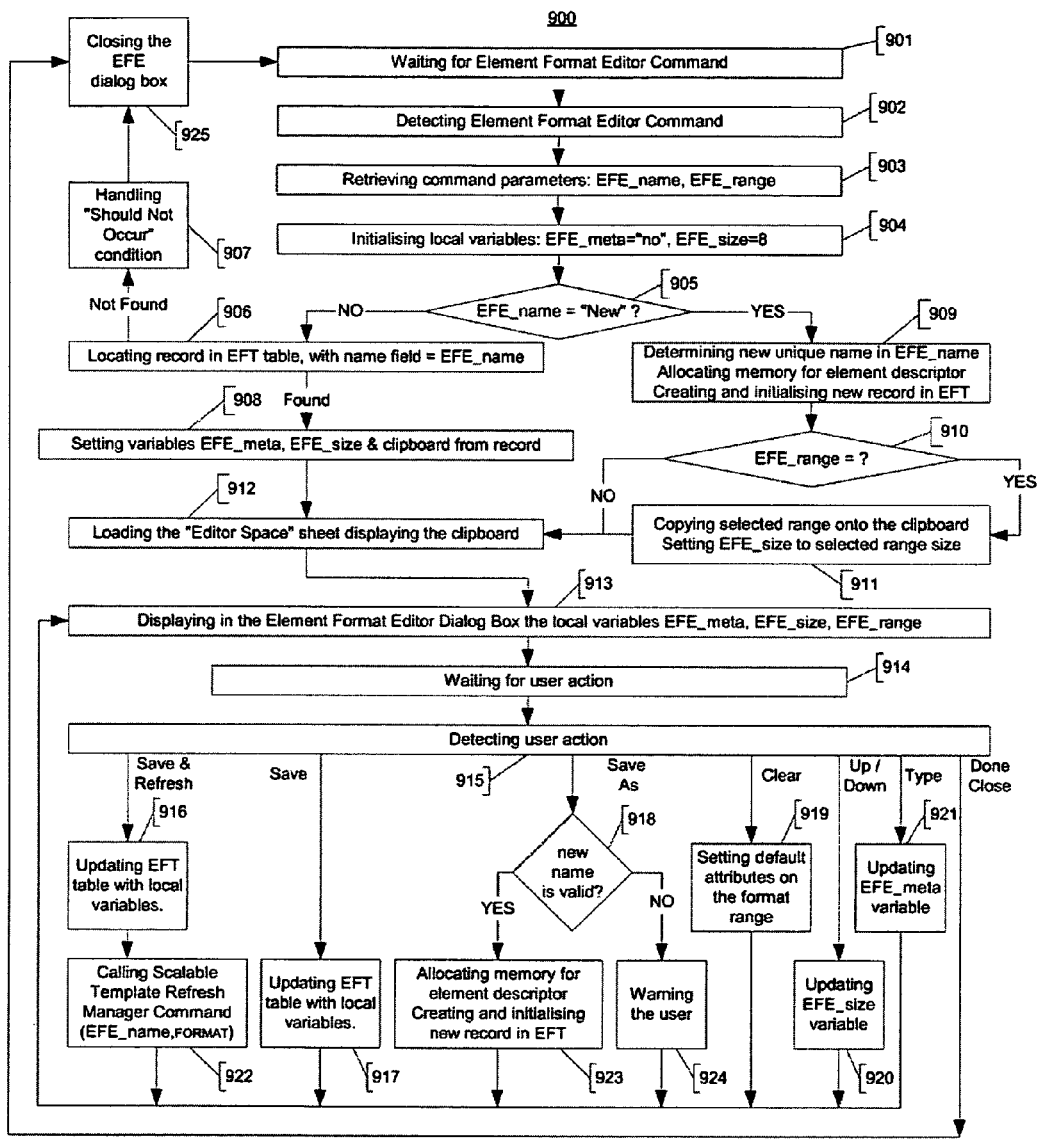
FIG. 9 is a flow chart illustrating a preferred method for editing element formats and meta-element formats according to a preferred embodiment of the present invention.

The method for creating or updating element formats or meta-element formats used in the preferred embodiment of the present invention is summarised in flowchart 900 of FIG. 9. This method can be seen as the processing of the Element Format Editor command.

At step 901, the method is in its default state, waiting for an event to initiate the process.

At step 902, the Element Format Editor command is detected, as a result of an user action. This action can be for instance:

a specific combination of key on the keyboard 104, or
the click of the pointing device 105 on a specific button, or
any other similar means not further specified here.

At step 903, the parameters of the command are retrieved. They correspond to:

a first mandatory parameter EFE_name which can either take a reserved value "NEW" or another value corresponding to a character string name, as found in the "Name" field 732 of a record 731 within the STMT table 730; and a second optional parameter EFE_range which can take only two predefined values "YES" and "NO". This second optional parameter must be present when the first mandatory parameter value differs from the "NEW".

These two parameters are recorded as local variables.

At step 904, some local variables are initialised: the local variable EFE_meta is set to the value "NO", the local variable EFE_size is set to the value 8 (eight).

At step 905, a test is performed to determine the value taken by the local variable EFE_name. If found equal to "NEW", then control is given to step 909; otherwise control is given to step 906.

At step 906, the EFT table 700 is looked up to locate a record 701 whose "Name" field 702 is found equal to the value taken by the local variable EFE_name. If such a record is found, then control is given to step 908; otherwise control is given to step 907.

At step 907, an exception handler is invoked to treat this "should not occur" condition. Such operation is implementation dependent and can take different forms such as the display on the display device 106 of an error message pop-up window. Then control is given to step 925.

At step 908,
the local variable EFE_meta is set to the value "YES" or "NO" according to the value of the "META" attribute 708 within the "Type" field 707 of the record 701 found at step 906,
the local variable EFE_size is set to the value found in the "Column #" field 706 of the record 701 found at step 906, and
the memory location pointed by the "Description Ptr" field 704 of the record 701 found at step 906 is copied onto the clipboard.

Then control is given to step 912.

At step 909, a new name for the newly created format is determined, according to a name string taking in a preferred embodiment of the present invention the form "New XX" where XX corresponds to a counter value ensuring the name uniqueness with respect to all the names previously defined and recorded in the "Name" fields 702, 712 and 722 found in the respective records 701, 711 and 721 of the respective tables EFT 700, EPT 710 and STT 720. Any other similar conventional means could be used instead without departing from the spirit of the invention, as long as the uniqueness of the newly created name is ensured.

Then the new name is recorded in the local variable EFE_name. Then memory space is allocated within the main memory 102 to later record the illustrative range of cells for the element format or meta-element format. This allocated memory is part of the memory space corresponding to the currently opened electronic spreadsheet file.

Then a new record 701 is created in the EFT table 700, and this new record 701 is initialised as follows:
the "Name" field 702 is set to the value of the local variable EFE_name;
the "Last Change Date" field 703 is set to the system time reference, as known by the central processor 101;
the "Description Ptr" field 704 is set to the memory location which has just been allocated;
the "Row #" field 705 is set to the value 1 (as in the preferred embodiment of the present invention the scalable templates are managed in a 2D environment; this field would carry the number of defined rows for the created format in a 3D environment);
the "Column #" field 706 is set to the value of the local variable EFE_size and
the "Type" field 707 is set as follows: the attribute "META" 708 is set equal to the value of the local variable EFE_meta, and the attribute "REFERENCED" 709 is set to "NONE".

Then control is given to step 910.

At step 910, a test is performed to determine the value taken by the local variable EFE_range. If found equal to "YES", then control is given to step 911; otherwise control is given to step 912.

At step 911, the currently selected range of cells is copied onto the clipboard and the local variable EFE_size is set equal to the number of columns of the selected range.

At step 912, the "Editor Space" sheet 635 is made the current sheet and the content of the clipboard is pasted on this blank sheet at a fixed cell address 634 (address B2 in a preferred embodiment of the present invention, as shown on FIG. 6B), so that the user can visualise on the display device 106, within the window 160 an illustration of the element format or meta-element format.

At step 913, the Element Format Editor Dialog Box 621 is displayed on the display device 106.
The label box 624 is initialised with the value of the local variable EFE_name.
The top (respectively bottom) option button 630 is filled with a black point if the local variable EFE_meta is found equal to "NO" (respectively "YES").
The text box 626 is filled with the value of the local variable EFE_size.
The push-buttons "Save" 632 and "Save & Refresh" 628 are enabled if the local variable EFE_size is found equal to the "Column #" field 706 of the current record 701, or if the attribute "REFERENCED" 709 within the "Type" field 707 of this same record 701 is found equal to "NO", so that any future click with the pointing device 105 on one of these two push-buttons "Save" 632 and "Save & Refresh" 628 will be recognised as a valid event.
The push-buttons "Save" 632 and "Save & Refresh" 628 are disabled otherwise (local variable EFE_size is not found equal to the "Column #" field 706 of the current record 701, and the attribute "REFERENCED" 709 within the "Type" field 707 of this same record 701 is not found equal to "NO"), so that any future click with the pointing device 105 on one of these two push-buttons "Save" 632 and "Save & Refresh" 628 will not be recognised as an event.

At step 914, the method is waiting for any user action on the Element Format Editor Dialog Box 621. Such user action is typically resulting from a click with the pointing device 105, but take other similar forms such as, but not limited to a specific combination of key on the keyboard 104, or any other similar means not further specified here.

At step 915, a user action on the Element Format Editor Dialog Box 621 is detected.
If the user action is a click on the push-button "Save & Refresh" 628, then control is given to step 916;
if the user action is a click on the push-button "Save" 632, then control is given to step 917;
if the user action is a click on the push-button "Save As" 631, then control is given to step 918;
if the user action is a click on the push-button "Clear" 629, then control is given to step 919;
if the user action is a click on the spin button 627, then control is given to step 920;
if the user action is a click on one of the two option buttons 630, then control is given to step 921;
if the user action is a click on the push-button "Done" 623, or on the closing-window push-button 622, then control is given to step 925.

At step 916, the EFT table 700 is updated and saved as part of the electronic spreadsheet file by refreshing the record 701 whose "Name" field 702 is equal to the local variable EFE_name. For this purpose,
the "Last Change Date" field 703 is set to the system time reference, as known by the central processor 101;
the "Column #" field 706 is set to the value of the local variable EFE_size and
the "Type" field 707 is set as follows: the attribute "META" 708 is set equal to the value of the local variable EFE_meta.
In addition the range of cells 634 illustrating on the "Editor Space" sheet 635 the current definition of the element format or meta-element format is copied onto the memory location pointed by the "Description Ptr" field 704. Then control is given to step 922.

At step 917, the EFT table 700 is updated and saved as part of the electronic spreadsheet file by refreshing the record 701 whose "Name" field 702 is equal to the local variable EFE_name. For this purpose,
the "Last Change Date" field 703 is set to the system time reference, as known by the central processor 101;
the "Column #" field 706 is set to the value of the local variable EFE_size and
the "Type" field 707 is set as follows: the attribute "META" 708 is set equal to the value of the local variable EFE_meta.
In addition the range of cells 634 illustrating on the "Editor Space" sheet 635 the current definition of the element format or meta-element format is copied onto the memory location pointed by the "Description Ptr" field 704. Then control is given to step 913.

At step 918, a test is performed on the value found in the text box 625 to determine if it corresponds to a valid new name. The corresponding criteria are implementation dependent and may take different forms without departing from the spirit of the invention, as long as the new proposed name is a unique character string against all the already defined names recorded in the "Name" fields 702, 712, and 722. If validity and uniqueness are proven, then control is given to step 923; otherwise control is given to step 924.

At step 919, the default attributes currently defined in the spreadsheet environment are applied to the "Editor Space" sheet 635, so that the displayed illustration of the element format or meta-element format receives these same default attributes. Then control is given to the step 913.

At step 920, the local variable EFE_size is either incremented or decremented by 1 (one) according to the direction (up or down) specified by the pointing device 105 on the spin button 627, and as long as it value remains positive and less than or equal to an upper limit set equal to 254 in a preferred embodiment of the present invention. Then control is given to step 913.

At step 921, the local variable EFE_meta is updated, so that its value becomes "YES" (respectively "NO") if the bottom (respectively top) option button 630 has been clicked on. Then control is given to step 913.

At step 922, the Scalable Template Refresh Manager command is issued with the following parameters: EFE_name, "FORMAT" and then control is given to step 913.

At step 923, memory space is allocated within the main memory 102 to later record the illustrative range of cells for the element format or meta-element format. This allocated memory is part of the memory space corresponding to the currently opened electronic spreadsheet file. Then a new record 701 is created in the EFT table 700 which is saved as part of the electronic spreadsheet file, and this new record 701 is initialised as follows:
the "Name" field 702 is set to the value found in the text box 625 and validated at step 918;
the "Last Change Date" field 703 is set to the system time reference, as known by the central processor 101;
the "Description Ptr" field 704 is set to the memory location which has just been allocated;
the "Row #" field 705 is set to the value 1 (as in the preferred embodiment of the present invention the scalable templates are managed in a 2D environment; this field would carry the number of defined rows for the created format in a 3D environment);
the "Column #" field 706 is set to the value of the local variable EFE_size and
the "Type" field 707 is set as follows: the attribute "META" 708 is set equal to the value of the local variable EFE_meta, and the attribute "REFERENCED" 709 is set to "NONE".
Then control is given to step 913.

At step 924, a warning message notification is issued for informing the user that a valid and unique name must be specified in the text box 625 prior to clicking on the "Save As" push-button 631. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 913.

At step 925, the Element Format Editor Dialog Box 661 is closed so that it disappears from the display device 106, then the "Editor Space" sheet 675 is removed from the window 160 so that it is replaced by the original sheet present at Element Format Editor invocation time. Finally control is given back to the initial step 901 for processing any future Element Format Editor command.

E3. Element Profile Editor method

Figure 10:
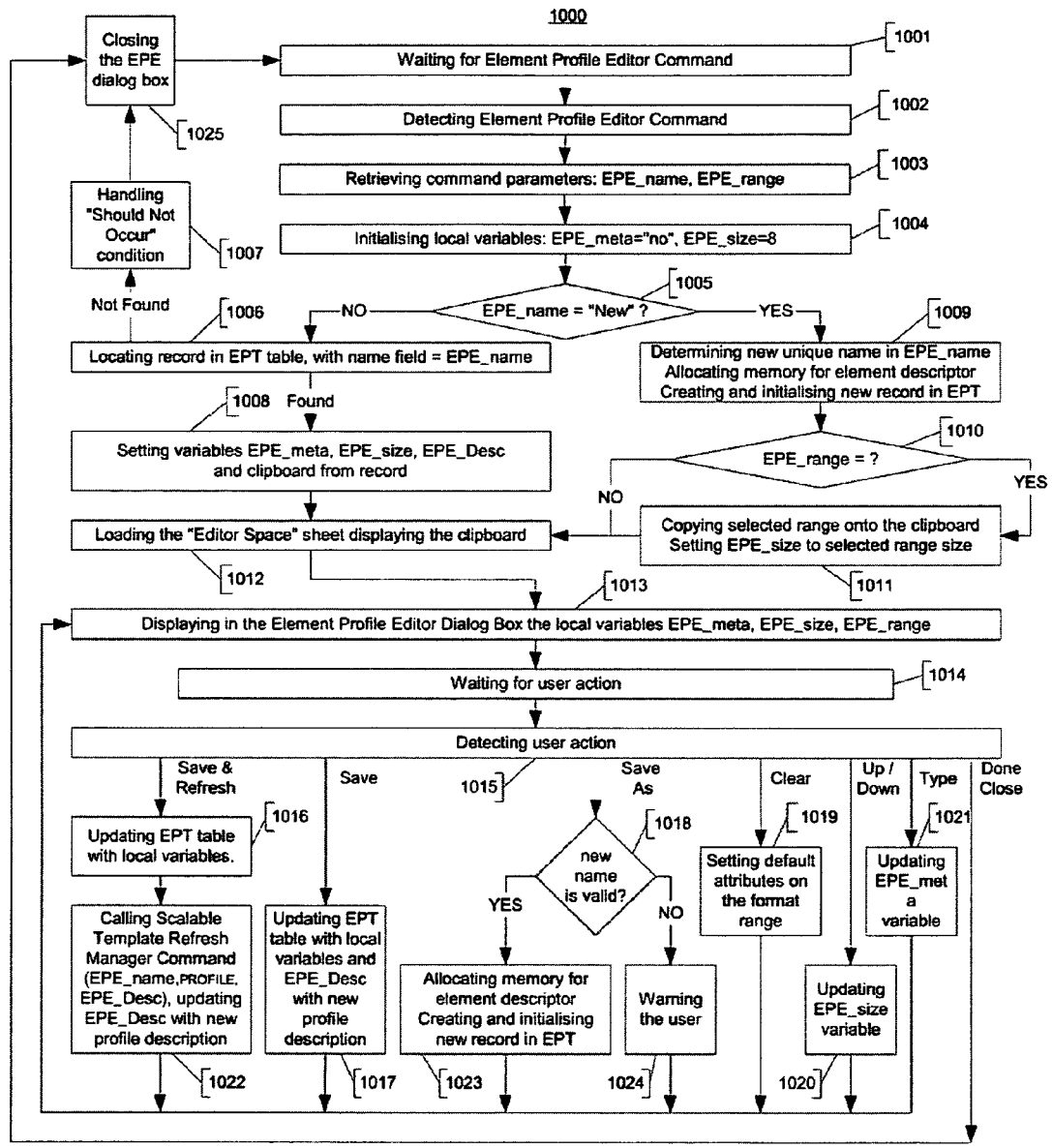
FIG. 10 is a flow chart illustrating a preferred method for editing element profiles and meta-element profiles according to a preferred embodiment of the present invention.

The method for creating or updating element profiles or meta-element profiles used in the preferred embodiment of the present invention is summarised in flowchart 1000 of FIG. 10. This method can be seen as the processing of the Element Profile Editor command.

At step 1001, the method is in its default state, waiting for an event to initiate the process.

At step 1002, the Element Profile Editor command is detected, as a result of an user action. This action can be for instance:
a specific combination of key on the keyboard 104, or
the click of the pointing device 105 on a specific button, or
any other similar means not further specified here.

At step 1003, the parameters of the command are retrieved. They correspond to:
a first mandatory parameter EPE_name which can either take a reserved value "NEW" or another value corresponding to a character string name, as found in the "Name" field 732 of a record 731 within the STMT table 730; and a second optional parameter EPE_range which can take only two predefined values "YES" and "NO". This second optional parameter must be present when the first mandatory parameter value differs from the "NEW".
These two parameters are recorded as local variables.

At step 1004, some local variables are initialised: the local variable EPE_meta is set to the value "NO", the local variable EPE_size is set to the value 8 (eight).

At step 1005, a test is performed to determine the value taken by the local variable EPE_name. If found equal to "NEW", then control is given to step 1009; otherwise control is given to step 1006.

At step 1006, the EPT table 710 is looked up to locate a record 711 whose "Name" field 712 is found equal to the value taken by the local variable EPE_name. If such a record is found, then control is given to step 1008; otherwise control is given to step 1007.

At step 1007, an exception handler is invoked to treat this "should not occur" condition. Such operation is implementation dependent and can take different forms such as the display on the display device 106 of an error message pop-up window. Then control is given to step 1025.

At step 1008,
  the local variable EPE_meta is set to the value "YES" or "NO" according to the value of the "META" attribute 718 within the "Type" field 717 of the record 711 found at step 1006,
  the local variable EPE_size is set to the value found in the "Column #" field 716 of the record 711 found at step 1006, and
  the memory location pointed by the "Description Ptr" field 714 of the record 711 found at step 1006 is copied onto the clipboard and within the local variable EPE_Desc.
  Then control is given to step 1012.

At step 1009, a new name for the newly created profile is determined, according to a name string taking in a preferred embodiment of the present invention the form "New XX" where XX corresponds to a counter value ensuring the name uniqueness with respect to all the names previously defined and recorded in the "Name" fields 702, 712 and 722 found in the respective records 701, 711 and 721 of the respective tables EFT 700, EPT 710 and STT 720. Any other similar conventional means could be used instead without departing from the spirit of the invention, as long as the uniqueness of the newly created name is ensured. Then the new name is recorded in the local variable EPE_name.

Then memory space is allocated within the main memory 102 to later record the illustrative range of cells for the element profile or meta-element profile. This allocated memory is part of the memory space corresponding to the currently opened electronic spreadsheet file. Then a new record 711 is created in the EPT table 710, and this new record 711 is initialised as follows:
  the "Name" field 712 is set to the value of the local variable EPE_name;
  the "Last Change Date" field 713 is set to the system time reference, as known by the central processor 101;
  the "Description Ptr" field 714 is set to the memory location which has just been allocated;
  the "Row #" field 715 is set to the value 1 (as in the preferred embodiment of the present invention the scalable templates are managed in a 2D environment; this field would carry the number of defined rows for the created profile in a 3D environment);
  the "Column #" field 716 is set to the value of the local variable EPE_size and
  the "Type" field 717 is set as follows: the attribute "META" 718 is set equal to the value of the local variable EPE_meta, and the attribute "REFERENCED" 719 is set to "NONE".
  Then control is given to step 1010.

At step 1010, a test is performed to determine the value taken by the local variable EPE_range. If found equal to "YES", then control is given to step 1011; otherwise control is given to step 1012.

At step 1011, the currently selected range of cells is copied onto the clipboard and the local variable EPE_size is set equal to the number of columns of the selected range.

At step 1012, the "Editor Space" sheet 635 is made the current sheet and the content of the clipboard is pasted on this blank sheet at a fixed cell address 634 (address B2 in a preferred embodiment of the present invention, as shown on FIG. 6B), so that the user can visualise on the display device 106, within the window 160 an illustration of the element profile or meta-element profile.

At step 1013, the Element Profile Editor Dialog Box 641 is displayed on the display device 106.
  The label box 644 is initialised with the value of the local variable EPE_name. The top (respectively bottom) option button 650 is filled with a black point if the local variable EPE_meta is found equal to "NO" (respectively "YES").
  The text box 646 is filled with the value of the local variable EPE_size.
  The push-buttons "Save" 652 and "Save & Refresh" 648 are enabled if the local variable EPE_size is found equal to the "Column #" field 716 of the current record 711, or if the attribute "REFERENCED" 719 within the "Type" field 717 of this same record 711 is found equal to "NO", so that any future click with the pointing device 105 on one of these two push-buttons "Save" 652 and "Save & Refresh" 648 will be recognised as a valid event.
  The push-buttons "Save" 652 and "Save & Refresh" 648 are disabled otherwise (local variable EPE_size is not found equal to the "Column #" field 716 of the current record 711, and the attribute "REFERENCED" 719 within the "Type" field 717 of this same record 711 is not found equal to "NO"), so that any future click with the pointing device 105 on one of these two push-buttons "Save" 652 and "Save & Refresh" 648 will not be recognised as an event.

At step 1014, the method is waiting for any user action on the Element Profile Editor Dialog Box 641. Such user action is typically resulting from a click with the pointing device 105, but take other similar forms such as, but not limited to a specific combination of key on the keyboard 104, or any other similar means not further specified here.

At step 1015, a user action on the Element Profile Editor Dialog Box 641 is detected.
  If the user action is a click on the push-button "Save & Refresh" 648, then control is given to step 1016;
  if the user action is a click on the push-button "Save" 652, then control is given to step 1017;
  if the user action is a click on the push-button "Save As" 651, then control is given to step 1018;
  if the user action is a click on the push-button "Clear" 649, then control is given to step 1019;
  if the user action is a click on the spin button 647, then control is given to step 1020;
  if the user action is a click on one of the two option buttons 650, then control is given to step 1021;
  if the user action is a click on the push-button "Done" 643, or on the closing-window push-button 642, then control is given to step 1025.

At step 1016, the EPT table 710 is updated and saved as part of the electronic spreadsheet file by refreshing the record 711 whose "Name" field 712 is equal to the local variable EPE_name. For this purpose, the "Last Change Date" field 713 is set to the system time reference, as known by the central processor 101;

the "Column #" field 716 is set to the value of the local variable EPE_size and the "Type" field 717 is set as follows: the attribute "META" 718 is set equal to the value of the local variable EPE_meta.

In addition the range of cells 654 illustrating on the "Editor Space" sheet 655 the current definition of the element profile or meta-element profile is copied onto the memory location pointed by the "Description Ptr" field 714. Then control is given to step 1022.

At step 1017, the EPT table 710 is updated and saved as part of the electronic spreadsheet file by refreshing the record 711 whose "Name" field 712 is equal to the local variable EPE_name. For this purpose, the "Last Change Date" field 713 is set to the system time reference, as known by the central processor 101;

the "Column #" field 716 is set to the value of the local variable EPE_size and the "Type" field 717 is set as follows: the attribute "META" 718 is set equal to the value of the local variable EPE_meta.

In addition the range of cells 654 illustrating on the "Editor Space" sheet 655 the current definition of the element profile or meta-element profile is copied onto the memory location pointed by the "Description Ptr" field 714.

Then the local variable EPE_desc is updated with the current profile description, as recorded in the memory location pointed by the "Description Ptr" field 714, and control is given to step 1013.

At step 1018, a test is performed on the value found in the text box 645 to determine if this value corresponds to a valid new name. The corresponding criteria are implementation dependent and may take different forms without departing from the spirit of the invention, as long as the new proposed name is a unique character string against all the already defined names recorded in the "Name" fields 702, 712, and 722. If validity and uniqueness are proven, then control is given to step 1023; otherwise control is given to step 1024.

At step 1019, the default attributes currently defined in the spreadsheet environment are applied to the "Editor Space" sheet 655, so that the displayed illustration of the element profile or meta-element profile receives these same default attributes. Then control is given to the step 1013.

At step 1020, the local variable EPE_size is either incremented or decremented by 1 (one) according to the direction (up or down) specified by the pointing device 105 on the spin button 647, and as long as it value remains positive and less than or equal to an upper limit set equal to 254 in a preferred embodiment of the present invention. Then control is given to step 1013.

At step 1021, the local variable EPE_meta is updated, so that its value becomes "YES" (respectively "NO") if the bottom (respectively top) option button 650 has been clicked on. Then control is given to step 1013.

At step 1022, the Scalable Template Refresh Manager command is issued with the following parameters: EPE_name, "PROFILE", and EPE_desc. Then the local variable EPE_desc is updated with the current profile description, as recorded in the memory location pointed by the "Description Ptr" field 714 and then control is given to step 1013.

At step 1023, memory space is allocated within the main memory 102 to later record the illustrative range of cells for the element profile or meta-element profile. This allocated memory is part of the memory space corresponding to the currently opened electronic spreadsheet file. Then a new record 711 is created in the EPT table 710 which is saved as part of the electronic spreadsheet file, and this new record 711 is initialised as follows:

the "Name" field 712 is set to the value found in the text box 645 and validated at step 1018;

the "Last Change Date" field 713 is set to the system time reference, as known by the central processor 101;

the "Description Ptr" field 714 is set to the memory location which has just been allocated;

the "Row #" field 715 is set to the value 1 (as in the preferred embodiment of the present invention the scalable templates are managed in a 2D environment; this field would carry the number of defined rows for the created profile in a 3D environment);

the "Column #" field 716 is set to the value of the local variable EPE_size;

the "Type" field 717 is set as follows: the attribute "META" 718 is set equal to the value of the local variable EPE_meta, and the attribute "REFERENCED" 719 is set to "NONE".

Then control is given to step 1013.

At step 1024, a warning message notification is issued for informing the user that a valid and unique name must be specified in the text box 645 prior to clicking on the "Save As" push-button 651. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1013.

At step 1025, the Element Profile Editor Dialog Box 641 is closed so that it disappears from the display device 106, then the "Editor Space" sheet 655 is removed from the window 160 so that it is replaced by the original sheet present at Element Profile Editor invocation time. Finally control is given back to the initial step 1001 for processing any future Element Profile Editor command.

E4. Scalable Template Editor method

Figure 12:
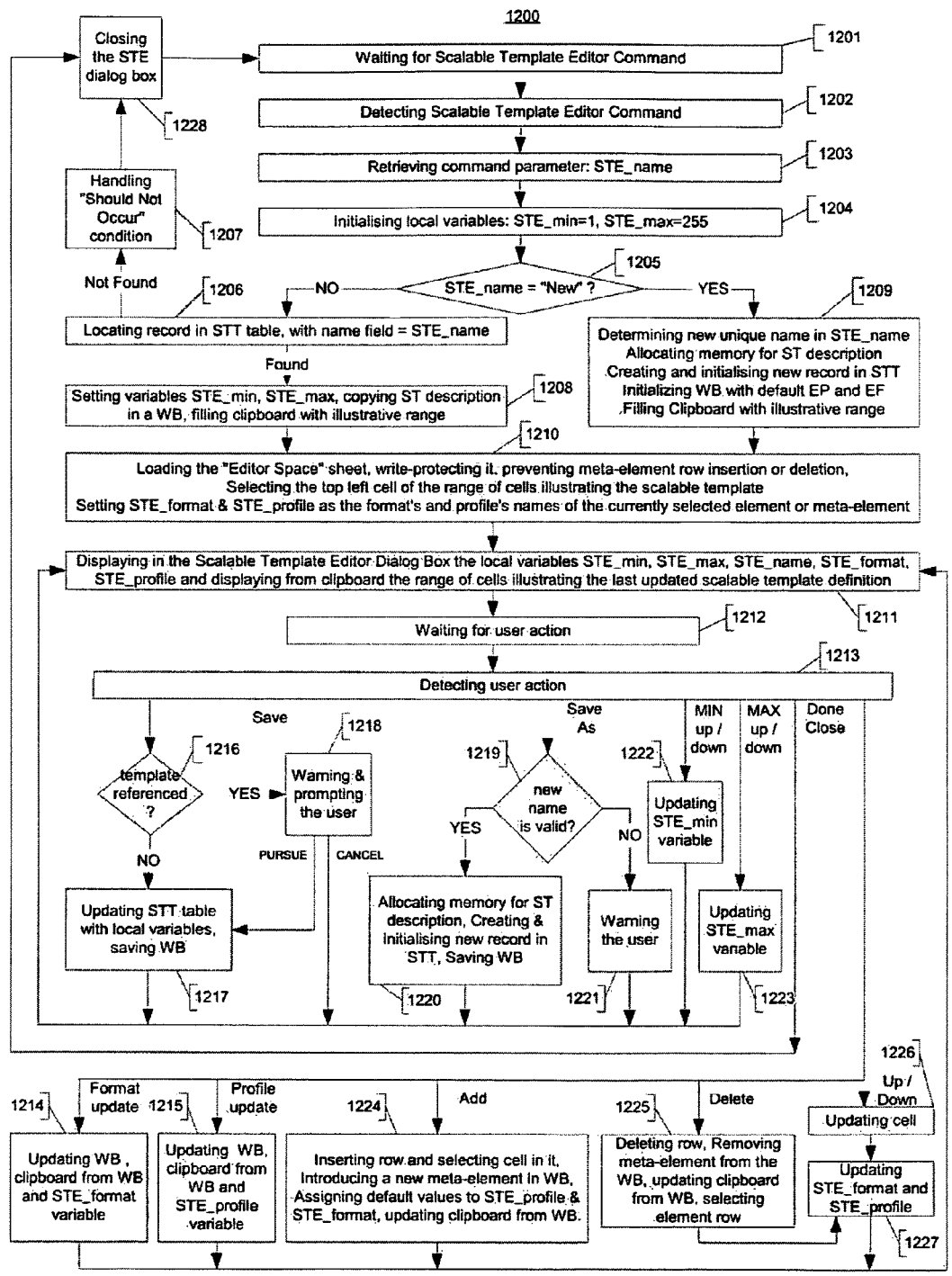
FIG. 12 is a flow chart illustrating a preferred method for editing a scalable template according to a preferred embodiment of the present invention.

The method for creating or updating scalable templates used in the preferred embodiment of the present invention is summarised in flowchart 1200 of FIG. 12. This method can be seen as the processing of the Scalable Template Editor command.

At step 1201, the method is in its default state, waiting for an event to initiate the process.

At step 1202, the Scalable Template Editor command is detected, as a result of an user action. This action can be for instance:

a specific combination of key on the keyboard 104, or the click of the pointing device 105 on a specific button, or any other similar means not further specified here.

At step 1203, the parameter of the command is retrieved. It corresponds to a mandatory parameter STE_name which can either take a reserved value "NEW" or another value corresponding to a character string name, as found in the "Name" field 732 of a record 731 within the STMT table 730. This parameter is recorded as a local variable.

At step 1204, some local variables are initialised: the local variable STE_min is set to the default value 1 (one), the local variable STE_max is set to the default value 255.

At step 1205, a test is performed to determine the value taken by the local variable STE_name. If found equal to "NEW", then control is given to step 1209; otherwise control is given to step 1206.

At step 1206, the STT table 720 is looked up to locate a record 721 whose "Name" field 722 is found equal to the value taken by the local variable STE_name. If such a record is found, then control is given to step 1208; otherwise control is given to step 1207.

At step 1207, an exception handler is invoked to treat this "should not occur" condition. Such operation is implementation dependent and can take different forms such as the display on the display device 106 of an error message pop-up window. Then control is given to step 1228.

At step 1208,
- the local variable STE_min is set to the value found in the "Min Element #" field 725 of the record 721 found at step 1206,
- the local variable STE_max is set to the value found in the "Max Element #" field 726 of the record 721 found at step 1206.
- Then the memory location pointed by the "Description Ptr" field 724 of the record 721 found at step 1206 (where is recorded the description of the scalable template according to the STDT table 760 illustrated in FIG. 7E) is copied in a working buffer which in turns follows the same STDT table 760.
- This structure is then used to build on the clipboard within the main memory 102 a spreadsheet range of cells illustrating the scalable template definition copied in the working buffer.
- This construction is achieved by loading in the clipboard within the main memory 102 an ordered sequence of ranges of cells, each of them successively abiding by the format (column 765) and the profile (column 764) definition corresponding to each pair of format and profile names, starting with the first pair 761 up to the last one 763.
- Then control is given to step 1210.

At step 1209, a new name for the newly created scalable template is determined, according to a name string taking in a preferred embodiment of the present invention the form "New XX" where XX corresponds to a counter value ensuring the name uniqueness with respect to all the names previously defined and recorded in the "Name" fields 702, 712 and 722 found in the respective records 701, 711 and 721 of the respective tables EFT 700, EPT 710 and STT 720. Any other similar conventional means could be used instead without departing from the spirit of the invention, as long as the uniqueness of the newly created name is ensured. Then the new name is recorded in the local variable STE_name. Then memory space is allocated within the main memory 102 to later record the illustrative range of cells for the new scalable template. This allocated memory is part of the memory space corresponding to the currently opened electronic spreadsheet file and follows the STDT table 760 illustrated in FIG. 7E. Then a new record 721 is created in the STT table 720, and this new record 721 is initialised as follows:
- the "Name" field 722 is set to the value of the local variable STE_name;
- the "Last Change Date" field 723 is set to the system time reference, as known by the central processor 101;
- the "Description Ptr" field 724 is set to the memory location which has just been allocated;
- the "Min Element #" field 725 is set to the value of the local variable STE_min;
- the "Max Element #" field 726 is set to the value of the local variable STE_max; and
- the "Type" field 727 is set as follows: the attribute "META" 728 is set equal to "NO", and the attribute "REFERENCED" 729 is set to "NONE".

Then a working buffer is allocated in main memory 102 and initialised with a default scalable template description which corresponds to a single pair 762 of default element format and default element profile. This default scalable template description is then used to build on the clipboard within the main memory 102 a spreadsheet range of cells illustrating the new scalable template. This construction is achieved as explained at the end of the step 1208. Then control is given to step 1210.

At step 1210, the "Editor Space" sheet 675 is made the current sheet and this sheet is turned to write-protect mode while regular row insertion and deletion are disabled. Then the top left cell of the range of cells 674 is selected.

Then the local variable STE_format is filled with the name of the element format or of the meta-element format corresponding to the row where is located the currently selected cell within the range of cells 674.

Finally the local variable STE_profile is filled with the name of the element profile or of the meta-element profile corresponding to the row where is located the currently selected cell within the range of cells 674.

At step 1211, the Scalable Template Editor Dialog Box 661 is displayed on the display device 106.
- The label box 664 is initialised with the value of the local variable STE_name.
- The text box 666 is filled with the value of the local variable STE_min.
- The text box 669 is filled with the value of the local variable STE_max.
- The combo box 671 is filled with the value of the local variable STE_format.
- The combo box 670 is filled with the value of the local variable STE_profile.
- Then the range of cells 674 is updated according to the description recorded in the memory clipboard: the content of the clipboard is pasted on this blank sheet at a fixed cell address 674 (address B2 in a preferred embodiment of the present invention, as shown on FIG. 6D), so that the user can visualise on the display device 106, within the window 660 an illustration of the scalable template.
- Then a test is performed to check if all the element formats, element profiles, meta-element formats and meta-elements profiles contributing to the scalable template definition illustrated by the range of cells 674, have the same number of fields. If it is the case, then the two push-buttons "Save" 673 and "Save As" 672 are enabled, so that the click with the pointing device 105 on one of these two push-buttons is recognised as a valid event. Otherwise the two push-buttons "Save" 673 and "Save As" 672 are disabled, so that the click with the pointing device 105 on one of these two push-buttons is not recognised as a valid event.

At step 1212, the method is waiting for any user action on the Scalable Template Editor Dialog Box 661. Such user action is typically resulting from a click with the pointing device 105, but take other similar forms such as, but not limited to a specific combination of key on the keyboard 104, or any other similar means not further specified here.

At step 1213, a user action on the Scalable Template Editor Dialog Box 661 is detected.

If the user action is a click on the push-button "Save" 673, then control is given to step 1216;

if the user action is a click on the push-button "Save As" 672, then control is given to step 1219;

if the user action is a click on the push-button "Add" 677, then control is given to step 1224;

if the user action is a click on the push-button "Delete" 678, then control is given to step 1225;

if the user action is a click on the push-button "Up" 679 or on the push-button "Down" 680, then control is given to step 1226;

if the user action is an update of the combo box 671, then control is given to step 1214;

if the user action is an update of the combo box 670, then control is given to step 1215;

if the user action is a click on the spin button 667, then control is given to step 1222;

if the user action is a click on the spin button 668, then control is given to step 1223;

if the user action is a click on the push-button "Done" 663, or on the closing-window push-button 662, then control is given to step 1228.

At step 1214, the scalable template description is updated in the working buffer by replacing by the element format or meta-element format name found in the text box 671 the previous element format or meta-element format specification corresponding to the element or meta-element illustrated by the currently selected cell within the range of cells 674. Then the local variable STE_format is also set equal to the name found in the text box 671. Then control is given to step 1211.

At step 1215, the scalable template description is updated in the working buffer by replacing by the element profile or meta-element profile name found in the text box 670 the previous element profile or meta-element profile specification corresponding to the element or meta-element illustrated by the currently selected cell within the range of cells 674. Then the local variable STE_profile is also set equal to the name found in the text box 670. Then control is given to step 1211.

At step 1216, a test is performed to check if the currently edited scalable template is already referenced by an existing scalable template instance. For this purpose is considered the value of the "REFERENCED" attribute 729 within the "Type" field 727 of the record 721 within the STT table 720 whose "Name" field 722 is equal to the local variable STE_name. If the value of this attribute is found equal to "NONE", then control is given to step 1217; otherwise control is given to step 1218.

At step 1217, the "ST" table 720 is updated by refreshing the record 721 whose "Name" field 722 is equal to the local variable STE_name. For this purpose, the "Last Change Date" field 723 is set to the system time reference, as known by the central processor 101;

the "Min Element #" field 725 is set to the value of the local variable STE_min;

the "Max Element #" field 726 is set to the value of the local variable STE_max.

In addition the current description of the scalable template, as illustrated by the range of cells 674, as recorded in the working buffer, and following the STDT table 760 is copied onto the memory location pointed by the "Description Ptr" field 724. For each element format name or meta-element format name found in the column 765 of this STDT table 760, the EFT table 700 is visited to identify the corresponding record 701 whose "Name" field 702 matches this element or meta-element format name. Once found, the "REFERENCED" attribute 709 of the "Type" field 707 of this record 701 is set to the value TEMPLATE if and only if its former value was equal to NONE. For each element profile name or meta-element profile name found in the column 764 of this STDT table 760, the EPT table 710 is visited to identify the corresponding record 711 whose "Name" field 712 matches this element or meta-element profile name. Once found, the "REFERENCED" attribute 719 of the "Type" field 717 of this record 711 is set to the value TEMPLATE if and only if its former value was equal to NONE. Then control is given to step 1211.

At step 1218, a warning message notification is issued for informing the user that the edited scalable template is already referenced by an existing scalable template instance. This can typically be done by displaying on the display device 106 a warning message in a pop-up window, or in a status bar area, but any other similar means could be used instead, without departing from the spirit of the invention. Then the user is prompted to either cancel the current "Save" operation, or to pursue it. This can typically be done by displaying on the display device 106 a prompting message in a pop-up window, but any other similar means could be used instead, without departing from the spirit of the invention. Once the user has made his choice through conventional means such as clicking with the pointing device 105 on an. "Cancel" or "Continue" push-button present within a prompting message pop-up window, or any other similar means without departing from the spirit of the invention, control is given to step 1211 if the spreadsheet user decision is to cancel the operation, or to step 1217 if the spreadsheet user decision is to continue the operation.

At step 1219, a test is performed on the value found in the text box 665 to determine if it corresponds to a valid new name. The corresponding criteria are implementation dependent and may take different forms without departing from the spirit of the invention, as long as the new proposed name is a unique character string against all the already defined names recorded in the "Name" fields 702, 712, and 722. If validity and uniqueness are proven, then control is given to step 1220; otherwise control is given to step 1221.

At step 1220, memory space is allocated within the main memory 102 to later record the descriptor of the scalable template. This allocated memory is part of the memory space corresponding to the currently opened electronic spreadsheet file. Then a new record 721 is created in the STT table 720, and this new record 721 is initialised as follows:

the "Name" field 722 is set to the value found in the text box 665 and validated at step 1219;

a the "Last Change Date" field 723 is set to the system time reference, as known by the central processor 101;

the "Description Ptr" field 724 is set to the memory location which has just been allocated;

the "Min Element #" field 725 is set to the value of the local variable STE_min;

the "Max Element #" field 726 is set to the value of the local variable STE_max; and the "Type" field 727 is set as follows: the attribute "META" 728 is set equal to "NO", and the attribute "REFERENCED" 719 is set to "NONE".

In addition the current description of the scalable template, as illustrated by the range of cells 674, as recorded in the working buffer, and following the STDT table 760 is copied onto the memory location pointed by the "Description Ptr" field 724. For each element format name or meta-element format name found in the column 765 of this STDT table 760, the EFT table 700 is visited to identify the corresponding record 701 whose "Name" field 702 matches this element or meta-element format name. Once found, the "REFERENCED" attribute 709 of the "Type" field 707 of this record 701 is set to the value TEMPLATE if and only if its former value was equal to NONE. For each element profile name or meta-element profile name found in the column 764 of this STDT table 760, the EPT table 710 is visited to identify the corresponding record 711 whose "Name" field 712 matches this element or meta-element profile name. Once found, the "REFERENCED" attribute 719 of the "Type" field 717 of this record 711 is set to the value TEMPLATE if and only if its former value was equal to NONE. Then control is given to step 1211.

At step 1221, a warning message notification is issued for informing the user that a valid and unique name must be specified in the text box 665 prior to clicking on the "Save As" push-button 672. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1211.

At step 1222, the local variable STE_min is either incremented or decremented by 1 (one) according to the direction (up or down) specified by the pointing device 105 on the spin button 667, and as long as its value remains positive and less than or equal to both an upper limit set equal to 254 in a preferred embodiment of the present invention and to the value shown in the text box 669. Then control is given to step 1211.

At step 1223, the local variable STE_max is either incremented or decremented by 1 (one) according to the direction (up or down) specified by the pointing device 105 on the spin button 668, and as long as its value remains positive, greater than the value shown in the text box 666 and less than or equal to an upper limit set equal to 254 in a preferred embodiment of the present invention. Then control is given to step 1211.

At step 1224, a new row is inserted in the range of cells 674 illustrating the edited scalable template, above the row where the last selected cell was previously located.

Then the left most cell located on the new row within the range of cells 674 is selected.

Then the scalable template definition is updated in the working buffer by introducing a new meta-element which is described, like the other ones, by a couple (meta-element format 765, meta-element profile 764) which defaults to a couple of default format and default profile, which are also respectively assigned to the local variable STE_format and STE_profile.

In addition the current description of the scalable template, as illustrated by the range of cells 674, as recorded in the working buffer, and following the STDT table 760 is copied onto the memory location pointed by the "Description Ptr" field 724.

Then control is given to step 1211.

At step 1225, the row containing the selected cell is removed from the range of cells 674.

Then the left most cell located within the range of cells 674 on the row representing the element defined within the edited scalable template is selected.

Then the scalable template definition is updated by removing the deleted meta-element which was described by a couple (meta-element format, meta-element profile).

In addition the current description of the scalable template, as illustrated by the range of cells 674, as recorded in the working buffer, and following the STDT table 760 is copied onto the memory location pointed by the "Description Ptr" field 724.

Then control is given to step 1227.

At step 1226, the current cell within the "Editor Space" sheet 675 is respectively moved up or down if the spreadsheet user has clicked with the pointing device 105 on the "Up" push-button 679, or on the "Down" push-button 680, and also if this movement does not move the current cell away from the range of cells 674 illustrating the scalable template.

At step 1227, the local variables STE_format and STE_profile are respectively set equal to the name of the element format or meta-element format and to the name of the element profile or meta-element profile corresponding to either the element or the meta-element illustrated by to the currently selected cell within the range of cells 674. Then control is given to step 1211.

At step 1228, the Scalable Template Editor Dialog Box 661 is closed so that it disappears from the display device 106, then the "Editor Space" sheet 675 is removed from the window 160 so that it is replaced by the original sheet present at Element Profile Editor invocation time. All the means which were temporarily disabled while the "Editor Space" sheet 675 was displayed are now enabled again. Finally control is given back to the initial step 1201 for processing any future Scalable Template Editor command.

E5. Scalable Template Instanciator method

Figure 14:
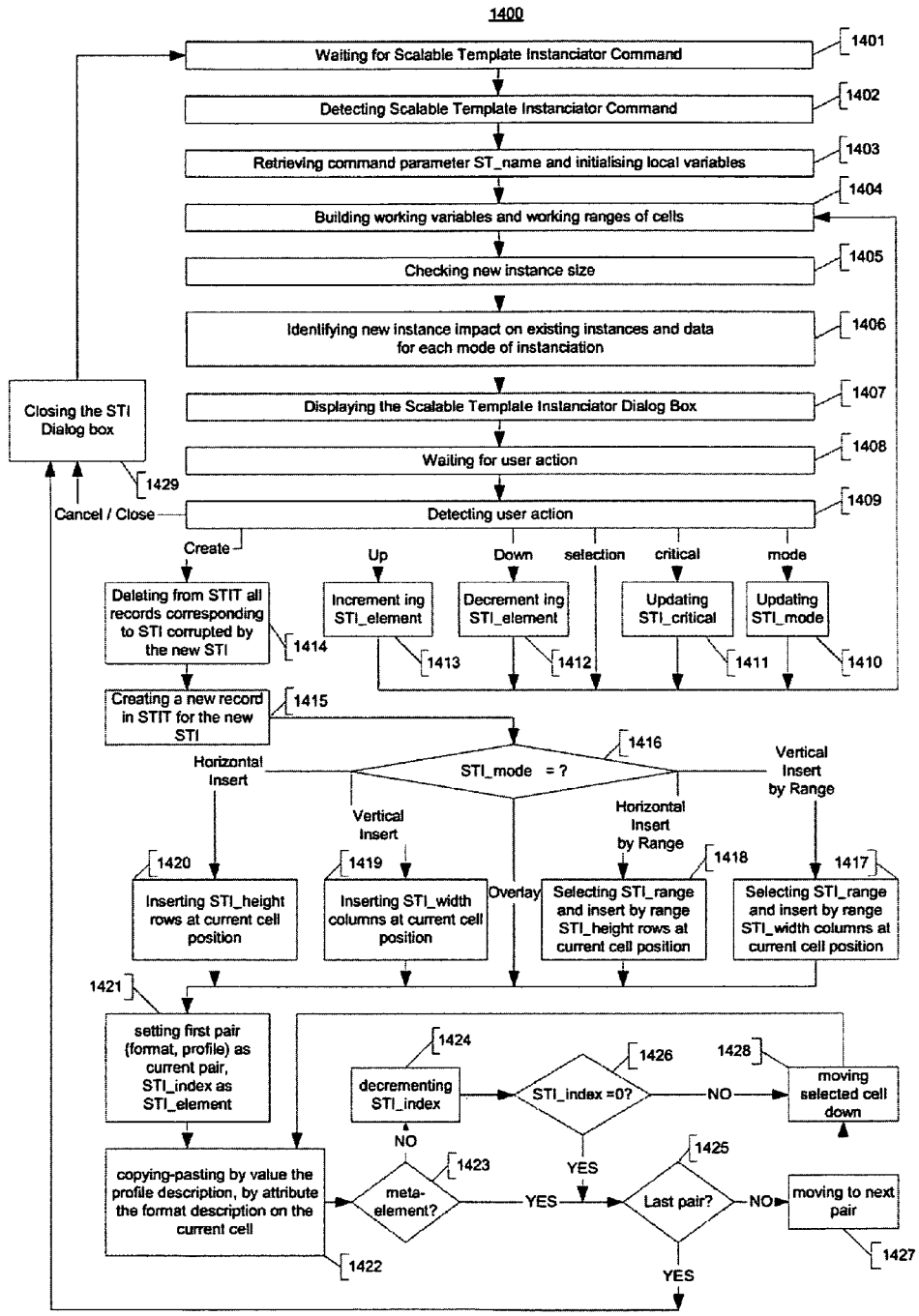
FIG. 14 is a flow chart illustrating a preferred method for creating scalable template instances according to a preferred embodiment of the present invention.

The method for creating a scalable template instance abiding by a defined scalable template used in the preferred embodiment of the present invention is summarised in flowchart 1400 of FIG. 14. This method can be seen as the processing of the Scalable Template Instanciator command.

At step 1401, the method is in its default state, waiting for an event to initiate the process.

At step 1402, the Scalable Template Instanciator command is detected, as a result of a user action. This action can be for instance a specific combination of key on the keyboard 104, or the click of the pointing device 105 on a specific button, or any other similar means not further specified here.

At step 1403, the command parameter ST_name is first retrieved: it corresponds to the name of the scalable template that the scalable template instance to be created will abide by. This parameter ST_name is used to parse the STT table 720 in order to find the record 721 whose "Name" field 722 matches the parameter ST_name. Once this record 721 is found, its fields "Min Element #" 725 and "Max Element #" 726 are respectively memorized as local variables STI_min and STI_max. Then its field "Description Ptr" 724 is used to determine, according to the referenced STDT table 760, the number of meta-elements defined within the scalable template, and the number of cells defined within each element or meta-element member of the scalable template. The first number is memorized in a local variable STI_meta, and the second number is memorized in a local variable STI_width 1325 (representing the number of columns of the future scalable template instance).

Then another local variable STI_element is initialised with the value taken by STI_min.

Then another local variable STI_critical is initialised with the default value "YES".

Then another local variable STI_sheet_width 1321 is initialised with the total number of columns in the current sheet 1320.

Then another local variable STI_sheet_height 1322 is initialised with the total number of rows in the current sheet 1320.

Then another local variable STI_mode is initialised with the value OVERLAY.

At step 1404, some other local variables are first built or updated. The position of the currently selected cell 1327 is first represented by the local variables STI_offset_width 1323 and STI_offset_height 1324 corresponding respectively to the number of columns and of rows between the top left cell of the current sheet 1320 and the currently selected cell 1327.

Then the number of rows of the future scalable template instance is represented by the local variable STI_height 1326, computed as the sum of the local variables STI_meta and STI_element.

Second some working ranges of cells are determined through the evaluation of their addresses.

The range of cells STI_range 1328 corresponding to the future scalable template instance is first determined as the range of cells with the currently selected cell 1327 as the top left cell, and with a number of rows and columns respectively equal to STI_height 1326 and STI_width 1325.

Then the range of cells STI_horizontal_flushed_range 1330 is determined as the range of cells sharing the same rows as STI_range 1328, and occupying the STI_width 1325 rightmost columns of the current sheet 1320.

Then the range of cells STI_horizontal_kept_range 1329 is determined as the range of cells sharing the same rows as STI_range 1328, and occupying the columns located between those of STI_range 1328 and STI_horizontal_flushed_range 1330.

Then the range of cells STI_vertical_flushed_range 1332 is determined as the range of cells sharing the same columns as STI_range 1328, and occupying the STI_height 1326 bottom columns of the current sheet 1320.

Then the range of cells STI_vertical_kept_range 1331 is determined as the range of cells sharing the same columns as STI_range 1328, and occupying the rows located between those of STI_range 1328 and STI_vertical_flushed_range 1332.

At step 1405, two sums are performed to check if the future scalable template instance will fit within the boundaries of the current sheet 1320.

If the sum of the local variables STI_offset_width 1323 and STI_width 1325 is found greater than the local variable STI_sheet_width 1321, then a local variable STI_too_wide is set to "YES"; otherwise it is set to "NO".

If the sum of the local variables STI_offset height 1324 and STI_height 1326 is found greater than the local variable STI_sheet_height 1322, then a local variable STI_too_high is set to "YES"; otherwise it is set to "NO".

At step 1406, several tests are performed to evaluate the potential impact of the creation of the future scalable template instance, according to the five possible instanciation modes, on any already existing scalable template instance or data. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

First the OVERLAY mode of instanciation is investigated.

If there exists at least one existing scalable template instance whose "Critical" field 755 takes the value "YES" and which partially overlaps the range of cells STI_range 1328, then the local test variable STI_overlay_critical takes the value "YES"; otherwise the local test variable STI_overlay critical takes the value "NO".

If there exists at least one existing scalable template instance whose "Critical" field 755 takes the value "NO" and which partially overlaps the range of cells STI_range 1328, then the local test variable STI_overlay_other takes the value "YES"; otherwise the local test variable STI_overlay_other takes the value "NO".

If all the cells within the range of cells STI_range 1328 are empty (containing none data), then the local test variable STI_overlay_data takes the value "NO"; otherwise the local test variable STI_overlay_data takes the value "YES".

Second the HORIZONTAL_INSERT mode of instanciation is investigated.

If there exists at least one existing scalable template instance whose "Critical" field 755 takes the value "YES" and which partially overlaps the range of cells made of the entire row where is located the currently selected cell 1327, or which partially overlaps the range of cells constituted by the last bottom STI_height 1326 rows, or which is included in the range of cells constituted by the last bottom STI_height 1326 rows, then the local test variable STI_horizontal_critical takes the value "YES"; otherwise the local test variable STI_horizontal_critical takes the value "NO".

If there exists at least one existing scalable template instance whose "Critical" field 755 takes the value "NO" and which partially overlaps the range of cells made of the entire row where is located the currently selected cell 1327, or which partially overlaps the range of cells constituted by the last bottom STI_height 1326 rows, or which is included in the range of cells constituted by the last bottom STI_height 1326 rows, then the local test variable STI_horizontal_other takes the value "YES"; otherwise the local test variable STI_horizontal_other takes the value "NO".

If all the cells within the range of cells constituted by the last bottom STI_height 1326 rows are empty (containing none data), then the local test variable STI_horizontal_data takes the value "NO"; otherwise the local test variable STI_horizontal_data takes the value "YES".

Third the HORIZONTAL_INSERT_BY_RANGE mode of instanciation is investigated.

If there exists at least one existing scalable template instance whose "Critical" field 755 takes the value "YES" and which partially overlaps the range of cells constituted by the concatenation of the two ranges of cells STI_range 1328 and STI_vertical_kept_range 1331, or which partially overlaps the range of cells STI_vertical_flushed_range 1332, or which is included in the range of cells STI_vertical_flushed_range 1332, then the local test variable STI_horizontal_range_critical takes the value "YES"; otherwise the local test variable STI_horizontal_range_critical takes the value "NO".

If there exists at least one existing scalable template instance whose "Critical" field 755 takes the value "NO" and which partially overlaps the range of cells constituted by the concatenation of the two ranges of cells STI_range 1328 and STI_vertical_kept_range 1331, or which partially overlaps the range of cells STI_vertical_flushed_range 1332, or which is included in the range of cells STI_vertical_flushed_range 1332, then the local test variable STI_horizontal_range_other takes the value "YES"; otherwise the local test variable STI_horizontal_range_other takes the value "NO".

If all the cells within the range of cells STI_vertical_flushed_range 1332 are empty (containing none data), then the local test variable STI_horizontal_range_data takes the value "NO"; otherwise the local test variable STI_horizontal_range_data takes the value "YES".

Fourth the VERTICAL_INSERT mode of instanciation is investigated.

If there exists at least one existing scalable template instance whose "Critical" field 755 takes the value "YES" and which partially overlaps the range of cells made of the entire column where is located the currently selected cell 1327, or which partially overlaps the range of cells constituted by the last right STI_width 1325 columns, or which is included in the range of cells constituted by the last right STI_width 1325 columns, then the local test variable STI_vertical_critical takes the value "YES"; otherwise the local test variable STI_vertical_critical takes the value "NO".

If there exists at least one existing scalable template instance whose "Critical" field 755 takes the value "NO" and which partially overlaps the range of cells made of the entire column where is located the currently selected cell 1327, or which partially overlaps the range of cells constituted by the last right STI_width 1325 columns, or which is included in the range of cells constituted by the last right STI_width 1325 columns, then the local test variable STI_vertical_other takes the value "YES"; otherwise the local test variable STI_vertical_other takes the value "NO".

If all the cells within the range of cells constituted by the last right STI_width 1325 columns are empty (containing no data), then the local test variable STI_vertical_data takes the value "NO"; otherwise the local test variable STI_vertical_data takes the value "YES".

Fifth the VERTICAL_INSERT_BY_RANGE mode of instanciation is investigated.

If there exists at least one existing scalable template instance whose "Critical" field 755 takes the value "YES" and which partially overlaps the range of cells constituted by the concatenation of the two ranges of cells STI_range 1328 and STI_horizontal_kept_range 1329, or which partially overlaps the range of cells STI_horizontal_flushed_range 1330, or which is included in the range of cells STI_horizontal_flushed_range 1330, then the local test variable STI_vertical_range_critical takes the value "YES"; otherwise the local test variable STI_vertical_range_critical takes the value "NO".

If there exists at least one existing scalable template instance whose "Critical" field 755 takes the value "NO" and which partially overlaps the range of cells constituted by the concatenation of the two ranges of cells STI_range 1328 and STI_horizontal_kept_range 1329, or which partially overlaps the range of cells STI_horizontal_flushed_range 1330, or which is included in the range of cells STI_horizontal_flushed_range 1330, then the local test variable STI_vertical_range_other takes the value "YES"; otherwise the local test variable STI_vertical_range_other takes the value "NO".

If all the cells within the range of cells STI_horizontal_flushed_range 1330 are empty (containing none data), then the local test variable STI_vertical_range_data takes the value "NO"; otherwise the local test variable STI_vertical_range_data takes the value "YES".

At step 1407, the Scalable Template Instanciator Dialog Box 1300 is displayed on the display device 106. The "Critical" check box 1314 displays a check mark if the local variable STI_critical takes the value "YES"; otherwise (value "NO"), the "Critical" check box 1314 is kept with a blank empty display. The label box 1315 is initialised with the value of the local variable ST_name. The text box 1312 is filled with the value of the local variable STI_element. The label box 1311 is filled with the value of the local variable STI_too_wide and the label box 1310 is filled with the value of the local variable STI_too_high. The 15 label boxes 1304 are filled row after row, starting with the top row, from the left to the right, with the values of the following local variables in the following order: STI_overlay_critical, STI_overlay_other, STI_overlay_data, STI_horizontal_critical, STI_horizontal_other, STI_horizontal_data, STI_horizontal_range_critical, STI_horizontal_range_other, STI_horizontal_range_data, STI_vertical_critical, STI_vertical_other, STI_vertical_data, STI_vertical_range_critical, STI_vertical_range_other, STI_vertical_range_data.

Then if the local variable STI_mode takes the respective value OVERLAY, or HORIZONTAL_INSERT, or HORIZONTAL_

INSERT_BY_RANGE, or VERTICAL_INSERT, or VERTICAL_INSERT_BY_RANGE, then the option button "Overlay" 1309, or "Horizontal Insert" 1308, or "Horizontal Insert by Range" 1307, or "Vertical Insert" 1306, or "Vertical Insert by Range" 1305 displays alone a black point. Finally the "Create" push-button 1303 is disabled as soon as one of the following local variables takes the value "YES": STI_too_wide, STI_too_high, STI_overlay_critical (only taken into account if the local variable STI_mode is equal to OVERLAY), STI_horizontal_critical (only taken into account if the local variable STI_mode is equal to HORIZONTAL_INSERT), STI_vertical_critical (only taken into account if the local variable STI_mode is equal to VERTICAL_INSERT), STI_horizontal_range_critical (only taken into account if the local variable STI_mode is equal to HORIZONTAL_INSERT_BY_RANGE), STI_vertical_range_critical (only taken into account if the local variable STI_mode is equal to VERTICAL_INSERT_BY_RANGE); otherwise the "Create" push-button 1303 is enabled.

At step 1408, the method is waiting for any user action on the Scalable Template Instanciator Dialog Box 1300, or on any change of the currently selected cell. Such user action is typically resulting from a click with the pointing device 105, but take other similar forms such as, but not limited to a specific combination of key on the keyboard 104, or any other similar means not further specified here.

At step 1409, a user action on the Scalable Template Instanciator Dialog Box 1300, or a change of the currently selected cell is detected.

If the user action is a click on the "Create" push-button 1303, then control is given to step 1414;

if the user action is a click on the upper part of the spin button 1313, then control is given to step 1413;

if the user action is a click on the lower part of the spin button 1313, then control is given to step 1412;

if the user action is a click on the "Critical" check box 1314, then control is given to step 1411;

if the user action is a click on one of the option buttons 1309, or 1308, or 1307, or 1306, or 1305, then control is given to step 1410;

if the user action is a click on the "Cancel" push-button 1302, or on the closing-window push-button 1301, then control is given to step 1429;

finally if the user action is a change in the position of the currently selected cell, then control is given to step 1404.

At step 1410, the local variable STI_mode takes the value OVERLAY, or HORIZONTAL_INSERT, or HORIZONTAL_INSERT_BY_RANGE, or VERTICAL_INSERT, or VERTICAL_INSERT_BY_RANGE if the spreadsheet user has respectively cliked with the pointing device 105 on the option button 1309, or 1308, or 1307, or 1306, or 1305. Then control is given to step 1404.

At step 1411, the local variable STI_critical is updated in order to swap between the values "YES" and "NO". Then control is given to step 1404.

At step 1412, the local variable STI_element is decremented by 1 (one), as long as its value remains greater than or equal to the value of the local variable STI_min. Then control is given to step 1404.

At step 1413, the local variable STI_element is incremented by 1 (one), as long as its value remains less than or equal to the value of the local variable STI_max. Then control is given to step 1404.

At step 1414, the STIT table 750 is visited to remove from it every record 751 corresponding to a scalable template instance corrupted by the introduction of the new instance, as identified during the step 1406 for the insertion mode represented by the local variable STI_mode. Then the EFT, EPT and STT tables 700, 710 and 720 must be potentially updated to reflect any possible change in the way formats, or profiles, or scalable templates are referenced, resulting from the removal of scalable template instances. This process, described hereafter, will be referred to as the "Reference Housekeeping Process".

For each such removed scalable template instance, the associated record 751 within the STIT table 750 contains a "ST" field 753 which identifies the associated scalable template. If there is not other remaining record 751 in the STIT table 750 sharing the same value of the "ST" field 753 as the one of the removed record 751, and whose "Address" field 752 differs from the value "CLIPBOARD", then it means that the removed scalable template instance was the last one abiding by its associated scalable template. In this case, this "ST" field 753 is used to scan the STT table 720 for identifying a record 721 whose "Name" field 722 is equal to the "ST" field 753, and then to set within this found record 721 the "REFERENCED" attribute 729 of the "Type" field 727 to the value NONE. Then in this same case, the scalable template STDT table 760 pointed by the "Description Ptr" field 724 within this found record 721 of the STT table 720 must be scanned to determine if the removed scalable template instance was the last one referencing any of the associated format or profile. For each name found in this STDT table 760 (referred to as STI_removed_name either for a format name as found in the column 765, or for a profile name as found in the column 764), the STIT table 750 is scanned to identify any other record 751 whose "Address" field 752 differs from the value "CLIPBOARD" and whose "ST" field 753 specifies another scalable template name whose associated record 721 in the STT table 720 (with "Name" field 722 matching this "ST" field 753) comprises a "Description Ptr" field 724 pointing to another STDT table 760 where the same name STI_removed_name is specified. If no other record 751 matching this criteria is found in the STIT table 750, then it means that this object (either a format or a profile) is no longer referenced in an existing scalable template instance. If this object is a format name, then the EFT table 700 is scanned to first identify the record 701 whose "Name" field 702 matches this format name STI_removed_name, and then when found the "REFERENCED" attribute 709 of the "Type" field 707 within this found record 701 is set to the value TEMPLATE. If this object is a profile name, then the EPT table 710 is scanned to first identify the record 711 whose "Name" field 712 matches this profile name STI_removed_name, and then when found the "REFERENCED" attribute 719 of the "Type" field 717 within this found record 711 is set to the value TEMPLATE. Then for each name STI_removed_name, the STT table 720 is scanned to identify a record 721 whose "Description_Ptr" field 724 points to a STDT table 760 containing this name STI_removed_name. If no record 721 matching this criteria is found in the STT table 720, then it means that this object (either a format or a profile) is no longer referenced in an existing scalable template. If this object is a format name, then the EFT table 700 is scanned to first identify the record 701 whose "Name" field 702 matches this format name STI_removed_name, and then when found the "REFERENCED" attribute 709 of the "Type" field 707 within this found record 701 is set to the value NONE. If this object is a profile name, then the EPT table 710 is scanned to first identify the record 711 whose "Name" field 712 matches this profile name STI_removed_name, and then when found the "REFERENCED" attribute 719 of the "Type" field 717 within this found record 711 is set to the value NONE. All these operations are repeated for each removed scalable template instance and constitute the "Reference Housekeeping Process".

At step 1415, a new record 751 is introduced in the STIT table 750. Within this record 751, the "Address" field 752 is initialised with the address of the range of cells STI_range 1328, the "ST" field 753 is initialised with the value of the local variable ST_name, the "Element #" field 754 is initialised with the value of the local variable STI_element, the "Critical" field 755 is initialised with the value of the local variable STI_critical, the "Header Size" field 756 is initialised with the number of meta-elements constituting the header part of the new scalable template instance (this number being equal to the number of pairs in the header part 767 of the STDT table 760 associated to the scalable template that the new scalable template instance will abide by), and the "Footer Size" field 757 is initialised with the number of meta-elements constituting the footer part of the new scalable template instance (this number being equal to the number of pairs in the footer part 766 of the STDT table 760 associated to the scalable template abided by the new scalable template instance). Then the STT table 720 is scanned to identify the record 721 whose "Name" field is found equal to the local variable ST_name. Once found, the "REFERENCED" attribute 729 within the "Type" field 727 of this record 721 is set to the value INSTANCE.

At step 1416 a test is performed to check the value of the local variable STI_mode.
  If this value is found equal to OVERLAY then control is given to step 1421,
  If this value is found equal to HORIZONTAL_INSERT then control is given to step 1420,
  If this value is found equal to HORIZONTAL_INSERT_BY_RANGE then control is given to step 1418,
  If this value is found equal to VERTICAL_INSERT then control is given to step 1419,
  If this value is found equal to VERTICAL_INSERT_BY_RANGE then control is given to step 1417.

At step 1417, the range of cells STI_range 1328 is selected to become the currently selected range of cells, with the currently selected cell being kept in its former position 1327 and then a regular operation of "column insertion within selected range" is performed. Then control is given to step 1421.

At step 1418, the range of cells STI_range 1328 is selected to become the currently selected range of cells, with the currently selected cell being kept in its former position 1327 and then a regular operation of "row insertion within selected range" is performed. Then control is given to step 1421.

At step 1419, the range of cells STI_range 1328 is selected to become the currently selected range of cells, with the currently selected cell being kept in its former position 1327 and then a regular operation of "column insertion" is performed. Then control is given to step 1421.

At step 1420, the range of cells STI_range 1328 is selected to become the currently selected range of cells, with the currently selected cell being kept in its former position 1327 and then a regular operation of "row insertion" is performed. Then control is given to step 1421.

At step 1421, a local variable STI_index is initialised to the value taken by the local variable STI_element. Then the STT table 720 is parsed to identify the record 721 whose "Name" field 722 matches the value of the local variable ST_name. Within this record 721 is retrieved the "Description Ptr" field 724 allowing to locate in memory the STDT table 760 associated to the scalable template that the new scalable template instance to be created will abide by. Then the first pair 761 of element or meta-element format name and element or meta-element profile name found within this STDT table 760 is set as the current pair of names: (format name, profile name). Then the EFT table 700 is visited to identify the corresponding record 701 whose "Name" field 702 matches this element or meta-element format name. Once found, the "REFERENCED" attribute 709 of the "Type" field 707 of this record 701 is set to the value INSTANCE. Then the EPT table 710 is visited to identify the corresponding record 711 whose "Name" field 712 matches this element or meta-element profile name. Once found, the "REFERENCED" attribute 719 of the "Type" field 717 of this record 711 is set to the value INSTANCE.

At step 1422, the EPT table 710 is parsed to find the record 711 whose "Name" field 712 is found equal to the profile name within the current pair. Once this record 711 is found, its "Description Ptr" field 714 is retrieved to locate in memory the range of cells illustrating the profile. This description of the profile is copy-pasted by value only onto the currently selected cell, so that the corresponding row within the STI_range receives the profile initial values. Then the EFT table 700 is parsed to find the record 701 whose "Name" field 702 is found equal to the format name within the current pair. Once this record 701 is found, its "Description Ptr" field 704 is retrieved to locate in memory the range of cells illustrating the format. This description of the profile is copy-pasted by attribute only onto the currently selected cell, so that the corresponding row within the STI_range receives the format attributes.

At step 1423 a test is performed to check if the current pair (format name, profile name) corresponds to an element or to a meta-element. In the first case, control is given to step 1424, and in the second case control is given to step 1425.

At step 1424, the local variable STI_index is decremented by 1 (one). Then control is given to step 1426.

At step 1425, a test is performed to check if the current pair (format name, profile name) is the last one 763 within the STDT table 760. If it is the case, the control is given to step 1429, otherwise control is given to step 1427.

At step 1426, a test is performed to check if the local variable STI_index is equal to 0 (zero). If it is the case, then control is given to step 1425, otherwise control is given to step 1428.

At step 1427, the pair of names (format name, profile name) following the current one in the STDT table 760 becomes the current pair of names. Then the EFT table 700 is visited to identify the corresponding record 701 whose "Name" field 702 matches this element or meta-element format name. Once found, the "REFERENCED" attribute 709 of the "Type" field 707 of this record 701 is set to the value INSTANCE. Then the EPT table 710 is visited to identify the corresponding record 711 whose "Name" field 712 matches this element or meta-element profile name. Once found, the "REFERENCED" attribute 719 of the "Type" field 717 of this record 711 is set to the value INSTANCE.

At step 1428, the currently selected cell is moved downwards by one row. Then control is given to step 1422.

At step 1429, the Scalable Template Instanciator Dialog Box 1300 is closed so that it disappears from the display device 106. Finally control is given back to the initial step 1401 for processing any future Scalable Template Instanciator command.

E6. Scalable Template Instance Insertion Manager method

Figure 15:
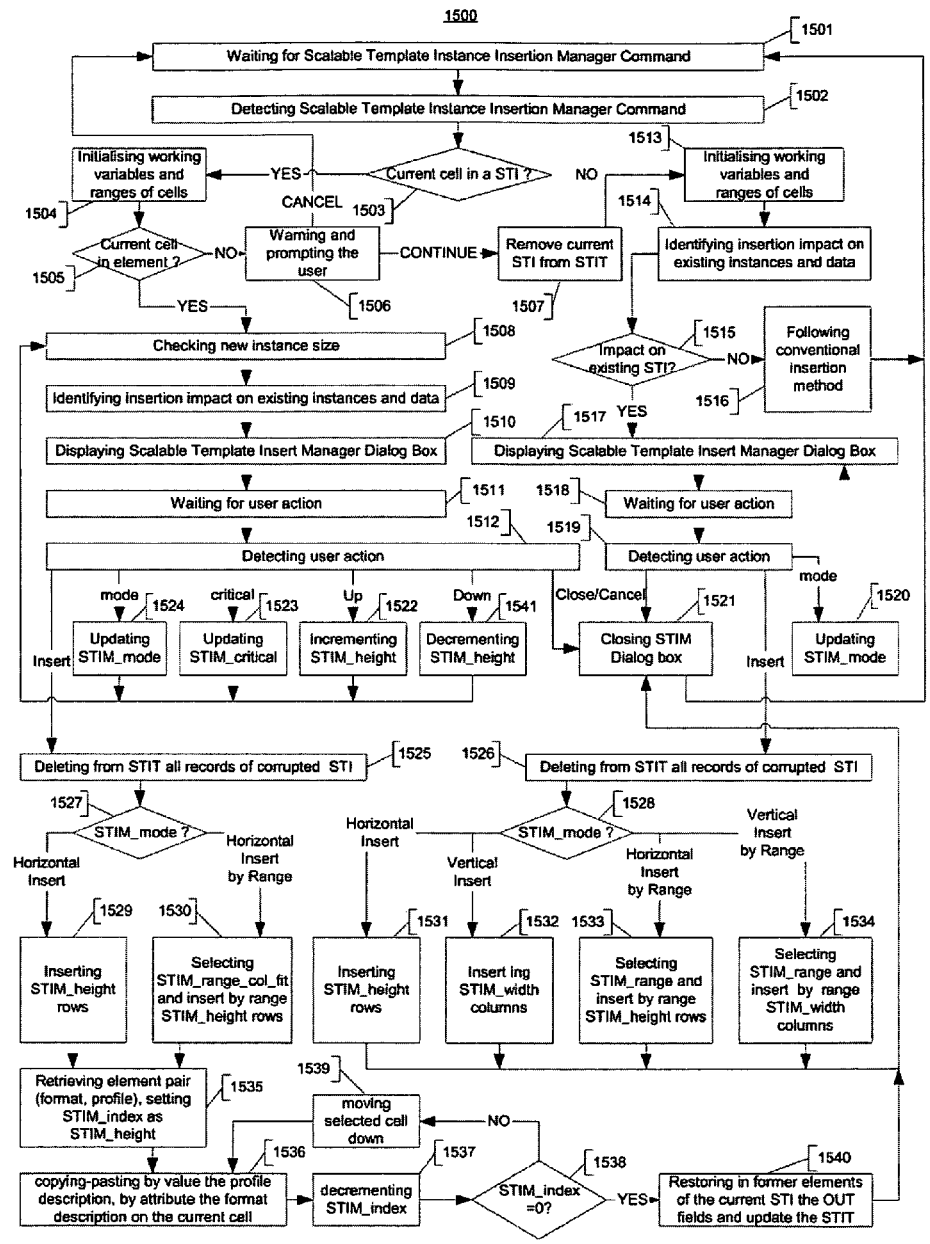
FIG. 15 is a flow chart illustrating a preferred method for managing insertion in scalable template instances according to a preferred embodiment of the present invention.

The method for changing an existing scalable template instance by introducing new elements used in the preferred embodiment of the present invention is summarised in flowchart 1500 of FIG. 15. This method can be seen as the processing of the Scalable Template Instance Insertion Manager command.

At step 1501, the method is in its default state, waiting for an event to initiate the process.

At step 1502, the Scalable Template Instance Insertion Manager command is detected, as a result of a user action. This action can be for instance:
a specific combination of key on the keyboard 104, or
the click of the pointing device 105 on a specific button or menu entry or sub-menu entry, or
any other similar means not further specified here.

When the Scalable Template Instance Insertion Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 1503, a test is performed to check if the currently selected cell is located within an existing scalable template instance. This test is performed by parsing the STIT table 750 and visiting in each record 751 the "Address" field 752 to determine if the range of cells address specified in this field does include the address of the individual currently selected cell 1707. If it is the case, then the currently selected cell 1707 is contained in a scalable template instance named STIM_instance_range 1713 and control is given to step 1504; otherwise control is given to step 1513.

At step 1504, the record 751 found at the step 1503 is first retrieved to initialise local variables from its fields describing the scalable template instance STIM_instance_range 1713:
the local variable ST_name is initialised with the value of the field "ST" 753;
the local variable STIM_element is initialised with the value of the "Element #" field 754;
the local variable STIM_critical is initialised with the value of the "Critical" field 755;
the local variable STIM_header size is initialised with the value of the "Header Size" field 756;
the local variable STIM_footer size is initialised with the value of the "Footer Size" field 757;

Then the local variable ST_name is used to parse the STT table 720 in order to find the record 721 whose "Name" field 722 matches the parameter ST_name. Once this record 721 is found, its field "Max Element #" 726 is memorized as the local variable STIM_max. Then another local variable STIM_sheet_width 1701 is initialised with the total number of columns in the current sheet 1700. Then another local variable STIM_sheet_height 1702 is initialised with the total number of rows in the current sheet 1700. Then another local variable STIM_mode is initialised with the value HORIZONTAL_INSERT. Then the position of the currently selected cell 1707 is used to initialise the local variable STIM_range_offset_height 1709 corresponding to the number of rows between the top left cell of the current sheet 1700 and the currently selected cell 1707. Then the number of rows of the currently selected range of cells STIM_range 1708 is represented by the local variable STIM_height 1706. Then the position of the top left cell of the range of cells STIM_instance_range 1713 is first represented by the local variables STIM_offset width 1703 and STIM_offset_height 1704 corresponding respectively to the number of columns and of rows between the top left cell of the current sheet 1320 and the top left cell of the range of cells STIM_instance_range 1713.

Then the range of cells STIM_vertical_flushed_range 1712 is determined as the range of cells sharing the same columns as STIM_instance_range 1713, and occupying the STIM_height 1706 bottom columns of the current sheet 1700. Then the range of cells STIM_vertical_kept_range 1711 is determined as the range of cells sharing the same columns as STIM_instance_range 1713, and occupying the rows located between those of STIM_instance_range 1713 and STIM_vertical_flushed_range 1712.

At step 1505, a test is performed to test if the currently selected cell 1707 is located either within the header part or the footer part of the current scalable template instance, or within an element of the current scalable template instance. If the sum of the local variables STIM_offset_height 1704 and STIM_header_size is less than or equal to the local variable STIM_range_offset_height 1709 and if the local variable STIM_range_offset_height 1709 is less than or equal to the sum of the local variables STIM_offset_height 1704, STIM_header_size, and STIM_element, then the currently selected cell 1707 is outside the header and footer parts of the current scalable template instance and control is given to step 1508; otherwise control is given to step 1506.

At step 1506, a warning message notification is issued for informing the user that the current scalable template instance may be corrupted if the insertion operation is pursued. This can typically be done by displaying on the display device 106 a warning message in a pop-up window, or in a status bar area, but any other similar means could be used instead, without departing from the spirit of the invention. Then the user is prompted to either cancel the current "Insertion" operation, or to pursue it. This can typically be done by displaying on the display device 106 a prompting message in a pop-up window, but any other similar means could be used instead, without departing from the spirit of the invention. Once the user has made his choice through conventional means such as clicking with the pointing device 105 on an "Cancel" or "Continue" push-button present within a prompting message pop-up window, or any other similar means without departing from the spirit of the invention, control is given to step 1501 if the spreadsheet user decision is to cancel the operation, or to step 1507 if the spreadsheet user decision is to continue the operation.

At step 1507, the STIT table 750 is visited to remove from it the record 751 corresponding to the current scalable template instance identified at step 1503 and containing the currently selected cell 1707. Then the "Reference Housekeeping Process", as described in step 1414 of the Scalable Template Instanciator method, is executed, before giving control to step 1508.

At step 1508, two sums are performed to check if the insertion within the current scalable template instance will fit within the boundaries of the current sheet 1700 and within the maximum size of the scalable template instance.

If the sum of the local variables STIM_height 1706 and STIM_element is found greater than the local variable STIM_max, then a local variable STIM_too high is set to "YES"; otherwise it is set to "NO".

If the sum of the local variables STIM_offset_height 1704 and STIM_header_size and STIM_element and STIM_footer_size and STIM_height 1706 is found greater than the local variable STIM_sheet_height 1702, then a local variable STIM_too_high is set to "YES"; otherwise it is set to "NO".

At step 1509, several tests are performed to evaluate the potential impact of the insertion, according to two possible insertion modes, on any already existing scalable template instance or data. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

First the HORIZONTAL_INSERT mode of instanciation is investigated.

If there exists at least one existing scalable template instance whose "Critical" field 755 takes the value "YES" and which partially overlaps the range of cells made of the entire row where is located the currently selected cell 1707, or which partially overlaps the range of cells constituted by the last bottom STIM_height 1706 rows, or which is included in the range of cells constituted by the last bottom STIM_height 1706 rows, then the local test variable STIM_horizontal_critical takes the value "YES"; otherwise the local test variable STIM_horizontal_critical takes the value "NO".

If there exists at least one existing scalable template instance whose "Critical" field 755 takes the value "NO" and which partially overlaps the range of cells made of the entire row where is located the currently selected cell 1707, or which partially overlaps the range of cells constituted by the last bottom STIM_height 1706 rows, or which is included in the range of cells constituted by the last bottom STIM_height 1706 rows, then the local test variable STIM_horizontal_other takes the value "YES"; otherwise the local test variable STIM_horizontal other takes the value "NO".

If all the cells within the range of cells constituted by the last bottom STIM_height 1706 rows are empty (containing none data), then the local test variable STIM_horizontal_data takes the value "NO"; otherwise the local test variable STIM_horizontal_data takes the value "YES".

Second the HORIZONTAL_INSERT_BY_RANGE mode of instanciation is investigated.

If there exists at least one existing scalable template instance whose "Critical" field 755 takes the value "YES" and which partially overlaps the range of cells constituted by the concatenation of the range of cells STIM_vertical_kept_range 1711 with the range of cells which is derived from the range of cells STIM_instance_range 1713 by removing the rows above the currently selected cell 1707, or which partially overlaps the range of cells STIM_vertical_flushed_range 1712, or which is included in the range of cells STIM_vertical_flushed_range 1712, then the local test variable STIM_horizontal_range_critical takes the value "YES"; otherwise the local test variable STIM_horizontal_range_critical takes the value "NO".

If there exists at least one existing scalable template instance whose "Critical" field 755 takes the value "NO" and which partially overlaps the range of cells constituted by the concatenation of the range of cells STIM_vertical kept_range 1711 with the range of cells which is derived from the range of cells STIM_instance_range 1713 by removing the rows above the currently selected cell 1707, or which partially overlaps the range of cells STIM_vertical_flushed_range 1712, or which is included in the range of cells STIM_vertical_flushed_range 1712, then the local test variable STIM_horizontal_range_other takes the value "YES"; otherwise the local test variable STIM_horizontal_range_other takes the value "NO".

If all the cells within the range of cells STIM_vertical_flushed_range 1712 are empty (containing none data), then the local test variable STIM_horizontal_range_data takes the value "NO"; otherwise the local test variable STIM_horizontal_range_data takes the value "YES".

At step 1510, the Scalable Template Insert Manager Dialog Box 1600 is displayed on the display device 106. The "Critical" check box 1610 displays a check mark if the local variable STIM_critical takes the value "YES"; otherwise (value "NO"), the "Critical" check box 1610 is kept with a blank empty display. The label box 1611 is initialised with the value of the local variable ST_name. The text box 1608 is filled with the value of the local variable STIM_height 1706. The label box 1607 is filled with the value of the local variable STIM_too high. The 6 label boxes 1604 are filled row after row, starting with the top row, from the left to the right, with the values of the following local variables in the following order:
STIM_horizontal_critical,
STIM_horizontal_other,
STIM_horizontal_data,
STIM_horizontal_range_critical,
a STIM_horizontal_range_other,
STIM_horizontal_range_data.

Then if the local variable STIM_mode takes the respective value HORIZONTAL_INSERT, or HORIZONTAL_INSERT_BY_RANGE, then the option button 1606, or 1605 displays alone a black point.

Finally the "Insert" push-button 1603 is disabled as soon as one of the following local variables takes the value "YES": STIM_too_high, STIM_horizontal_critical (only taken into account if the local variable STIM_mode is equal to HORIZONTAL_INSERT), STIM_horizontal_range_critical (only taken into account if the local variable STIM_mode is equal to HORIZONTAL_INSERT_BY_RANGE); otherwise the "Insert" push-button 1603 is enabled.

At step 1511, the method is waiting for any user action on the Scalable Template Insert Manager Dialog Box 1600. Such user action is typically resulting from a click with the pointing device 105, but take other similar forms such as, but not limited to a specific combination of key on the keyboard 104, or any other similar means not further specified here.

At step 1512, a user action on the Scalable Template Insert Manager Dialog Box 1600 is detected.

If the user action is a click on the "Insert" push-button 1603, then control is given to step 1525;

if the user action is a click on the upper part of the spin button 1609, then control is given to step 1522;

if the user action is a click on the lower part of the spin button 1609, then control is given to step 1541;

if the user action is a click on the "Critical" check box 1610, then control is given to step 1523;

if the user action is a click on one of the option buttons 1606, or 1605, then control is given to step 1524;

if the user action is a click on the "Cancel" push-button 1602, or on the closing-window push-button 1601, then control is given to step 1521.

At step 1513, the local variable STIM_sheet_width 1741 is initialised with the total number of columns in the current sheet 1740. Then another local variable STIM_sheet_height 1742 is initialised with the total number of rows in the current sheet 1740. Then another local variable STIM_mode is initialised with the value HORIZONTAL_INSERT. Then the number of rows and of columns of the currently selected range of cells STIM_range 1748 is represented respectively by the local variables STIM_height 1746 and STIM_width 1745. Then the position of the currently selected cell 1747 is first represented by the local variables STIM_offset_width 1743 and STIM_offset_height 1744 corresponding respectively to the number of columns and of rows between the top left cell of the current sheet 1740 and the currently selected cell 1747. Then the range of cells STIM_vertical_flushed_range 1752 is determined as the range of cells sharing the same columns as STIM_range 1748, and occupying the STIM_height 1746 bottom columns of the current sheet 1740. Then the range of cells STIM_vertical_kept_range 1751 is determined as the range of cells sharing the same columns as STIM_range 1748, and occupying the rows located between those of STIM_range 1743 and STIM_vertical_flushed_range 1752. Then the range of cells STIM_horizontal_flushed_range 1750 is determined as the range of cells sharing the same rows as STIM_range 1748, and occupying the STIM_width 1745 rightmost columns of the current sheet 1740. Then the range of cells STIM_horizontal_kept_range 1749 is determined as the range of cells sharing the same rows as STIM_range 1748, and occupying the columns located between those of STIM_range 1748 and STIM_horizontal_flushed_range 1750.

At step 1514, several tests are performed to evaluate the potential impact of the insertion, according to four possible insertion modes, on any already existing scalable template instance or data. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

First the HORIZONTAL_INSERT mode of insertion is investigated.

If there exists at least one existing scalable template instance whose "Critical" field 755 takes the value "YES" and which partially overlaps the range of cells made of the entire row where is located the currently selected cell 1747, or which partially overlaps the range of cells constituted by the last bottom STIM_height 1746 rows, or which is included in the range of cells constituted by the last bottom STIM_height 1746 rows, then the local test variable STIM_horizontal_critical takes the value "YES"; otherwise the local test variable STIM_horizontal_critical takes the value "NO".

If there exists at least one existing scalable template instance whose "Critical" field 755 takes the value "NO" and which partially overlaps the range of cells made of the entire row where is located the currently selected cell 1747, or which partially overlaps the range of cells constituted by the last bottom STIM_height 1746 rows, or which is included in the range of cells constituted by the last bottom STIM_height 1746 rows, then the local test variable STIM_horizontal_other takes the value "YES"; otherwise the local test variable STIM_horizontal_other takes the value "NO".

If all the cells within the range of cells constituted by the last bottom STIM_height 1746 rows are empty (containing none data), then the local test variable STIM_horizontal_data takes the value "NO"; otherwise the local test variable STIM_horizontal_data takes the value "YES".

Second the HORIZONTAL_INSERT_BY_RANGE mode of insertion is investigated. If there exists at least one existing scalable template instance whose "Critical" field 755 takes the value "YES" and which partially overlaps the range of cells constituted by the concatenation of the two ranges of cells STIM_range 1748 and STIM_vertical kept_range 1751, or which partially overlaps the range of cells STIM_vertical_flushed_range 1752, or which is included in the range of cells STIM_vertical_flushed_range 1752, then the local test variable STIM_horizontal_range_critical takes the value "YES"; otherwise the local test variable STIM_horizontal_range_critical takes the value "NO".

If there exists at least one existing scalable template instance whose "Critical" field 755 takes the value "NO" and which partially overlaps the range of cells constituted by the concatenation of the two ranges of cells STIM_range 1748 and STIM_vertical_kept_range 1751, or which partially overlaps the range of cells STIM_vertical_flushed_range 1752, or which is included in the range of cells STIM_vertical_flushed_range 1752, then the local test variable STIM_horizontal_range_other takes the value "YES"; otherwise the local test variable STIM_horizontal_range_other takes the value "NO".

If all the cells within the range of cells STIM_vertical_flushed_range 1752 are empty (containing none data), then the local test variable STIM_horizontal_range_data takes the value "NO"; otherwise the local test variable STIM_horizontal_range_data takes the value "YES".

Third the VERTICAL_INSERT mode of insertion is investigated.

If there exists at least one existing scalable template instance whose "Critical" field 755 takes the value "YES" and which partially overlaps the range of cells made of the entire column where is located the currently selected cell 1747, or which partially overlaps the range of cells constituted by the last right STIM_width 1745 columns, or which is included in the range of cells constituted by the last right STIM_width 1745 columns, then the local test variable STIM_vertical_critical takes the value "YES"; otherwise the local test variable STIM_vertical_critical takes the value "NO".

If there exists at least one existing scalable template instance whose "Critical" field 755 takes the value "NO" and which partially overlaps the range of cells made of the entire column where is located the currently selected cell 1747, or which partially overlaps the range of cells constituted by the last right STIM_width 1745 columns, or which is included in the range of cells constituted by the last right STIM_width 1745 columns, then the local test variable STIM_vertical_other takes the value "YES"; otherwise the local test variable STIM_vertical_other takes the value "NO".

If all the cells within the range of cells constituted by the last right STIM_width 1745 columns are empty (containing none data), then the local test variable STIM_vertical_data takes the value "NO"; otherwise the local test variable STIM_vertical data takes the value "YES".

Fourth the VERTICAL_INSERT_BY_RANGE mode of insertion is investigated.

If there exists at least one existing scalable template instance whose "Critical" field 755 takes the value "YES" and which partially overlaps the range of cells constituted by the concatenation of the two ranges of cells STIM_range 1748 and STIM_horizontal_kept_range 1749, or which partially overlaps the range of cells STIM_horizontal_flushed_range 1750, or which is included in the range of cells STIM_horizontal_flushed_range 1750, then the local test variable STIM_vertical_range_critical takes the value "YES"; otherwise the local test variable STIM_vertical_range_critical takes the value "NO".

If there exists at least one existing scalable template instance whose "Critical" field 755 takes the value "NO" and which partially overlaps the range of cells constituted by the concatenation of the two ranges of cells STIM_range 1748 and STIM_horizontal_kept_range 1749, or which partially overlaps the range of cells STIM_horizontal_flushed_range 1750, or which is included in the range of cells STIM_horizontal_flushed_range 1750, then the local test variable STIM_vertical_range_other takes the value "YES"; otherwise the local test variable STIM_vertical_range_other takes the value "NO".

If all the cells within the range of cells STIM_horizontal_flushed_range 1750 are empty (containing none data), then the local test variable STIM_vertical_range_data takes the value "NO"; otherwise the local test variable STIM_vertical_range_data takes the value "YES".

At step 1515, a test is performed to check the insertion impact on any existing scalable template instance, according to the values assigned during the step 1514 to the local variables STIM_horizontal_critical,
a STIM_horizontal_other,
a STIM_horizontal_range_critical,
STIM_horizontal_range_other,
STIM_vertical_critical,
STIM_vertical_other,
STIM_vertical range_critical,
STIM_vertical_range_other.

If none of these local variables takes the value "YES", then control is given to step 1516; otherwise if at least one of these local variables takes the value "YES", then control is given to step 1517.

At step 1516, the conventional insertion method as used and defined in conventional electronic spreadsheet environments is triggered, and then control is given back to the initial step 1501 for processing any future Scalable Template Instance Insertion Manager command.

At step 1517, the Scalable Template Insert Manager Dialog Box 1620 is displayed on the display device 106. The label box 1629 is initialised with the reserved value "None". The 12 label boxes 1624 are filled row after row, starting with the top row, from the left to the right, with the values of the following local variables in the following order:

STIM_horizontal_critical,
X STIM_horizontal_other,
STIM_horizontal_data,
a STIM_horizontal_range_critical,
STIM_horizontal_range_other,
STIM_horizontal_range_data,
STIM_vertical_critical,
STIM_vertical_other,
STIM_vertical_data,
STIM_vertical range_critical,
STIM_vertical_range_other,
STIM_vertical_range_data.

Then if the local variable STIM_mode takes the respective value HORIZONTAL_INSERT, or HORIZONTAL_INSERT_BY_RANGE, or VERTICAL_INSERT, or VERTICAL_INSERT_BY_RANGE, then the option button 1628, or 1627, or 1626, or 1625 displays alone a black point.

Finally the "Insert" push-button 1623 is disabled as soon as one of the following local variables takes the value "YES": STIM_horizontal_critical (only taken into account if the local variable STIM_mode is equal to HORIZONTAL_INSERT), STIM_vertical_critical (only taken into account if the local variable STIM_mode is equal to VERTICAL_INSERT), STIM_horizontal_range_critical (only taken into account if the local variable STIM_mode is equal to HORIZONTAL_INSERT_BY_RANGE), STIM_vertical_range_critical (only taken into account if the local variable STIM_mode is equal to VERTICAL_INSERT_BY_RANGE); otherwise the "Insert" push-button 1623 is enabled.

At step 1518, the method is waiting for any user action on the Scalable Template Insert Manager Dialog Box 1620. Such user action is typically resulting from a click with the pointing device 105, but take other similar forms such as, but not limited to a specific combination of key on the keyboard 104, or any other similar means not further specified here.

At step 1519, a user action on the Scalable Template Insert Manager Dialog Box 1620 is detected.

If the user action is a click on the "Insert" push-button 1623, then control is given to step 1526;

if the user action is a click on one of the option buttons 1628, or 1627, or 1626, or 1625, then control is given to step 1520;

if the user action is a click on the "Cancel" push-button 1622, or on the closing-window push-button 1621, then control is given to step 1521.

At step 1520, the local variable STIM_mode takes the value HORIZONTAL_INSERT, or HORIZONTAL_INSERT_BY_RANGE, or VERTICAL_INSERT, or VERTICAL_INSERT_BY_RANGE if the spreadsheet user has respectively clicked with the pointing device 105 on the option button 1628, or 1627, or 1626, or 1625. Then control is given to step 1517.

At step 1521, the Scalable Template Insert Manager Dialog Box 1600 or 1620 is closed so that it disappears from the display device 106. Finally control is given back to the initial step 1501 for processing any future Scalable Template Instance Insertion Manager command.

At step 1522, the local variable STIM_height 1706 is incremented by 1 (one), as long as the sum of its value with the value of the local variable STIM_element remains less than or equal to the value of the local variable STIM_max. If the increment has been done, then the currently selected range of cells STIM_range 1708 is enlarged by adding to the current selection a new row below the last one. Then control is given to step 1508.

At step 1523, the local variable STIM_critical is updated in order to swap between the values "YES" and "NO". Then the field "Critical" 755 within the record 751 of the STIT table 750, as found at step 1503 is updated with the value of the local variable STIM_critical. Then control is given to step 1508.

At step 1524, the local variable STIM_mode takes the value HORIZONTAL_INSERT, or HORIZONTAL_INSERT_BY_RANGE, if the spreadsheet user has respectively clicked with the pointing device 105 on the option button 1606, or 1605. Then control is given to step 1508.

At step 1525, the STIT table 750 is visited to remove from it every record 751 corresponding to a scalable template instance corrupted by the insertion of the new rows, as identified during the step 1509 for the insertion mode represented by the local variable STIM_mode. Each time such a record 751 has been removed from the STIT table 750, the "Reference Housekeeping Process", as described in step 1414 of the Scalable Template Instanciator method, is invoked and executed before looking for any other record 751 to be removed from the STIT table 750. Then control is given to the step 1527.

At step 1526, the STIT table 750 is visited to remove from it every record 751 corresponding to a scalable template instance corrupted by the insertion of the new rows, as identified during the step 1514 for the insertion mode represented by the local variable STIM_mode. Each time such a record 751 has been removed from the STIT table 750, the "Reference Housekeeping Process", as described in step 1414 of the Scalable Template Instanciator method, is invoked and executed before looking for any other record 751 to be removed from the STIT table 750. Then control is given to the step 1528.

At step 1527 a test is performed to check the value of the local variable STIM_mode. If this value is found equal to HORIZONTAL_INSERT then control is given to step 1529, if this value is found equal to HORIZONTAL_INSERT_BY_RANGE then control is given to step 1530.

At step 1528 a test is performed to check the value of the local variable STIM_mode.

If this value is found equal to HORIZONTAL_INSERT then control is given to step 1531;

if this value is found equal to HORIZONTAL_INSERT_BY_RANGE then control is given to step 1533;

if this value is found equal to VERTICAL_INSERT then control is given to step 1532;

if this value is found equal to VERTICAL_INSERT_BY_RANGE then control is given to step 1534.

At step 1529, the range of cells STIM_range 1708 is selected to become the currently selected range of cells, with the currently selected cell being kept in its former position 1747 and then a regular operation of "row insertion" is performed. Then control is given to step 1535.

At step 1530, the range of cells STIM_range_col_fit 1721 is selected to become the currently selected range of cells, with the currently selected cell being moved to the position 1736 corresponding to the intersection of the leftmost column of the range of cells STIM_instance_range 1713 with the row where was previously located the currently selected cell 1707 and then a regular operation of "row insertion within selected range" is performed. Then control is given to step 1535.

At step 1531, the range of cells STIM_range 1748 is selected to become the currently selected range of cells, with the currently selected cell being kept in its former position 1747 and then a regular operation of "row insertion" is performed. Then control is given to step 1521.

At step 1532, the range of cells STIM_range 1748 is selected to become the currently selected range of cells, with the currently selected cell being kept in its former position 1747 and then a regular operation of "column insertion" is performed. Then control is given to step 1521.

At step 1533, the range of cells STIM_range 1748 is selected to become the currently selected range of cells, with the currently selected cell being kept in its former position 1747 and then a regular operation of "row insertion within selected range" is performed. Then control is given to step 1521.

At step 1534, the range of cells STIM_range 1748 is selected to become the currently selected range of cells, with the currently selected cell being kept in its former position 1747 and then a regular operation of "column insertion within selected range" is performed. Then control is given to step 1521.

At step 1535, a local variable STIM_index is initialised to the value taken by the local variable STIM_height 1706. Then the STT table 720 is parsed to identify the record 721 whose "Name" field 722 matches the value of the local variable ST_name. Within this record 721 is retrieved the "Description Ptr" field 724 allowing to locate in memory the STDT table 760 associated to the scalable template that the current scalable template instance abides by. Then the element pair 762 of element format name and element profile name found within this STDT table 760 is set as the current pair of names: (format name, profile name).

At step 1536, the EPT table 710 is parsed to find the record 711 whose "Name" field 712 is found equal to the profile name within the current pair. Once this record 711 is found, its "Description Ptr" field 714 is retrieved to locate in memory the range of cells illustrating the profile. This description of the profile is copy-pasted by value only onto the currently selected cell, so that the corresponding row within the range of cells STI_range_col_fit 1721 or 1731 receives the profile initial values. Then the EFT table 700 is parsed to find the record 701 whose "Name" field 702 is found equal to the format name within the current pair. Once this record 701 is found, its "Description Ptr" field 704 is retrieved to locate in memory the range of cells illustrating the format. This description of the format is copy-pasted by attribute only onto the currently selected cell, so that the corresponding row within the range of cells STI_range_col_fit 1721 or 1731 receives the format attributes.

At step 1537, the local variable STIM_index is decremented by 1 (one). Then control is given to step 1538.

At step 1538, a test is performed to check if the local variable STIM_index is equal to 0 (zero). If it is the case, then control is given to step 1540, otherwise control is given to step 1539.

At step 1539, the currently selected cell is moved downwards by one row. Then control is given to step 1536.

At step 1540, the current scalable template instance STIM_instance_range 1713 is updated by restoring in all the elements the "OUT" cells to prevent any corruption due to the insertion. For this purpose the element profile name found at step 1535 within the pair 762 is used to identify the record 711 within the EPT table 710 whose "Name" field 712 matches this element profile name. Then the "Description Ptr" field 714 of this same record 711 is used to retrieve in memory the profile illustrative range of cells which indicates the profile cells specified as "OUT" cells (recorded in a preferred embodiment of the present invention by setting the cell protection mode attribute to "cell protected from changes"). For this purpose, a temporary local variable STIM_out_fields memorises the relative positions of all the cells specified as "IN" or "OUT" cells, as an ordered set of IN or OUT values. For instance in an element profile made of 5 cells, where only the third and fifth cells are "OUT" cells, this local variable STIM_out_fields takes the value (IN, IN, OUT, IN, OUT). Then the top row of the inserted range of cells 1721 or 1731 is selected as the currently selected range of cells. Then each cell within this selection is individually deselected if it corresponds to a position taking the value "IN" in the local variable STIM_out_fields. Within this selection, the leftmost cell is set as the currently selected cell. At this stage, the current selection corresponds to the collection of all the "OUT" cells. Then the current selection is extended by adding as many rows as needed above the current one, so that it spreads over all the elements located between the top one of the scalable template instance and the top one of the inserted new elements. Then a conventional "copy-up" operation is done to copy the "OUT" cells of the last row of the current selection onto the above "OUT" cells. Then the current selection is extended by adding as many rows as needed below the last one, so that it spreads over all the elements located within the scalable template instance. Then a conventional "copy-down" operation is done to copy the "OUT" cells of the last row of the current selection onto the below "OUT" cells, so that eventually all the "OUT" cells of the current scalable template instance receive a correct content. Finally the field "Element # " 754 within the record 751 of the STIT table 750, as found at step 1503 is updated with the sum of the local variables STIM_element and STIM_height 1706. Finally control is given to step 1521.

At step 1541, the local variable STIM_height 1706 is decremented by 1 (one), as long as its value remains strictly positive. If the decrement has been done, then the currently selected range of cells STIM_range 1708 is reduced by removing from the current selection the last row. Then control is given to step 1508.

E7. Scalable Template Instance Deletion Manager method

Figure 18:
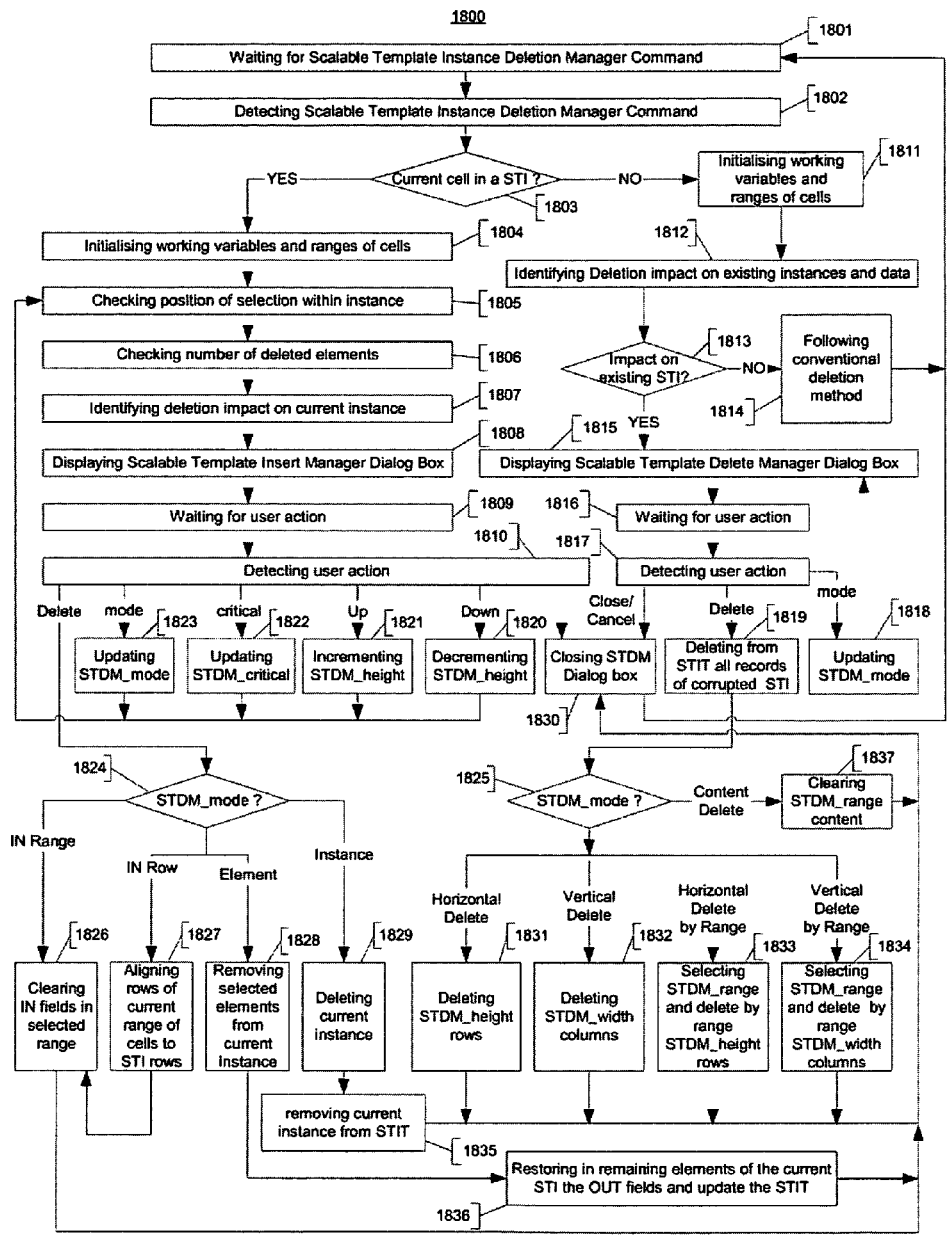
FIG. 18 is a flow chart illustrating a preferred method for managing deletion in scalable template instances according to a preferred embodiment of the present invention.

The method for deleting within a scalable template instance either the content of selected cells, or selected elements or even the whole scalable template instance used in the preferred embodiment of the present invention is summarised in flowchart 1800 of FIG. 18. This method can be seen as the processing of the Scalable Template Instance Deletion Manager command.

At step 1801, the method is in its default state, waiting for an event to initiate the process.

At step 1802, the Scalable Template Instance Deletion Manager command is detected, as a result of a user action. This action can be for instance a specific combination of key on the keyboard 104, or the click of the pointing device 105 on a specific button, or any other similar means not further specified here. When the Scalable Template Instance Deletion Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 1803, a test is performed to check if the currently selected cell is located within an existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance named STDM_instance_range and control is given to step 1804; otherwise control is given to step 1811.

At step 1804, the record 751 found at the step 1803 is first retrieved to initialise local variables from its fields describing the scalable template instance STDM_instance_range to which belongs the currently selected cell: the local variable ST_name is initialised with the value of the field "ST" 753; the local variable STDM_element is initialised with the value of the "Element #" field 754; the local variable STDM_critical is initialised with the value of the "Critical" field 755; the local variable STDM_header_size is initialised with the value of the "Header Size" field 756; the local variable STDM_footer_size is initialised with the value of the "Footer Size" field 757. Then the local variable ST_name is used to parse the STT table 720 in order to find the record 721 whose "Name" field 722 matches the parameter ST_name. Once this record 721 is found, its field "Min Element #" 725 is memorized as the local variable STDM_min. Then another local variable STDM_mode is initialised with the value DELETE_IN_FIELDS_IN_SELECTED_RANGE. Then the position of the currently selected cell is used to initialise the local variable STDM_offset_height corresponding to the number of rows between the top left cell of the range of cells STDM_instance_range and the currently selected cell. Then the number of rows of the currently selected range of cells STDM_range is represented by the local variable STDM_height.

At step 1805, a series of tests is performed to determine the relative position of the currently selected range of cells with respect to the current scalable template instance STDM_instance_range. First a local variable STDM_header_overlap takes the value 1 (one) if the value of the local variable STDM_offset_height is less than the value of the local variable STDM_header_size; otherwise the local variable STDM_header_overlap takes the value 0 (zero). Then a local variable STDM_footer_overlap takes the value 1 (one) if the sum of the values of the local variables STDM_offset_height and STDM_height is found greater than the sum of the values of the local variables STDM_header_size and STDM_element. Then a local variable STDM_body_overlap takes the value of the formula: STDM_header_overlap×STDM_data1+(1−TDM_header_overlap)×STDM_data2, where STDM_data1 takes the value 1 (respectively 0) if the sum of the values of the local variables STDM_offset_height and STDM_height is found greater than (respectively less than or equal to) the value of the local variable STDM_header_size; and where STDM_data2 takes the value 1 (respectively 0) if the value of the local variable STDM_offset_height is found less than (respectively greater than or equal to) the sum of the values of the local variables STDM_header_size and STDM_element.

At step 1806, the number of deleted elements is evaluated to then verify that the remaining number of elements will not be too small, that is below the lower limit STDM_min. This number of deleted elements is recorded in the local variable STDM_delete_element_# whose value is given by the following formula:

STDM_body_overlap×(STDM_height−STDM_header_overlap×(STDM_header_size−STDM_offset_height)−STDM_footer_overlap×(STDM_offset_height+STDM_height−STDM_header_size−STDM_element)).

At step 1807, a first local variable STDM_too_small is set to the value "YES" if the sum of the values of the local variables STDM_deleted_element_# and STDM_min is found greater than the value of the local variable STDM_element; otherwise this local variable STDM_too_small takes the value "NO". Then a second local variable STDM_outside_body is set to the value "NO" if both the local variables STDM_header_overlap and STDM_footer_overlap take the value 0 (zero); otherwise this local variable STDM_outside_body is set to the value "YES".

At step 1808, the Scalable Template Delete Manager Dialog Box 1900 is displayed on the display device 106. The "Critical" check box 1910 displays a check mark if the local variable STDM_critical takes the value "YES"; otherwise (value "NO"), the "Critical" check box 1910 is kept with a blank empty display. The label box 1911 is initialised with the value of the local variable ST_name. The text box 1908 is filled with the value of the local variable STDM_height. The label box 1907 is filled with the value of the local variable STDM_too_small, and the label box 1904 is filled with the value of the local variable STDM_outside_body. Then if the local variable STDM_mode takes the respective value DELETE_IN_FIELDS_IN_SELECTED_RANGE, or DELETE_IN_FIELDS_IN_SELECTED_ROWS, or DELETE_SELECTED_ELEMENTS, or DELETE_SELECTED_INSTANCE, then the option button 1905, or 1906, or 1912, or 1913 displays alone a black point. Finally the "Delete" push-button 1903 is disabled as soon as one of the following local variables takes the value "YES": STDM_too_high, STDM_outside_body, when the local variable STDM_mode is equal to DELETE_SELECTED_ELEMENTS; otherwise the "Delete" push-button 1903 is enabled.

At step 1809, the method is waiting for any user action on the Scalable Template Delete Manager Dialog Box 1900. Such user action is typically resulting from a click with the pointing device 105, but take other similar forms such as, but not limited to a specific combination of key on the keyboard 104, or any other similar means not further specified here.

At step 1810, a user action on the Scalable Template Delete Manager Dialog Box 1900 is detected.
  If the user action is a click on the "Delete" push-button 1903, then control is given to step 1824;
  if the user action is a click on the upper part of the spin button 1909, then control is given to step 1821;
  if the user action is a click on the lower part of the spin button 1909, then control is given to step 1820;
  if the user action is a click on the "Critical" check box 1910, then control is given to step 1822;
  if the user action is a click on one of the option buttons 1906, or 1905, or 1912, or 1913, then control is given to step 1823;
  if the user action is a click on the "Cancel" push-button 1902, or on the closing-window push-button 1901, then control is given to step 1830.

At step 1811, the local variable STDM_mode is initialised with the value CONTENT_DELETE. Then the number of rows and of columns of the currently selected range of cells STDM_range 2002 is represented respectively by the local variables STDM_height and STDM_width. Then the range of cells STDM_right_range 2003 is determined as the range of cells sharing the same rows as STDM_range 2002, and occupying the columns located on the right of the range of cells STDM_range 2002. Then the range of cells STDM_bottom_range 2004 is determined as the range of cells sharing the same columns as STDM_range 2002, and occupying the rows located below those of STDM_range 2002. Then the range of cells STDM_left_range 2005 is determined as the range of cells sharing the same rows as STDM_range 2002, and occupying the columns located on the left of the range of cells STDM_range 2002. Then the range of cells STDM_top_range 2006 is determined as the range of cells sharing the same columns as STDM_range 2002, and occupying the rows located above those of STDM_grange 2002.

At step 1812, several tests are performed to evaluate the potential impact of the deletion, according to four possible deletion modes, on any already existing scalable template instance or data. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells also belongs to the second range of cells). Different conventional range comparison techniques can be used for evaluating either range partial overlapping or range inclusion, without departing from the spirit of the present invention; they will not be described in the preferred embodiment of the present invention.

First the HORIZONTAL_DELETE mode of deletion is investigated.
- If there exists at least one existing scalable template instance whose "Critical" field 755 takes the value "YES" and which partially overlaps the range of cells made of the entire rows where is located the currently selected range of cells STDM_range 2002, or which is included in the range of cells made of the entire rows where is located the currently selected range of cells STDM_range 2002, then the local test variable STDM_horizontal_critical takes the value "YES"; otherwise the local test variable STDM_horizontal_critical takes the value "NO".
- If there exists at least one existing scalable template instance whose "Critical" field 755 takes the value "NO" and which partially overlaps the range of cells made of the entire rows where is located the currently selected range of cells STDM_range 2002, or which is included in the range of cells made of the entire rows where is located the currently selected range of cells STDM_range 2002, then the local test variable STDM_horizontal_other takes the value "YES"; otherwise the local test variable STDM_horizontal_other takes the value "NO".
- If all the cells within the range of cells made of the entire rows where is located the currently selected range of cells STDM_range 2002 are empty (containing none data), then the local test variable STDM_horizontal_data takes the value "NO"; otherwise the local test variable STDM_horizontal_data takes the value "YES".

Second the horizontal_delete_by_range mode of deletion is investigated.
- If there exists at least one existing scalable template instance whose "Critical" field 755 takes the value "YES" and which partially overlaps the range of cells constituted by the concatenation of the two ranges of cells STDM_range 2002 and STDM_bottom_range 2004, or which partially overlaps or is included in the range of cells STDM_range 2002, then the local test variable STDM_horizontal_range_critical takes the value "YES"; otherwise the local test variable STDM_horizontal_range_critical takes the value "NO".
- If there exists at least one existing scalable template instance whose "Critical" field 755 takes the value "NO" and which partially overlaps the range of cells constituted by the concatenation of the two ranges of cells STDM_range 2002 and STDM_bottom_range 2004, or which partially overlaps or is included in the range of cells STDM_range 2002, then the local test variable STDM_horizontal_range_other takes the value "YES"; otherwise the local test variable STDM_horizontal_range_other takes the value "NO".
- If all the cells within the range of cells STDM_range 2002 are empty (containing none data), then the local test variable STDM_horizontal_range_data takes the value "NO"; otherwise the local test variable STDM_horizontal_range_data takes the value "YES".

Third the vertical_delete mode of deletion is investigated.
- If there exists at least one existing scalable template instance whose "Critical" field 755 takes the value "YES" and which partially overlaps the range of cells made of the entire columns where is located the currently selected range of cells STDM_range 2002, or which is included in the range of cells made of the entire columns where is located the currently selected range of cells STDM_range 2002, then the local test variable STDM_vertical_critical takes the value "YES"; otherwise the local test variable STDM_vertical_critical takes the value "NO".
- If there exists at least one existing scalable template instance whose "Critical" field 755 takes the value "NO" and which partially overlaps the range of cells made of the entire columns where is located the currently selected range of cells STDM_range 2002, or which is included in the range of cells made of the entire columns where is located the currently selected range of cells STDM_range 2002, then the local test variable STDM_vertical_other takes the value "YES"; otherwise the local test variable STDM_vertical_other takes the value "NO".
- If all the cells within the range of cells made of the entire columns where is located the currently selected range of cells STDM_range 2002 are empty (containing no data), then the local test variable STDM_vertical_data takes the value "NO"; otherwise the local test variable STDM_vertical_data takes the value "YES".

Fourth the VERTICAL_DELETE_BY_RANGE mode of deletion is investigated.
- If there exists at least one existing scalable template instance whose "Critical" field 755 takes the value "YES" and which partially overlaps the range of cells constituted by the concatenation of the two ranges of cells STDM_range 2002 and STDM_right_range 2003, or which partially overlaps or is included in the range of cells STDM_range 2002, then the local test variable STDM_vertical_range_critical takes the value "YES"; otherwise the local test variable STDM_vertical range_critical takes the value "NO".
- If there exists at least one existing scalable template instance whose "Critical" field 755 takes the value "NO" and which partially overlaps the range of cells constituted by the concatenation of the two ranges of cells STDM_range 2002 and STDM_right_range 2003, or which partially overlaps or is included in the range of cells STDM_range 2002, then the local test variable STDM_vertical_range_other takes the value "YES"; otherwise the local test variable STDM_vertical range_other takes the value "NO".
- If all the cells within the range of cells STDM_range 2002 are empty (containing no data), then the local test variable STDM_vertical_range_data takes the value "NO"; otherwise the local test variable STDM_vertical_range_data takes the value "YES".

Fifth the CONTENT_DELETE mode of deletion is investigated.
- If there exists at least one existing scalable template instance whose "Critical" field 755 takes the value "YES" and whose intersection with the range of cells STDM_range 2002 contains at least one element or meta-element cell specified as "OUT" cell, then the local test variable STDM_content_critical takes the value "YES"; otherwise the local test variable STDM_content_critical takes the value "NO".

If there exists at least one existing scalable template instance whose "Critical" field 755 takes the value "NO" and whose intersection with the range of cells STDM_range 2002 contains at least one element or meta-element cell specified as "OUT" cell, then the local test variable STDM_content_other takes the value "YES"; otherwise the local test variable STDM_content_other takes the value "NO".

If all the cells within the range of cells STDM_range 2002 are empty (containing no data), then the local test variable STDM_content_data takes the value "NO"; otherwise the local test variable STDM_content_data takes the value "YES".

At step 1813, a test is performed to check the deletion impact on any existing scalable template instance, according to the values assigned during the step 1812 to the local variables STDM_horizontal_critical,
STDM_horizontal_other,
STDM_horizontal_range_critical,
a STDM_horizontal_range_other,
STDM_vertical_critical,
STDM_vertical_other,
STDM_vertical_range_critical,
STDM_vertical_range_other,
STDM_content_critical,
STDM_content_other.

If none of these local variables takes the value "YES", then control is given to step 1814; otherwise if at least one of these local variables takes the value "YES", then control is given to step 1815.

At step 1814, the conventional deletion method as used and defined in conventional electronic spreadsheet environments is triggered, and then control is given back to the initial step 1801 for processing any future Scalable Template Instance Deletion Manager command.

At step 1815, the Scalable Template Delete Manager Dialog Box 1920 is displayed on the display device 106. The label box 1929 is initialised with the reserved value "None". The 15 label boxes 1924 are filled row after row, starting with the top row, from the left to the right, with the values of the following local variables in the following order:

STDM_content_critical,
STDM_content_other,
STDM_content_data,
STDM_horizontal_critical,
STDM_horizontal_other,
STDM_horizontal_data,
STDM_horizontal_range_critical,
STDM_horizontal_range_other,
STDM_horizontal_range_data,
STDM_vertical_critical,
STDM_vertical_other,
STDM_vertical_data,
STDM_vertical_range_critical,
STDM_vertical_range_other,
STDM_vertical_range_data.

Then if the local variable STDM_mode takes the respective value CONTENT_DELETE, or HORIZONTAL_DELETE, or HORIZONTAL_DELETE_BY_RANGE, or VERTICAL_DELETE, or VERTICAL_DELETE_BY_RANGE, then the option button 1930, or 1928, or 1927, or 1926, or 1925 displays alone a black point.

Finally the "Delete" push-button 1923 is disabled as soon as one of the following local variables takes the value "YES":

STDM_content_critical (only taken into account if the local variable STDM_mode is equal to CONTENT_DELETE),
STDM_horizontal_critical (only taken into account if the local variable STDM_mode is equal to HORIZONTAL_DELETE),
STDM_vertical_critical (only taken into account if the local variable STDM_mode is equal to vertical_delete),
STDM_horizontal_range_critical (only taken into account if the local variable STDM_mode is equal to HORIZONTAL_DELETE_BY_RANGE),
STDM_vertical_range_critical (only taken into account if the local variable STDM_mode is equal to VERTICAL_DELETE_BY_RANGE); otherwise the "Delete" push-button 1923 is enabled.

At step 1816, the method is waiting for any user action on the Scalable Template Insert Manager Dialog Box 1920. Such user action is typically resulting from a click with the pointing device 105, but take other similar forms such as, but not limited to a specific combination of key on the keyboard 104, or any other similar means not further specified here.

At step 1817, a user action on the Scalable Template Insert Manager Dialog Box 1920 is detected. If the user action is a click on the "Delete" push-button 1923, then control is given to step 1819; if the user action is a click on one of the option buttons 1930, or 1928, or 1927, or 1926, or 1925, then control is given to step 1818; if the user action is a click on the "Cancel" push-button 1922, or on the closing-window push-button 1921, then control is given to step 1830.

At step 1818, the local variable STDM_mode takes the value CONTENT_DELETE, or HORIZONTAL_DELETE, or HORIZONTAL_DELETE_BY_RANGE, or VERTICAL_DELETE, or VERTICAL_DELETE_BY_RANGE if the spreadsheet user has respectively clicked with the pointing device 105 on the option button 1930, or 1928, or 1927, or 1926, or 1925. Then control is given to step 1815.

At step 1819, the STIT table 750 is visited to remove from it every record 751 corresponding to a scalable template instance corrupted by the deletion operation, as identified during the step 1812 for the deletion mode represented by the local variable STDM_mode. Each time such a record 751 has been removed from the STIT table 750, the "Reference Housekeeping Process", as described in step 1414 of the Scalable Template Instanciator method, is invoked and executed before looking for any other record 751 to be removed from the STIT table 750. Then control is given to the step 1825.

At step 1820, the local variable STDM_height is decremented by 1 (one), as long as its value remains strictly positive. If the decrement has been done, then the currently selected range of cells STDM_range is reduced by removing from the current selection the last row. Then control is given to step 1805.

At step 1821, the local variable STDM_height is incremented by 1 (one), as long as its value remains less than the value of the local variable STDM_element. If the increment has been done, then the currently selected range of cells STDM_range is enlarged by adding to the current selection a new row below the last one. Then control is given to step 1805.

At step 1822, the local variable STDM_critical is updated in order to swap between the values "YES" and "NO". In addition, a check mark is respectively added within or removed from the "Critical" check box 1910 if it was previously absent or present in this same check box 1910. Then the field "Critical" 755 within the record 751 of the STIT table 750, as found at step 1803 is updated with the value of the local variable STDM_critical. Then control is given to step 1805.

At step 1823, the local variable STDM_mode takes the value "DELETE_IN_FIELDS_IN_SELECTED_RANGE", or "DELETE_IN_FIELDS_IN_SELECTED_ROWS", or "DELETE_SELECTED_ELEMENTS", or "DELETE_SELECTED_INSTANCE", if the spreadsheet user has respectively clicked with the pointing device 105 on the option button 1905, or 1906, or 1912, or 1913. Then control is given to step 1805.

At step 1824 a test is performed to check the value of the local variable STDM_mode.
  If this value is found equal to "DELETE_IN_FIELDS_IN_SELECTED_RANGE" then control is given to step 1826;
  if this value is found equal to "DELETE_IN_FIELDS_IN_SELECTED_ROWS" then control is given to step 1827;
  if this value is found equal to "DELETE_SELECTED_ELEMENTS" then control is given to step 1828;
  if this value is found equal to "DELETE_SELECTED_INSTANCE" then control is given to step 1829.

At step 1825 a test is performed to check the value of the local variable STDM_mode.
  If this value is found equal to HORIZONTAL_DELETE then control is given to step 1831;
  if this value is found equal to HORIZONTAL_DELETE_BY_RANGE then control is given to step 1833;
  if this value is found equal to VERTICAL_DELETE then control is given to step 1832;
  if this value is found equal to VERTICAL_DELETE_BY_RANGE then control is given to step 1834;
  if this value is found equal to CONTENT_DELETE then control is given to step 1837.

At step 1826, the "IN" cells belonging to the currently selected range of cells STDM_range are cleared. For this purpose, the "ST" field 753 of the record 751 of the STIT table 750, as identified at step 1803, is visited to get a memory pointer on the STDT table 760 of the scalable template, which specifies for each meta-element and for each element of the scalable template instance what is the associated profile, which in turn indicates which cells are "IN" cells and which cells are "OUT" cells. Then each row of the range of cells STDM_range is selected one after the other, and for each selected row, the corresponding element or meta-element profile is retrieved from the STDT table 760 to determine which cells are "IN" cells. For this purpose, a temporary local variable STDM_out_fields memorises the relative positions of all the cells specified as "IN" or "OUT" cells, as an ordered set of IN or OUT values. For instance in an element profile made of 5 cells, where only the third and fifth cells are "OUT" cells, this local variable STDM_out_fields takes the value (IN, IN, OUT, IN, OUT). With the same example, if the selected range of cells was only occupying the second, third and fourth columns of the scalable template instance, then the first cell is ignored because although it is an "IN" cell, it falls outside the limits of the range of cells STDM_range, so that only the second and fourth cells are taken into account. Once the "IN" cells belonging to the range of cells STDM_range are determined, these cells are updated by clearing their content.

At step 1827, the currently selected range of cells STDM_range is updated in order to align its columns with those occupied by the scalable template instance STDM_instance_range. Then control is given to step 1826.

At step 1828, the elements belonging to the rows of the currently selected range of cells STDM_range are removed from the current instance STDM_instance_range. For this purpose is first selected the range of cells constituted by the same columns as the range of cells STDM_instance_range, and whose rows are located between the bottom row of the range of cells STDM_range (excluded) and the bottom row of the range of cells STDM_instance_range (included). Then this selected range of cells is moved upwards, row after row, up to the position where its top row occupies the same row as the top row of the former range of cells STDM_range. For each step of this move, a row within the range of cells STDM_range is removed, so that at the end all the rows of the range of cells STDM_range are removed. Then control is given to step 1836.

At step 1829, the range of cells corresponding to the scalable template instance STDM_instance_range becomes a regular ranges of cells and looses its quality of scalable template instance. For this purpose, the content of all the cells of this range of cells STDM_instance_range is cleared, and then this whole range of cells receives the default display attributes defined within the current spreadsheet file. Then control is given to step 1835.

At step 1830, the Scalable Template Delete Manager Dialog Box 1900 or 1920 is closed so that it disappears from the display device 106. Finally control is given back to the initial step 1801 for processing any future Scalable Template Instance Deletion Manager command.

At step 1831, the range of cells STDM_range is selected to become the currently selected range of cells so that STDM_height rows are selected, and then a regular operation of "row deletion" is performed. Then control is given to step 1830.

At step 1832, the range of cells STDM_range is selected to become the currently selected range of cells so that STDM_width columns are selected, and then a regular operation of "column deletion" is performed. Then control is given to step 1830.

At step 1833, the range of cells STDM_range is selected to become the currently selected range of cells so that STDM_height rows are selected, and then a regular operation of "row deletion within selected range" is performed. Then control is given to step 1830.

At step 1834, the range of cells STDM_range is selected to become the currently selected range of cells so that STDM_width columns are selected, and then a regular operation of "column deletion within selected range" is performed. Then control is given to step 1830.

At step 1835, the record 751 identified at step 1803 is removed from the STIT table 750. Then the "Reference Housekeeping Process", as described in step 1414 of the Scalable Template Instanciator method, is executed, before giving control to the step 1830.

At step 1836, the current scalable template instance STDM_instance_range is updated by restoring in all the remaining elements the "OUT" cells to prevent any corruption due to the element deletion. First the STT table 720 is parsed to identify the record 721 whose "Name" field 722 matches the value of the local variable ST_name. Within this record 721 is retrieved the "Description Ptr" field 724 allowing to locate in memory the STDT table 760 associated to the scalable template that the current scalable template instance STDM_instance_range abides by. Then the element pair 762 within this STDT table 760 is accessed to retrieve the element profile, recorded in the local variable STDM- _profile. Then the EPT table 710 is parsed to identify a record 711 whose "Name" field 712 matches the local variable STDM_profile. Once found, the "Description Ptr" field 714 is used to access in memory a description of the element profile which indicates which cells are "IN" cells and which cells are "OUT" cells. For this purpose, a temporary local variable STDM_outfields memorises the relative positions of all the cells specified as "OUT" cells, as an ordered set of IN or OUT values. For instance with an element profile made of 5 cells, where only the third and fifth cells are "OUT" cells, this local variable STDM_out_fields takes the value (IN, IN, OUT, IN, OUT). Then each "OUT" cell of the illustrative range of cells (pointed by the "Description Ptr" field 714 of the record 711 of the EPT table 710 whose "Name" 712 field matches the local variable STDM_profile) is individually copied and pasted onto the cell of the top element of the scalable template instance STDM_instance_range which has the same relative column offset within the element (corresponding to a position taking the value "OUT" in the local variable STDM_out_fields). Then the top element of the scalable template instance STDM_instance_range is selected as the currently selected range of cells. Then each cell within this selection is individually deselected if it corresponds to a position taking the value "IN" in the local variable STDM_out_fields. Within this selection, the leftmost cell is set as the currently selected cell. At this stage, the current selection corresponds to the collection of all the "OUT" cells. Then the current selection is extended to include as many rows as needed below the top element, so that it spreads over all the elements of the scalable template instance STDM_instance_range. Then a conventional "copy-down" operation is done to copy the first row onto the below ones, so that all the "OUT" cells of the current scalable template instance STDM_instance_range receive a correct content. Finally the "Element #" field 754 within the record 751 of the STIT table 750, as found at step 1803 is updated with the difference of the local variables STDM_element and STDM_height. Finally control is to step 1830.

At step 1837, the content of every cell comprised within the currently selected range of cells STDM_range is cleared. Then control is given to step 1830.

E8. Scalable Template Refresh Manager Method

Figure 21:
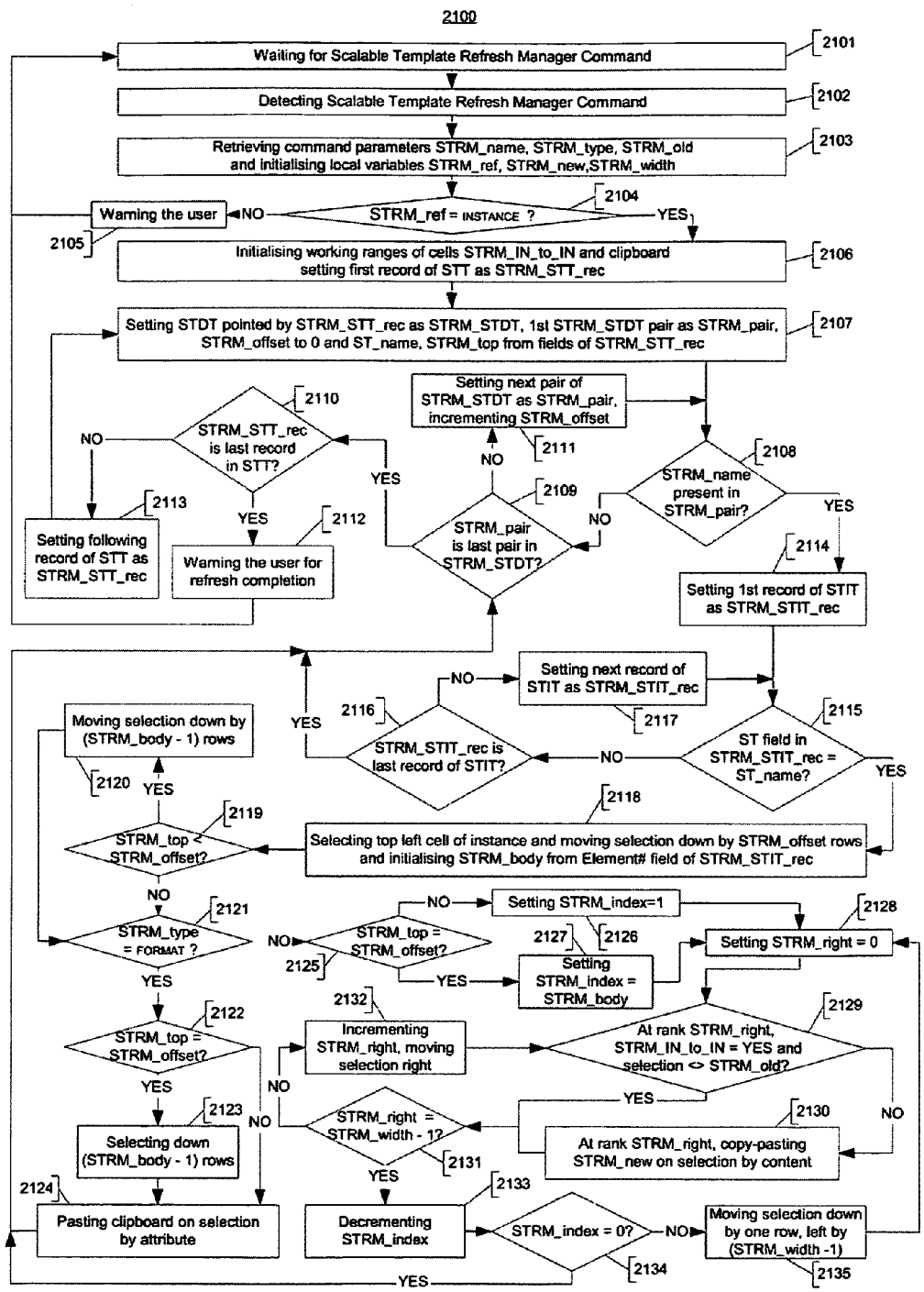
FIG. 21 is a flow chart illustrating a preferred method for refreshing scalable template instances according to a preferred embodiment of the present invention.

The method for updating the definition of existing scalable template objects (either element formats, or element profiles, or meta-element formats or meta-element profiles) so that each defined scalable template instance abiding by these objects get automatically refreshed, used in the preferred embodiment of the present invention is summarised in flowchart 2100 of FIG. 21. This method can be seen as the processing of the Scalable Template Refresh Manager command.

At step 2101, the method is in its default state, waiting for an event to initiate the process.

At step 2102, the Scalable Template Refresh Manager command is detected, as a result of a user action. This action can be for instance a specific combination of key on the keyboard 104, or the click of the pointing device 105 on a specific button, or any other similar means not further specified here.

At step 2103, the command parameters are retrieved and memorized in local variables. The first command parameter is recorded in the local variable STRM_name. The second command parameter is recorded in the local variable STRM_type. The third optional command parameter is recorded, when present, in the local variable STRM_old. If the value of the local variable STRM_type is found equal to FORMAT, then the EFT table 700 is scanned to find the record 701 whose "Name" field 702 is equal to the local variable STRM_name. When this record 701 is found, the local variable STRM_ref is initialised with the value of the referenced attribute 709 of the "Type" field 707; then the STRM_new local variable is initialised with the content of the memory location pointed by the "Description Ptr" field 704; and then the STRM_width local variable is initialised with the value of the "Column #" field 706. If the value of the local variable STRM_type is found equal to PROFILE, then the EPT table 710 is scanned to find the record 711 whose "Name" field 712 is equal to the local variable STRM_name. When this record 711 is found, the local variable STRM_ref is initialised with the value of the referenced attribute 719 of the "Type" field 717; then the STRM_new local variable is initialised with the content of the memory location pointed by the "Description Ptr" field 714; and then the STRM_width local variable is initialised with the value of the "Column #" field 716.

At step 2104, a test is performed to check if the value of the local variable STRM_ref is equal to instance. If it is the case, then control is given to step 2106; otherwise control is given to step 2105.

At step 2105, a warning message notification is issued for informing the user that there is no instance defined which uses the format or profile definition, so that the Refresh operation is not needed. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given back to the initial step 2101 for processing any future Scalable Template Refresh Manager command.

At step 2106, if the value of the local variable STRM_type is found equal to FORMAT, then a local variable STRM_IN_to_IN is initialised as a range of cells made by a single row and by a number of columns equal to the value of the local variable STRM_width. The n-th cell within this range of cells STRM_IN_to_IN takes the value "YES" if both the n-th cell of the range of cells STRM_old and the n-th cell of the range of cells STRM_new have been specified as "IN" cells; otherwise the n-th cell within this range of cells STRM_IN_to_IN takes the value "NO". This local variable will be later used to determine the cells which have remained as "IN" cells.

Then regardless of the value of the local variable STRM_type, a conventional copy operation (both by attribute and by content) is performed from the range of cells STRM_new onto the clipboard. Finally the first record 721 of the STT table 720 is set as the current record in the local variable STRM_STT_rec.

At step 2107, the STDT table 760 pointed by the "Description Ptr" field 724 of the current record 721 STRM_STT_rec is set as current STDT table 760 recorded in the local variable STRM_STDT. Then the first pair of names 761 (format name, profile name) within the STDT table 760 STRM_STDT is set as the current pair recorded in the local variable STRM_pair. Then the local variable STRM_offset is initialised to the value 0 (zero), then the local variable ST_name is set to the value of the "Name" field 722 of the record 721 STRM_STT_rec and then the local variable STRM_top is set to the value of the "Header Size" field 756 of the record 721 STRM_ST-T_rec.

At step 2108, a test is performed to check if the name recorded in the local variable STRM_name is found in the pair of names STRM_pair. If it is the case, then control is given to step 2114; otherwise control is given to step 2109.

At step 2109, a test is performed to check if the current pair of names STRM_pair is the last pair 763 of the current STDT 760 table STRM_STDT. If it is the case, then control is given to step 2110; otherwise control is given to step 2111.

At step 2110, a test is performed to check if the current record 721 STRM_STT_rec is the last record of the STT table 720. If it is the case, then control is given to step 2112; otherwise control is given to step 2113.

At step 2111, the pair following the current pair STRM_pair in the current STDT table STRM_STDT becomes the new current pair STRM_pair, and then the local variable STRM_offset is incremented by 1 (one). Then control is given to step 2108.

At step 2112, an information message notification is issued for informing the user that the Refresh operation is complete. This can typically be done by displaying on the display device 106 an information message in a pop-up window, or in a status bar area, but any other similar means could be used instead, without departing from the spirit of the invention. Once the user has acknowledged this notification message through conventional means such as clicking with the pointing device 105 on an "OK" push-button present within an information message pop-up window, or any other similar means without departing from the spirit of the invention, control is given back to the initial step 2101 for processing any future Scalable Template Refresh Manager command.

At step 2113, the record following the current record 721 STRM_STT_rec in the STT table 720 becomes the new current record 721 STRM_STT_rec.

At step 2114, the first record 751 of the STIT table 750 is set as the current record in the local variable STRM_STIT_rec.

At step 2115, a test is performed to check if the value of the "ST" field 753 within the current record 751 STRM_STIT_rec is equal to the value of the local variable ST_name. If it is the case, then control is given to step 2118; otherwise control is given to step 2116.

At step 2116, a test is performed to check if the current record 751 STRM_STIT_rec is the last record of the STIT table 750. If it is the case, then control is given to step 2109; otherwise control is given to step 2117.

At step 2117, the record following the current record 751 STRM_STIT_rec in the STIT table 750 becomes the new current record 751 STRM_STIT_rec. Then control is given to step 2115.

At step 2118, the top left cell of the range of cells whose address is specified by the "Address" field 752 of the current record 751 STRM_STIT_rec, is selected. Then the selection is moved down by a number of rows equal to the value of the local variable STRM_offset. Then the local variable STRM_body is set equal to the value of the "Element #" field 754 of the current record 751 STRM_STIT_rec.

At step 2119, a test is performed to check if the value of the local variable STRM_top is found less than the value of the local variable STRM_offset. If it is the case, then control is given to step 2120; otherwise control is given to step 2121.

At step 2120, the currently selected cell is moved down by a number of rows equal to the value of the local variable STRM_body decremented by 1 (one).

At step 2121, a test is performed to check if the value of the local variable STRM_type is equal to FORMAT. If it is the case, then control is given to step 2122; otherwise control is given to step 2125.

At step 2122, a test is performed to check if the value of the local variable STRM_top is found equal to the value of the local variable STRM_offset. If it is the case, then control is given to step 2123; otherwise control is given to step 2124.

At step 2123, the current selection is extended by selecting down a number of rows equal to the value of the local variable STRM_body decremented by 1 (one).

At step 2124, a conventional paste operation by attribute is performed from the content of the clipboard onto the current selection.

At step 2125, a test is performed to check if the value of the local variable STRM_top is found equal to the value of the local variable STRM_offset. If it is the case, then control is given to step 2127; otherwise control is given to step 2126.

At step 2126, the local variable STRM_index is set to the value 1 (one). Then control is given to step 2128.

At step 2127, the local variable STRM_index is set to the value of the local variable STRM_body.

At step 2128, the local variable STRM_right is set to the value 0 (zero).

At step 2129, a test is performed to check if two conditions are fulfilled.

The first condition consists in finding in the local variable STRM_IN_to_IN the cell of rank STRM_right equal to the value "YES" (where the rank is set to zero for the left most cell, and incremented by one for each neighbour cell on the right).

The second condition consists in finding the content of the currently selected cell different from the cell of rank STRM_right in the local variable STRM_old.

If both conditions are fulfilled, then control is given to step 2131; otherwise control is given to step 2130.

At step 2130, a conventional copy-paste operation by content only is performed from the cell of rank STRM_right within the local variable STRM_new onto the currently selected cell.

At step 2131, a test is performed to check if the value of the local variable STRM_right is found equal to the value of the local variable STRM_width decremented by 1 (one). If it is the case, then control is given to step 2133; otherwise control is given to step 2132.

At step 2132, the local variable STRM_right is incremented by 1 (one), and then the currently selected cell is moved right by one column. Then control is given to step 2129.

At step 2133, the local variable STRM_index is decremented by 1 (one).

At step 2134, a test is performed to check if the value of the local variable STRM_index is found equal to 0 (zero). If it is the case, then control is given to step 2109; otherwise control is given to step 2135.

At step 2135, the currently selected cell is moved down by one row, and left by a number of columns equal to the value of the local variable STRM_width decremented by 1 (one). Then control is given to step 2128.

E9. Scalable Template Instance Copy Manager Method

Figure 24A:
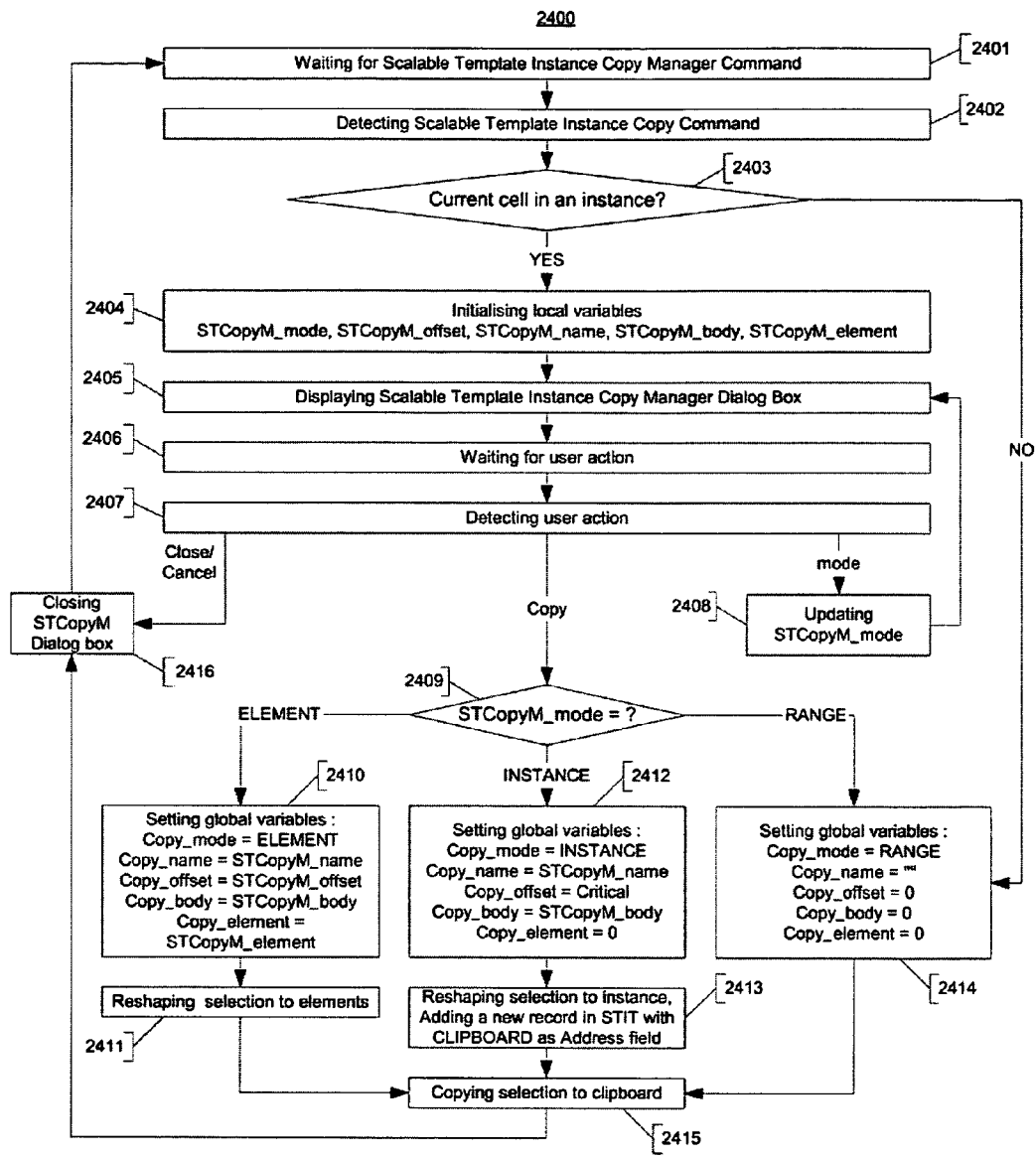
FIG. 24A is a flow chart illustrating a preferred method for copying scalable template instances according to a preferred embodiment of the present invention.

The method for performing a copy operation on a source scalable template instance used in the preferred embodiment of the present invention is summarised in flowchart 2400 of FIG. 24A. This method can be seen as the processing of the Scalable Template Instance Copy Manager command.

At step 2401, the method is in its default state, waiting for an event to initiate the process.

At step 2402, the Scalable Template Instance Copy Manager command is detected, as a result of a user action. This action can be for instance a specific combination of key on the keyboard 104, or the click of the pointing device 105 on a specific button, or any other similar means not further specified here. When the Scalable Template Instance Copy Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 2403, a test is performed to check if the currently selected cell is located within any existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance named STCopyM_instance_range and control is given to step 2404; otherwise control is given to step 2414.

At step 2404, some local variables are initialised. The local variable STCopyM_mode takes the default value "RANGE". The local variable STCopyM_offset takes the value equal to the number of rows between the top row of the scalable template instance STCopyM_instance_range and the row of the currently selected cell (for instance if the currently selected cell is located on the same row as the top row of the scalable template instance STCopyM_instance_range, then the local variable STCopyM_offset takes the value 0). The local variable STCopyM_name takes the value of the name of the scalable template that the scalable template instance STCopyM_instance_range abides by. This name can be retrieved from the "ST" field 753 within the record 751 of the STIT table 750, associated to the scalable template instance STCopyM_instance_range. The local variable STCopyM_element takes the value equal to the number of rows belonging both to the currently selected range of cells and to the scalable template instance STCopyM_instance_range. Finally the local variable STCopyM_body takes the value equal to the current number of elements within the scalable template instance STCopyM_instance_range. This number can be retrieved from the "Element #" field 754 within the record 751 of the STIT table 750, associated to the scalable template instance STCopyM_instance_range.

At step 2405, the Scalable Template Instance Copy Manager Dialog Box 2300 is displayed on the display device 106. The label box 2311 is initialised with the value of the local variable STCopyM_name. Then if the local variable STCopyM_mode takes the respective value RANGE, or ELEMENT, or INSTANCE, then the option button 2310, or 2309, or 2308 displays alone a black point. Finally the three text boxes 2305, 2306 and 2307 are initialised with the value "YES" regardless of any local variable value (these text boxes are present on the Scalable Template Instance Copy Manager Dialog Box 2300 for consistency with the Scalable Template Instance Cut Manager Dialog Box 2320 and the Scalable Template Instance Paste Manager Dialog Box 2340).

At step 2406, the method is waiting for any user action on the Scalable Template Instance Copy Manager Dialog Box 2300. Such user action is typically resulting from a click with the pointing device 105, but take other similar forms such as, but not limited to a specific combination of key on the keyboard 104, or any other similar means not further specified here.

At step 2407, a user action on the Scalable Template Instance Copy Manager Dialog Box 2300 is detected.
If the user action is a click on the "Copy" push-button 2303, then control is given to step 2409;
if the user action is a click on one of the option buttons 2310, or 2309, or 2308, then control is given to step 2408;
if the user action is a click on the "Cancel" push-button 2302, or on the closing-window push-button 2301, then control is given to step 2416.

At step 2408, the local variable STCopyM_mode takes the value "RANGE", or "ELEMENT", or "INSTANCE", if the spreadsheet user has respectively clicked with the pointing device 105 on the option button 2310, or 2309, or 2308. Then control is given to step 2405.

At step 2409, a test is performed to check the value of the local variable STCopyM_mode.
If this local variable is found equal to "RANGE", then control is given to step 2414;
if it is found equal to "INSTANCE", then control is given to step 2412;
if it is found equal to "ELEMENT", then control is given to step 2410.

At step 2410, some global variables are initialised. In a preferred embodiment of the present invention, these global variables are preferably recorded as part of the main memory 102, but any other similar recording means could be used instead without departing from the spirit of the invention.
The global variable Copy_mode is initialised with the value "ELEMENT".
The global variable Copy_name is initialised with the value of the local variable STCopyM_name.
The global variable Copy_offset is initialised with the value of the local variable STCopyM_offset.
The global variable Copy_body is initialised with the value of the local variable STCopyM_body.
The global variable Copy_element is initialised with the value of the local variable STCopyM_element.

At step 2411, the currently selected range of cells is reshaped so that it first occupies all the columns and only the columns of the scalable template instance STCopyM_instance_range and second does occupy all rows inside and not any row outside the intersection of the scalable template instance STCopyM_instance_range with the previous position of the selected range of cells. Then the currently selected cell becomes the top left cell of this reshaped currently selected range of cells.

At step 2412, some global variables are initialised. In a preferred embodiment of the present invention, these global variables are preferably recorded as part of the main memory 102, but any other similar recording means could be used instead without departing from the spirit of the invention.

The global variable Copy_mode is initialised with the value "INSTANCE".

The global variable Copy_name is initialised with the value of the local variable STCopyM_name.

The global variable Copy_offset is initialised with the value 0 (respectively 1) if the scalable template instance STCopyM_instance_range is qualified as critical (respectively not critical), as specified by the "Critical" field 755 of the record 751 within the STIT table 750 corresponding to this scalable template instance, field taking respectively the values "NO" and "YES".

The global variable Copy_body is initialised with the value of the local variable STCopyM_body.

The global variable Copy_element is initialised with the value 0 (zero).

At step 2413, the currently selected range of cells is reshaped so that it occupies the same rows and columns than the scalable template instance STCopyM_instance_range. Then the STIT table 750 is updated by first removing any record 751 whose "Address" field 752 is found equal to "CLIPBOARD", then by duplicating field by field the record 751 whose "Address" field 752 is equal to the address of the range of cells STCopyM_instance_range, and then by replacing in this newly created record 751 the "Address" field content by the value "CLIPBOARD". Then control is given to step 2415.

At step 2414, some global variables are initialised. In a preferred embodiment of the present invention, these global variables are preferably recorded as part of the main memory 102, but any other similar recording means could be used instead without departing from the spirit of the invention.

The global variable Copy_mode is initialised with the value "RANGE".

The global variable Copy_name is initialised with the value " " (empty character string).

The global variable Copy_offset is initialised with the value 0 (zero).

The global variable Copy_body is initialised with the value 0 (zero).

The global variable Copy_element is initialised with the value 0 (zero).

At step 2415, a conventional Copy operation is performed from the currently selected range of cell onto the clipboard.

At step 2416, the Scalable Template Instance Copy Manager Dialog Box 2300 is closed (if it was opened) and then control is given back to the initial step 2401 for processing any future Scalable Template Instance Copy Manager command.

E10. Scalable Template Instance Cut Manager method

Figure 24B:
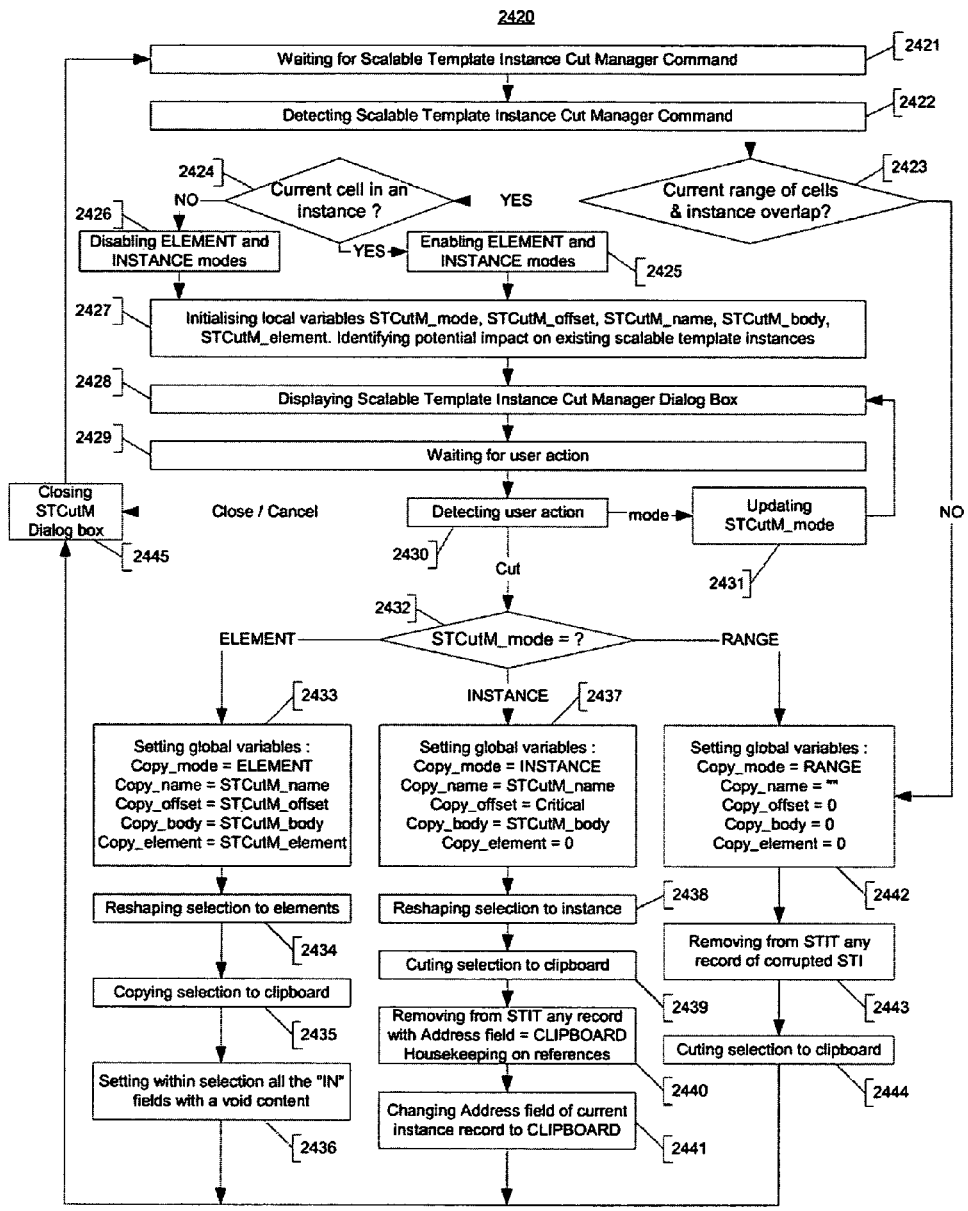
FIG. 24B is a flow chart illustrating a preferred method for cutting scalable template instances according to a preferred embodiment of the present invention.

The method for performing a cut operation on a source scalable template instance used in a preferred embodiment of the present invention is summarised in flowchart 2420 of FIG. 24B. This method can be seen as the processing of the Scalable Template Instance Cut Manager command.

At step 2421, the method is in its default state, waiting for an event to initiate the process.

At step 2422, the Scalable Template Instance Cut Manager command is detected, as a result of an user action. This action can be for instance a specific combination of key on the keyboard 104, or the click of the pointing device 105, on a specific button, or any other similar means not further specified here. When the Scalable Template Instance Cut Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 2423, a test is performed to check if the currently selected range of cells (referred to as STCutM_range) overlaps any existing scalable template instance. This test is performed by parsing the STIT table 750 and visiting in each record 751 the "Address" field 752 to determine if the range of cells address specified in this field does overlap the address of the currently selected range of cells STCutM_range. If it is the case, then control is given to step 2424; otherwise control is given to step 2442.

At step 2424, a test is performed to check if the currently selected cell is located within any existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance named STCutM_instance_range and control is given to step 2425; otherwise control is given to step 2426.

At step 2425, two local variables STCutM_element and STCutM_instance are initialised with the value "ENABLE". Then control is given to step 2427.

At step 2426, two local variables STCutM_element and STCutM_instance are initialised with the value "DISABLE".

At step 2427, some local variables are initialised.

The local variable STCutM_mode takes the default value "RANGE".

If the local variable STCutM_instance is equal to "DISABLE", then the local variable STCutM_offset takes the value 0 (zero). If the local variable STCutM_instance is equal to "ENABLE", then the local variable STCutM_offset takes the value equal to the number of rows between the top row of the scalable template instance STCutM_instance_range and the row of the currently selected cell (for instance if the currently selected cell is located on the same row as the top row of the scalable template instance STCutM_instance_range, then the local variable STCutM_offset takes the value 0).

If the local variable STCutM_instance is equal to "DISABLE", then the local variable STCutM_name takes the value "NONE". If the local variable STCutM_instance is equal to "ENABLE", then the local variable STCutM_name takes the value of the name of the scalable template that the scalable template instance STCutM_instance_range abides by. This name can be retrieved from the "ST" field 753 within the record 751 of the STIT table 750, associated to the scalable template instance STCutM_instance_range.

If the local variable STCutM_instance is equal to "DISABLE", then the local variable STCutM_element takes the value 0 (zero). If the local variable STCutM_instance is equal to "ENABLE", then the local variable STCutM_element takes the value equal to the number of rows belonging both to the currently selected range of cells and to the scalable template instance STCutM_instance_range.

Finally if the local variable STCutM_instance is equal to "DISABLE", then the local variable STCutM_body takes the value 0 (zero). If the local variable STCutM_instance is equal to "ENABLE", then the local variable STCutM_body takes the value equal to the current number of elements within the scalable template instance STCutM_instance_range. This number can be retrieved from the "Element #" field 754 within the record 751 of the STIT table 750, associated to the scalable template instance STCutM_instance_range.

Then several tests are performed to evaluate the potential impact of the cut operation according to the "RANGE" mode, on any already existing scalable template instance. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

If there exists at least one existing scalable template instance whose "Critical" field 755 takes the value "YES" and which partially overlaps the currently selected range of cells STCutM_range, then the local test variable STCutM_range_critical takes the value "YES"; otherwise the local test variable STCutM_range_critical takes the value "NO".

If there exists at least one existing scalable template instance whose "Critical" field 755 takes the value "NO" and which partially overlaps the currently selected range of cells STCutM_range, then the local test variable STCutM_range_other takes the value "YES"; otherwise the local test variable STCutM_range_other takes the value "NO".

At step 2428, the Scalable Template Instance Cut Manager Dialog Box 2320 is displayed on the display device 106. The label box 2331 is initialised with the name of the scalable template that the scalable template instance STCutM_name abides by.

If the local parameter STCutM_element takes the value "ENABLE", then the option button 2329 is enabled, meaning that any future click on it with the pointing device 105 will be recognised as a valid event.

If the local parameter STCutM_element takes the value "DISABLE", then the option button 2329 is disabled, meaning that any future click on it with the pointing device 105 will not be recognised as a valid event.

If the local parameter STCutM_instance takes the value "ENABLE", then the option button 2328 is enabled, meaning that any future click on it with the pointing device 105 will be recognised as a valid event.

If the local parameter STCutM_instance takes the value "DISABLE", then the option button 2328 is disabled, meaning that any future click on it with the pointing device 105 will not be recognised as a valid event.

Then if the local variable STCutM_mode takes the respective value "RANGE", or "ELEMENT", or "INSTANCE", then the option button 2330, or 2329, or 2328 displays alone a black point. Then the text box 2332 is initialised with the value of the local variable STCutM_range_critical. Then the text box 2333 is initialised with the value of the local variable STCutM_range_other. Then the text box 2325 is initialised with the value "YES" (respectively "NO") if the local variable STCutM_range_critical is equal to "NO" (respectively "YES"). Then the text box 2326 is initialised with the value "YES" (respectively "NO") if the local variable STCutM_element takes the value "ENABLE" (respectively "DISABLE"). Then the text box 2327 is initialised with the value "YES" (respectively "NO") if the local variable STCutM_instance takes the value "ENABLE" (respectively "DISABLE"). Finally the "Cut" push-button 2323 is enabled if the text box 2325 shows the value "YES" and the option button 2330 shows a black point, or if the text box 2326 shows the value "YES" and the option button 2329 shows a black point, or if the text box 2327 shows the value "YES" and the option button 2328 shows a black point.

At step 2429, the method is waiting for any user action on the Scalable Template Instance Cut Manager Dialog Box 2320. Such user action is typically resulting from a click with the pointing device 105, but take other similar forms such as, but not limited to a specific combination of key on the keyboard 104, or any other similar means not further specified here.

At step 2430, a user action on the Scalable Template Instance Cut Manager Dialog Box 2320 is detected. If the user action is a click on the "Cut" push-button 2323, then control is given to step 2432; if the user action is a click on one of the option buttons 2330, or 2329, or 2328, then control is given to step 2431; if the user action is a click on the "Cancel" push-button 2322, or on the closing-window push-button 2321, then control is given to step 2445.

At step 2431, the local variable STCutM_mode takes the value "RANGE", or "ELEMENT", or "INSTANCE", if the spreadsheet user has respectively clicked with the pointing device 105 on the option button 2330, or 2329, or 2328. Then control is given to step 2428.

At step 2432, a test is performed to check the value of the local variable STCutM_mode.

If this local variable is found equal to "RANGE", then control is given to step 2442;

if it is found equal to "INSTANCE", then control is given to step 2437;

if it is found equal to "ELEMENT", then control is given to step 2433.

At step 2433, some global variables are initialised. In a preferred embodiment of the present invention, these global variables are preferably recorded as part of the main memory 102, but any other similar recording means could be used instead without departing from the spirit of the invention.

The global variable Copy_mode is initialised with the value "ELEMENT".

The global variable Copy_name is initialised with the value of the local variable STCutM_name.

The global variable Copy_offset is initialised with the value of the local variable STCutM_offset.

The global variable Copy_body is initialised with the value of the local variable STCutM_body.

The global variable Copy_element is initialised with the value of the local variable STCutM_element.

At step 2434, the currently selected range of cells STCutM_range is reshaped so that it first occupies all the columns and only the columns of the scalable template instance STCutM_instance_range and second does occupy all rows inside and not any row outside the intersection of the scalable template instance STCutM_instance_range with the previous position of the selected range of cells. Then the currently selected cell becomes the top left cell of this reshaped currently selected range of cells.

At step 2435, a conventional Copy operation is performed from the currently selected range of cell onto the clipboard.

At step 2436, the "IN" cells belonging to the currently selected range of cells STCutM_range are cleared. For this purpose, the "ST" field 753 of the record 751 of the STIT table 750, as identified at step 2424, is visited to get a memory pointer on the STDT table 760 of the scalable template, which specifies for each meta-element and for each element of the scalable template instance what is the associated profile, which in turn indicates which cells are "IN" cells and which cells are "OUT" cells. Then each row of the range of cells STCutM_range is selected one after the other, and for each selected row, the corresponding element or meta-element profile is retrieved from the STDT table 760 to determine which cells are "IN" cells. For this purpose, a temporary local variable STCutM_out_fields memorises the relative positions of all the cells specified as "IN" or "OUT" cells, as an ordered set of IN or OUT values. For instance in an element profile made of 5 cells, where only the third and fifth cells are "OUT" cells, this local variable STCutM_out_fields takes the value (IN, IN, OUT, IN, OUT). Once the "IN" cells belonging to the range of cells STCutM_range are determined, these cells are updated by clearing their content.

At step 2437, some global variables are initialised. In a preferred embodiment of the present invention, these global variables are preferably recorded as part of the main memory 102, but any other similar recording means could be used instead without departing from the spirit of the invention.

The global variable Copy_mode is initialised with the value "INSTANCE".

The global variable Copy_name is initialised with the value of the local variable STCutM_name.

The global variable Copy_offset is initialised with the value 0 (respectively 1) if the scalable template instance STCutM_instance_range is qualified as critical (respectively not critical), as specified by the "Critical" field 755 of the record 751 within the STIT table 750 corresponding to this scalable template instance, field taking respectively the values "NO" and "YES".

The global variable Copy_body is initialised with the value of the local variable STCutM_body.

The global variable Copy_element is initialised with the value 0 (zero).

At step 2438, the currently selected range of cells is reshaped so that it occupies the same rows and columns than the scalable template instance STCutM_instance_range.

At step 2439, a conventional Cut operation is performed from the currently selected range of cell onto the clipboard.

At step 2440, the STIT table 750 is scanned to remove from it any record 751 whose "Address" field 752 is found equal to the value "CLIPBOARD". Each time such a record 751 has been removed from the STIT table 750, the "Reference Housekeeping Process", as described in step 1414 of the Scalable Template Instanciator method, is invoked and executed before looking for any other record 751 to be removed from the STIT table 750. Then control is given to the step 2441.

At step 2441, the record 751 within the STIT table 750 whose "Address" field 752 corresponds to the scalable template instance STCutM_instance_range is updated by setting the "Address" field 752 to the value "CLIPBOARD".

At step 2442, some global variables are initialised. In a preferred embodiment of the present invention, these global variables are preferably recorded as part of the main memory 102, but any other similar recording means could be used instead without departing from the spirit of the invention.

The global variable Copy_mode is initialised with the value "RANGE".

The global variable Copy_name is initialised with the value " " (empty character string).

The global variable Copy_offset is initialised with the value 0 (zero).

The global variable Copy_body is initialised with the value 0 (zero).

The global variable Copy_element is initialised with the value 0 (zero).

At step 2443, the records 751 identified at step 2423 are removed from the STIT table 750. Each time such a record 751 has been removed from the STIT table 750, the "Reference Housekeeping Process", as described in step 1414 of the Scalable Template Instanciator method, is invoked and executed before looking for any other record 751 to be removed from the STIT table 750. Then control is given to the step 2444.

At step 2444, a conventional Cut operation is performed from the currently selected range of cell onto the clipboard.

At step 2445, the Scalable Template Instance Cut Manager Dialog Box 2320 is closed (if it was opened) and then control is given back to the initial step 2421 for processing any future Scalable Template Instance Cut Manager command.

E11. Scalable Template Instance Paste method

Figure 24C:
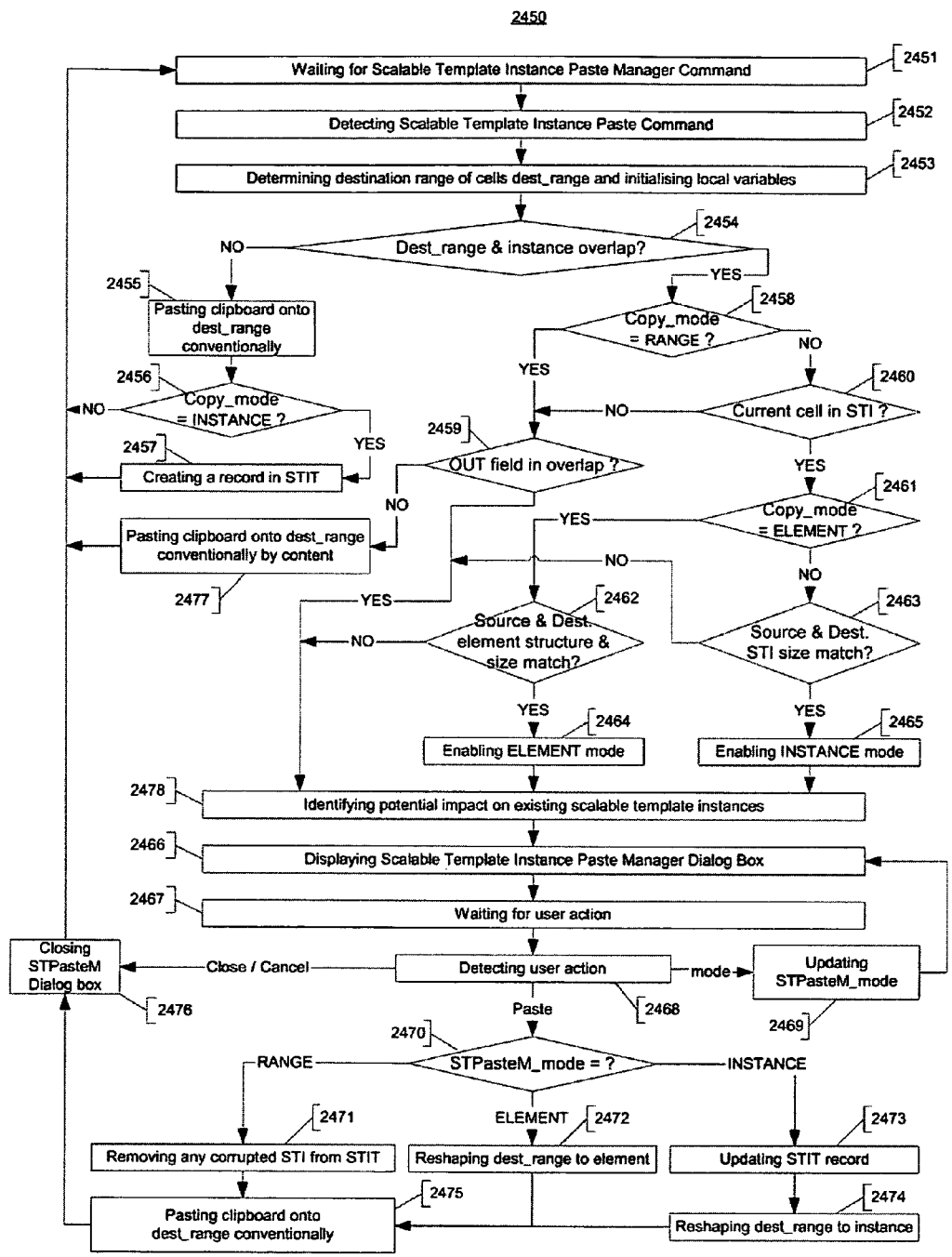
FIG. 24C is a flow chart illustrating a preferred method for pasting scalable template instances according to a preferred embodiment of the present invention.

The method for performing a paste operation on a destination scalable template instance used in a preferred embodiment of the present invention is summarised in flowchart 2450 of FIG. 24C. This method can be seen as the processing of the Scalable Template Instance Paste Manager command.

At step 2451, the method is in its default state, waiting for an event to initiate the process.

At step 2452, the Scalable Template Instance Paste Manager command is detected, as a result of an user action. This action can be for instance a specific combination of key on the keyboard 104, or the click of the pointing device 105 on a specific button, or any other similar means not further specified here. When the Scalable Template Instance Paste Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 2453, the destination range of cells, referred to as dest_range, is determined according to a conventional method.

If the previously copied or cut range of cells is made of a single column and of multiple rows, then dest_range corresponds to a range of cells occupying the same columns as the currently selected range of cells, and occupying as many rows as the range of cells previously copied or cut.

If the previously copied or cut range of cells is made of a single row and of multiple columns, then dest_range corresponds to a range of cells occupying the same rows as the currently selected range of cells, and occupying as many columns as the range of cells previously copied or cut.

If the previously copied or cut range of cells is made of a single cell, then dest_range corresponds to the currently selected range of cells.

In all the other cases, dest_range occupies as many rows and columns as the previously copied or cut range of cells, with the top left cell located on the position of the currently selected cell.

Then some local variables are initialised: the local variable STPasteM_mode is initialised to the value "RANGE"; the local variable STPasteM_element is initialised to the value "DISABLE"; and the local variable STPasteM_instance is initialised to the value "DISABLE".

At step 2454, a test is performed to check if the range of cells dest_range overlaps any existing scalable template instance. This test is performed by parsing the STIT table 750 and visiting in each record 751 the "Address" field 752 to determine if the range of cells address specified in this field does overlap the address of the range of cells dest_range. If it is the case, then control is given to step 2458; otherwise control is given to step 2455.

At step 2455, a conventional Paste operation is performed from the clipboard onto the range of cells dest_range.

At step 2456, a test is performed to check the value of the global variable copy_mode. If the value of this global variable is found equal to "INSTANCE", then control is given to step 2457; otherwise control is given to the initial step 2451 for processing any future Scalable Template Instance Paste Manager command.

At step 2457, the STIT table 750 is updated. The record 751 whose "Address" field 752 is found equal to "CLIPBOARD" is first duplicated field by field and then this just created new record 751 is updated by setting the "Address" field 752 to the address of the range of cells dest_range. Then control is given to the initial step 2451 for processing any future Scalable Template Instance Paste Manager command.

At step 2458, a test is performed to check the value of the global variable copy_mode. If the value of this global variable is found equal to "RANGE", then control is given to step 2459; otherwise control is given to step 2460.

At step 2459, a test is performed to check if the overlap area between the range of cells dest_range and existing scalable template instances (as identified at step 2454) does comprise element or meta-element cells specified as "OUT" cells. If it is the case, then control is given to step 2478; otherwise control is given to step 2477.

At step 2460, a test is performed to check if the currently selected cell is located within any existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance named STPasteM_instance_range and control is given to step 2461; otherwise control is given to step 2459.

At step 2461, a test is performed to check the value of the global variable copy_mode. If the value of this global variable is found equal to "ELEMENT", then control is given to step 2462; otherwise control is given to step 2463.

At step 2462, a test is performed to check if there is any mismatch between the structure of the elements or meta-elements which were previously copied or cut onto the clipboard (referred to as the source element structure which is characterised by the global variable copy_name, by the global variable copy_offset, by the global variable copy_element and by the global variable copy_body) and the structure of the elements or meta-elements within the scalable template instance STPasteM_instance_range which occupy the rows of the range of cells dest_range (referred to as the destination element structure which is characterised by the "ST" field 753 of the associated record 751 within the STIT table 750, by the relative row offset between the range of cells dest_range and the range of cells STPasteM_instance_range, and by the "Element #" field 754 of the associated record 751 within the STIT table 750). These two structures are found as different if one or both of the two following conditions are fulfilled:

The global variable copy_offset is less than the "Header Size" field 756 and the global variable copy_offset is different from the relative row offset between the range of cells dest_range and the range of cells STPasteM_instance_range, The sum of the global variables copy_offset and copy_element is greater than the sum of the "Header Size" field 756 and of the global variable copy_body and the difference between the global variables copy_body and copy_offset is different from the difference between the "Element #" field 754 and the relative row offset between the range of cells dest_range and the range of cells STPasteM_instance_range.

If both structures are found different (according to the above conditions) then control is given to step 2478; otherwise control is given to step 2464.

At step 2463, a test is performed to check if there is any mismatch between the size of the scalable template instance which was previously copied or cut onto the clipboard (referred to as the source scalable template instance which is characterised by the global variable copy_name, by the global variable copy_offset and by the global variable copy_body) and the scalable template instance STPasteM_instance_range (referred to as the destination scalable template instance element structure which is characterised by the "ST" field 753 of the associated record 751 within the STIT table 750, by the "Critical" field 755 of the associated record 751 within the STIT table 750, and by the "Element #" field 754 of the associated record 751 within the STIT table 750). If both instances have the same size (same number of rows and columns) then control is given to step 2465; otherwise control is given to step 2478.

At step 2464, the local variable STPasteM_element is initialised to the value "ENABLE", then control is given to step 2478.

At step 2465, the local variable STPasteM_instance is initialised to the value "ENABLE", then control is given to step 2478.

At step 2466, the Scalable Template Instance Paste Manager Dialog Box 2340 is displayed on the display device 106. The label box 2351 is initialised with the name of the scalable template that the scalable template instance STPasteM_instance_name abides by. The label box 2354 is initialised with the value of the global variable copy_name.

If the local parameter STPasteM_element takes the value "ENABLE", then the push-button 2349 is enabled, meaning that any future click on it with the pointing device 105 will be recognised as a valid event.

If the local parameter STPasteM_element takes the value "DISABLE", then the push-button 2349 is disabled, meaning that any future click on it with the pointing device 105 will not be recognised as a valid event.

If the local parameter STPasteM_instance takes the value "ENABLE", then the push-button 2348 is enabled, meaning that any future click on it with the pointing device 105 will be recognised as a valid event.

If the local parameter STPasteM_instance takes the value "DISABLE", then the push-button 2348 is disabled, meaning that any future click on it with the pointing device 105 will not be recognised as a valid event.

Then if the local variable STPasteM_mode takes the respective value "RANGE", or "ELEMENT", or "INSTANCE", then the option button 2350, or 2349, or 2348 displays alone a black point. Then the text box 2352 is initialised with the value of the local variable STPasteM_range_critical. Then the text box 2353 is initialised with the value of the local variable STPasteM_range_other. Then the text box 2345 is initialised with the value "YES" (respectively "NO") if the local variable STPasteM_range_critical is equal to "NO" (respectively "YES"). Then the text box 2346 is initialised with the value "YES" (respectively "NO") if the local variable STPasteM_element takes the value "ENABLE" (respectively "DISABLE"). Then the text box 2347 is initialised with the value "YES" (respectively "NO") if the local variable STPasteM_instance takes the value "ENABLE" (respectively "DISABLE"). Finally the "Paste" push-button 2343 is enabled if the text box 2345 shows the value "ES" and the option button 2350 shows a black point, or if the text box 2346 shows the value "YES" and the option button 2349 shows a black point, or if the text box 2347 shows the value "YES" and the option button 2348 shows a black point.

At step 2467, the method is waiting for any user action on the Scalable Template Instance Paste Manager Dialog Box 2340. Such user action is typically resulting from a click with the pointing device 105, but take other similar forms such as, but not limited to a specific combination of key on the keyboard 104, or any other similar means not further specified here.

At step 2468, a user action on the Scalable Template Instance Paste Manager Dialog Box 2340 is detected.
If the user action is a click on the "Paste" push-button 2343, then control is given to step 2470;

if the user action is a click on one of the option buttons 2350, or 2349, or 2348, then control is given to step 2469;

if the user action is a click on the "Cancel" push-button 2342, or on the closing-window push-button 2341, then control is given to step 2476.

At step 2469, the local variable STPasteM_mode takes the value "RANGE", or "ELEMENT" or "INSTANCE", if the spreadsheet user has respectively clicked with the pointing device 105 on the option button 2350, or 2349, or 2348. Then control is given to step 2466.

At step 2470, a test is performed to check the value of the local variable STPasteM_mode.
If this local variable is found equal to "RANGE", then control is given to step 2471;
if it is found equal to "INSTANCE", then control is given to step 2473;
if it is found equal to "ELEMENT", then control is given to step 2472.

At step 2471, the records 751 identified at step 2478 are removed from the STIT table 750. Each time such a record 751 has been removed from the STIT table 750, the "Reference Housekeeping Process", as described in step 1414 of the Scalable Template Instanciator method, is invoked and executed before looking for any other record 751 to be removed from the STIT table 750. Then control is given to the step 2475.

At step 2472, the range of cells dest_range is reshaped so that it first occupies all the columns and only the columns of the scalable template instance STPasteM_instance_range and second does occupy all rows inside and not any row outside the intersection of the scalable template instance STPasteM_instance_range with the previous position of the range of cells dest_range. Then the currently selected cell becomes the top left cell of this reshaped range of cells. Then control is given to step 2475.

At step 2473, the STIT table 750 is updated. First the record 751 whose "Address" field 751 is found equal to the address of the range of cells STPasteM_instance_range is deleted. Second the record 751 whose "Address" field 752 is found equal to "CLIPBOARD" is first duplicated field by field an then the just created new record 751 is updated by setting in the "Address" field 752 the address of the range of cells STPasteM_instance_range.

At step 2474, the range of cells dest_range is reshaped to occupy the same position than the range of cells STPasteM_instance_range.

At step 2475, a conventional Paste operation is performed from the clipboard onto the range of cells dest_range.

At step 2476, the Scalable Template Instance Paste Manager Dialog Box 2340 is closed and then control is given back to the initial step 2451 for processing any future Scalable Template Instance Paste Manager command.

At step 2477, a conventional Paste operation by content is performed from the clipboard onto the range of cells dest_range and then control is given back to the initial step 2451 for processing any future Scalable Template Instance Paste Manager command.

At step 2478, several tests are performed to evaluate the potential impact of the paste operation according to the "RANGE" mode, on any already existing scalable template instance. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

If there exists at least one existing scalable template instance whose "Critical" field 755 takes the value "YES" and which partially overlaps the range of cells dest_range, then the local test variable STPasteM_range_critical takes the value "YES"; otherwise the local test variable STPasteM_range_critical takes the value "NO".

If there exists at least one existing scalable template instance whose "Critical" field 755 takes the value "NO" and which partially overlaps the range of cells dest_range, then the local test variable STPasteM_range_other takes the value "YES"; otherwise the local test variable STPasteM_range_other takes the value "NO". Then control is given to step 2466.

E12. Scalable Template Export Manager method

Figure 25A:
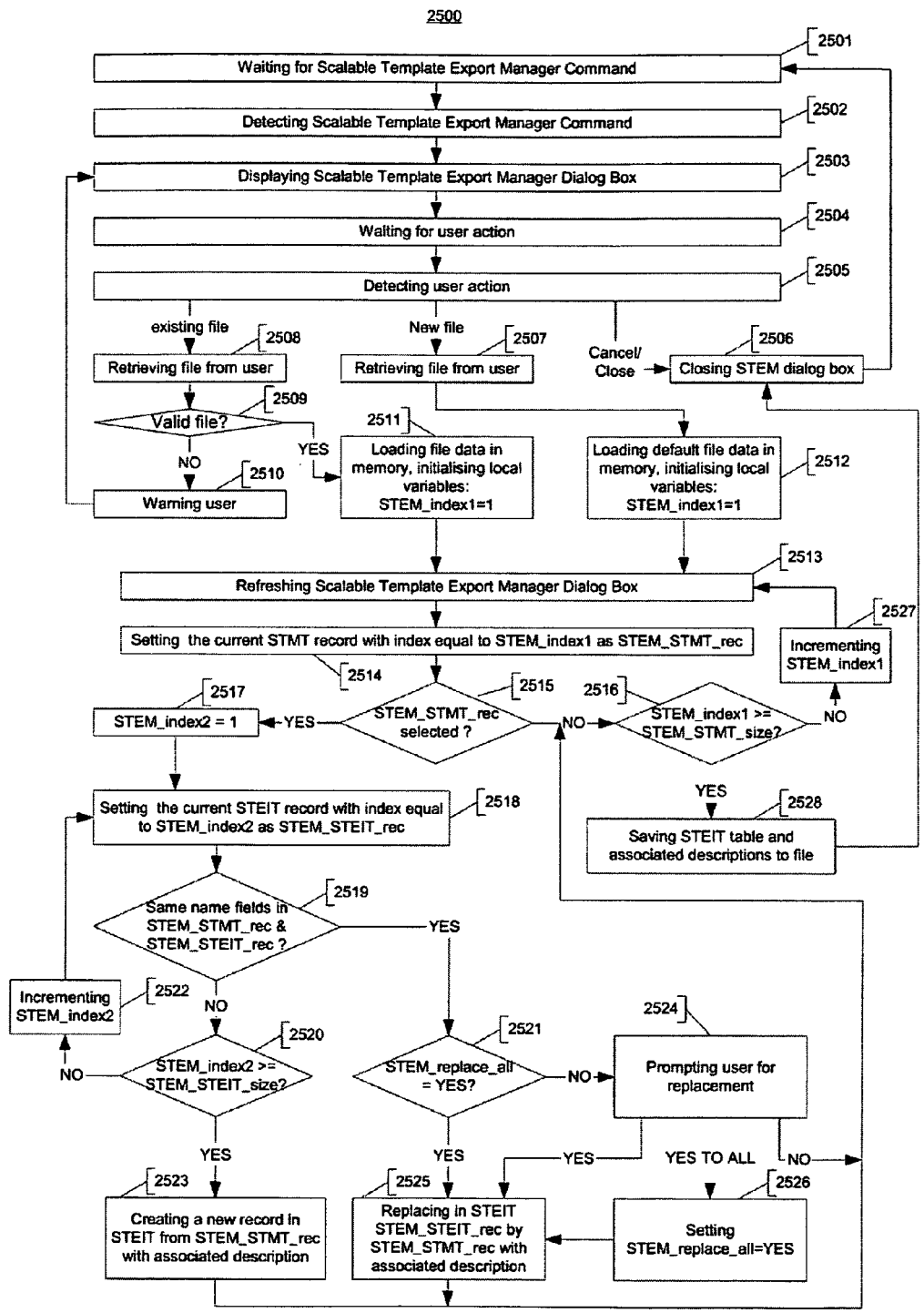
FIG. 25A is a flow chart illustrating a preferred method for exporting scalable template items (element formats, or meta-element formats, or element profiles, or meta-element profiles, or scalable templates) according to a preferred embodiment of the present invention.

The method for exporting the definition of scalable template objects (either element formats, or element profiles, or meta-element formats or meta-element profiles or scalable templates) from a source spreadsheet file to a destination export-import spreadsheet file used in a preferred embodiment of the present invention is summarised in flowchart 2500 of FIG. 25A. This method can be seen as the processing of the Scalable Template Export Manager command.

At step 2501, the method is in its default state, waiting for an event to initiate the process.

At step 2502, the Scalable Template Export Manager command is detected, as a result of a user action. This action can be for instance a specific combination of key on the keyboard 104, or the click of the pointing device 105 on a specific button, or any other similar means not further specified here.

At step 2503, the Scalable Template Export Manager Dialog Box 2600 is displayed on the display device 106. At this stage of the Scalable Template Export Manager method, the Scalable Template Export Manager Dialog Box 2600 contains only three push-buttons: the push-button "Export in a NEW file" 2612, the push-button "Export in an EXISTING file" 2613, and the push-button "Cancel" 2602.

At step 2504, the method is waiting for any user action on the Scalable Template Export Manager Dialog Box 2600. Such user action is typically resulting from a click with the pointing device 105, but take other similar forms such as, but not limited to a specific combination of key on the keyboard 104, or any other similar means not further specified here.

At step 2505, a user action on the Scalable Template Export Manager Dialog Box 2600 is detected.

If the user action is a click on the push-button "Export in a NEW file" 2612, then control is given to step 2507;

if the user action is a click on the push-button "Export in an EXISTING file" 2613, then control is given to step 2508;

if the user action is a click on the push-button "Cancel" 2602, or on the closing-window push-button 2601, then control is given to step 2506.

At step 2506, the Scalable Template Export Manager Dialog Box 2600 is closed and then control is given back to the initial step 2501 for processing any future Scalable Template Export Manager command.

At step 2507, conventional means are used to interface with the spreadsheet user for creating the new spreadsheet export-import file to be created. In a preferred embodiment of the present invention, these means correspond to a conventional file creation dialog box displayed on the display device 106, but any other similar conventional means could be used instead without departing from the spirit of the invention. Furthermore no specific assumption is made regarding the file structure used in the environment where the spreadsheet application is running, as any conventional file structure can be used without influencing the spirit of the invention. Then control is given to step 2512.

At step 2508, conventional means are used to interface with the spreadsheet user for retrieving the existing spreadsheet export-import file to be updated. In a preferred embodiment of the present invention, these means correspond to a conventional file selection dialog box displayed on the display device 106, but any other similar conventional means could be used instead without departing from the spirit of the invention. Furthermore no specific assumption is made regarding the file structure used in the environment where the spreadsheet application is running, as any conventional file structure can be used without influencing the spirit of the invention.

Figure 26C:
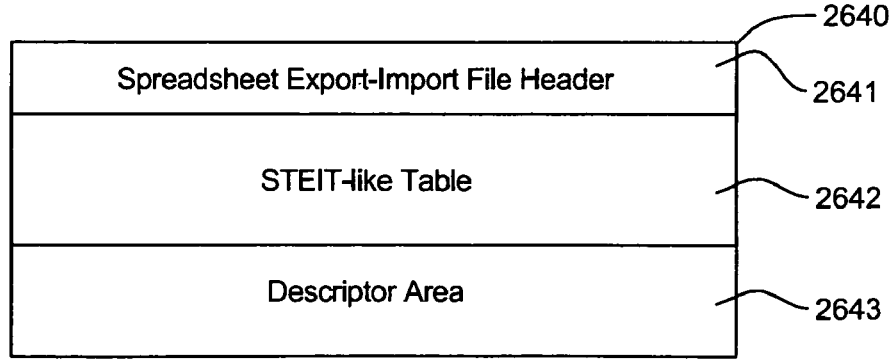
FIG. 26C illustrates the logical file structure of the export-import files, according to the preferred embodiment of the present invention.

At step 2509, a test is performed to check if the file identified at step 2508 is a valid spreadsheet export-import file. This validity test corresponds to verifying that the identified spreadsheet file follows the logical file structure 2640 illustrated by the FIG. 26C, which is made of three parts.

The first part 2641 is the spreadsheet export-import file header containing a unique signature identifying a spreadsheet export-import file.

The second part 2642 is made of a table following the structure of a STEIT table 770, as illustrated by FIG. 7G.

The third and last part 2643 is the Descriptor area where are recorded the descriptions of the scalable template items (either element formats, or element profiles, or meta-element formats or meta-element profiles or scalable templates) pointed by the "Description Ptr" field 774 within the records 771 of the STEIT-like table recorded within the second part 2642 of the spreadsheet export-import file.

If the spreadsheet file follows this logical file structure 2640, then control is given to step 2511; otherwise control is given to step 2510.

At step 2510, a warning message notification is issued for informing the user that the selected spreadsheet file does not comply with the structure of spreadsheet export-import files. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2503.

At step 2511, the second and third parts 2642 and 2643 of the selected file are loaded into memory to constitute the STEIT table 770 and the associated object descriptions. Then some local variables are initialised:
the local variable STEM_index1 is initialised to the value 1 (one);
the local variable STEM_replace_all is initialised to the value "NO";
the local variable STEM_STMT size is initialised to the number of records 731 within the STMT table 730;
the local variable STEM_STEIT_size is initialised to the number of records 771 within the STEIT table 770.
Then control is given to step 2513.

At step 2512, an empty STEIT table 770 is created in memory as well as the associated memory space for recording the descriptions of the scalable template items described by records 771. Then some local variables are initialised: the local variable STEM_index1 is initialised to the value 1 (one); the local variable STEM_replace_all is initialised to the value "NO"; the local variable STEM_STMT size is initialised to the number of records 731 within the STMT table 730; the local variable STEM_STEI_size is initialised to 0 (zero).

At step 2513, the Scalable Template Export Manager Dialog Box 2600 is refreshed on the display device 106, as the text box 2603 specifies the name of the file to which are exported scalable template items, and as the progression bar 2604 is displayed to reflect the fact that the currently processed record of the STMT table 730 is the one of rank STEM_index1 out of a set of size STEM_STMT size.

At step 2514, within the STMT table 730, the record 731 whose "Index" field 738 has a value equal to the value of the local variable STEM_index1, becomes the current record STEM_STMT_rec 731 of the STMT table 730.

At step 2515, a test is performed on the STEM_STMT rec record 731 to determine if the value of the "SELECTED" attribute 742 within the "Type" field 737 is equal to "YES". If it is the case, then control is given to step 2517; otherwise control is given to step 2516.

At step 2516, a test is performed to check if the value of the local variable STEM_index1 is greater than or equal to the value of the local variable STEM_STMT size. If it is the case, then control is given to step 2528; otherwise control is given to step 2527.

At step 2517, the local variable STEM_index2 is initialised to the value 1 (one).

At step 2518, within the STEIT table 770, the record 771 whose "Index" field 778 has a value equal to the value of the local variable STEM_index2, becomes the current record STEM_STEIT_rec 771 of the STEIT table 770.

At step 2519, a test is performed to check if the value of the "Name" field 732 of the STEM_STMT rec record 731 is equal to the value of the "Name" field 772 of the STEM_STEIT rec record 771. If it is the case, then control is given to step 2521; otherwise control is given to step 2520.

At step 2520, a test is performed to check if the value of the local variable STEM_index2 is greater than or equal to the value of the local variable STEM_STEIT_size. If it is the case, then control is given to step 2523; otherwise control is given to step 2522.

At step 2521, a test is performed to check if the local variable STEM_replace all is equal to the value "YES". If it is the case, then control is given to step 2525; otherwise control is given to step 2524.

At step 2522, the local variable STEM_index2 is incremented by 1 (one) and then control is given to step 2518.

At step 2523, a new record 771 is created in the STEIT table 770. This new record is initialised within each field 772, 773, 775, 776, 777 and 778 with the content of the respective fields 732, 733, 735, 736, 737 and 738 within the STEM_STMT rec record 731. In addition the scalable template item description, as pointed by the "Description Ptr" field 734 is copied within the Descriptor Area 2643, and the "Description Ptr" field 774 of the STEM_STEIT_rec record 731 is set to the memory address of this copied descriptor. Then control is given to step 2516.

At step 2524, the Scalable Template Export Manager Dialog Box 2600 is updated by displaying in a frame 2611 some information related to a conflict between a record already existing in the STEIT table 770 and a record exported from the STMT table 730. Both records correspond to the same scalable template item whose name is displayed in the text box 2605. The STEIT record 771 is time stamped with the date displayed in the text box 2606, and the STMT record 731 is time stamped with a date displayed in the text box 2607. The spreadsheet user makes one choice out of three:
If he/she wants to replace the existing definitions based on the STEIT table 770 by the definitions based on the STMT table 730 for all the scalable template items, then he/she click with the pointing device 105 on the "Yes to All" push-button 2609 and control is given to step 2526;
if he/she wants to replace the existing definition based on the STEIT table 770 by the definition based on the STMT table 730 for the current scalable template item, then he/she click with the pointing device 105 on the "Yes" push-button 2610 and control is given to step 2525;
if he/she does not want to replace the existing definition based on the STEIT table 770 by the definition based on the STMT table 730 for the current scalable template item, then he/she click with the pointing device 105 on the "NO" push-button 2608 and control is given to step 2516.
In all the three cases, the frame 2611 and the objects it contains are no longer displayed on the display device 106 as soon as the spreadsheet user clicks with the pointing device 105 on one of the three push-buttons 2608, 2609, and 2610.

At step 2525, the STEM_STEIT rec record 771 within the STEIT table 770 is replaced field by field by the STEM_STMT rec record 731: the content of each field 772, 773, 775, 776, 777 and 778 is replaced by the content of the respective fields 732, 733, 735, 736, 737 and 738 from the STEM_STMT rec record 731. In addition the scalable template item description, as pointed by the "Description Ptr" field 734 is copied within the Descriptor Area 2643 at the address pointed by the "Description Ptr" field 774 of the STEM_STEIT rec record 731. Then control is given to step 2516.

At step 2526, the local variable STEM_replace_all is set equal to the value "YES" and then control is given to step 2525.

At step 2527, the local variable STEM_index1 is incremented by 1 (one) and then control is given to step 2513.

At step 2528, the STEIT table 770 and the associated descriptions are saved on the current export-import file to respectively constitute the updated second part (STEIT-like table) 2642 and the updated third part (Descriptor Area) 2643 of the logical structure 2640 followed by the export-import file. Then control is given to step 2506.

E13. Scalable Template Import Manager Method

Figure 25B:
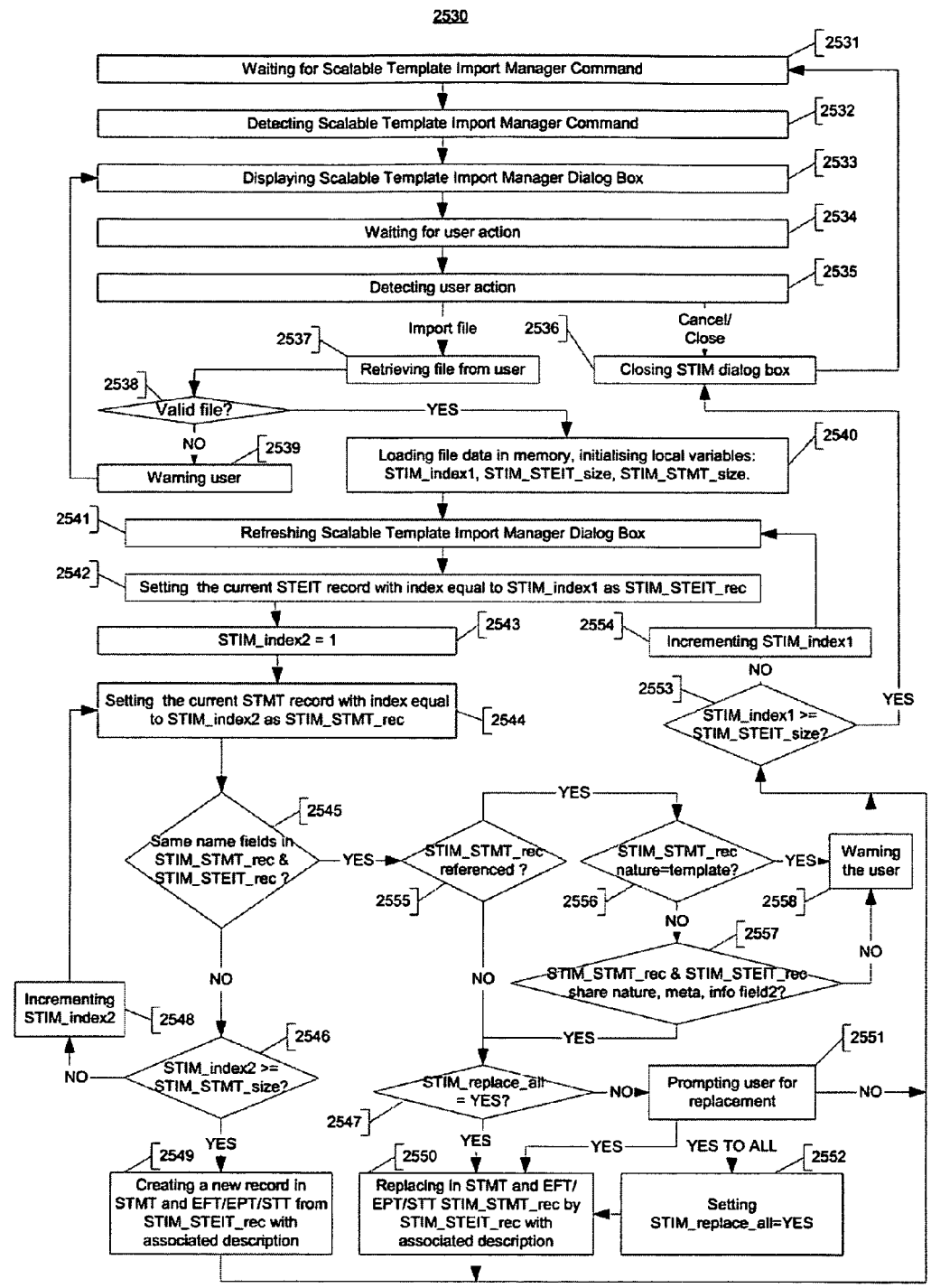
FIG. 25B is a flow chart illustrating a preferred method for importing scalable template items (element formats, or meta-element formats, or element profiles, or meta-element profiles, or scalable templates) according to a preferred embodiment of the present invention.

The method for importing the definition of scalable template objects (either element formats, or element profiles, or meta-element formats or meta-element profiles or scalable templates) from a source import-export spreadsheet file to a destination spreadsheet file used in a preferred embodiment of the present invention is summarised in flowchart 2530 of FIG. 25B. This method can be seen as the processing of the Scalable Template Import Manager command.

At step 2531, the method is in its default state, waiting for an event to initiate the process.

At step 2532, the Scalable Template Import Manager command is detected, as a result of a user action. This action can be for instance a specific combination of key on the keyboard 104, or the click of the pointing device 105 on a specific button, or any other similar means not further specified here.

At step 2533, the Scalable Template Import Manager Dialog Box 2620 is displayed on the display device 106. At this stage of the Scalable Template Import Manager method, the Scalable Template Import Manager Dialog Box 2620 contains only two push-buttons: the push-button "Select an Importfile" 2632, and the push-button "Cancel" 2622.

At step 2534, the method is waiting for any user action on the Scalable Template Import Manager Dialog Box 2620. Such user action is typically resulting from a click with the pointing device 105, but take other similar forms such as, but not limited to a specific combination of key on the keyboard 104, or any other similar means not further specified here.

At step 2535, a user action on the Scalable Template Import Manager Dialog Box 2620 is detected. If the user action is a click on the push-button "Select an Import file" 2632, then control is given to step 2537. If the user action is a click on the push-button "Cancel" 2622, or on the closing-window push-button 2621, then control is given to step 2536.

At step 2536, the Scalable Template Import Manager Dialog Box 2620 is closed and then control is given back to the initial step 2531 for processing any future Scalable Template Import Manager command.

At step 2537, conventional means are used to interface with the spreadsheet user for retrieving the existing spreadsheet export-import file to be accessed. In a preferred embodiment of the present invention, these means correspond to a conventional file selection dialog box displayed on the display device 106, but any other similar conventional means could be used instead without departing from the spirit of the invention. Furthermore no specific assumption is made regarding the file structure used in the environment where the spreadsheet application is running, as any conventional file structure can be used without influencing the spirit of the invention.

At step 2538, a test is performed to check if the file identified at step 2537 is a valid spreadsheet export-import file. This validity test corresponds to verifying that the spreadsheet file follows the logical file structure 2640 illustrated by the FIG. 26C, which is made of three parts. The first part 2641 is the spreadsheet export-import file header containing a unique signature identifying a spreadsheet export-import file. The second part 2642 is made of a table following the structure of a STEIT table 770, as illustrated by FIG. 7G. The third and last part 2643 is the Descriptor area where are recorded the descriptions of the scalable template items (either element formats, or element profiles, or meta-element formats or meta-element profiles or scalable templates) pointed by the "Description Ptr" field 774 within the records 771 of the STEIT-like table recorded within the second part 2642 of the export-import file. If the file follows this logical file structure 2640, then control is given to step 2540; otherwise control is given to step 2539.

At step 2539, a warning message notification is issued for informing the user that the selected spreadsheet file does not comply with the structure of spreadsheet export-import files. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2533.

At step 2540, the second and third parts 2642 and 2643 of the selected file are loaded into memory to constitute the STEIT table 770 and the associated object descriptions. Then some local variables are initialised: the local variable STIM_index1 is initialised to the value 1 (one); the local variable STIM_replace_all is initialised to the value "NO"; the local variable STIM_STMT size is initialised to the number of records 731 within the STMT table 730; the local variable STIM_STEIT_size is initialised to the number of records 771 within the STEIT table 770.

At step 2541, the Scalable Template Import Manager Dialog Box 2620 is refreshed on the display device 106, as the text box 2623 specifies the name of the file from which are imported scalable template items, and as the progression bar 2624 is displayed to reflect the fact that the currently processed record of the STEIT table 770 is the one of rank STIM_index1 out of a set of size STIM_STEIT_size.

At step 2542, within the STEIT table 770, the record 771 whose "Index" field 778 has a value equal to the value of the local variable STIM_index1, becomes the current record STIM_STMT_rec 771 of the STEIT table 770.

At step 2543, the local variable STIM_index2 is initialised to the value 1 (one).

At step 2544, within the STMT table 730, the record 731 whose "Index" field 738 has a value equal to the value of the local variable STIM_index2, becomes the current record STIM_STMT_rec 731 of the STMT table 730.

At step 2545, a test is performed to check if the value of the "Name" field 732 of the STIM_STMT_rec record 731 is equal to the value of the "Name" field 772 of the STIM_STEIT_rec record 771. If it is the case, then control is given to step 2555; otherwise control is given to step 2546.

At step 2546, a test is performed to check if the value of the local variable STIM_index2 is greater than or equal to the value of the local variable STIM_STMT size. If it is the case, then control is given to step 2549; otherwise control is given to step 2548.

At step 2547, a test is performed to check if the local variable STIM_replace_all is equal to the value "YES". If it is the case, then control is given to step 2550; otherwise control is given to step 2551.

At step 2548, the local variable STIM_index2 is incremented by 1 (one) and then control is given to step 2544.

At step 2549, a new record 731 is created in the STMT table 730. This new record is initialised within each field 732, 733, 735, 736, 737 and 738 with the content of the respective fields 772, 773, 775, 776, 777 and 778 within the STIM_STEIT rec record 771. In addition the scalable template item description, as pointed by the "Description Ptr" field 774 is copied in memory, and the "Description Ptr" field 734 of the new record 731 is set to the memory address of this copied descriptor. Then the "NATURE" attribute 741 of the "Type" field 737 of the new record 731 is retrieved to determine in which table (EFT 700, or EPT 710, or STT 720) a new record must also be created. If this "NATURE" attribute is found equal to "FORMAT" (respectively "TEMPLATE", or "PROFILE"), then a new record 701 (respectively 711 or 721) is created in the EFT table 700 (respectively EPT table 710 or STT table 720), where the fields 702, 703, 704, 705, 706, 708, 709 (respectively 712, 713, 714, 715, 716, 718, 719 or 722, 723, 724, 725, 726, 728, 729) are initialised with the content of the fields 732, 733, 734, 735, 736, 739, 740 of the new record 731. Then control is given to step 2553.

At step 2550, the STIM_STMT_rec record 731 within the STMT table 730 is replaced field by field by the STIM_STEIT_rec record 771: the content of each field 732, 733, 735, 736, 737 and 738 is replaced by the content of the respective fields 772, 773, 775, 776, 777 and 778 from the STIM_STEIT_rec record 771. In addition the scalable template item description, as pointed by the "Description Ptr" field 774 is copied from the Descriptor Area 2643 at the address pointed by the "Description Ptr" field 734 of the STIM_STMT_rec record 731. Then the "NATURE" attribute 741 of the "Type" field 737 of the updated record 731 is retrieved to determine in which table (EFT 700, or EPT 710, or STT 720) a record must also be updated. If this "NATURE" attribute is found equal to "FORMAT" (respectively "TEMPLATE", or "PROFILE"), then the record 701 (respectively 711 or 721) in the EFT table 700 (respectively EPT table 710 or STT table 720), whose "Name" field 702 (respectively 712 or 722) is found equal to the "Name" field 732, is updated as the fields 703, 704, 705, 706, 708, 709 (respectively 713, 714, 715, 716, 718, 719 or 723, 724, 725, 726, 728, 729) are replaced by the content of the fields 733, 734, 735, 736, 739, 740 of the updated record 731. At this stage, the method can optionally be completed by invoking the Scalable Template Refresh Manager command, so that the update of the imported object (either a profile or a format according to the "NATURE" attribute) be reflected in every scalable template instance that abides by a scalable template whose definition refers to the imported format or profile, as recorded in records 701 or 710 of the EFT table 700 or EPT table 710. The necessary steps followed for executing the Scalable Template Refresh Manager command are not recalled here as they have been already extensively described in a former section. Then control is given to step 2553.

At step 2551, the Scalable Template Import Manager Dialog Box 2620 is updated by displaying in a frame 2631 some information related to a conflict between a record already existing in the STMT table 730 and a record imported from the STEIT table 770. Both records correspond to the same scalable template item whose name is displayed in the text box 2625. The STEIT record 771 is time stamped with the date displayed in the text box 2627, and the STMT record 731 is time stamped with a date displayed in the text box 2626. The spreadsheet user makes one choice out of three:

- if he/she wants to replace the existing definitions based on the STMT table 730 by the definitions based on the STEIT table 770 for all the scalable template items, then he/she click with the pointing device 105 on the "Yes to All" push-button 2629 and control is given to step 2552;
- if he/she wants to replace the existing definition based on the STMT table 730 by the definition based on the STEIT table 770 for the current scalable template item, then he/she click with the pointing device 105 on the "Yes" push-button 2630 and control is given to step 2550;
- if he/she does not want to replace the existing definition based on the STMT table 730 by the definition based on the STEIT table 770 for the current scalable template item, then he/she click with the pointing device 105 on the "NO" push-button 2628 and control is given to step 2553.

In all the three cases, the frame 2631 and the objects it contains are no longer displayed on the display device 106 as soon as the spreadsheet user clicks with the pointing device 105 on one of the three push-buttons 2628, 2629, and 2630.

At step 2552, the local variable STIM_replace_all is set equal to the value "YES" and then control is given to step 2550.

At step 2553, a test is performed to check if the value of the local variable STIM_index1 is greater than or equal to the value of the local variable STIM_STEIT_size. If it is the case, then control is given to step 2536; otherwise control is given to step 2554.

At step 2554, the local variable STIM_index1 is initialised to the value 1 (one) and then control is given to step 2541.

At step 2555, a test is performed to check if the value of the "REFERENCED" attribute 740 of the "Type" field 737 of the STIM_STMT_rec record 731 is equal to "TEMPLATE" or to "INSTANCE". If it is the case, then control is given to step 2556; otherwise control is given to step 2547.

At step 2556, a test is performed to check if the value of the "NATURE" attribute 741 of the "Type" field 737 of the STIM_STMT_rec record 731 is equal to "TEMPLATE". If it is the case, then control is given to step 2558; otherwise control is given to step 2557.

At step 2557, a test is performed to check if the respective values of the "META" attribute 739 of the "Type" field 737 of the STIM_STMT rec record 731, of the "NATURE" attribute 741 of the "Type" field 737 of the STIM_STMT_rec record 731, and of the "Info Field 2" field 736 of the STIM_STMT_rec record 731, are equal to the values of the "META" attribute 779 of the "Type" field 777 of the STIM_STEIT rec record 771, of the "NATURE" attribute 771 of the "Type" field 777 of the STIM_STEIT rec record 771, and of the "Info Field 2" field 776 of the STIM_STEIT_rec record 771. If it is the case, then control is given to step 2547; otherwise control is given to step 2558.

At step 2558, a warning message notification is issued for informing the user that the currently processed scalable template object cannot be imported (replacing the scalable template object currently defined under the same name), due to the risk of corrupting the existing scalable template instances which abide by the definition of this scalable template object, upon any future update of those scalable template instances. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2553.

E14. Scalable Template Instance Export Manager Method

Figure 28A:
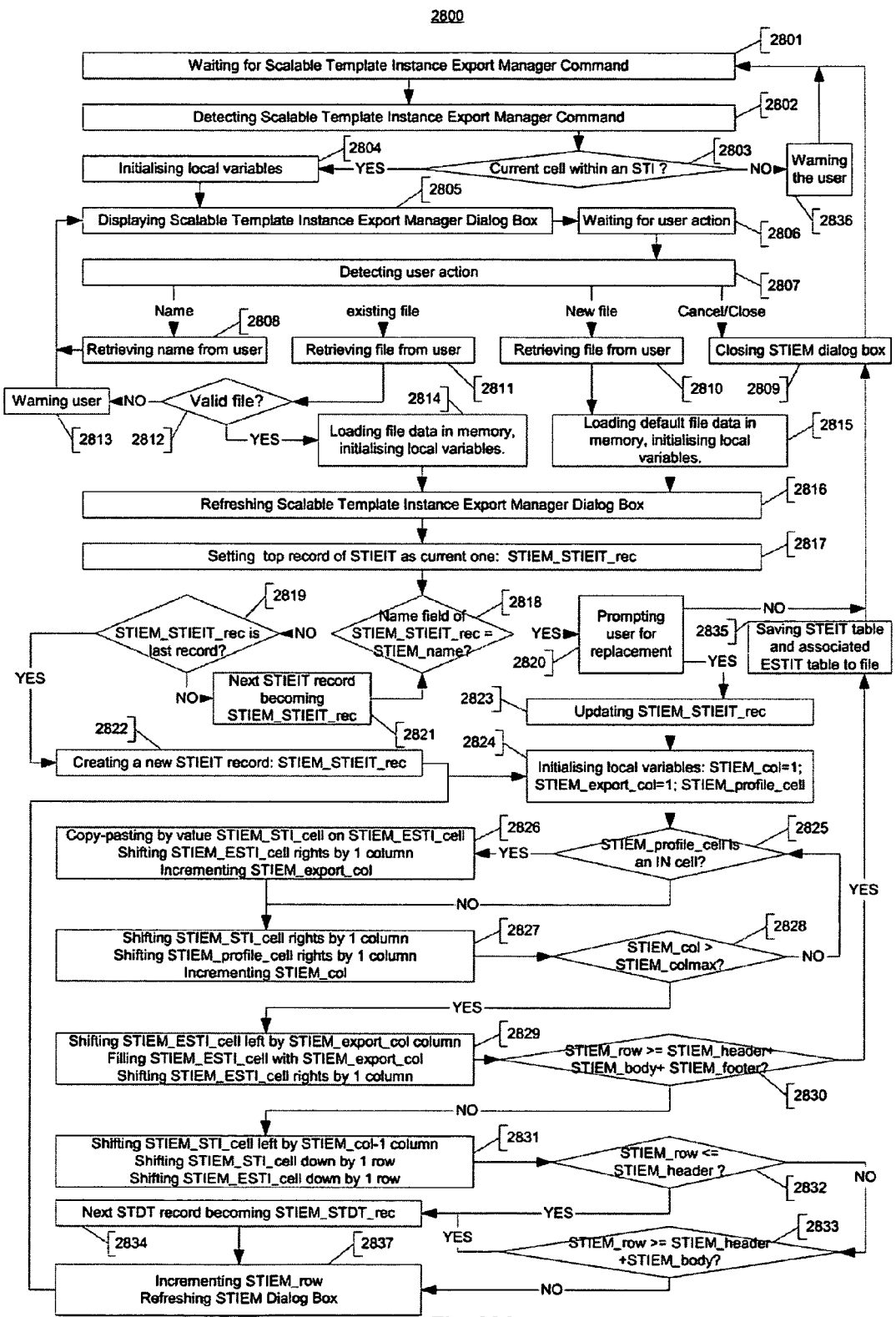
FIG. 28A is a flow chart illustrating a preferred method for exporting scalable template instances according to a preferred embodiment of the present invention.

The method for exporting the variable part of an existing scalable template instance from a source spreadsheet file to a destination spreadsheet instance export-import file used in a preferred embodiment of the present invention is summarised in flowchart 2800 of FIG. 28A. This method can be seen as the processing of the Scalable Template Instance Export Manager command.

At step 2801, the method is in its default state, waiting for an event to initiate the process.

At step 2802, the Scalable Template Instance Export Manager command is detected, as a result of a user action. This action can be for instance a specific combination of key on the keyboard 104, or the click of the pointing device 105 on a specific button, or any other similar means not further specified here. When the Scalable Template Instance Export Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 2803, a test is performed to check if the currently selected cell belongs to an existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance and control is given to step 2804; otherwise control is given to the step 2836.

At step 2804, several local variables are initialised.

The local variable STIEM_name is initialised with the name of the range of cells corresponding to the scalable template instance to which the currently selected cell belongs. If this scalable template instance is not a named range of cells, then the local variable STIEM_name defaults to an empty character string.

Then the local variable STIEM_ST is initialised with the value of the "ST" field 753 of the record 751 found at step 2803.

Then the local variable STIEM_body is initialised with the value of the "Element #" field 754 of the record 751 found at step 2803.

Then the local variable STIEM_header is initialised with the value of the "Header Size" field 756 of the record 751 found at step 2803.

Then the local variable STIEM_footer is initialised with the value of the "Footer Size" field 757 of the record 751 found at step 2803.

Then the local variable STIEM_row is initialised with the value 1 (one).

Then the local variable STIEM_file is initialised with the default value corresponding to an empty character string.

Then the local variable STIEM_STI_cell is initialised as being the top left cell of the scalable template instance to which the currently selected cell belongs.

Then the local variable STIEM_STDT_rec is initialised as being the top pair 761 of the STDT table 760 pointed by the "Description Ptr" field 724 of the record 721 of the STT table 720 whose "Name" field 722 is equal to the "ST" field 753 of the record 751 found at step 2803.

Then the local variable STIEM_STDT_name is initialised with the name of the element profile or meta-element profile within the pair STIEM_STDT_rec.

Then the local variable STIEM_profile_desc is initialised as being the descriptive range of cells pointed by the "Description Ptr" field 714 of the record 711 of the EPT table 710, whose "Name" field 712 is equal to the local variable STIEM_STDT_name.

Then the local variable STIEM_colmax is initialised with the value of the "Column #" field 716 of the record 711 of the EPT table 710, whose "Name" field 712 is equal to the local variable STIEM_STDT_name.

At step 2805, the Scalable Template Instance Export Manager Dialog Box 2700 is displayed on the display device 106. At this stage of the Scalable Template Instance Export Manager method, the Scalable Template Instance Export Manager Dialog Box 2700 contains only three text boxes and four push-buttons:

the "Export file" text box 2703 which is filled with the value of the local variable STIEM_file;

the "Instance Name" text box 2704 which is filled with the value of the local variable STIEM_name;

the "Template Name" text box 2705 which is filled with the value of the local variable STIEM_ST;

the push-button "Name or Rename the Instance" 2712;

the push-button "Export in a NEW file" 2714; the push-button "Export in an EXISTING file" 2713;

and the push-button "Cancel" 2702.

The two push-buttons "Export in a NEW file" 2714 and "Export in an EXISTING file" 2713 are enabled if and only if the value of the local variable STIEM_name differs from the default value (empty character string). Otherwise these two push-buttons are disabled, so that any click with the pointing device 105 on them will not be recognised as a valid event.

At step 2806, the method is waiting for any user action on the Scalable Template Instance Export Manager Dialog Box 2700. Such user action is typically resulting from a click with the pointing device 105, but take other similar forms such as, but not limited to a specific combination of key on the keyboard 104, or any other similar means not further specified here.

At step 2807, a user action on the Scalable Template Instance Export Manager Dialog Box 2700 is detected.

If the user action is a click on the push-button "Export in a NEW file" 2714, then control is given to step 2810;

if the user action is a click on the push-button "Export in an EXISTING file" 2713, then control is given to step 2811;

if the user action is a click on the push-button "Name or Rename the Instance" 2712, then control is given to step 2808;

if the user action is a click on the push-button "Cancel" 2702, or on the closing-window push-button 2701, then control is given to step 2809.

At step 2808, conventional means are used to interface with the spreadsheet user for naming the range of cells corresponding to the scalable template instance to which the currently selected cell belongs. In a preferred embodiment of the present invention, these means correspond to a conventional range name dialog box displayed on the display device 106, but any other similar conventional means could be used instead without departing from the spirit of the invention. Once the spreadsheet user has specified a new or an updated name for the range of cells corresponding to the scalable template instance to which the currently selected cell belongs, the local variable STIEM_name is updated with this user specified name. Then control is given to step 2805.

At step 2809, the Scalable Template Instance Export Manager Dialog Box 2700 is closed and then control is given back to the initial step 2801 for processing any future Scalable Template Instance Export Manager command.

At step 2810, conventional means are used to interface with the spreadsheet user for creating the new spreadsheet instance export-import file to be created. In a preferred embodiment of the present invention, these means correspond to a conventional file creation dialog box displayed on the display device 106, but any other similar conventional means could be used instead without departing from the spirit of the invention. Furthermore no specific assumption is made regarding the file structure used in the environment where the spreadsheet application is running, as any conventional file structure can be used without influencing the spirit of the invention. Then control is given to step 2815.

At step 2811, conventional means are used to interface with the spreadsheet user for retrieving the existing spreadsheet instance export-import file to be updated. In a preferred embodiment of the present invention, these means correspond to a conventional file selection dialog box displayed on the display device 106, but any other similar conventional means could be used instead without departing from the spirit of the invention. Furthermore no specific assumption is made regarding the file structure used in the environment where the spreadsheet application is running, as any conventional file structure can be used without influencing the spirit of the invention.

At step 2812, a test is performed to check if the file identified at step 2811 is a valid spreadsheet instance export-import file. This validity test corresponds to verifying that the spreadsheet file follows the logical file structure 2750 illustrated by the FIG. 27D, which is made of three parts.

The first part 2751 is the spreadsheet instance export-import file header containing a unique signature identifying a spreadsheet instance export-import file.

The second part 2752 is made of a table following the structure of a STIEIT table 790, as illustrated by FIG. 7H.

The third and last part 2753 is the Descriptor area where are recorded the exported scalable template instances, structured as ESTIT tables 2740, pointed by the "Exported STI Ptr" field 796 within the records 791 of the STIEIT-like table recorded within the second part 2752 of the spreadsheet instance export-import file.

If the spreadsheet file follows this logical file structure 2750, then control is given to step 2814; otherwise control is given to step 2813.

At step 2813, a warning message notification is issued for informing the user that the selected file does not comply with the structure of spreadsheet instance export-import files. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2805.

At step 2814, the second and third parts 2752 and 2753 of the selected file are loaded into memory to constitute the STIEIT table 790 and the associated exported scalable template instances in the form of ESTIT tables 2740. Then the local variable STIEM_file is initialised to the name of the spreadsheet instance export-import file retrieved from the spreadsheet user at step 2811. Then control is given to step 2816.

At step 2815, an empty STIEIT table 790 is created in memory as well as the associated memory space for recording the exported scalable template instances in the form of ESTIT tables. Then the local variable STIEM_file is initialised to the name of the spreadsheet instance export-import file retrieved from the spreadsheet user at step 2810.

At step 2816, the Scalable Template Instance Export Manager Dialog Box 2700 is refreshed on the display device 106, as the text box 2703 is filled with the updated value of the local variable STIEM_file, and as the progression bar 2706 is displayed to reflect the fact that the currently processed row of the scalable template instance to which belongs the currently selected cell is the one of rank STIEM_row out of a set of size STIEM_header+STIEM_body+STIEM_footer.

At step 2817, within the STIEIT table 790, the first record 791 becomes the current record STIEM_STIEIT_rec 791 of the STIEIT table 790.

At step 2818, a test is performed on the STIEM_STIEIT_rec record 791 to determine if the value of the "Name" field 792 is equal to the value of the local variable STIEM_name. If it is the case, then control is given to step 2820; otherwise control is given to step 2819.

At step 2819, a test is performed to check if the STIEM_STIEIT_rec record 791 is the last record of the STIEIT table 790. If it is the case, then control is given to step 2822; otherwise control is given to step 2821.

At step 2820, the Scalable Template Instance Export Manager Dialog Box 2700 is updated by displaying in a frame 2711 some information related to a conflict between the record STIEM_STIEIT_rec 791 corresponding to an exported scalable template instance already existing in the spreadsheet instance export-import file and the record 791 to be built in the STIEIT table 790 for representing the exported scalable template instance derived from the scalable template instance to which the currently selected cell belongs. Both records correspond to the same scalable template instance name which is displayed in the text box 2704. The already existing STIEM_STIEIT_rec record 791 is time stamped with the date displayed in the text box 2707, and derived from a file whose name is displayed in the text box 2708. Being aware of these pieces of information, the spreadsheet user can take a decision:
- if he/she wants to replace the existing exported scalable template instance based on the STIEIT table 790 by a new one derived from the current spreadsheet file, then he/she clicks with the pointing device 105 on the "Yes" push-button 2710 and control is given to step 2823;
- if he/she does not want to replace the existing exported scalable template instance based on the STIEIT table 790 by a new one derived from the current spreadsheet file, then he/she clicks with the pointing device 105 on the "NO" push-button 2709 and control is given to step 2809.

In both cases, the frame 2711 and the objects it contains are no longer displayed on the display device 106 as soon as the spreadsheet user clicks with the pointing device 105 on one of the two push-buttons 2709, and 2710.

At step 2821, within the STIEIT table 790, the record 791 which follows the record STIEM_STIEIT_rec 791 becomes the new current record STIEM_STIEIT_rec 791 of the STIEIT table 790.

At step 2822, a new record 791 is created in the STIEIT table 790. This new record becomes the record STIEM_STIEIT rec 791 and is initialised as follows:
- the "Name" field 792 is filled with the value of the local variable STIEM_name;
- the "Source File Name" field 793 is filled with the name of the current spreadsheet file which can be retrieved by conventional means from the spreadsheet environment system information repository;
- the "Export Date" field 794 is filled with the current date and time which can be retrieved by conventional means from the spreadsheet environment system information repository;
- the "Row #" field 795 is filled with the sum of the values of the three local variables STIEM_header, STIEM_body and STIEM_footer;
- the "Exported STI Ptr" field 796 is filled with the memory address of the allocated memory space where the ESTIT table 2740 will record the exported scalable template instance.

Then the local variable STIEM_ESTI_cell is initialised as being the top left cell of the ESTIT table 2740. Then control is given to step 2824.

At step 2823, the record STIEM_STIEIT_rec 791 is updated in the STIEIT table 790. The "Source File Name" field 793 is filled with the name of the current spreadsheet file which can be retrieved by conventional means from the spreadsheet environment system information repository; the "Export Date" field 794 is filled with the current date and time which can be retrieved by conventional means from the spreadsheet environment system information repository; the "Row #" field 795 is filled with the sum of the values of the three local variables STIEM_header, STIEM_body and STIEM_footer. Then the local variable STIEM_ESTI_cell is initialised as being the top left cell of the ESTIT table 2740.

At step 2824, some local variables are initialised: the local variable STIEM_col is initialised to the value 1 (one); the local variable STIEM_export_col is initialised to the value 1 (one); the local variable STIEM_profile_cell is initialised as being the leftmost cell within the range of cells STIEM_profile_desc.

At step 2825, a test is performed to check if STIEM_profile_cell has been defined as an "IN" cell. If it is the case, then control is given to step 2826; otherwise control is given to step 2827.

At step 2826, a conventional copy-paste operation by value is performed from the individual cell STIEM_STI_cell onto the individual cell STIEM_ESTI_cell. Then the individual cell located immediately at the right of STIEM_ESTI_cell becomes the new cell STIEM_ESTI_cell. Then the local variable STIEM_export_col is incremented by 1 (one).

At step 2827, the individual cell located immediately at the right of STIEM_STI_cell becomes the new cell STIEM_STI_cell. The individual cell located immediately at the right of STIEM_profile_cell becomes the new cell STIEM_profile_cell. Then the local variable STIEM_col is incremented by 1 (one).

At step 2828, a test is performed to determine if the value of the local variable STIEM_col is greater than the value of the local variable STIEM_colmax. If it is the case, then control is given to step 2829; otherwise control is given to step 2825.

At step 2829, the individual cell located on the left of STIEM_ESTI_cell by a number of columns equal to the value of the local variable STIEM_export_col becomes the new cell STIEM_ESTI_cell. Then the individual cell STIEM_ESTI_cell is filled with the value of the local variable STIEM_export_col. Then the individual cell located immediately at the right of STIEM_ESTI_cell becomes the new cell STIEM_ESTI_cell.

At step 2830, a test is performed to determine if the value of the local variable STIEM_row is greater than or equal to the sum of the values of the three local variables STIEM_header, STIEM_body, STIEM_footer. If it is the case, then control is given to step 2835; otherwise control is given to step 2831.

At step 2831, the individual cell located on the left of STIEM_STI_cell by a number of columns equal to the value of the local variable STIEM_col decremented by 1 (one) becomes the new cell STIEM_STI_cell. Then the individual cell located immediately below STIEM_STI_cell becomes the new cell STIEM_STI_cell. Then the individual cell located immediately below STIEM_ESTI_cell becomes the new cell STIEM_ESTI_cell.

At step 2832, a test is performed to determine if the value of the local variable STIEM_row is less than or equal to the value of the local variable STIEM_header. If it is the case, then control is given to step 2834; otherwise control is given to step 2833.

At step 2833, a test is performed to determine if the value of the local variable STIEM_row is greater than or equal to the sum of the values of the two local variables STIEM_header, STIEM_body. If it is the case, then control is given to step 2834; otherwise control is given to step 2837.

At step 2834, in the STDT table 760, the pair which follows the STIEM_STDT_rec pair becomes the new pair STIEM_STDT_rec. Then the local variable STIEM_STDT_name is initialised with the name of the element profile or meta-element profile within the pair STIEM_STDT_rec. Then the local variable STIEM_profile_desc is initialised as being the descriptive range of cells pointed by the "Description Ptr" field 714 of the record 711 of the EPT table 710, whose "Name" field 712 is equal to the local variable STIEM_STDT_name. Then control is given to step 2837.

At step 2835, the STIEIT table 790 and the associated exported scalable template instances recorded in ESTIT tables 2740 are saved on the current spreadsheet instance export-import file to respectively constitute the updated second part (STIEIT-like table) 2752 and the updated third part (Descriptor Area) 2753 of the logical structure 2750 followed by the spreadsheet instance export-import file. Then control is given to step 2809.

At step 2836, a warning message notification is issued for informing the user that the scalable template instance export operation can only be performed if the currently selected cell is located within an existing scalable template instance. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to the initial step 2801 for processing any future Scalable Template Instance Export Manager command.

At step 2837, the local variable STIEM_row is incremented by 1 (one). Then the Scalable Template Instance Export Manager Dialog Box 2700 is refreshed on the display device 106, as the progression bar 2706 is displayed to reflect the fact that the currently processed row of the scalable template instance to which belongs the currently selected cell is the one of rank STIEM_row out of a set of size STIEM_header+STIEM_body+STIEM_footer. Then control is given to step 2824.

E15. Scalable Template Instance Import Manager Method

Figure 28B:
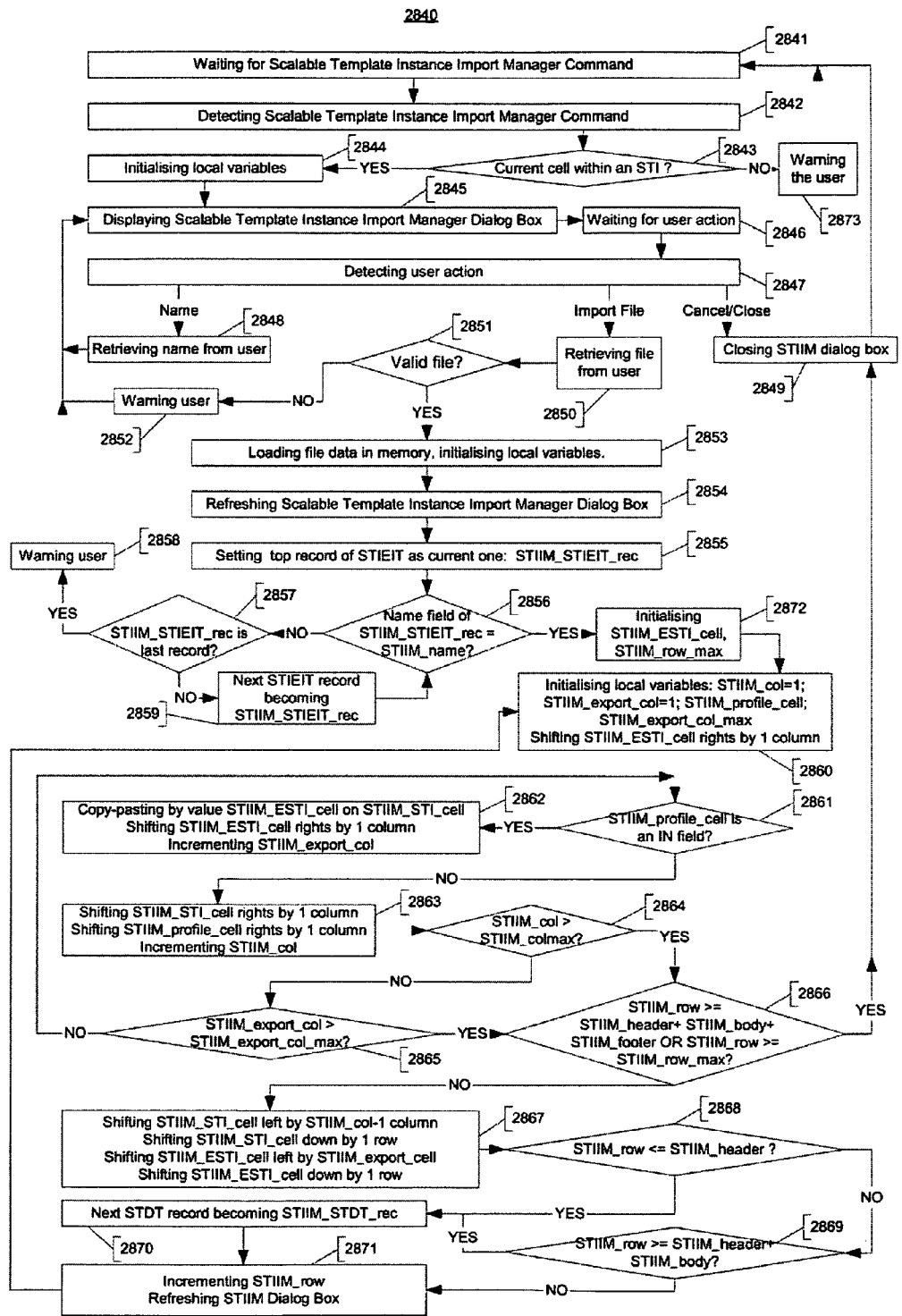
FIG. 28B is a flow chart illustrating a preferred method for importing scalable template instances according to a preferred embodiment of the present invention.

The method for importing the variable part of an existing scalable template instance from a source spreadsheet file to a destination spreadsheet instance export-import file used in a preferred embodiment of the present invention is summarised in flowchart 2840 of FIG. 28B. This method can be seen as the processing of the Scalable Template Instance Import Manager command.

At step 2841, the method is in its default state, waiting for an event to initiate the process.

At step 2842, the Scalable Template Instance Import Manager command is detected, as a result of a user action. This action can be for instance a specific combination of key on the keyboard 104, or the click of the pointing device 105 on a specific button, or any other similar means not further specified here. When the Scalable Template Instance Import Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 2843, a test is performed to check if the currently selected cell belongs to an existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance and control is given to step 2844; otherwise control is given to step 2873.

At step 2844, several local variables are initialised.

The local variable STIIM_name is initialised with the name of the range of cells corresponding to the scalable template instance to which the currently selected cell belongs. If this scalable template instance is not a named range of cells, then the local variable STIIM_name defaults to an empty character string.

Then the local variable STIIM_ST is initialised with the value of the "ST" field 753 of the record 751 found at step 2843.

Then the local variable STIIM_body is initialised with the value of the "Element #" field 754 of the record 751 found at step 2843.

Then the local variable STIIM_header is initialised with the value of the "Header Size" field 756 of the record 751 found at step 2843.

Then the local variable STIIM_footer is initialised with the value of the "Footer Size" field 757 of the record 751 found at step 2843.

Then the local variable STIIM_row is initialised with the value 1 (one).

Then the local variable STIIM_file is initialised with the default value corresponding to an empty character string.

Then the local variable STIIM_STI_cell is initialised as being the top left cell of the scalable template instance to which the currently selected cell belongs.

Then the local variable STIIM_STDT_rec is initialised as being the top pair 761 of the STDT table 760 pointed by the "Description Ptr" field 724 of the record 721 of the STT table 720 whose "Name" field 722 is equal to the "Sr" field 753 of the record 751 found at step 2843.

Then the local variable STIIM_STDT_name is initialised with the name of the element profile or meta-element profile within the pair STIIM_STDT_rec.

Then the local variable STIIM_profile_desc is initialised as being the descriptive range of cells pointed by the "Description Ptr" field 714 of the record 711 of the EPT table 710, whose "Name" field 712 is equal to the local variable STIIM_STDT name.

Then the local variable STIIM_colmax is initialised with the value of the "Column #" field 716 of the record 711 of the EPT table 710, whose "Name" field 712 is equal to the local variable STIIM_STDT_name.

At step 2845, the Scalable Template Instance Import Manager Dialog Box 2720 is displayed on the display device 106. At this stage of the Scalable Template Instance Import Manager method, the Scalable Template Instance Import Manager Dialog Box 2720 comprises only three text boxes and three push-buttons:

the "Import file" text box 2723 which is filled with the value of the local variable STIIM_file;

the "Instance Name" text box 2724 which is filled with the value of the local variable STIIM_name;

the "Template Name" text box 2725 which is filled with the value of the local variable STIIM_ST;

the push-button "Name or Rename the Instance" 2727;

the push-button "Select an Import File" 2728;

the push-button "Cancel" 2722.

The push-button "Select an Import File" 2728 is enabled if and only if the value of the local variable STIIM_name differs from the default value (empty character string).

Otherwise this push-button is disabled, so that any click with the pointing device 105 on it will not be recognised as a valid event.

At step 2846, the method is waiting for any user action on the Scalable Template Instance Import Manager Dialog Box 2720. Such user action is typically resulting from a click with the pointing device 105, but take other similar forms such as, but not limited to a specific combination of key on the keyboard 104, or any other similar means not further specified here.

At step 2847, a user action on the Scalable Template Instance Import Manager Dialog Box 2720 is detected. If the user action is a click on the push-button "Select an Import File" 2728, then control is given to step 2850. If the user action is a click on the push-button "Name or Rename the Instance" 2727, then control is given to step 2848. If the user action is a click on the push-button "Cancel" 2722, or on the closing-window push-button 2721, then control is given to step 2849.

At step 2848, conventional means are used to interface with the spreadsheet user for naming the range of cells corresponding to the scalable template instance to which the currently selected cell belongs. In a preferred embodiment of the present invention, these means correspond to a conventional range name dialog box displayed on the display device 106, but any other similar conventional means could be used instead without departing from the spirit of the invention. Once the spreadsheet user has specified a new or an updated name for the range of cells corresponding to the scalable template instance to which the currently selected cell belongs, the local variable STIIM_name is updated with this user specified name. Then control is given to step 2845.

At step 2849, the Scalable Template Instance Import Manager Dialog Box 2720 is closed and then control is given back to the initial step 2841 for processing any future Scalable Template Instance Import Manager command.

At step 2850, conventional means are used to interface with the spreadsheet user for retrieving the existing spreadsheet instance export-import file to be accessed. In a preferred embodiment of the present invention, these means correspond to a conventional file selection dialog box displayed on the display device 106, but any other similar conventional means could be used instead without departing from the spirit of the invention. Furthermore no specific assumption is made regarding the file structure used in the environment where the spreadsheet application is running, as any conventional file structure can be used without influencing the spirit of the invention.

At step 2851, a test is performed to check if the file identified at step 2850 is a valid spreadsheet instance export-import file. This validity test corresponds to verifying that the spreadsheet file follows the logical file structure 2750 illustrated by the FIG. 27D, which is made of three parts.

The first part 2751 is the spreadsheet instance export-import file header containing a unique signature identifying a spreadsheet instance export-import file.

The second part 2752 is made of a table following the structure of a STIEIT table 790, as illustrated by FIG. 7H.

The third and last part 2753 is the Descriptor area where are recorded the exported scalable template instances, structured as ESTIT tables 2740, pointed by the "Exported STI Ptr" fields 796 within the records 791 of the STIEIT-like table recorded within the second part 2752 of the spreadsheet instance export-import file.

If the spreadsheet file follows this logical file structure 2750, then control is given to step 2853; otherwise control is given to step 2852.

At step 2852, a warning message notification is issued for informing the user that the selected file does not comply with the structure of spreadsheet instance export-import files. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2845.

At step 2853, the second and third parts 2752 and 2753 of the selected file are loaded into memory to constitute the STIEIT table 790 and the associated exported scalable template instances in the form of ESTIT tables 2740. Then the local variable STIIM_file is initialised to the name of the spreadsheet instance export-import file retrieved from the spreadsheet user at step 2850.

At step 2854, the Scalable Template Instance Import Manager Dialog Box 2720 is refreshed on the display device 106, as the text box 2723 is filled with the updated value of the local variable STIIM_file, and as the progression bar 2726 is displayed to reflect the fact that the currently processed row of the scalable template instance to which belongs the currently selected cell is the one of rank STIIM_row out of a set of size STIIM_header+STIIM_body+STIIM_footer.

At step 2855, within the STIEIT table 790, the first record 791 becomes the current record STIIM_STIEIT_rec 791 of the STIEIT table 790.

At step 2856, a test is performed on the STIIM_STIEIT_rec record 791 to determine if the value of the "Name" field 792 is equal to the value of the local variable STIIM_name. If it is the case, then control is given to step 2872; otherwise control is given to step 2857.

At step 2857, a test is performed to check if the STIIM_STIEIT_rec record 791 is the last record of the STIEIT table 790. If it is the case, then control is given to step 2858; otherwise control is given to step 2859.

At step 2858, a warning message notification is issued for informing the user that the selected file does not comprise any exported scalable template instance that shares the same name as the scalable template instance to which the currently selected cell belongs. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2845.

At step 2859, within the STIEIT table 790, the record 791 which follows the record STIIM_STIEIT_rec 791 becomes the new current record STIIM_STIEIT_rec 791 of the STIEIT table 790.

At step 2860, some local variables are initialised:
  the local variable STIIM_col is initialised to the value 1 (one);
  the local variable STIIM_export_col is initialised to the value 1 (one);
  the local variable STIIM_profile_cell is initialised as being the leftmost cell within the range of cells STIIM_profile_desc;
  the local variable STIIM_export_col_max is initialised with the content of the individual cell STIIM_ESTI_cell.
  Then the individual cell located immediately at the right of STIIM_ESTI_cell becomes the new cell STIIM_ESTI_cell.

At step 2861, a test is performed to check if STIIM_profile cell has been defined as an "IN" cell. If it is the case, then control is given to step 2862; otherwise control is given to step 2863.

At step 2862, a conventional copy-paste operation by value is performed from the individual cell STIIM_ESTI_cell onto the individual cell STIIM_STI_cell. Then the individual cell located immediately at the right of STIIM_ESTI_cell becomes the new cell STIIM_ESTI_cell. Then the local variable STIIM_export_col is incremented by 1 (one).

At step 2863, the individual cell located immediately at the right of STIIM_STI_cell becomes the new cell STIIM_STI_cell. The individual cell located immediately at the right of STIIM_profile cell becomes the new cell STIIM_profile_cell. Then the local variable STIIM_col is incremented by 1 (one).

At step 2864, a test is performed to determine if the value of the local variable STIIM_col is greater than the value of the local variable STIIM_colmax. If it is the case, then control is given to step 2866; otherwise control is given to step 2865.

At step 2865, a test is performed to determine if the value of the local variable STIIM_export_col is greater than the value of the local variable STIIM_export_col_max. If it is the case, then control is given to step 2866; otherwise control is given to step 2861.

At step 2866, a test is performed to determine if the value of the local variable STIIM_row is greater than or equal to the sum of the values of the three local variables STIIM_header, STIIM_body, STIIM_footer, or if the value of the local variable STIIIM_row is greater than or equal to the value of the local variable STIM_row_max. If it is the case, then control is given to step 2849; otherwise control is given to step 2867.

At step 2867, the individual cell located on the left of STIIM_STI_cell by a number of columns equal to the value of the local variable STIIM_col decremented by 1 (one) becomes the new cell STIIM_STI_cell. Then the individual cell located immediately below STIIM_STI_cell becomes the new cell STIIM_STI_cell. Then the individual cell located on the left of STIIM_ESTI_cell by a number of columns equal to the value of the local variable STIIM_export_cell becomes the new cell STIIM_ESTI_cell. Then the individual cell located immediately below STIIM_ESTI_cell becomes the new cell STIIM_ESTI_cell.

At step 2868, a test is performed to determine if the value of the local variable STIIM_row is less than or equal to the value of the local variable STIIM_header. If it is the case, then control is given to step 2870; otherwise control is given to step 2869.

At step 2869, a test is performed to determine if the value of the local variable STIIM_row is greater than or equal to the sum of the values of the two local variables STIIM_header, STIIM_body. If it is the case, then control is given to step 2870; otherwise control is given to step 2871.

At step 2870, in the STDT table 760, the pair which follows the STIIM_STDT_rec pair becomes the new pair STIIM_STDT_rec. Then the local variable STIIM_STDT_name is initialised with the name of the element profile or meta-element profile within the pair STIIM_STDT rec. Then the local variable STIIM_profile_desc is initialised as being the descriptive range of cells pointed by the "Description Ptr" field 714 of the record 711 of the EPT table 710, whose "Name" field 712 is equal to the local variable STIIM_STDT_name.

At step 2871, the local variable STIIM_row is incremented by 1 (one). Then the Scalable Template Instance Import Manager Dialog Box 2720 is refreshed on the display device 106, as the progression bar 2726 is displayed to reflect the fact that the currently processed row of the scalable template instance to which belongs the currently selected cell is the one of rank STIIM_row out of a set of size STIIM_header+STIIM_body+STIIM_footer. Then control is given to step 2860.

At step 2872, the local variable STIIM_row_max is initialised to the value of the "Row #" field 795 of the STIIM_STIEIT rec record 791 identified at step 2856. Then the local variable STIIM_ESTI_cell is initialised as being the leftmost cell 2742 of the top record 2741 of the ESTIT table 2740 pointed by the "Exported STI Ptr" field 796 of the STIIM_STIEIT_rec record 791 identified at step 2856. Then control is given to step 2860.

At step 2873, a warning message notification is issued for informing the user that the scalable template instance import operation can only be performed if the currently selected cell is located within an existing scalable template instance. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to the initial step 2841 for processing any future Scalable Template Instance Import Manager command.

E16. Scalable Template Instance Sort Application Manager Method

The method for performing a sorting application on a scalable template instance used in a preferred embodiment of the present invention can be summarised in flowchart 2900 of FIG. 29A. This method can be seen as the processing of the Scalable Template Instance Sort Application Manager command.

At step 2901, the method is in its default state, waiting for an event to initiate the process.

At step 2902, the Scalable Template Instance Sort Application Manager command is detected, as a result of a user action. This action can be for instance a specific combination of key on the keyboard 104, or the click of the pointing device 105 on a specific button, or any other similar means not further specified here.

When the Scalable Template Instance Sort Application Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 2903, a test is performed to check if the currently selected range of cells (referred to as STISM_range) overlaps any existing scalable template instance. This test is performed by parsing the STIT table 750 and visiting in each record 751 the "Address" field 752 to determine if the range of cells address specified in this field does overlap the address of the currently selected range of cells STISM_range. If it is the case, then control is given to step 2904; otherwise control is given to step 2917.

At step 2904, a test is performed to check if the currently selected cell is located within any existing scalable template instance. This test is performed by parsing the STIT table 750 and visiting in each record 751 the "Address" field 752 to determine if the range of cells address specified in this field does include the address of the individual currently selected cell. If it is the case, then the currently selected cell is contained in a scalable template instance named STISM_instance_range and control is given to step 2905; otherwise control is given to step 2906.

At step 2905, two local variables STISM_element and STISM_instance are initialised with the value "ENABLE". Then the local variable STISM_mode takes the default value "ELEMENT". Then control is given to step 2907.

At step 2906, two local variables STISM_element and STISM_instance are initialised with the value "DISABLE". Then the local variable STISM_mode takes the default value "RANGE".

At step 2907, if the local variable STISM_instance is equal to "DISABLE", then the local variable STISM_name takes the value "NONE". If the local variable STISM_instance is equal to "ENABLE", then the local variable STISM_name takes the value of the name of the scalable template which is abided by the scalable template instance STISM_instance_range. This name can be retrieved from the "ST" field 753 within the record 751 of the STIT table 750, associated to the scalable template instance STISM_instance_range.

Then several tests are performed to evaluate the potential impact of the sorting application according to the "RANGE" mode, on any already existing scalable template instance. These tests require to parse the STIT table 750, and to visit each record 751 to learn the address ("Address" field 752) and the importance ("Critical" field 755) of every already defined scalable template instance. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

If there exists at least one existing scalable template instance whose "Critical" field 755 takes the value "YES" and which partially or totally overlaps the currently selected range of cells STISM_range, then the local test variable STISM_range_critical takes the value "YES"; otherwise the local test variable STISM_range_critical takes the value "NO".

If there exists at least one existing scalable template instance whose "Critical" field 755 takes the value "NO" and which partially or totally overlaps the currently selected range of cells STISM_range, then the local test variable STISM_range_other takes the value "YES"; otherwise the local test variable STISM_range_other takes the value "NO".

At step 2908, the Scalable Template Instance Sort Manager Dialog Box 2920 is displayed on the display device 106. The label box 2931 is initialised with the name of the scalable template that the scalable template instance STISM_name abides by. If the local parameter STISM_element takes the value "ENABLE", then the option button 2929 is enabled, meaning that any future click on it with the pointing device 105 will be recognised as a valid event. If the local parameter STISM_element takes the value "DISABLE", then the option button 2929 is disabled, meaning that any future click on it with the pointing device 105 will not be recognised as a valid event. If the local parameter STISM_instance takes the value "ENABLE", then the option button 2928 is enabled, meaning that any future click on it with the pointing device 105 will be recognised as a valid event. If the local parameter STISM_instance takes the value "DISABLE", then the option button 2928 is disabled, meaning that any future click on it with the pointing device 105 will not be recognised as a valid event. Then if the local variable STISM_mode takes the respective value "RANGE", or "ELEMENT", or "INSTANCE", then the option button 2930, or 2929, or 2928 displays alone a black point. Then the text box 2932 is initialised with the value of the local variable STISM_range_critical. Then the text box 2933 is initialised with the value of the local variable STISM_range_other. Then the text box 2925 is initialised with the value "YES" (respectively "NO") if the local variable STISM_range_critical is equal to "NO" (respectively "YES"). Then the text box 2926 is initialised with the value "YES" (respectively "NO") if the local variable STISM_element takes the value "ENABLE" (respectively "DISABLE"). Then the text box 2927 is initialised with the value "YES" (respectively "NO") if the local variable STISM_instance takes the value "ENABLE" (respectively "DISABLE"). Finally the "Sort" push-button 2923 is enabled if the text box 2925 shows the value "YES" and the option button 2930 shows a black point, or if the text box 2926 shows the value "YES" and the option button 2929 shows a black point, or if the text box 2927 shows the value "YES" and the option button 2928 shows a black point.

At step 2909, the method is waiting for any user action on the Scalable Template Instance Sort Manager Dialog Box 2920. Such user action is typically resulting from a click with the pointing device 105, but take other similar forms such as, but not limited to a specific combination of key on the keyboard 104, or any other similar means not further specified here.

At step 2910, a user action on the Scalable Template Instance Sort Manager Dialog Box 2920 is detected.
  If the user action is a click on the "Sort" push-button 2923, then control is given to step 2913;
    if the user action is a click on one of the option buttons 2930, or 2929, or 2928, then control is given to step 2911;
    if the user action is a click on the "Cancel" push-button 2922, or on the closing-window push-button 2921, then control is given to step 2912.
At step 2911, the local variable STISM_mode takes the value "RANGE", or "ELEMENT", or "INSTANCE", if the spreadsheet user has respectively clicked with the pointing device 105 on the option button 2930, or 2929, or 2928. Then control is given to step 2908.
At step 2912, the Scalable Template Instance Sort Manager Dialog Box 2920 is closed (if it was opened) and then control is given back to the initial step 2901 for processing any future Scalable Template Instance Sort Application Manager command.
At step 2913, a test is performed to check the value of the local variable STISM_mode. If this local variable is found equal to "RANGE", then control is given to step 2916; if it is found equal to "INSTANCE", then control is given to step 2915; if it is found equal to "ELEMENT", then control is given to step 2914.
At step 2914, the currently selected range of cells STISM_range is reshaped so that it first occupies all the columns of the scalable template instance STISM_instance_range and second does not occupy any row outside the intersection of the body part of the scalable template instance STISM_instance_range with the previous position of the selected range of cells. Then the currently selected cell becomes the top left cell of this reshaped currently selected range of cells. Then control is given to step 2917.
At step 2915, the currently selected range of cells is reshaped so that it occupies the same rows and columns as the body part of the scalable template instance STISM_instance_range. Then control is given to step 2917.
At step 2916, the STIT table 750 is scanned to remove from it any record 751 corresponding to a corrupted scalable template instance, as found at step 2907. Each time such a record 751 has been removed from the STIT table 750, the "Reference Housekeeping Process", as described in step 1414 of the Scalable Template Instanciator method, is invoked and executed before looking for any other record 751 to be removed from the STIT table 750.
At step 2917, the conventional user-interface means are used to retrieve from the spreadsheet user the conventional options and parameters characterising the sorting application. Such means can typically correspond to the display of a dedicated dialog box on the display device 106, but any other similar means could be used instead without departing from the spirit of the present invention.
At step 2918, the sorting operation is performed according to the conventional means on the range of cells which may have been reshaped during previous steps 2914 or 2915. Then control is given to step 2912.

Alternate Embodiments

The methods and systems according to the present invention may be used advantageously in those environments where elements of information are organised as vertically structured two dimensions tables.

The methods and systems according to the present invention may be used advantageously in those environments where elements of information are organised as multidimensional tables having more than two dimensions.

While the invention has been particularly shown and described with reference to a preferred embodiment, it will be understood that various changes in form and detail may be made therein without departing from the spirit, and scope of the invention.

What is claimed is:

1. A computer program product for exporting-importing the content of input cells from a source scalable template instance having input cells and output cells in a source multi-dimensional spreadsheet to a destination scalable template instance in a destination multi-dimensional spreadsheet, wherein a scalable template includes a reference to a couple, the couple including an element format and an element profile that define all body elements of a body part of a range of cells of a multi-dimensional spreadsheet, the computer program product comprising a computer-readable storage medium having computer-readable program code embodied in said medium, said computer-readable program code comprising:
  computer-readable program code that detects a command for exporting-importing input cells from a source scalable template instance in a source spreadsheet to a destination scalable template instance in a destination spreadsheet;
  computer-readable program code that identifies a source scalable template including a plurality of cells associated with the source scalable template instance, wherein the plurality of cells includes both input cells and output cells;
  computer-readable program code that identifies ones of the plurality of cells of the source scalable template defined as input cells in an element profile of the source scalable template;
  computer-readable program code that identifies a destination scalable template including a plurality of cells associated with the destination scalable template instance, wherein the plurality of cells includes both input cells and output cells;
  computer-readable program code that identifies ones of the plurality of cells of the destination scalable template defined as input cells in an element profile of the destination scalable template; and
  computer-readable program code that copies, cell per cell, the content of each input cell of the source scalable template instance to each input cell of the destination scalable template instance without copying the content of output cells of the source scalable template instance to output cells of the destination scalable template instance.

* * * * *